United States Patent
Hauenstein et al.

(10) Patent No.: US 11,449,222 B2
(45) Date of Patent: *Sep. 20, 2022

(54) DEVICES, METHODS, AND GRAPHICAL USER INTERFACES FOR MOVING USER INTERFACE OBJECTS

(71) Applicant: Apple Inc., Cupertino, CA (US)

(72) Inventors: Mark K. Hauenstein, San Francisco, CA (US); Raymond S. Sepulveda, Portland, OR (US); Marcos Alonso Ruiz, Oakland, CA (US); Julian K. Missig, Burlingame, CA (US); Jeffrey T. Bernstein, San Francisco, CA (US); Patrick L. Coffman, San Francisco, CA (US); Stephen O. Lemay, Palo Alto, CA (US)

(73) Assignee: APPLE INC., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/138,602

(22) Filed: Dec. 30, 2020

(65) Prior Publication Data

US 2021/0117079 A1    Apr. 22, 2021

Related U.S. Application Data

(63) Continuation of application No. 15/845,528, filed on Dec. 18, 2017, now Pat. No. 10,908,809.

(Continued)

(51) Int. Cl.
*G06F 3/04883* (2022.01)
*G06F 3/0482* (2013.01)
(Continued)

(52) U.S. Cl.
CPC .......... *G06F 3/04883* (2013.01); *G06F 3/016* (2013.01); *G06F 3/0482* (2013.01);
(Continued)

(58) Field of Classification Search
CPC .. G06F 3/016; G06F 3/04812; G06F 3/04817; G06F 3/0482; G06F 3/0485;
(Continued)

(56) References Cited

U.S. PATENT DOCUMENTS 10,564,806 B1    2/2020 Gray et al.
10,691,298 B2    6/2020 Zhang et al.
(Continued)

FOREIGN PATENT DOCUMENTS

CN    103064625 A    4/2013
CN    105955641 A    9/2016
(Continued)

OTHER PUBLICATIONS

Office Action, dated Nov. 17, 2020, received in Chinese Patent Application No. 202010011056.2 (7480CN), which corresponds with U.S. Appl. No. 15/845,528, 11 pages.
(Continued)

*Primary Examiner* — Chau T Nguyen
(74) *Attorney, Agent, or Firm* — Morgan, Lewis & Bockius LLP

(57) ABSTRACT

System and method of moving selected content is disclosed. In response to detecting a first portion of an input that activates a move operation for selected first content, a copy of at least a portion of the first content is displayed in a container object, and the container object is moved from a first placement location to a second placement location relative to a characteristic location of the contact(s) on the touch-screen display. After the movement from the first placement location to the second placement location relative to the characteristic location of the one or more contacts, the container object moves in accordance with movement of the one or more contacts while the container object is maintained at the second placement location relative to the (Continued)

characteristic location of the one or more contacts as the one or more contacts move across the touch-screen display.

51 Claims, 109 Drawing Sheets

Related U.S. Application Data

(60) Provisional application No. 62/507,124, filed on May 16, 2017.

(51) Int. Cl.
| | | |
|---|---|---|
| *G06F 3/04817* | (2022.01) | |
| *G06F 3/0485* | (2022.01) | |
| *G06F 3/0486* | (2013.01) | |
| *G06F 3/01* | (2006.01) | |
| *G06F 3/04812* | (2022.01) | |

(52) U.S. Cl.
CPC .......... *G06F 3/0485* (2013.01); *G06F 3/0486* (2013.01); *G06F 3/04812* (2013.01); *G06F 3/04817* (2013.01); *G06F 2203/0381* (2013.01); *G06F 2203/04808* (2013.01)

(58) Field of Classification Search
CPC ............... G06F 3/0486; G06F 3/04883; G06F 2203/014; G06F 2203/0381; G06F 2203/04808
See application file for complete search history.

(56) References Cited

U.S. PATENT DOCUMENTS

| | | | |
|---|---|---|---|
| 2008/0040668 A1 | 2/2008 | Ala-Rantala | |
| 2009/0138827 A1 | 5/2009 | Van Os et al. | |
| 2011/0252346 A1 | 10/2011 | Chaudhri | |
| 2011/0252349 A1 | 10/2011 | Chaudhri | |
| 2011/0307815 A1 | 12/2011 | Lampinen et al. | |
| 2012/0030568 A1* | 2/2012 | Migos .................. | G06F 3/0486 715/702 |
| 2012/0084689 A1* | 4/2012 | Ledet .................... | G06F 3/0486 715/769 |
| 2012/0162213 A1* | 6/2012 | Shim .................. | G06F 3/04815 345/419 |
| 2012/0287065 A1* | 11/2012 | Oshinome ............. | G06F 3/0486 345/173 |
| 2013/0016042 A1 | 1/2013 | Makinen et al. | |
| 2013/0019182 A1 | 1/2013 | Gil et al. | |
| 2013/0067392 A1 | 3/2013 | Leonard et al. | |
| 2013/0139107 A1 | 5/2013 | Jung | |
| 2013/0246970 A1 | 9/2013 | Helle | |
| 2014/0013254 A1 | 1/2014 | Hosein | |
| 2014/0258905 A1* | 9/2014 | Lee .................... | G06F 3/04883 715/770 |
| 2014/0331145 A1 | 11/2014 | Schoenefeld | |
| 2015/0193111 A1 | 7/2015 | Kauffmann et al. | |
| 2015/0317053 A1* | 11/2015 | Baek .................. | G06F 3/04817 715/765 |
| 2016/0274686 A1* | 9/2016 | Alonso Ruiz ....... | G06F 3/04883 |
| 2017/0336938 A1* | 11/2017 | Rhee ................... | G06F 3/04883 |
| 2018/0032997 A1* | 2/2018 | Gordon .............. | G06Q 30/0269 |
| 2018/0335937 A1 | 11/2018 | Hauenstein et al. | |

FOREIGN PATENT DOCUMENTS

| | | |
|---|---|---|
| EP | 3 130 997 A1 | 2/2017 |
| WO | WO 2014/200735 A1 | 12/2014 |
| WO | WO 2016/144975 A2 | 9/2016 |
| WO | WO 2017/027526 A1 | 2/2017 |

OTHER PUBLICATIONS

Tiemann, "Mac OS X Panther: Keeping Things Organized", http://www.informit.com/articles/article.aspx?p=169526&seqNum=7, Mar. 5, 2004, 3 pages.
Office Action, dated Mar. 26, 2020, received in U.S. Appl. No. 15/845,528 (7480), 6 pages.
Notice of Allowance, dated Sep. 30, 2020, received in U.S. Appl. No. 15/845,528 (7480), 10 pages.
Office Action, dated Feb. 15, 2018, received in Danish Patent Application No. 201770376 (7480DK), which corresponds with U.S. Appl. No. 15/845,528, 4 pages.
Office Action, dated Dec. 3, 2018, received in Danish Patent Application No. 201770376 (7480DK), which corresponds with U.S. Appl. No. 15/845,528, 5 pages.
Office Action, dated Aug. 20, 2019, received in Danish Patent Application No. 201770376 (7480DK), which corresponds with U.S. Appl. No. 15/845,528, 4 pages.
Office Action, dated Feb. 3, 2020, received in Danish Patent Application No. 201770376 (7480DK), which corresponds with U.S. Appl. No. 15/845,528, 3 pages.
Intention to Grant, dated Feb. 12, 2020, received in Danish Patent Application No. 201770376 (7480DK), which corresponds with U.S. Appl. No. 15/845,528, 2 pages.
Notice of Allowance, dated May 15, 2020, received in Danish Patent Application No. 201770376 (7480DK), which corresponds with U.S. Appl. No. 15/845,528, 3 pages.
Patent, dated May 26, 2020, received in Danish Patent Application No. 201770376 (7480DK), which corresponds with U.S. Appl. No. 15/845,528, 3 pages.
International Search Report and Written Opinion, dated Aug. 24, 2018, received in International Patent Application No. PCT/US2018/030697 (7480WO), which corresponds with U.S. Appl. No. 15/845,528, 17 pages.
Office Action, dated Jul. 29, 2021, received in Chinese Patent Application No. 202010011056.2 (7480CN), which corresponds with U.S. Appl. No. 15/845,528, 7 pages.
Patent, dated Aug. 31, 2021, received in Chinese Patent Application No. 202010011056.2 (7480CN), which corresponds with U.S. Appl. No. 15/845,528, 7 pages.
Intention to Grant, dated Aug. 16, 2021, received in European Patent Application No. 18726290.2 (7480EP), which corresponds with U.S. Appl. No. 15/845,528, 7 Pages.
Decision to Grant, dated Mar. 31, 2022, received in European Patent Application No. 18726290.2, which corresponds with U.S. Appl. No. 15/845,528, 3 Pages.
Patent, dated May 11, 2022, received in European Patent Application No. 18726290.2, which corresponds with U.S. Appl. No. 15/845,528, 2 Pages.

* cited by examiner

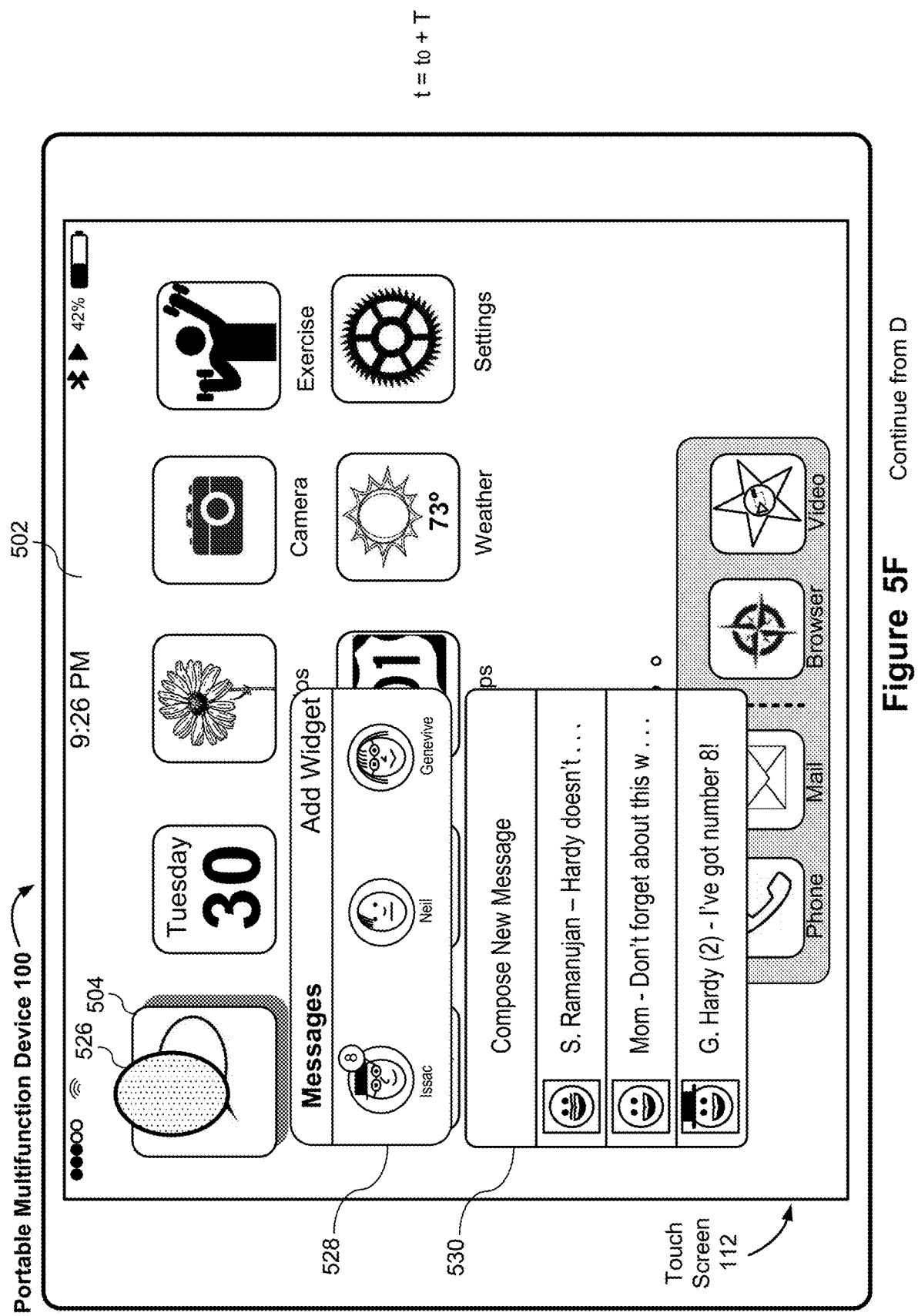

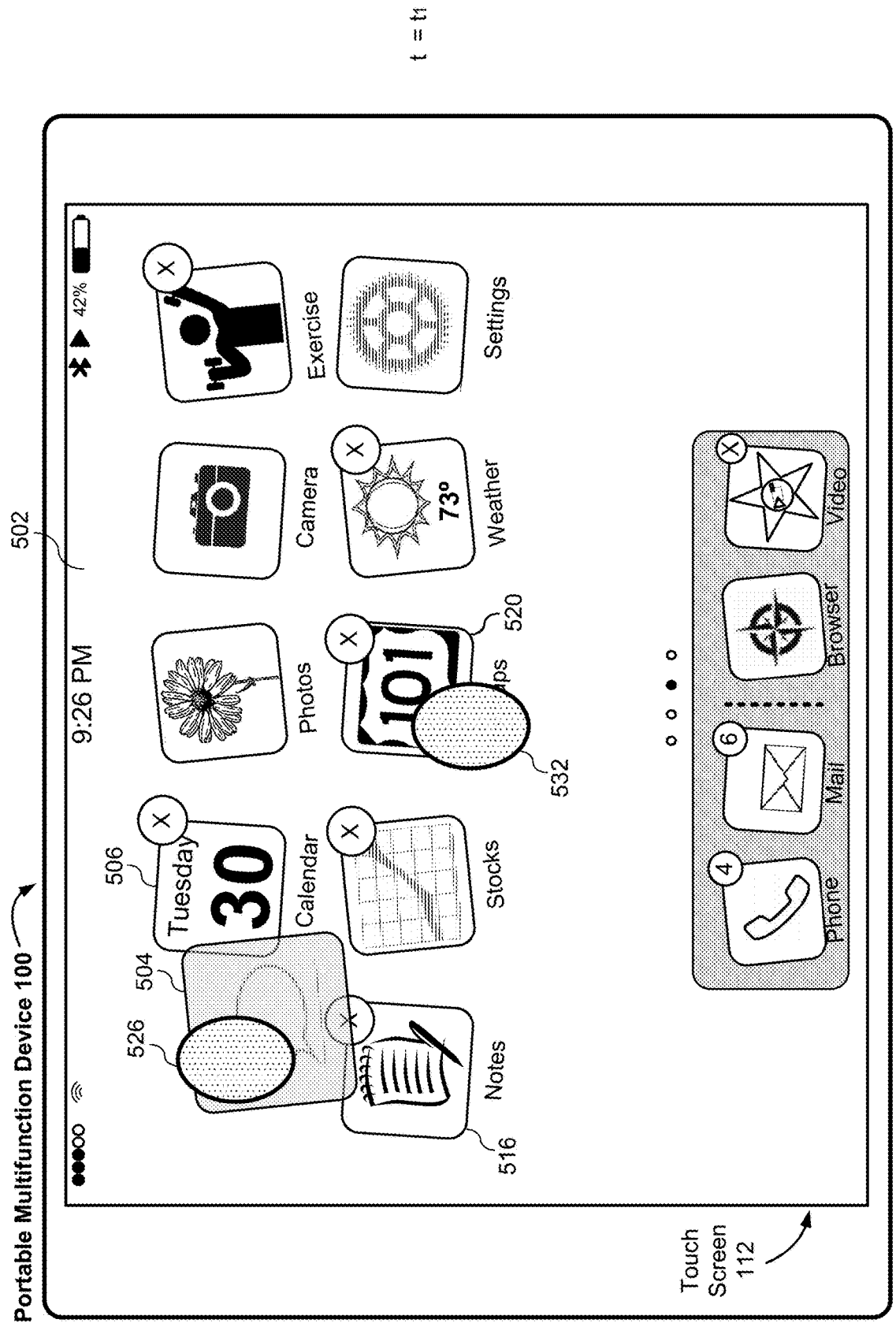

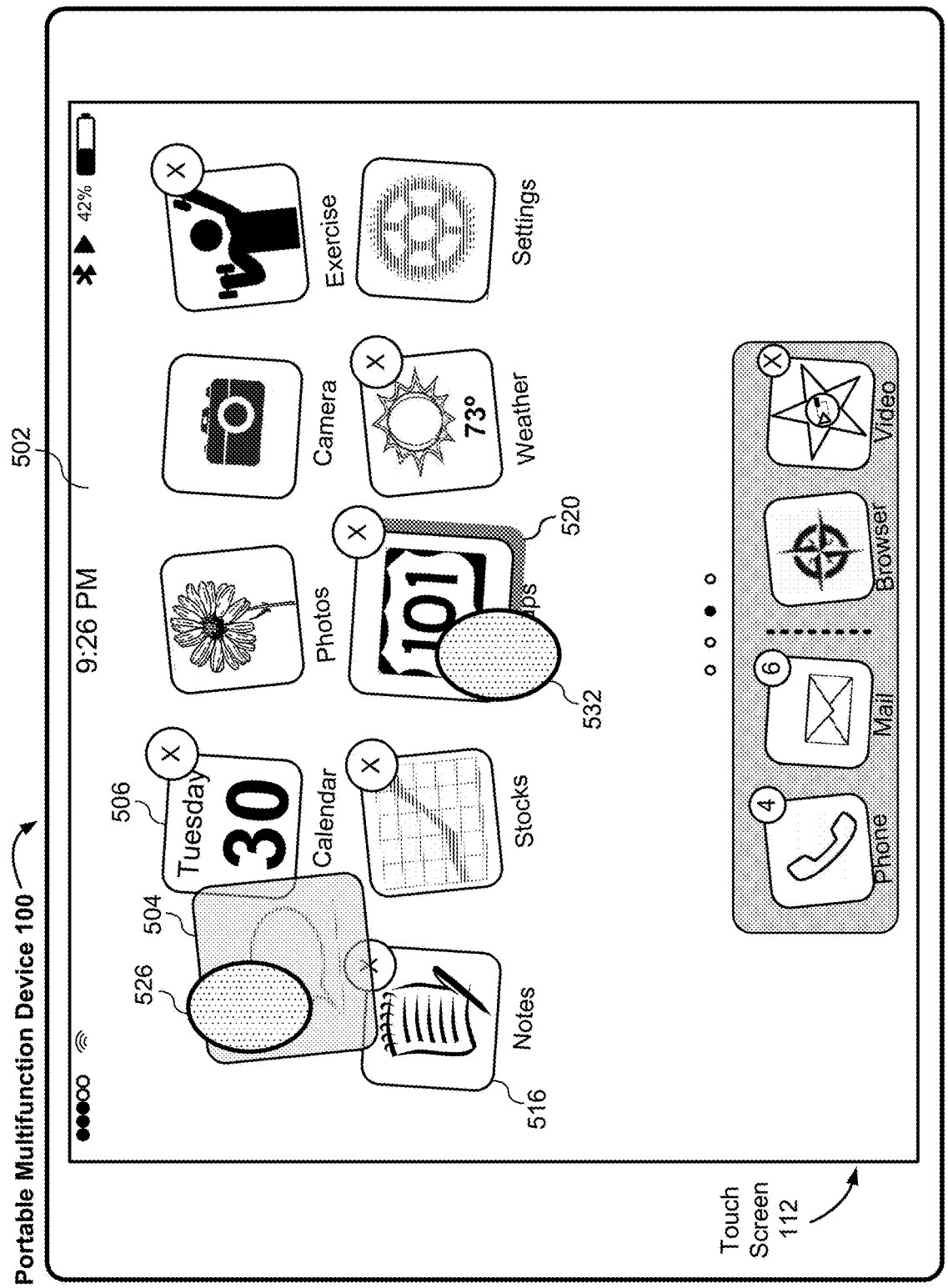

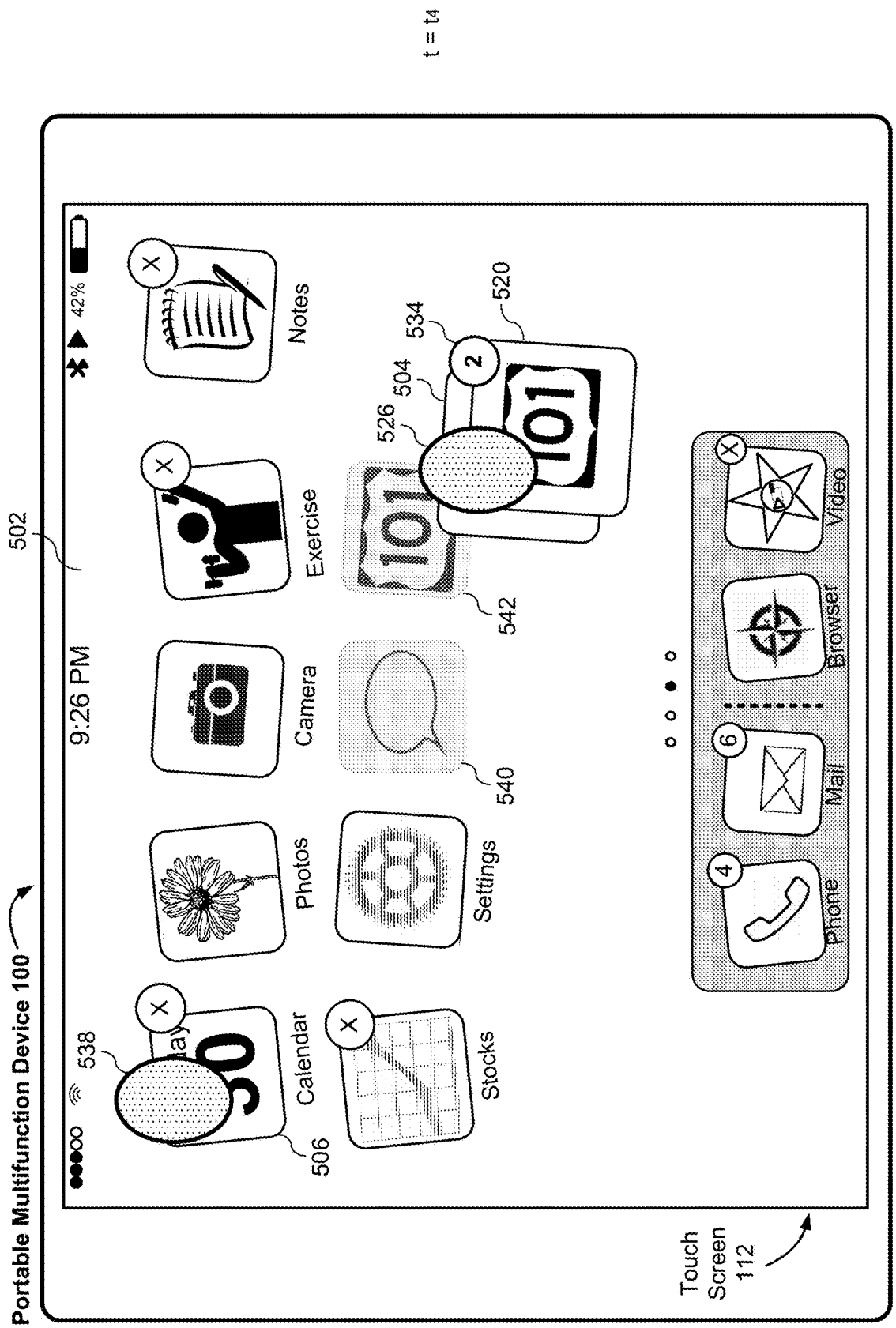

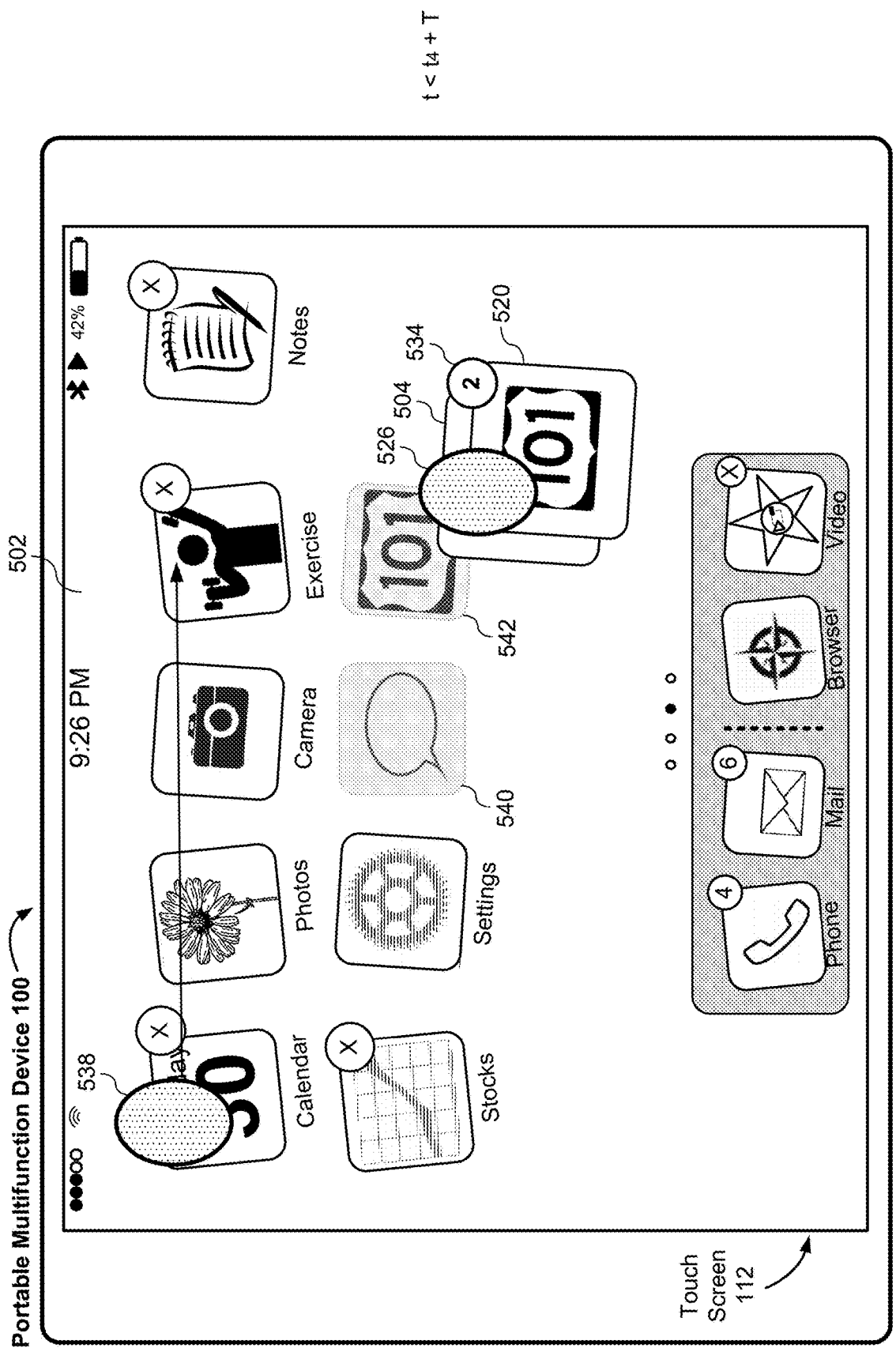

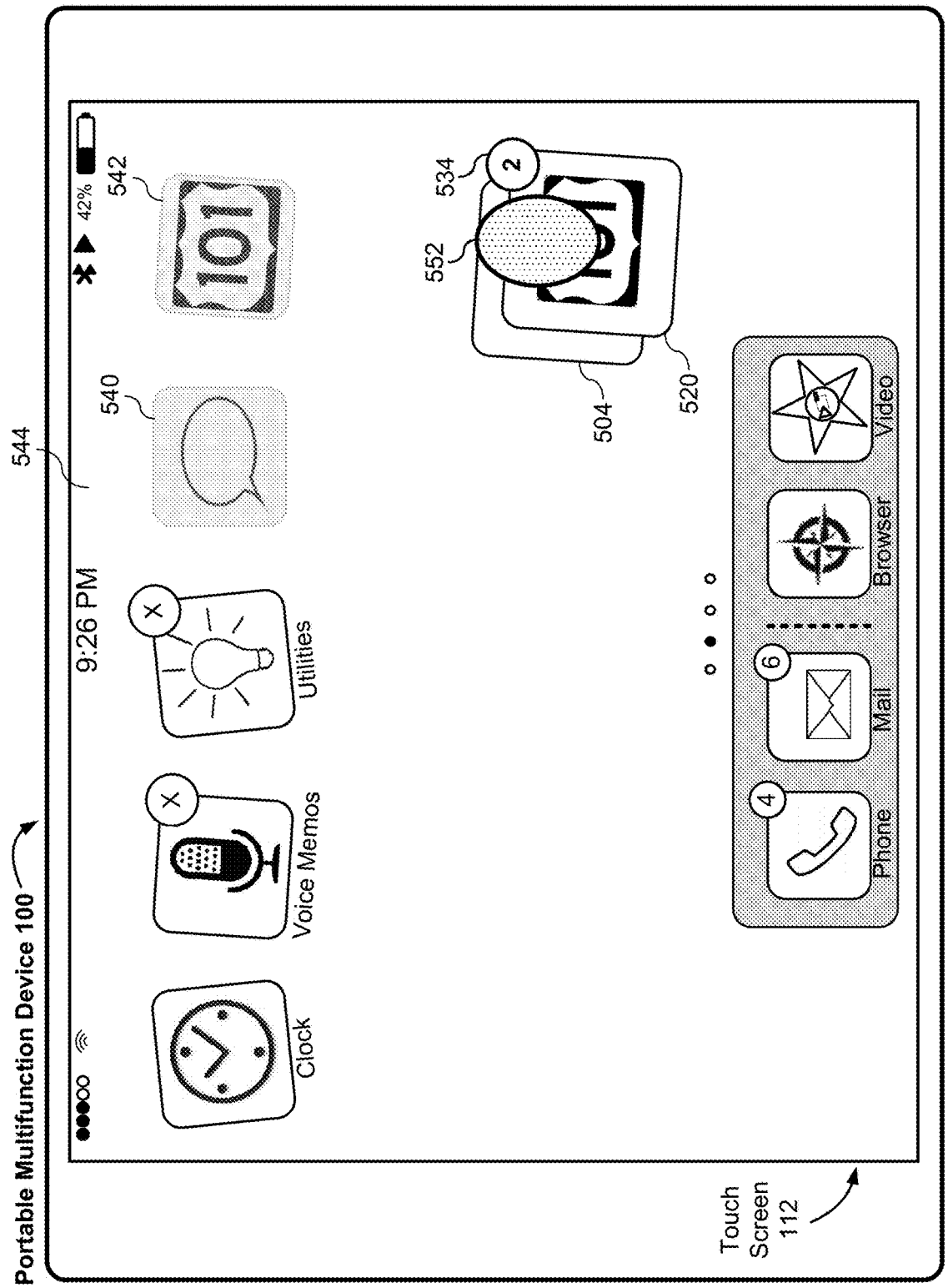

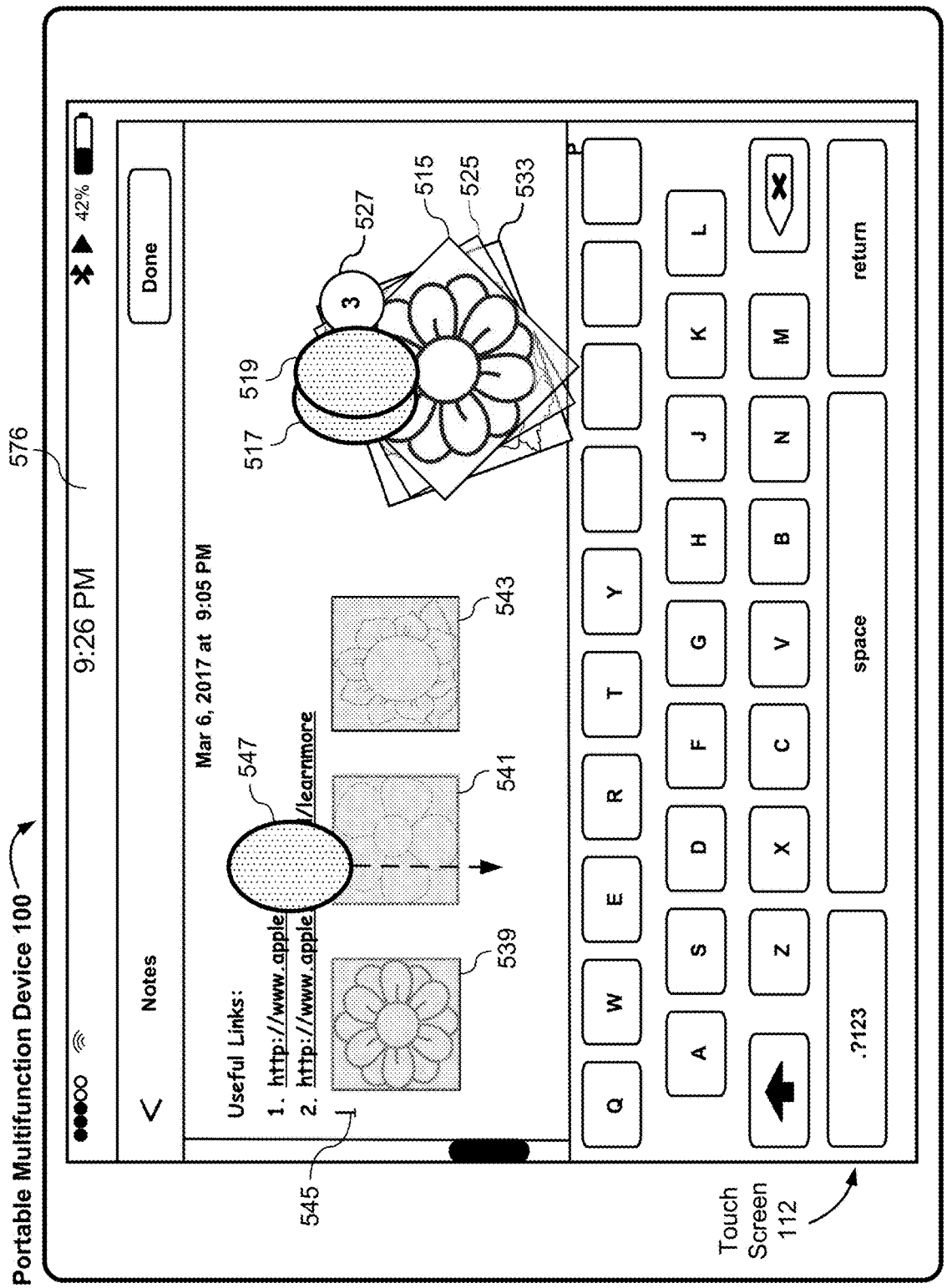

Portable Multifunction Device
100

602

•••• AT&T 🔶                       1:57 PM                    ↑ ✳ 72% ▬▬▬
Done                          Document8.pdf                          ⎘  ⌕

The quick brown fox jumps over the lazy dog. The quick brown fox
jumps over the lazy dog. The quick brown fox jumps over the lazy dog.
The quick brown fox jumps over the lazy dog. The quick brown fox
jumps over the lazy dog. The quick brown fox jumps over the lazy dog.
The quick brown fox jumps over the lazy dog. The quick brown fox
jumps over the lazy dog. The quick brown fox jumps over the lazy dog.
The quick brown fox jumps over the lazy dog. The quick brown fox
jumps over the lazy dog.

The quick brown fox jumps over the lazy dog. The quick brown fox
jumps over the lazy dog. The quick brown fox jumps over the lazy dog.
The quick brown fox jumps over the lazy dog. The quick brown fox
jumps over the lazy dog. The quick brown fox jumps over the lazy dog.
The quick brown fox jumps over the lazy dog. The quick brown fox
jumps over the lazy dog. The quick brown fox jumps over the lazy dog.
The quick brown fox jumps over the lazy dog. The quick brown fox
jumps over the lazy dog.

604

*quick brown fox jumps over the lazy dog. The
quick brown fox jumps over the lazy dog. The quick
brown fox jumps over the lazy dog. The quick brown
fox jumps over the lazy dog. The quick brown fox
jumps over the lazy dog. Lorem ipsum dolor sit
amet, consectetur adipiscing elit. Nulla semper eros
ut lorem fringilla convallis. Aliquam velit lectus,
fringilla quis pellentesque sed, aliquet vitae quam.
Nunc vitae tellus vel turpis suscipit faucibus id sed
nulla. Nam mattis interdum auctor. Maecenas
vulputate sollicitudin feugiat. Nunc consectetur*

✎    ⬤    🛈    ✂    716    ⬤    ☰    ᴀA

Touch Screen
112 t=t0

702 Display a first user interface on the display, wherein the first user interface includes a first user interface object at a first location in the first user interface

↓

704 While displaying the first user interface that includes the first user interface object at the first location in the first user interface, detect a first portion of a first input, including detecting a first contact at a location on the touch-sensitive surface that corresponds to the first user interface object in the first user interface

↓

706 In response to detecting the first portion of the first input:

in accordance with a determination that the first portion of the first input meets menu-display criteria, wherein the menu-display criteria require that the first contact is maintained on the touch-sensitive surface for more than a first threshold amount of time with less than a threshold amount of movement in order for the menu-display criteria to be met, display a plurality of selectable options that corresponds to the first user interface object on the display; and, in accordance with a determination that the first portion of the first input meets object-move criteria, wherein the object-move criteria require that the first contact is maintained on the touch-sensitive surface for more than the first threshold amount of time with less than the threshold amount of movement, and that after the contact has been maintained on the touch-sensitive surface for more than the first threshold amount of time with less than the threshold amount of movement, the first portion of the first input includes first movement of the first contact across the touch-sensitive surface that is greater than the threshold amount of movement, in order for the object-move criteria to be met, move the first user interface object or a representation thereof from the first location to a second location on the display in accordance with the first movement of the first contact (A)

---

708 In response to detecting the first portion of the first input:

in accordance with a determination that the first portion of the first input meets interface-scroll criteria, wherein the interface-scroll criteria require that the first portion of the first input includes second movement of the first contact across the touch-sensitive surface that is greater than the threshold amount of movement and that the second movement is detected before the first contact is maintained on the touch-sensitive surface for more than the first threshold amount of time in order for the interface-scroll criteria to be met, scroll the first user interface in accordance with the second movement of the first contact

---

710 In response to detecting the first portion of the first input:

in accordance with a determination that the first portion of the first input meets object-activation criteria, wherein the object-activation criteria require that the first contact is maintained on the touch-sensitive surface for less than the first threshold amount of time with less than the threshold amount of movement before termination of the first input is detected in order for the object-activation criteria to be met, perform an operation that corresponds to the first user interface object, including ceasing to display the first user interface and displaying a second user interface that corresponds to the first user interface object

---

712 In response to detecting the first portion of the first input:

in accordance with a determination that the contact has been maintained on the touch-sensitive surface for more than the first threshold amount of time with less than the threshold amount of movement, change an appearance of the first user interface object to indicate that the first contact has been maintained for more than the first threshold amount of time with less than the threshold amount of movement

---

714 Changing the appearance of the first user interface object to indicate that the first contact has been maintained for more than the first threshold amount of time with less than the threshold amount of movement includes one or more of:
    reducing an opacity of the first user interface object,
    increasing a size of the first user interface object, changing a simulated z-height of the first user interface object relative to a user interface in which the first user interface object was displayed, or
    displaying a shadow behind the first user interface object to indicate a separation of the first user interface object from the user interface in which the first user interface object was displayed 716 The menu-display criteria are met and the plurality of selectable options are displayed before lift-off of the first contact is detected 718 In response to detecting the first portion of the first input:
    in accordance with the determination that after the contact has been maintained on the touch-sensitive surface for more than the first threshold amount of time with less than the threshold amount of movement, and that the first portion of the first input includes first movement of the first contact across the touch-sensitive surface that is greater than the threshold amount of movement, cease to display the plurality of selectable options that correspond to the first user interface object 720 The menu-display criteria are met and the plurality of selectable options are displayed after lift-off of the first contact is detected 722 The object-move criteria are met and the first user interface object is moved from the first location to the second location in accordance with the first movement of the first contact before termination of the first input is detected (C)

724 Detect termination of the first input, including detecting lift-off of the first contact; and In response to detecting the termination of the first input:

in accordance with a determination that the object-move criteria have been met by the first input and that a current location of the first user interface object on the display corresponds to a permissible drop-off location in a currently displayed user interface on the display, display the first user interface object or a copy thereof at the permissible drop-off location in the currently displayed user interface on the display after the termination of the first input 726 In response to detecting the termination of the first input:

in accordance with a determination that the object-move criteria have been met by the first input and that the current location of the first user interface object on the display does not correspond to a permissible drop-off location in the currently displayed user interface on the display, provide visual feedback to indicate a cancelation of an object-move operation that corresponds to the first user interface object 728 While moving the first user interface object or the representation thereof from the first location to the second location:

in accordance with a determination that the object-move criteria have been met by the first input and that a current location of the first user interface object on the display corresponds to a permissible drop-off location in a currently displayed user interface on the display, display the first user interface object or the representation thereof with a first appearance; and in accordance with a determination that the object-move criteria have been met by the first input and that the current location of the first user interface object on the display does not correspond to a permissible drop-off location in the currently displayed user interface on the display, display the first user interface or the representation thereof with a second appearance that is different from the first appearance

730 The second location on the display corresponds to a permissible drop-off location for the first user interface object within the first user interface 732 The second location on the display corresponds to a permissible drop-off location in a third user interface that is concurrently displayed with the first user interface on the display when the first portion of the first input is detected 734 The second location on the display corresponds to a permissible drop-off location in a fourth user interface that was not concurrently displayed with the first user interface on the display when the first portion of the first input was detected 736 The first user interface is a user interface of a first application, and the second location on the display corresponds to a permissible drop-off location in a user interface of a second application that is distinct from the first application 738 The second location corresponds to a permissible drop-off location in a fifth user interface, and the first user interface and the fifth user interface are distinct user interfaces of a first application (E)

740 Detect termination of the input while a current location of the user interface object on the display corresponds to a permissible drop-location in a currently displayed user interface on the display; and
In response to detecting the termination of the first input:
    in accordance with a determination that the currently displayed user interface and the first user interface are interfaces of two distinct applications:
        display a copy of the first user interface object at the permissible drop-off location in the currently displayed user interface on the display after the termination of the first input; and
        maintain the first user interface object at the first location in the first user interface after the termination of the first input; and
    in accordance with a determination that the currently displayed user interface and the first user interface are interfaces of a common application,
        display the first user interface object at the permissible drop-off location in the currently displayed user interface on the display after the termination of the first input without maintaining the first user interface object at the first location in the first user interface after the termination of the first input

742 While maintaining the first contact, detect a second input, including detecting a second contact on the touch-sensitive surface that is distinct from the first contact on the touch-sensitive surface; and
In response to detecting the second input, perform an operation that corresponds to the second input while maintaining display of the first user interface object or the representation thereof independent of any effect of the operation on the first user interface

744 After the object-move criteria are met and before termination of the first input is detected, detect a third input, including detecting a third contact on the touch-sensitive surface at a location on the touch-sensitive surface that corresponds to a second user interface object in a currently displayed user interface and subsequently detecting lift-off of the third contact from the touch-sensitive surface; and
in response to detecting the third input:
    in accordance with a determination that the third input meets object-selection criteria, wherein the object-selection criteria require that the third contact is maintained on the touch-sensitive surface for less than the first threshold amount of time with less than the threshold amount of movement before the lift-off of the third contact is detected in order for the object-selection criteria to be met, move the second user interface object or a representation thereof to a respective location on the display that corresponds to a current location of the first contact on the touch-sensitive surface

744

746 After moving the second user interface object or the representation thereof to the respective location on the display that corresponds to the current location of the first contact on the touch-sensitive surface, detect a second portion of the first input, including detecting third movement of the first contact from a third location to a fourth location on the touch-sensitive surface; and In response to detecting the second portion of the first input, move the second user interface object and the first user interface object on the display in accordance with the third movement of the first contact 748 After moving the second user interface object or the representation thereof to the respective location on the display that corresponds to the current location of the first contact on the touch-sensitive surface:

merge display of the first user interface object or the representation thereof and display of the second user interface object or the representation thereof into a representation of an object collection;

while displaying the object collection on the display, detect a fourth input, including detecting a depinch gesture at a location on the touch-sensitive surface that corresponds to the object collection on the display; and in response to detecting the fourth input, expand the representation of the object collection to separately display the first user interface object or the representation thereof and the second user interface object or the representation thereof

750 The first user interface object is a first application launch icon that corresponds to a first application, and wherein the first user interface is a home screen user interface that includes a plurality of application launch icons that correspond to a plurality of different applications including the first application 752 In response to detecting the first portion of the first input:
in accordance with a determination that the first portion of the first input meets the object-move criteria, activate an interface reconfiguration mode, wherein in the interface reconfiguration mode, a respective application launch icon of the plurality of application icons is repositionable by a drag input directed to the respective application launch icon without requiring the drag input to meet the object-move criteria 754 In response to detecting the first portion of the first input:
in accordance with a determination that the first portion of the first input meets interface-reconfiguration criteria, wherein the interface-reconfiguration criteria require that the first contact is maintained on the touch-sensitive surface for more than a second threshold amount of time that is greater than the first threshold amount of time with less than the threshold amount of movement before termination of the first input is detected in order for the interface-reconfiguration criteria to be met, activate an interface reconfiguration mode, wherein in the interface reconfiguration mode, a respective application launch icon of the plurality of application icons is repositionable by a drag input without requiring the drag input to meet the object-move criteria 756 The first user interface includes first content, and the first user interface object is selected content that is a selected portion of the first content in the first user interface (I)

758 The display and the touch-sensitive surface are integrated in a touch-screen display, and wherein moving the first user interface object or the representation thereof from the first location to the second location on the display in accordance with the first movement of the first contact includes:
    displaying a copy of at least a portion of the selected content in a container object on the touch-screen display; and
    moving the container object containing the copy of at least a portion of the selected content on the display in accordance with the first movement of the first contact, including maintaining a predefined placement location of the container object relative to a characteristic location of the first contact during the first movement of the first contact 760 Displaying a copy of at least a portion of the selected content in a container object includes resizing the container object and the copy of at least a portion of the selected content in accordance with a predefined scaling constraint 762 The first user interface object is a hyperlink to first content, the second location on the display corresponds to a location on a home screen user interface and
the method includes:
    detecting termination of the first input, including detecting lift-off of the first contact; and
    in response to detecting the termination of the first input, displaying a representation of the first content on the home screen user interface, wherein activation of the representation of the first content causes display of the first content on the display

802 Display a first user interface on the display, wherein the first user interface includes a first user interface object at a first location in the first user interface

↓

804 While displaying the first user interface that includes the first user interface object, detect a first input that includes a first portion of the first input and a second portion of the first input, wherein detecting the first portion of the input includes detecting one or more first contacts at a location on the touch-sensitive surface that corresponds to the first user interface object in the first user interface and detecting the second portion of the first input that includes detecting first movement of the one or more first contacts across the touch-sensitive surface, wherein the first user interface object is displayed at the first location in the first user interface while the first portion of the first input is detected

↓

806 In response to detecting the first input:
    in accordance with a determination that the second portion of the first input was detected before the one or more first contacts had been detected at the location on the touch-sensitive surface for a first threshold amount of time without more than a threshold amount of movement:
        in accordance with a determination that the first input has a first predefined number of contacts, drag the first user interface object or a representation thereof relative to the first user interface in accordance with the second portion of the first input; and
        in accordance with a determination that the first input has a second predefined number of contacts, forgo dragging the first user interface object or the representation thereof relative to the first user interface in accordance with the second portion of the first input; and
    in accordance with a determination that the second portion of the first input was detected after the one or more first contacts had been detected at the location on the touch-sensitive surface for at least the first threshold amount of time without more than the threshold amount of movement, drag the first user interface object or the representation thereof relative to the first user interface in accordance with the second portion of the first input (A)

808 After the first user interface object or the representation thereof has been dragged to a second location on the display in accordance with the second portion of the first input and before termination of the first input is detected, detect a second input, including detecting one or more second contacts at a location on the touch-sensitive surface that corresponds to a second user interface object, distinct from the first user interface object, on the display; in response to detecting the second input:

in accordance with a determination that the second input meets object-selection criteria, wherein the object-selection criteria require that the second input has the first predefined number of contacts, the one or more second contacts are maintained on the touch-sensitive surface for less than the first threshold amount of time with less than the threshold amount of movement before the lift-off of the one or more second contacts is detected in order for the object-selection criteria to be met, select the second user interface object

---

810 Selecting the second user interface object includes changing an appearance of the second user interface object to indicate that the second user interface object is in a selected state

---

812 While the second user interface object is selected, detect a third portion of the first input, including detecting second movement of the one or more first contacts; and
in response to detecting the third portion of the first input:

move the second user interface object or a representation thereof to a respective location on the display that corresponds to a current location of the one or more first contacts on the touch-sensitive surface; and move the first user interface object and the second user interface object as a collection in accordance with the third portion of the first input (B)

814 The first input has the first predefined number of contacts detecting the first input further includes detecting a fourth portion of the first input, including detecting first relative movement between at least two of the first predefined number of contacts of the first input; and
the method includes:
    in response to detecting the fourth portion of the first input, spreading out the first user interface object from the second user interface object in accordance with the fourth portion of the first input 816 Selecting the second user interface object includes moving the second user interface object or a representation thereof to a respective location on the display that corresponds to a current location of the one or more first contacts on the touch-sensitive surface 818 In response to detecting the second input:
    in accordance with a determination that the second input meets object-activation criteria, wherein the object-activation criteria require that
        the second input has the second predefined number of contacts,
        the one or more second contacts are maintained on the touch-sensitive surface for less than the first threshold amount of time with less than the threshold amount of movement before the lift-off of the one or more second contacts is detected,
    in order for the object-activation criteria to be met, display user interface or content corresponding to the second user interface object

820 In response to detecting the first input:
    in accordance with a determination that the second portion of the first input was detected after the one or more first contacts had been detected at the location on the touch-sensitive surface for at least the first threshold amount of time without more than the threshold amount of movement:
        in accordance with a determination that the first input includes the second predefined number of contacts, display a plurality of selectable options that correspond to the first user interface object after the one or more first contacts had been detected at the location on the touch-sensitive surface for at least the first threshold amount of time without more than the threshold amount of movement; and
        in accordance with a determination that the first input includes the first predefined number of contacts, forgo displaying the plurality of selectable options that correspond to the first user interface object

---

822 In response to detecting the first input:
    in accordance with a determination that the first input includes the second predefined number of contacts, change an appearance of the first user interface object after the one or more first contacts had been detected at the location on the touch-sensitive surface for at least the first threshold amount of time without more than the threshold amount of movement; and
    in accordance with a determination that the first input includes the first predefined number of contacts, change the appearance of the first user interface object without waiting until the one or more first contacts are maintained for at least the first threshold amount of time

---

824 In response to detecting the first input:
    in accordance with a determination that the second portion of the first input is detected before the one or more first contact had been detected at the location on the touch-sensitive surface for the first threshold amount of time without more than the threshold amount of movement, scroll the first user interface in accordance with the second portion of the first input

826 Dragging the first user interface object or the representation thereof in accordance with the second portion of the first input includes:
    dragging the first user interface object or the representation thereof in accordance with the first movement of the first predefined number of contacts in the first input, wherein the first movement includes less than a threshold amount of relative movement between respective ones of the second predefined number of contacts 828 The first input has the first predefined number of contacts, detecting the first input further includes detecting a fifth portion of the first input, including detecting first relative movement between at least two of the second predefined number of contacts of the first input; and the method includes:
    in response to detecting the fifth portion of the first input, changing a size of the first user interface object in accordance with the fifth portion of the first input (E)

830 In response to detecting the first input:
    in accordance with a determination that deletion-mode-activation criteria are met, display the first user interface in an object-deletion mode, wherein:
        while the first user interface is displayed in the object-deletion mode, deletion of a respective object displayed in the first user interface is performed when a predefined deletion input is detected at a location on the touch-sensitive surface that corresponds to the respective object;
        the deletion-mode-activation criteria are met in accordance with any one of:
            (1) the first input has the first predefined number of contacts, and the second portion of the first input includes more than the threshold amount of movement;
            (2) the first input has the second predefined number of contacts, and the one or more first contacts had been detected at the location on the touch-sensitive surface for at least the first threshold amount of time without more than the threshold amount of movement before the second portion of the first input was detected; and
            (3) the first input has the second predefined number of contacts, and the one or more first contacts had been detected at the location on the touch-sensitive surface for at least a second threshold amount of time, greater than the first threshold amount of time without more than the threshold amount of movement

902 Display content in a first user interface on the touch-screen display

904 While displaying the content in the first user interface on the touch-screen display, detect a first user interaction that selects first content within the content

906 While displaying the first content in a selected state within the content, detect a first portion of a first input that activates a move operation for the selected first content, including detecting one or more contacts on the touch-screen display at a location that corresponds to the selected first content

908 In response to detecting the first portion of the first input that activates the move operation for the selected first content, display a copy of at least of a portion of the first content in a container object

910 Move the container object that displays the copy of at least a portion of the first content from a first placement location relative to a characteristic location of the one or more contacts on the touch-screen to a second placement location relative to the characteristic location of the one or more contacts on the touch screen

912 After moving the container object that displays the copy of at least a portion of the first content from the first placement location to the second placement location relative to the characteristic location of the one or more contacts, move the container object that displays the copy of at least the portion of the first content in accordance with movement of the one or more contacts while maintaining the container object at the second placement location relative to the characteristic location of the one or more contacts as the one or more contacts move across the touch-sensitive surface (A)

914 Displaying the copy of at least the portion of the first content in the container object includes:
    displaying the container object including at least the portion of the first content at the first placement location relative to the characteristic location of the one or more contacts on the touch-screen, wherein the first placement location corresponds to an original display location of the first content, and is on a different z-layer from the original display location of the first content 916 The first portion of the first input has a first predefined number of contacts; and
the method includes:
    detecting a second portion of the first input, including detecting at least a threshold amount of movement of the one or more contacts after detecting that the one or more contacts of the first input have been maintained at the location that corresponds to the selected first content with less than the threshold amount of movement for at least a threshold amount of time
wherein:
    moving the container object from the first placement location to the second placement location is performed in response to detecting the second portion of the first input 918 The first portion of the first input has a first predefined number of contacts; and
moving the container object from the first placement location to the second placement location is performed in response to detecting that the one or more contacts of the first input have been maintained at the location that corresponds to the selected first content with less than a threshold amount of movement for at least a threshold amount of time

920 The first portion of the first input includes an initial movement of the one or more contacts that is at least the threshold amount of movement, and the method includes:

in response to detecting the initial movement of the one or more contacts, moving the copy of at least the portion of the first content from an original location of the portion of the first content in the user interface to the first placement location;

after displaying the copy of at least the portion of the first content in the container object in response to detecting the first portion of the first input, detecting a second portion of the first input, including detecting additional movement of the one or more contacts after the initial movement of the one or more contacts, wherein:

moving the container object from the first placement location to the second placement location is performed in response to detecting the additional movement of the one or more contacts, and the second placement location is offset from the one or more contacts in a predefined manner 922 The container object includes a translucent background, and portions of the content are visible through the background of the container object during movement of the container object 924 The container object includes a background that separates the copy of at least the portion of the first content from the content 926 The container object includes an indicator that indicates an insertion location for the selected content 928 Displaying the copy of at least the portion of the first content in a container object includes: displaying a first portion of the first content with a first opacity; and displaying a second portion of the first content with a second opacity that is different from the first opacity (C)

930 Displaying the copy of at least the portion of the first content in the container object includes:

displaying the copy of at least the portion of the first content in the container object in a first configuration that corresponds to an original configuration of the portion of the first content; and reflowing at least the portion of the first content to display the copy of at least the portion of the first content in the container object in a second configuration that is different from the first configuration 932 While the container object is displayed at the second placement location relative to the characteristic location of the one or more contacts, display an insertion cursor at a first location in the content that corresponds to an original location of the first content in the content 934 While moving the container object in accordance with movement of the one or more contacts while maintaining the container object at the second placement location relative to the characteristic location of the one or more contacts as the one or more contacts move across the touch-sensitive surface, move the insertion cursor through one or more permissible insertion locations within the content in accordance with the movement of the one or more contacts 936 While moving the container object in accordance with the movement of the one or more contacts while maintaining the container object at the second placement location relative to the characteristic location of the one or more contacts, move the insertion cursor from a first permissible insertion location to a second permissible insertion location, wherein the first permissible insertion location is in a first user interface, and the second permissible insertion location is in a second user interface that is distinct from the first user interface (D)

938 Alter an appearance of the first content at an original location of the first content in the first user interface; and maintain display of the first content with the altered appearance while moving the container object that displays the copy of at least the portion of the first content in accordance with the movement of the one or more contacts

940 Detect termination of the first input while the one or more contacts are over the first user interface, including detecting lift-off of the one or more contacts; and in response to detecting the termination of the first input:

display the first content at a first insertion location within the first user interface; and cease to display the first content at the original location of the first content in the first user interface

942 Detect termination of the first input while the one or more contacts are over a second user interface, including detecting lift-off of the one or more contacts; and in response to detecting the termination of the first input:

display the first content at a second insertion location within the second user interface; and restore the appearance of the first content at the original location of the first content in the first user interface

944 In response to detecting the termination of the first input:

in accordance with a determination that a permissible insertion location is currently identified for the first content, display the first content at the permissible insertion location that is currently identified for the first content; and in accordance with a determination that no permissible insertion location is currently identified for the first content, restore the appearance of the first content at the original location of the first content in the first user interface without copying or moving the first content to another location that is different from the original location

Figure 9E

DEVICES, METHODS, AND GRAPHICAL USER INTERFACES FOR MOVING USER INTERFACE OBJECTS

RELATED APPLICATIONS

This application is a continuation of U.S. application Ser. No. 15/845,528, filed Dec. 18, 2017, which claims priority to U.S. Provisional Application Ser. No. 62/507,124, filed May 16, 2017, each of which is incorporated by reference herein in its entirety.

TECHNICAL FIELD

This relates generally to electronic devices with touch-sensitive surfaces, including but not limited to electronic devices with touch-sensitive surfaces for displaying user interfaces and interacting with user interface objects within the user interfaces.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interfaces and objects therein on a display. Example user interface objects include digital images, video, text, icons, and control elements such as buttons and other graphics.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), or a spreadsheet application (e.g., Numbers from Apple Inc. of Cupertino, Calif.).

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with improved methods and interfaces for interacting with user interface objects (e.g., moving user interface objects and displaying information corresponding to the user interface objects). Such methods and interfaces optionally complement or replace conventional methods for interacting with user interface objects. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a device having a display and a touch-sensitive surface. The method includes: displaying a first user interface on the display, wherein the first user interface includes a first user interface object at a first location in the first user interface; while displaying the first user interface that includes the first user interface object at the first location in the first user interface, detecting a first portion of a first input, including detecting a first contact at a location on the touch-sensitive surface that corresponds to the first user interface object in the first user interface; in response to detecting the first portion of the first input: in accordance with a determination that the first portion of the first input meets menu-display criteria, wherein the menu-display criteria require that the first contact is maintained on the touch-sensitive surface for more than a first threshold amount of time with less than a threshold amount of movement in order for the menu-display criteria to be met, displaying a plurality of selectable options that corresponds to the first user interface object on the display; and, in accordance with a determination that the first portion of the first input meets object-move criteria, wherein the object-move criteria require that the first contact is maintained on the touch-sensitive surface for more than the first threshold amount of time with less than the threshold amount of movement, and that after the contact has been maintained on the touch-sensitive surface for more than the first threshold amount of time with less than the threshold amount of movement, the first portion of the first input includes first movement of the first contact across the touch-sensitive surface that is greater than the threshold amount of movement, in order for the object-move criteria to be met, moving the first user interface object or a representation thereof from the first location to a second location on the display in accordance with the first movement of the first contact.

A method is performed at a device having a display, and a touch-sensitive surface. The method includes: displaying a first user interface on the display, wherein the first user interface includes a first user interface object at a first location in the first user interface; while displaying the first user interface that includes the first user interface object, detecting a first input that includes a first portion of the first input and a second portion of the first input, wherein detecting the first portion of the input includes detecting one or more first contacts at a location on the touch-sensitive surface that corresponds to the first user interface object in the first user interface and detecting the second portion of the first input that includes detecting first movement of the one or more first contacts across the touch-sensitive surface, wherein the first user interface object is displayed at the first location in the first user interface while the first portion of the first input is detected; in response to detecting the first input: in accordance with a determination that the second portion of the first input was detected before the one or more first contacts had been detected at the location on the touch-sensitive surface for a first threshold amount of time without more than a threshold amount of movement: in accordance with a determination that the first input has a first predefined number of contacts, dragging the first user interface object or a representation thereof relative to the first user interface in accordance with the second portion of the first input; and in accordance with a determination that the first input has a second predefined number of contacts, forgoing dragging the first user interface object or the representation thereof relative to the first user interface in accordance with the second portion of the first input; and in accordance with a determination that the second portion of the first input was detected after the one or more first contacts had been detected at the location on the touch-sensitive surface for at least the first threshold amount of time without more than the threshold amount of movement, dragging the first user interface object or the representation thereof relative to the first user interface in accordance with the second portion of the first input.

A method is performed at a device having a touch-screen display. The method includes: displaying content in a first user interface on the touch-screen display; while displaying the content in the first user interface on the touch-screen display, detecting a first user interaction that selects first content within the content; while displaying the first content in a selected state within the content, detecting a first portion of a first input that activates a move operation for the selected first content, including detecting one or more contacts on the touch-screen display at a location that corresponds to the selected first content; in response to detecting the first portion of the first input that activates the move operation for the selected first content, displaying a copy of at least of a portion of the first content in a container object; moving the container object that displays the copy of at least a portion of the first content from a first placement location relative to a characteristic location of the one or more contacts on the touch-screen to a second placement location relative to the characteristic location of the one or more contacts on the touch screen; and after moving the container object that displays the copy of at least a portion of the first content from the first placement location to the second placement location relative to the characteristic location of the one or more contacts, moving the container object that displays the copy of at least the portion of the first content in accordance with movement of the one or more contacts while maintaining the container object at the second placement location relative to the characteristic location of the one or more contacts as the one or more contacts move across the touch-sensitive surface.

In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by an electronic device with a display, a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, optionally one or more sensors to detect intensities of contacts with the touch-sensitive surface, and optionally one or more tactile output generators, includes means for performing or causing performance of the operations of any of the methods described herein.

Thus, electronic devices with displays, touch-sensitive surfaces, optionally one or more sensors to detect intensities of contacts with the touch-sensitive surface, optionally one or more tactile output generators, optionally one or more device orientation sensors, and optionally an audio system, are provided with improved methods and interfaces for moving user interface objects thereby increasing the effectiveness, efficiency, and user satisfaction with such devices. Such methods and interfaces may complement or replace conventional methods for moving user interface objects.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 5T-5AC illustrate example user interfaces for interacting with user interface objects (e.g., selecting, dragging and dropping objects) in response to touch-inputs, in accordance with some embodiments.

FIGS. 5AD-5AP illustrate example user interfaces for interacting with user interface objects (e.g., selecting, dragging and dropping objects, and displaying menus corresponding to selected objects) in response to touch inputs, in accordance with some embodiments.

FIGS. 5AQ-5BD illustrate example user interfaces for interacting with user interface objects (e.g., selecting, dragging and dropping objects) in response to touch inputs, in accordance with some embodiments.

FIGS. 7A-7J are flow diagrams illustrating a method of interacting with user interface objects (e.g., selecting and moving objects, and displaying menus corresponding to the selected objects) in response to touch inputs, in accordance with some embodiments.

FIGS. 8A-8F are flow diagrams illustrating a method of interacting with user interface objects (e.g., selecting and moving objects) in response to touch inputs, in accordance with some embodiments.

FIGS. 9A-9E are flow diagrams illustrating a method of interacting with user interface objects (e.g., dragging and dropping selected text) in response to touch inputs, in accordance with some embodiments.

DESCRIPTION OF EMBODIMENTS

Figure 1A:
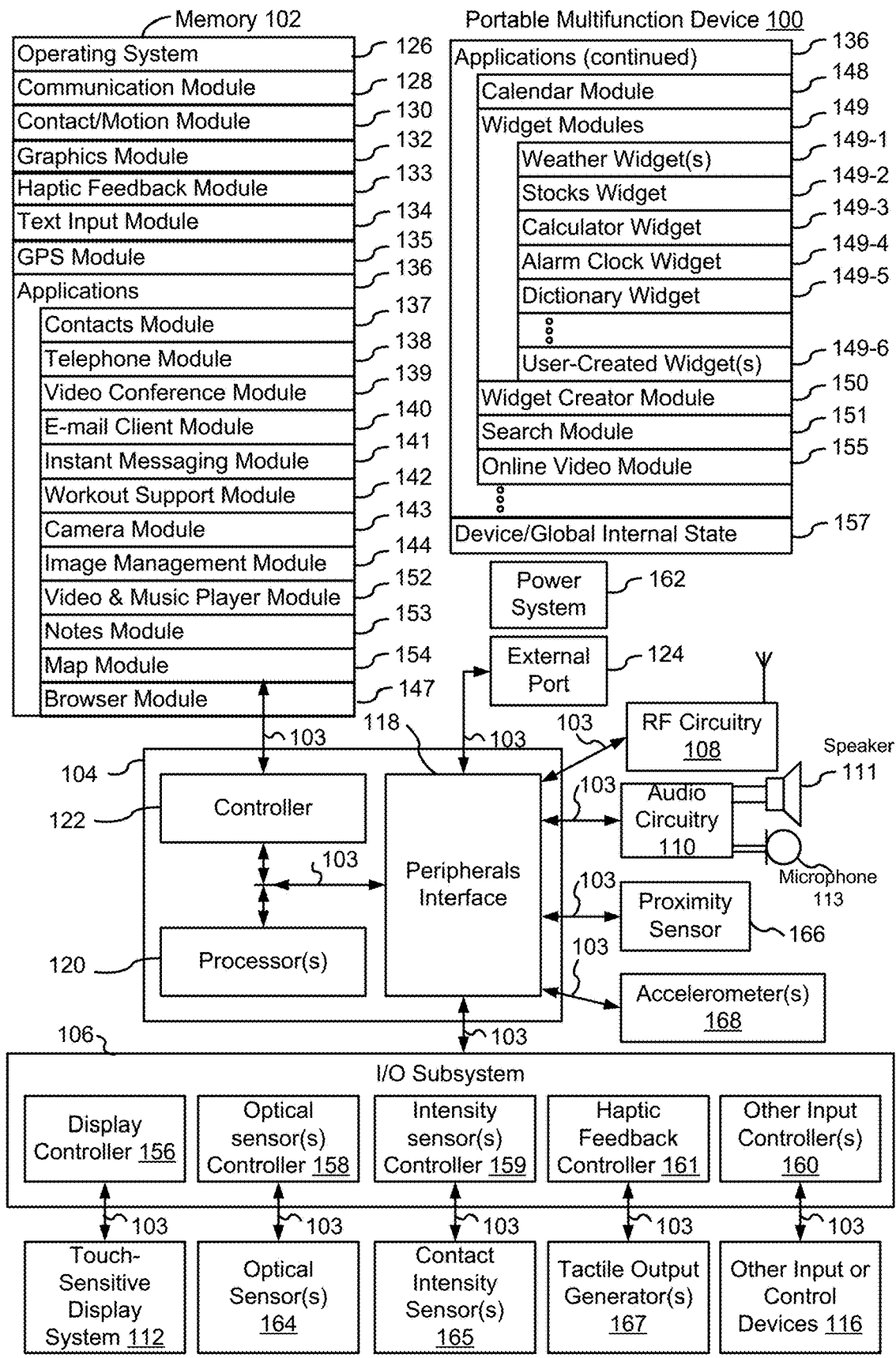
FIG. 1A is a block diagram illustrating a portable multifunction device with a touch-sensitive display in accordance with some embodiments.

Conventional methods of moving user interface objects, activating a user interface object (e.g., open a content item, or launch an application, etc.), displaying selectable options (e.g., a contextual menu or a menu of quick action options) require separate gestures with different contacts detected at different times. The embodiments below integrate the different gestures such that the same contact(s) may be used to provide the required inputs to accomplish multiple of the above operations, e.g., by integrating a long press requirement and/or a movement requirement into the criteria for some of these operations. In addition, movement by a different number of contacts is optionally used as an alternative way to a long press input followed by movement of the contact(s) when moving an object and/or displaying selectable options. Furthermore, placement of an object that is being moved is configured such that the object or copy thereof is less likely to interfere with the user's viewing of the underlying user interface and/or content.

Below, FIGS. 1A-1B, 2, and 3 provide a description of example devices. FIGS. 4A-4B, 5A-5BD, and 6A-6W illustrate example user interfaces for interacting with user interface objects (e.g., selecting, dragging and dropping objects, and displaying information corresponding to the selected objects) in response to touch inputs, in accordance with some embodiments. FIGS. 7A-7J, 8A-8F, and 9A-9E are flow diagrams of method of interacting with user interface objects in response to touch inputs, in accordance with some embodiments. The user interfaces in FIGS. 5A-5BD, and 6A-6W are used to illustrate the processes in FIGS. 7A-7J, 8A-8F, and 9A-9E.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
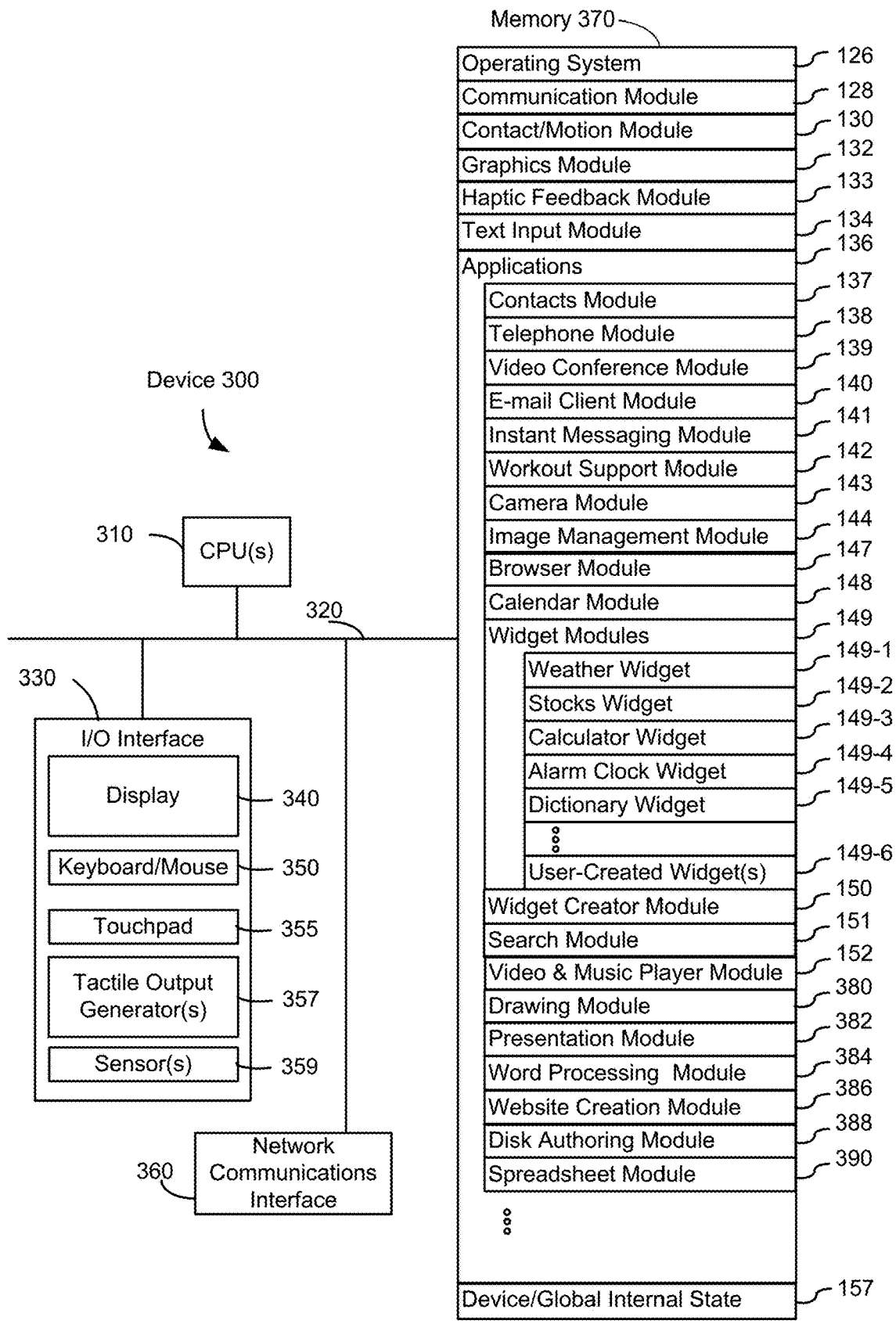
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
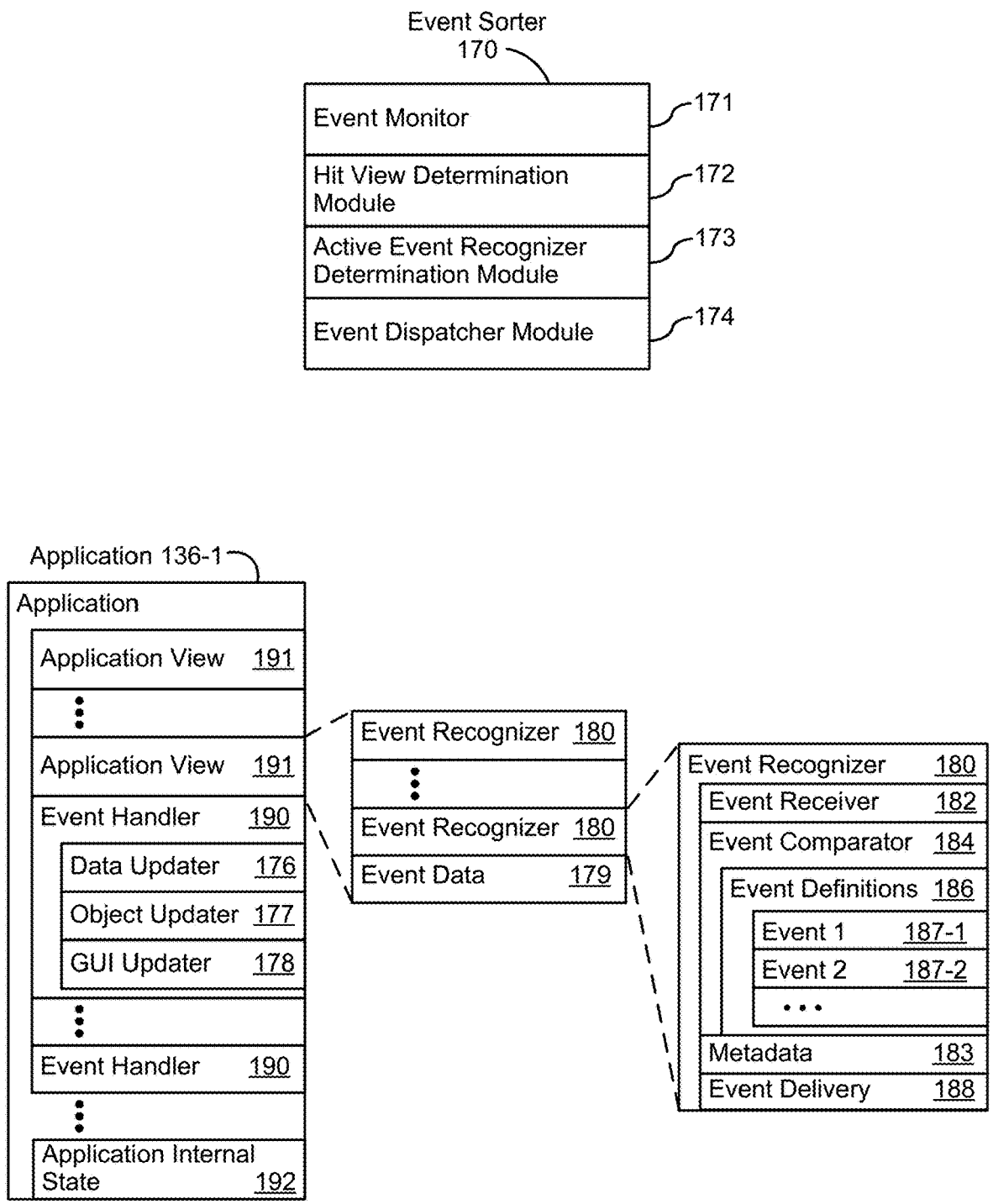
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
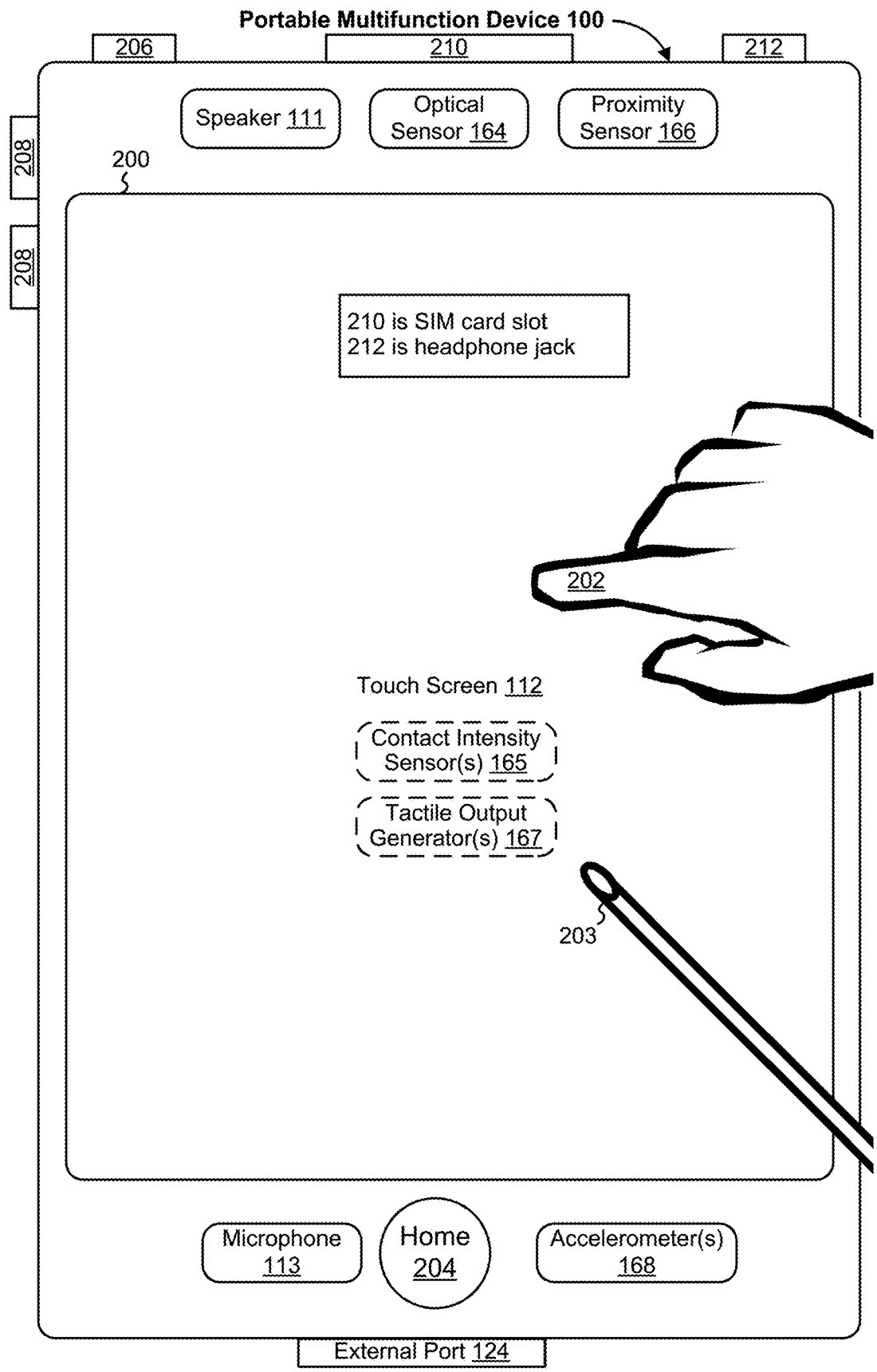
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, web site creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
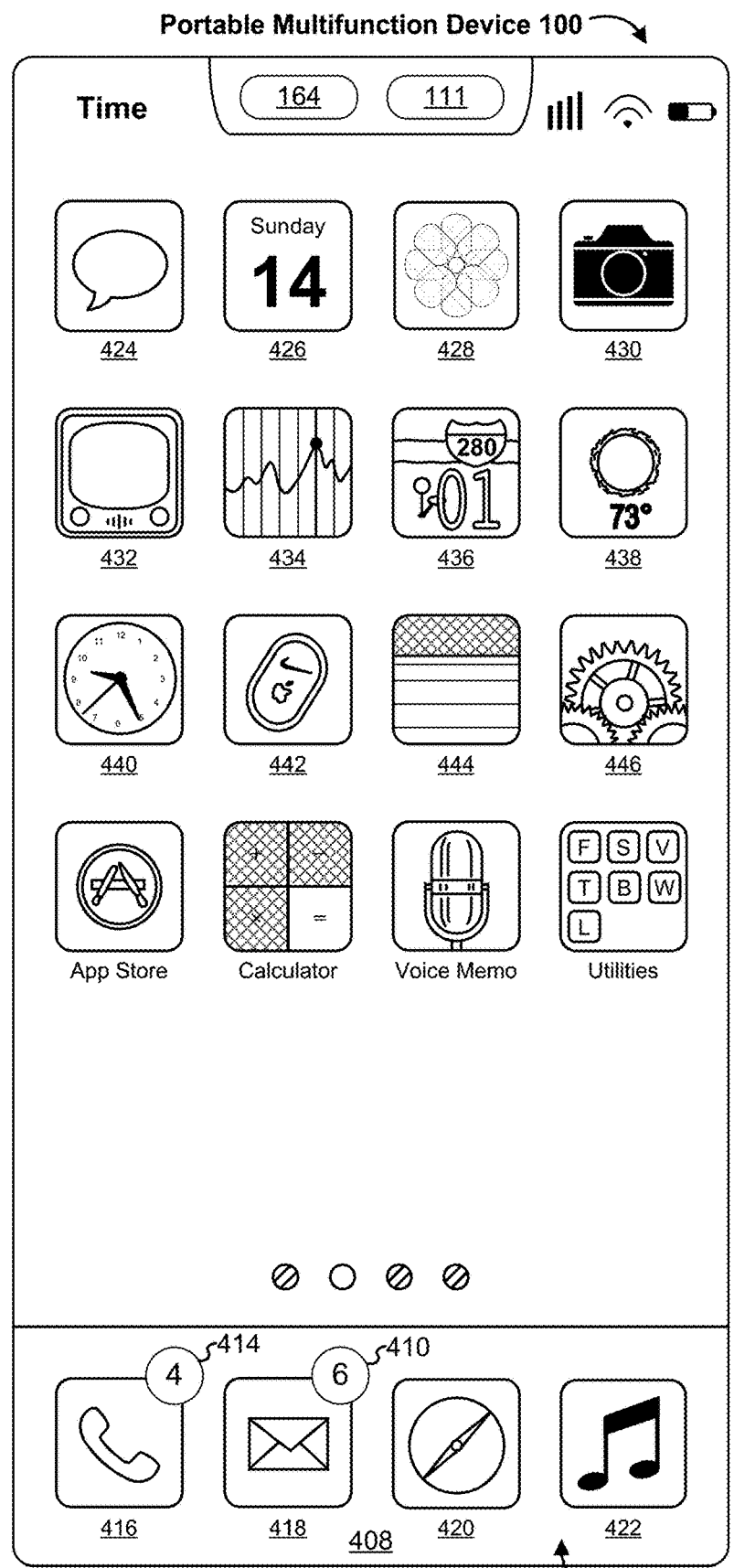
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, labeled "Music;" and
Icons for other applications, such as:
  Icon 424 for IM module 141, labeled "Messages;"
  Icon 426 for calendar module 148, labeled "Calendar;"
  Icon 428 for image management module 144, labeled "Photos;"

Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
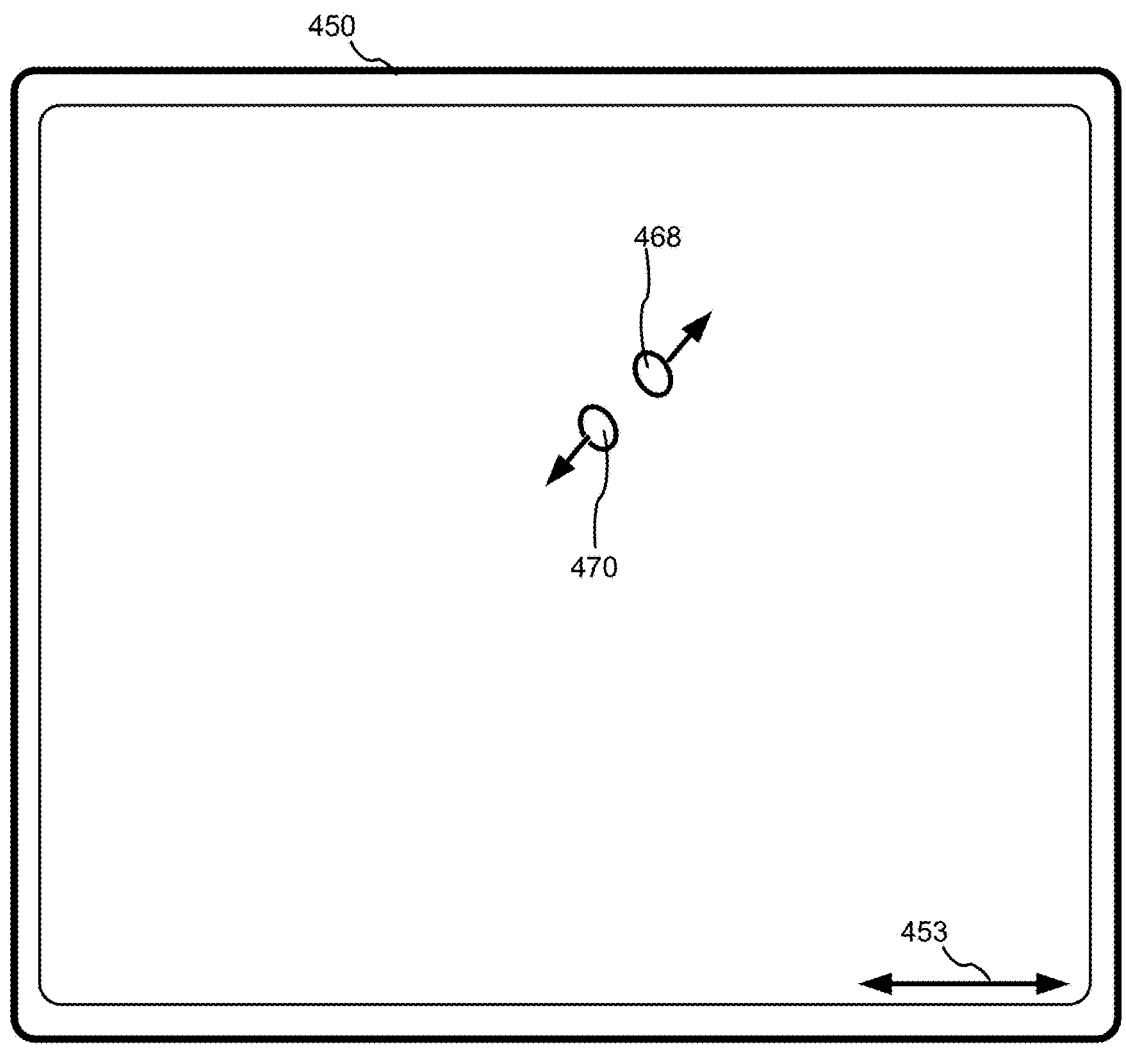
FIG. 4B illustrates an example user interface for a multifunction device with a touch-sensitive surface that is separate from the display in accordance with some embodiments.
Figure 4B:
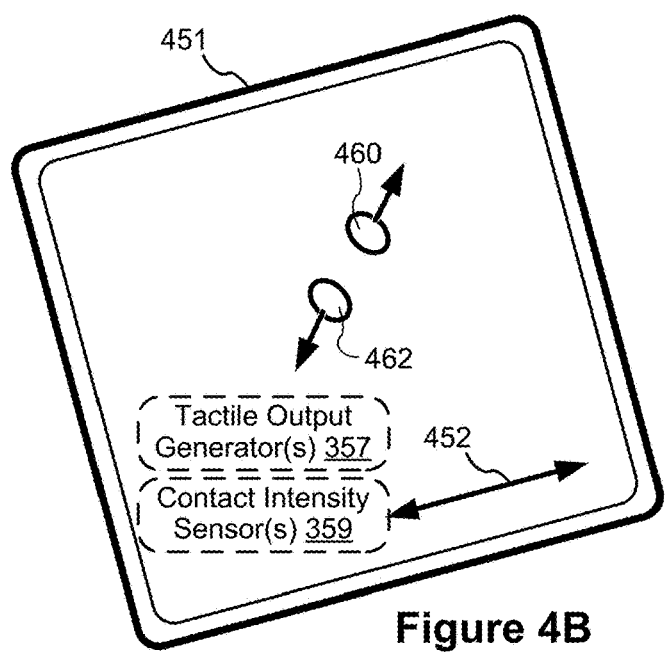

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
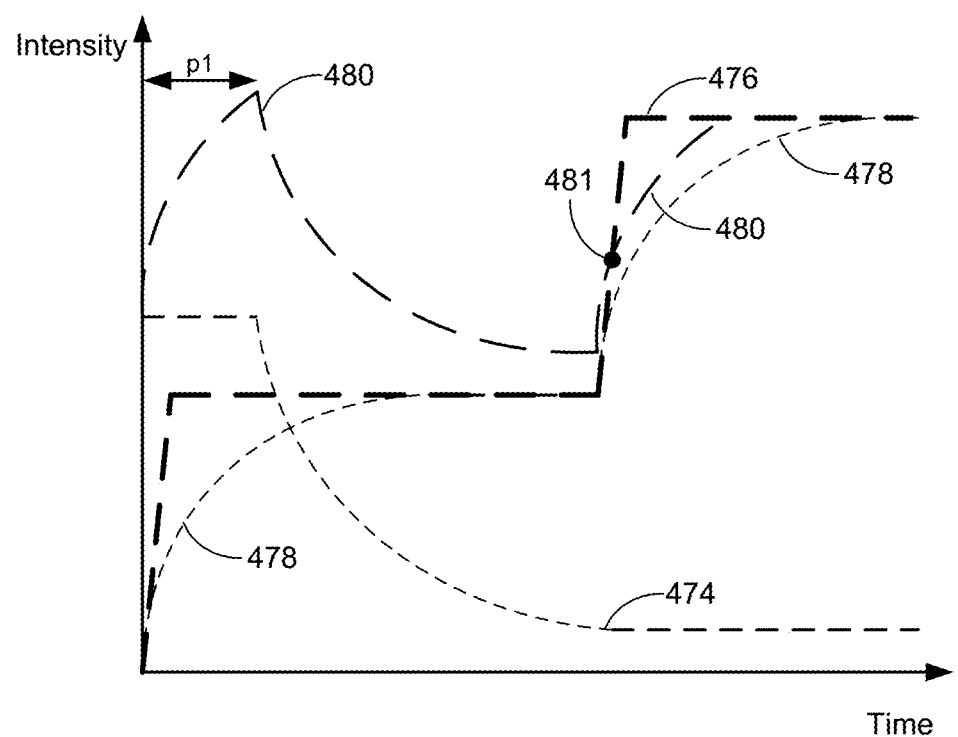
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
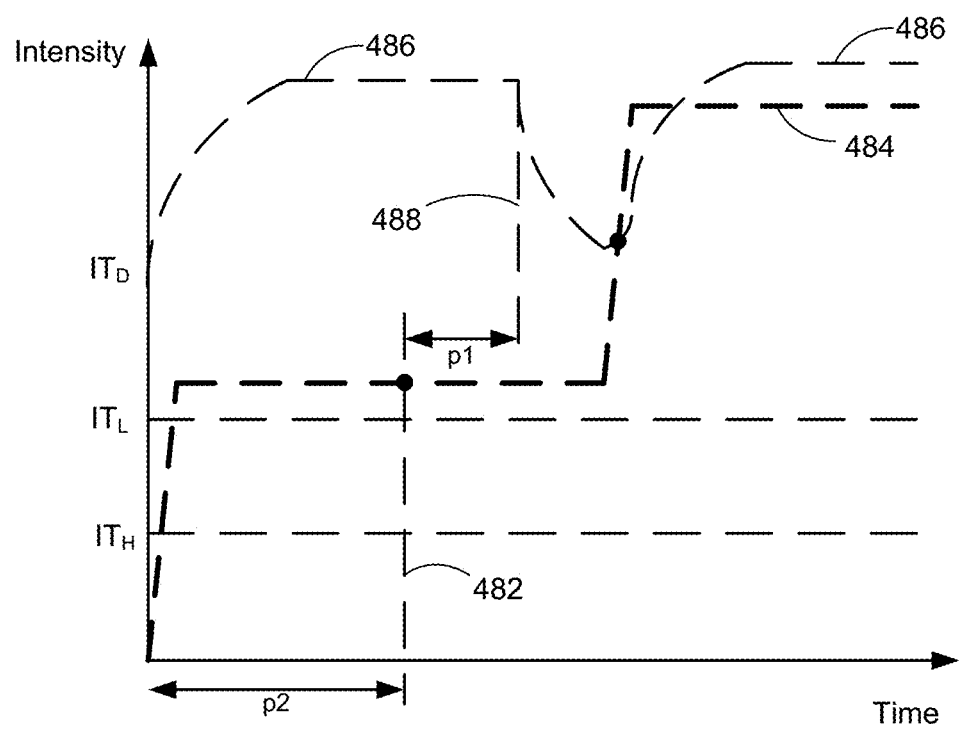

FIG. 4D illustrates another dynamic intensity threshold 486 (e.g., intensity threshold ID). FIG. 4D also illustrates two other intensity thresholds: a first intensity threshold $IT_H$ and a second intensity threshold IL. In FIG. 4D, although touch input 484 satisfies the first intensity threshold $IT_H$ and the second intensity threshold $IT_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $IT_L$ was triggered). This type of dynamic intensity threshold reduces accidental triggering of a response associated with the dynamic intensity threshold $IT_D$ immediately after, or concurrently with, triggering a response associated with a lower intensity threshold, such as the first intensity threshold $IT_H$ or the second intensity threshold $IT_L$.

Figure 4E:
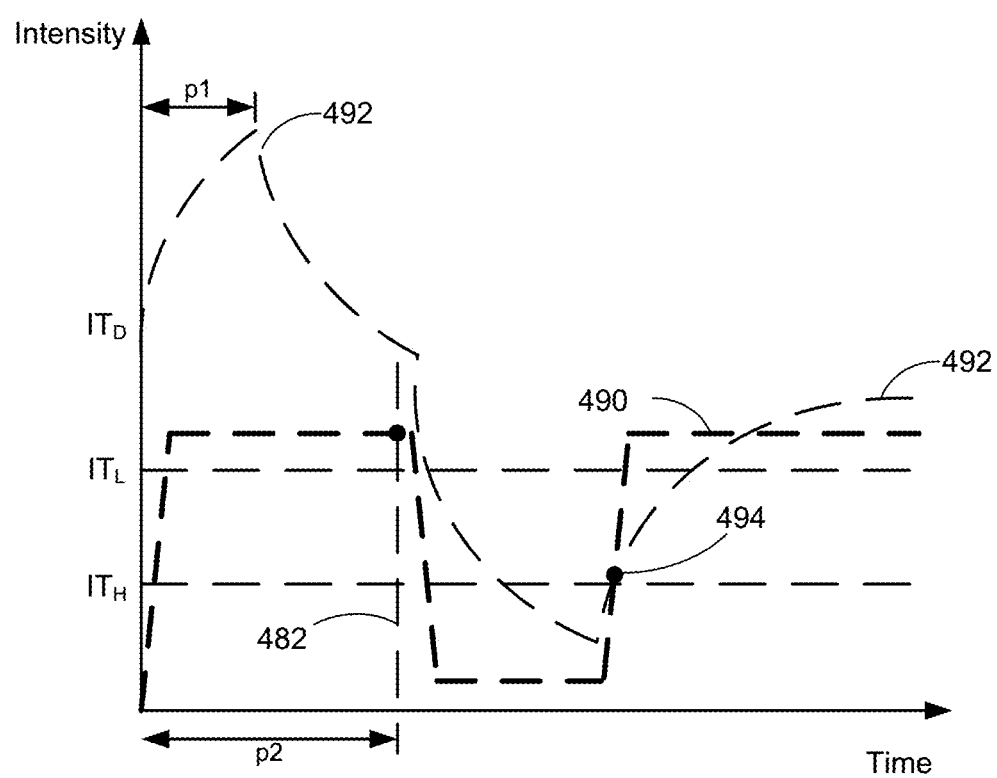

FIG. 4E illustrate yet another dynamic intensity threshold 492 (e.g., intensity threshold ID). In FIG. 4E, a response associated with the intensity threshold $IT_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold IL, followed by an increase in the intensity of touch input 490, without releasing touch input 490, can trigger a response associated with the intensity threshold $IT_D$ (e.g., at time 494) even when the intensity of touch input 490 is below another intensity threshold, for example, the intensity threshold IL.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and (optionally) one or more sensors to detect intensities of contacts with the touch-sensitive surface.

Figure 5A:
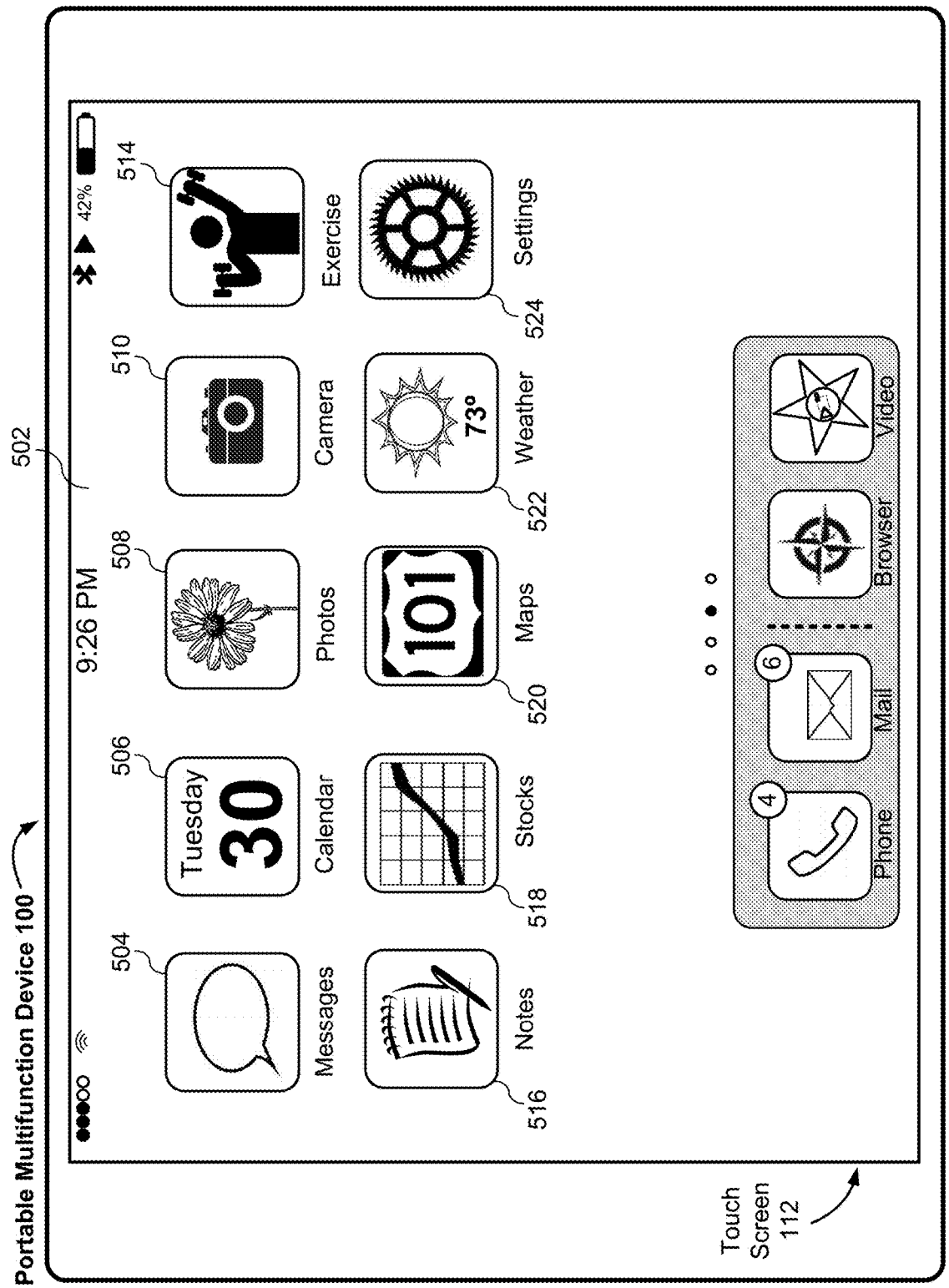
FIGS. 5A-5S illustrate example user interfaces for interacting with user interface objects (e.g., selecting, dragging and dropping objects, and displaying menus corresponding to selected objects) in response to touch inputs, in accordance with some embodiments.
Figure 5B:
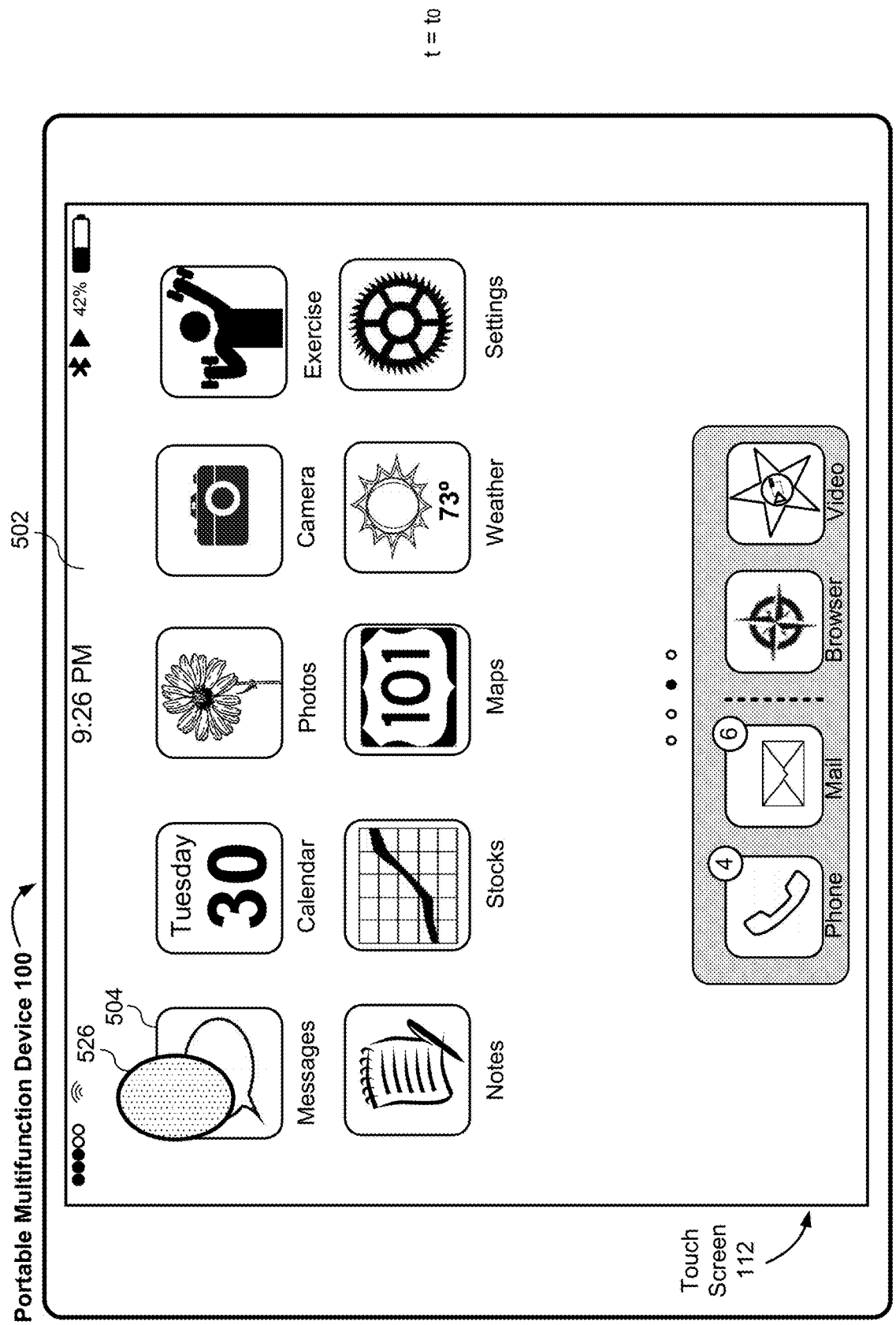
Figure 5C:
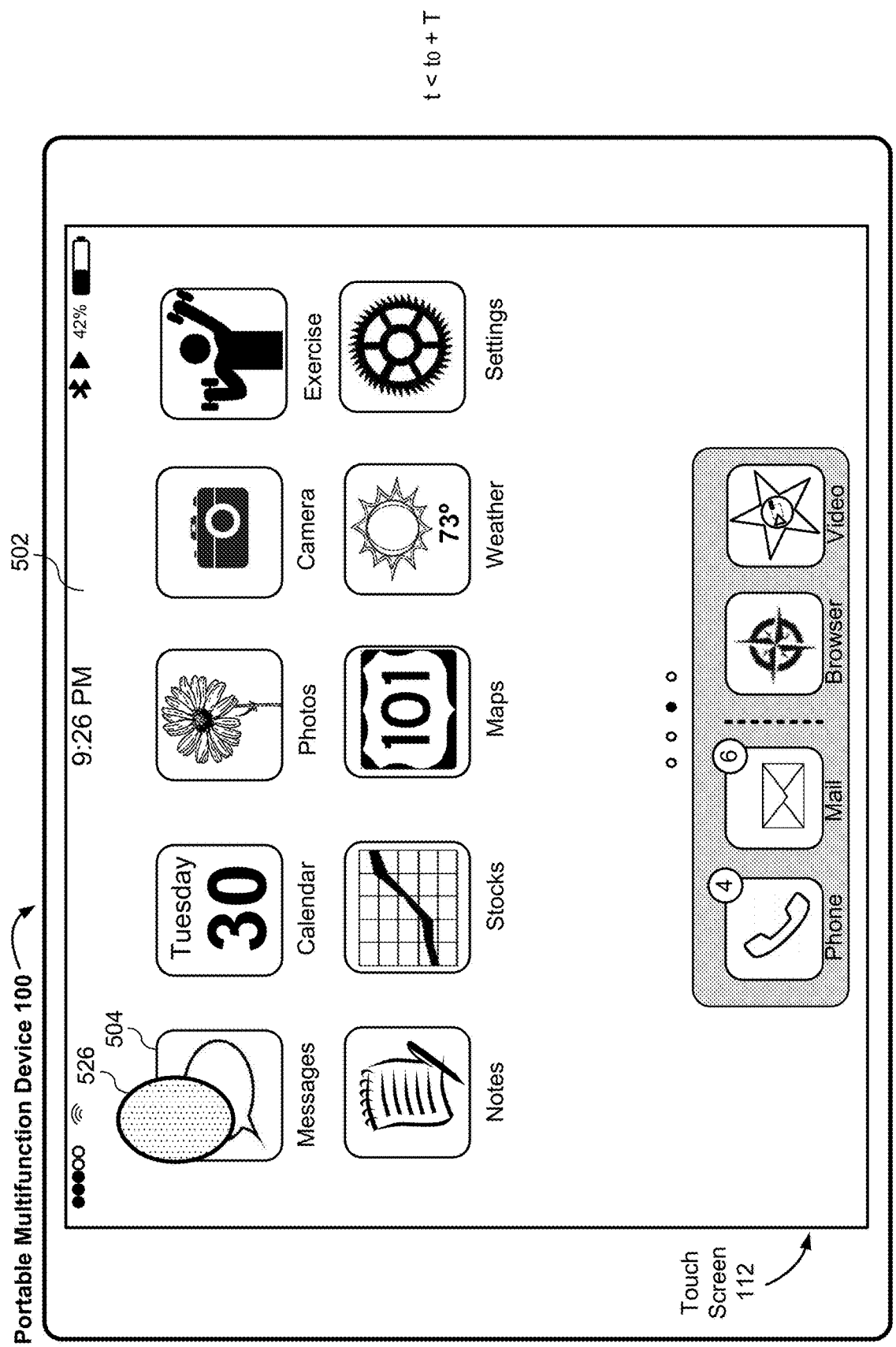
Figure 5D:
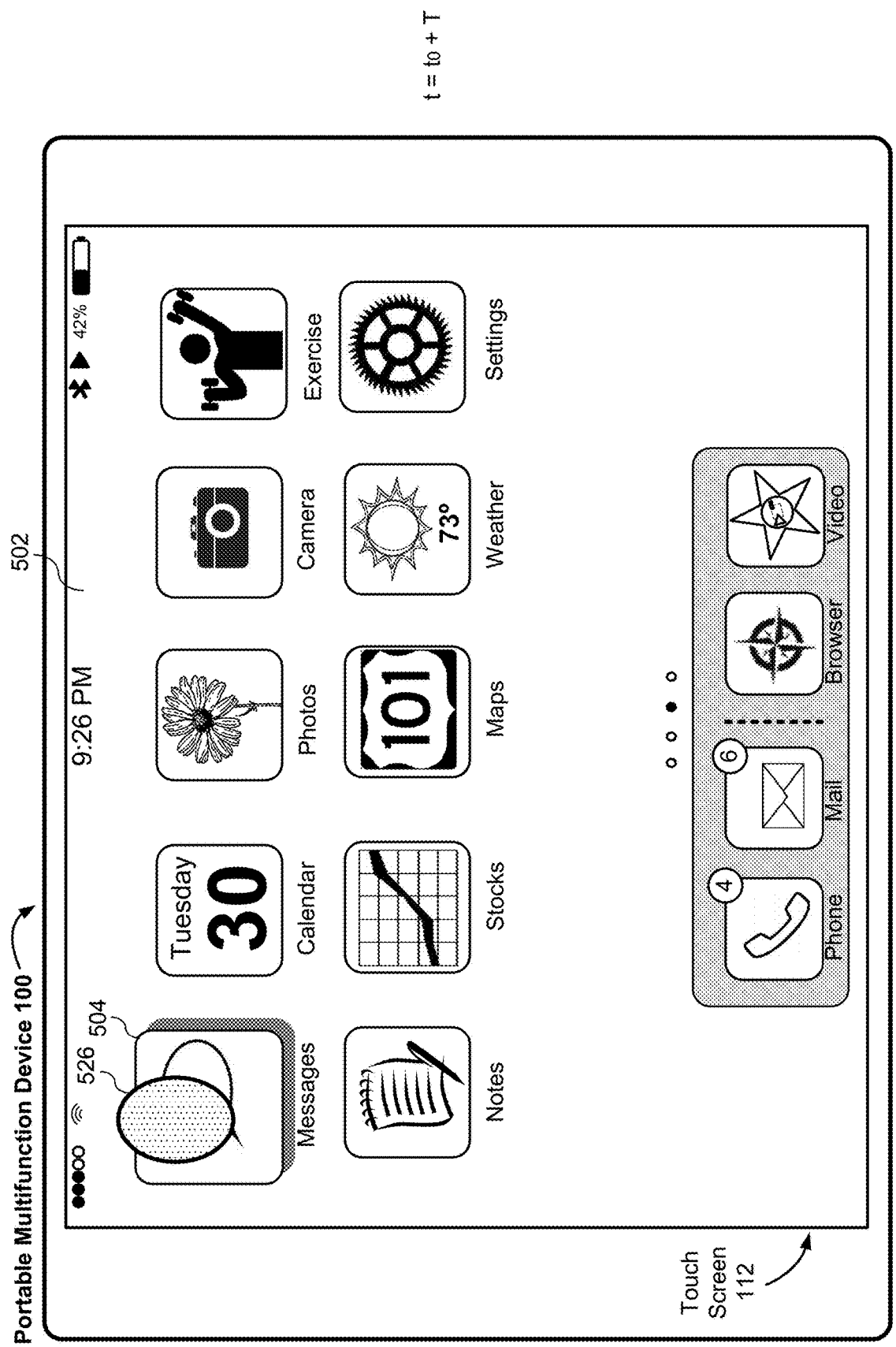
Figure 5E:
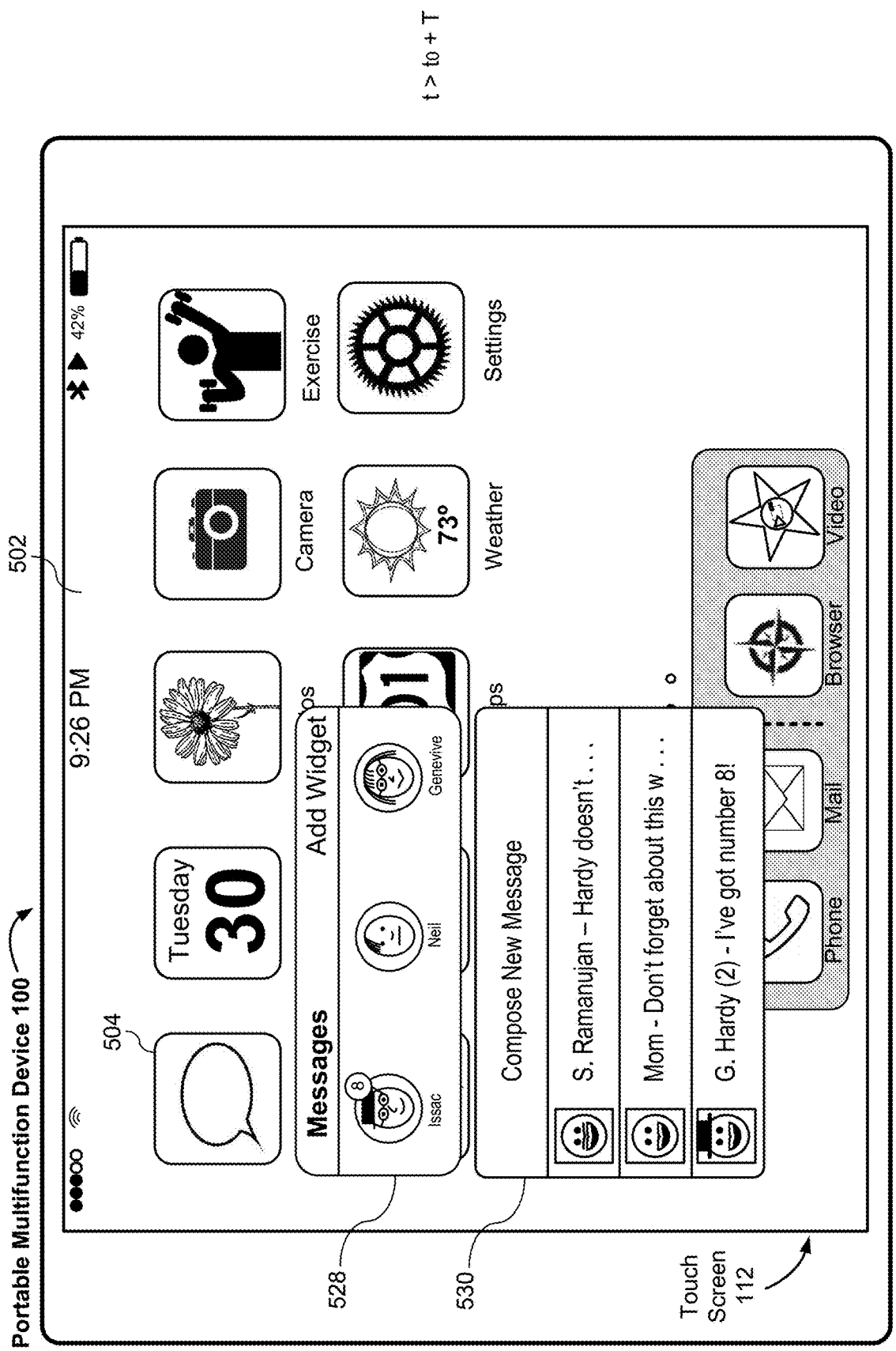
Figure 5G:
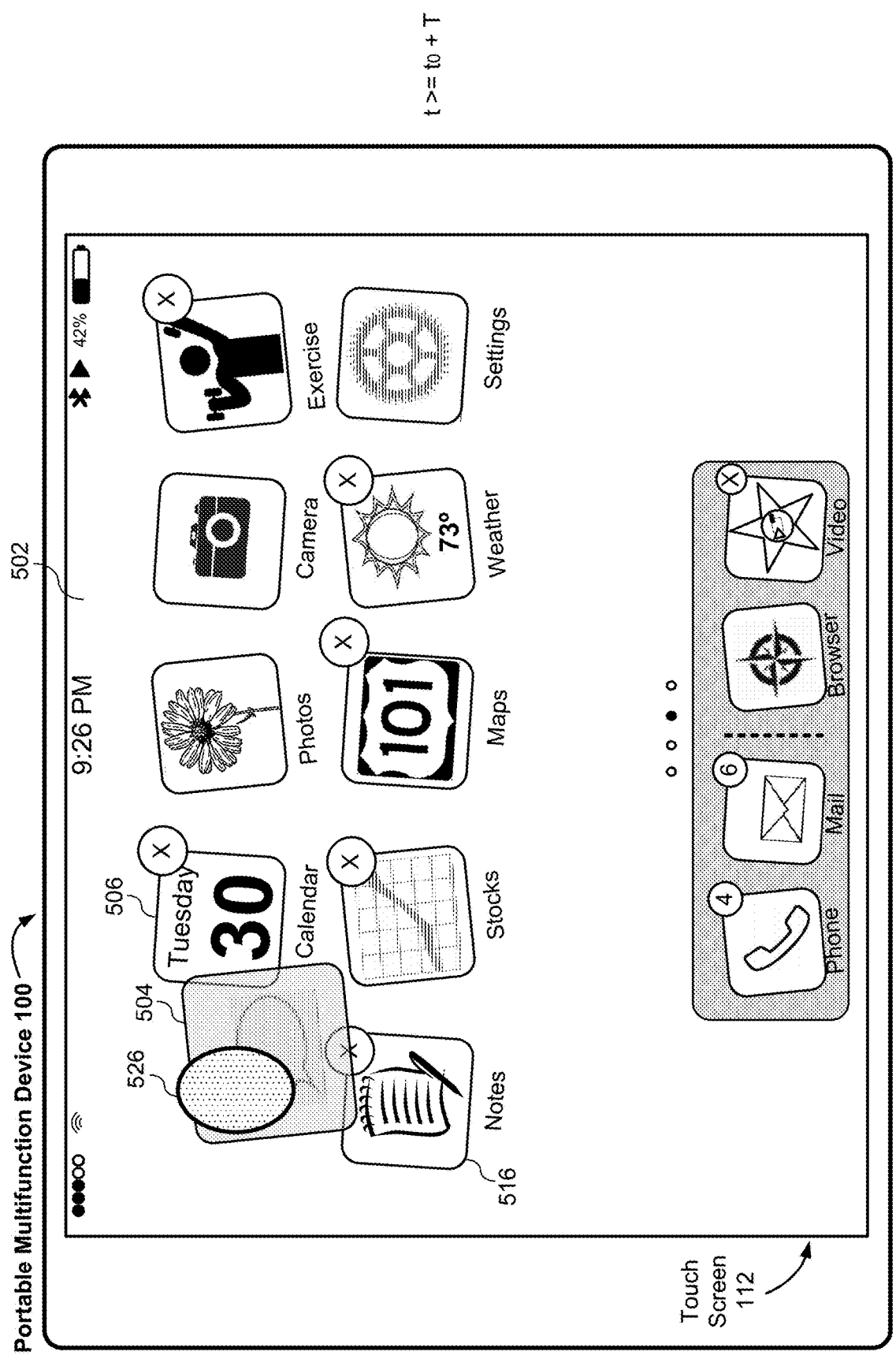
Figure 5J:
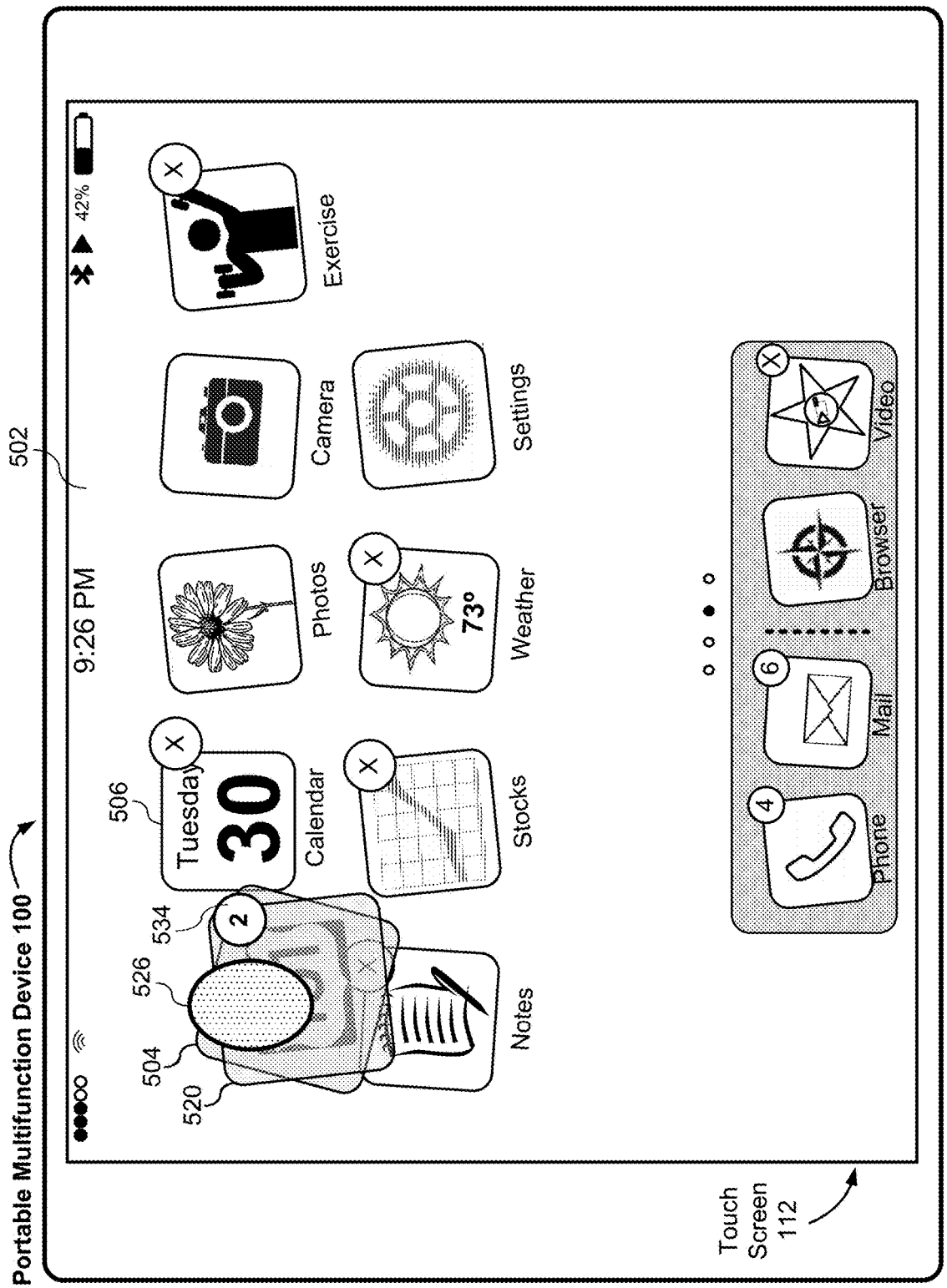
Figure 5K:
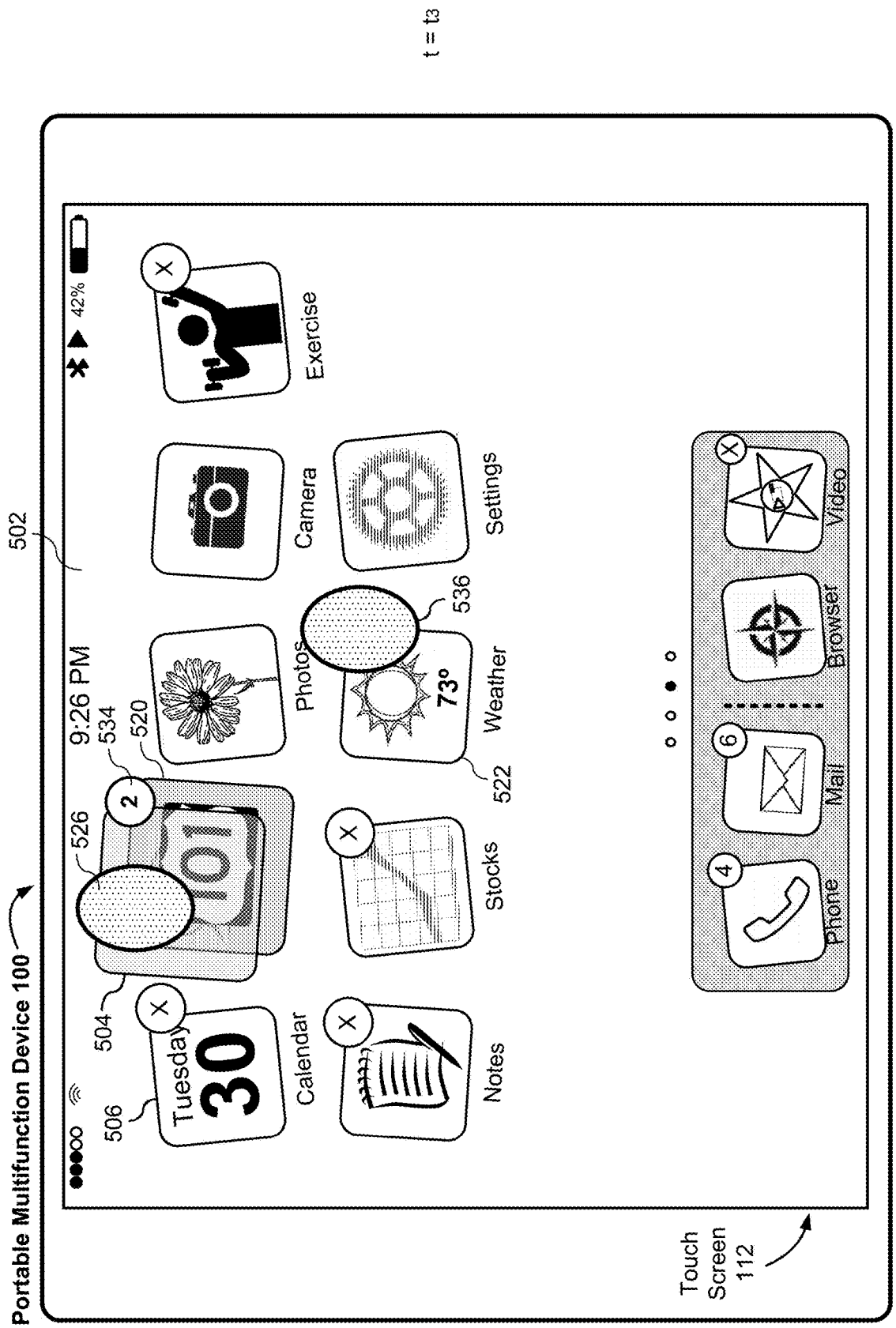
Figure 5L:
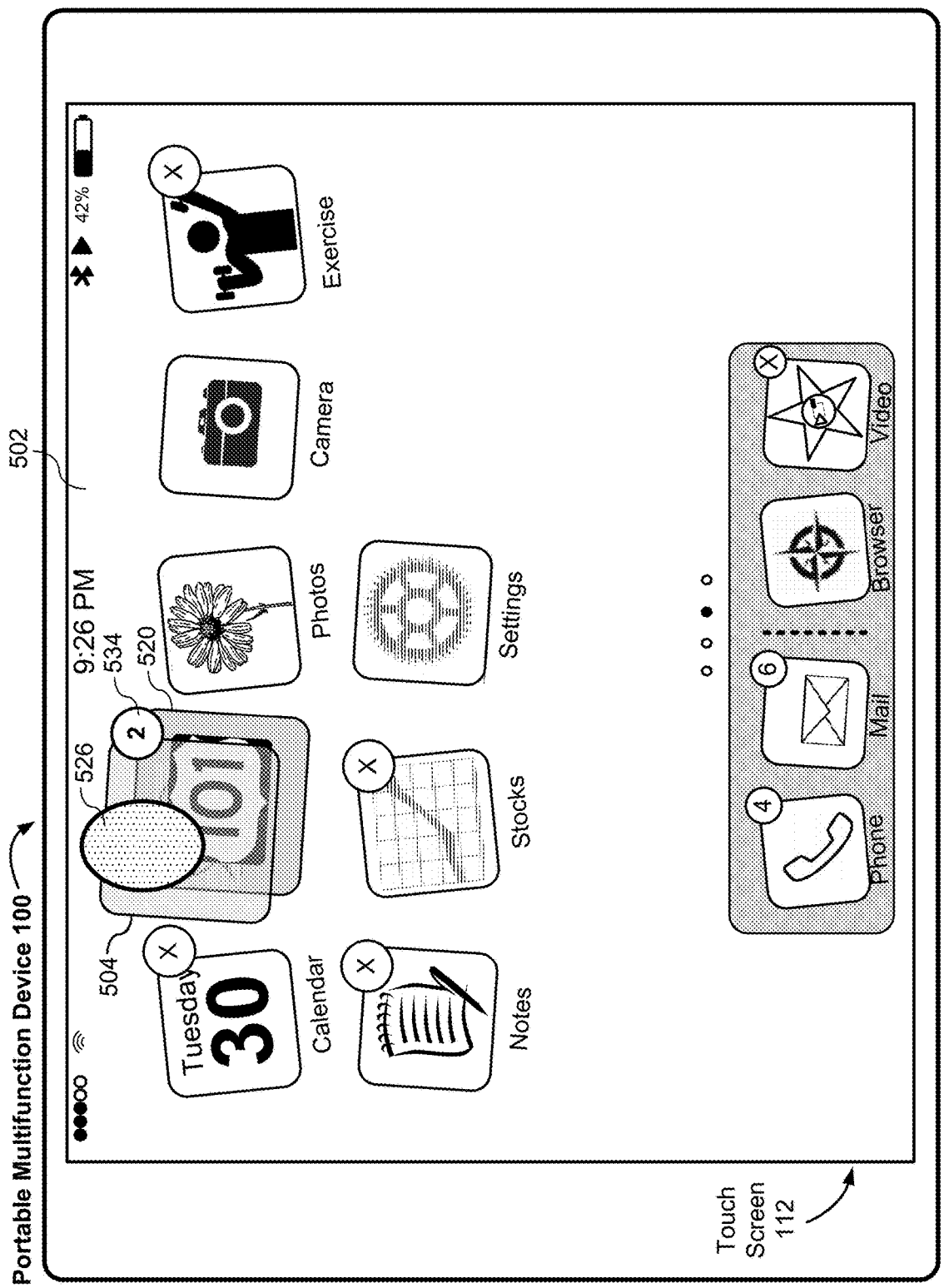
Figure 5O:
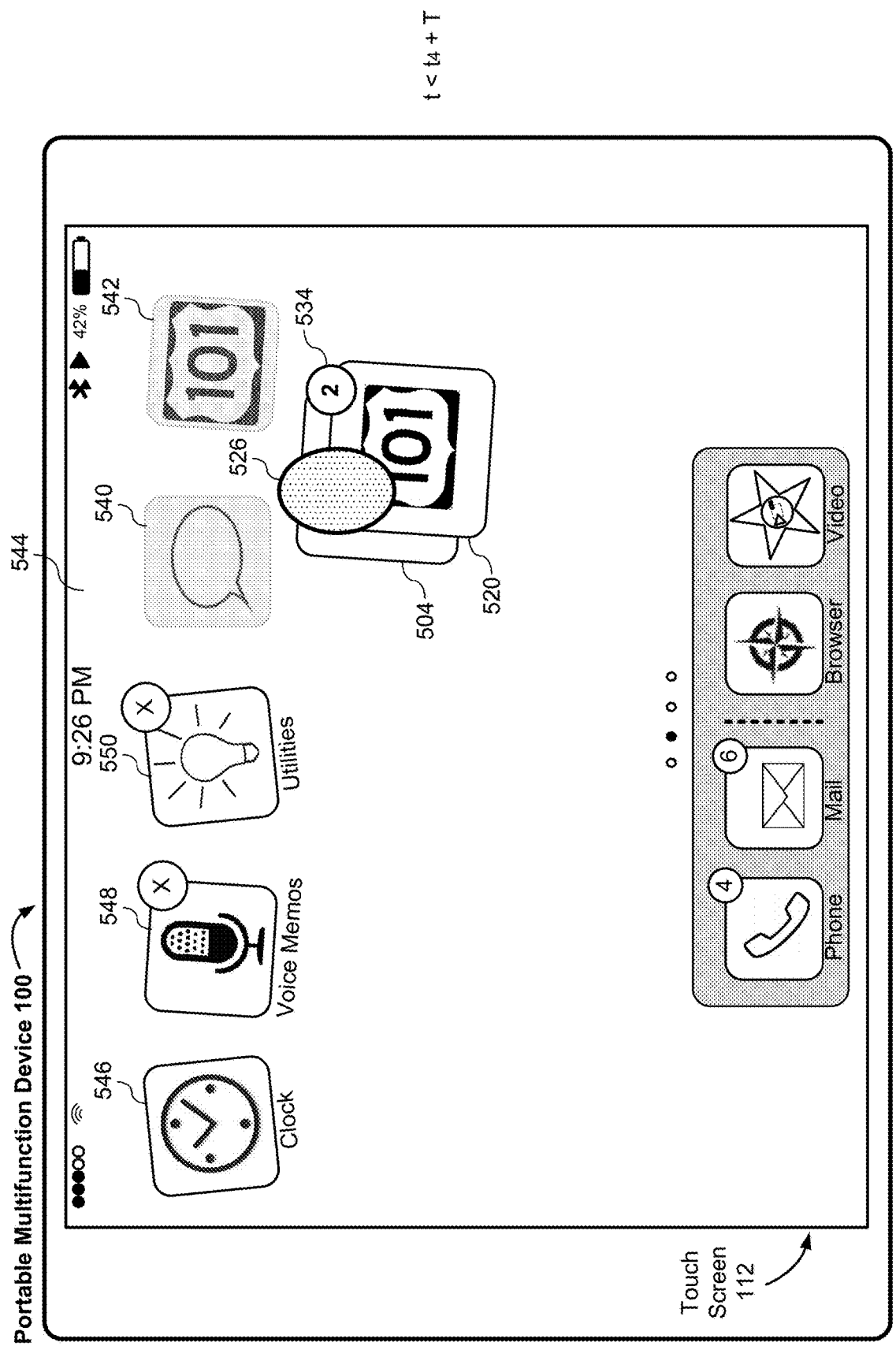
Figure 5P:
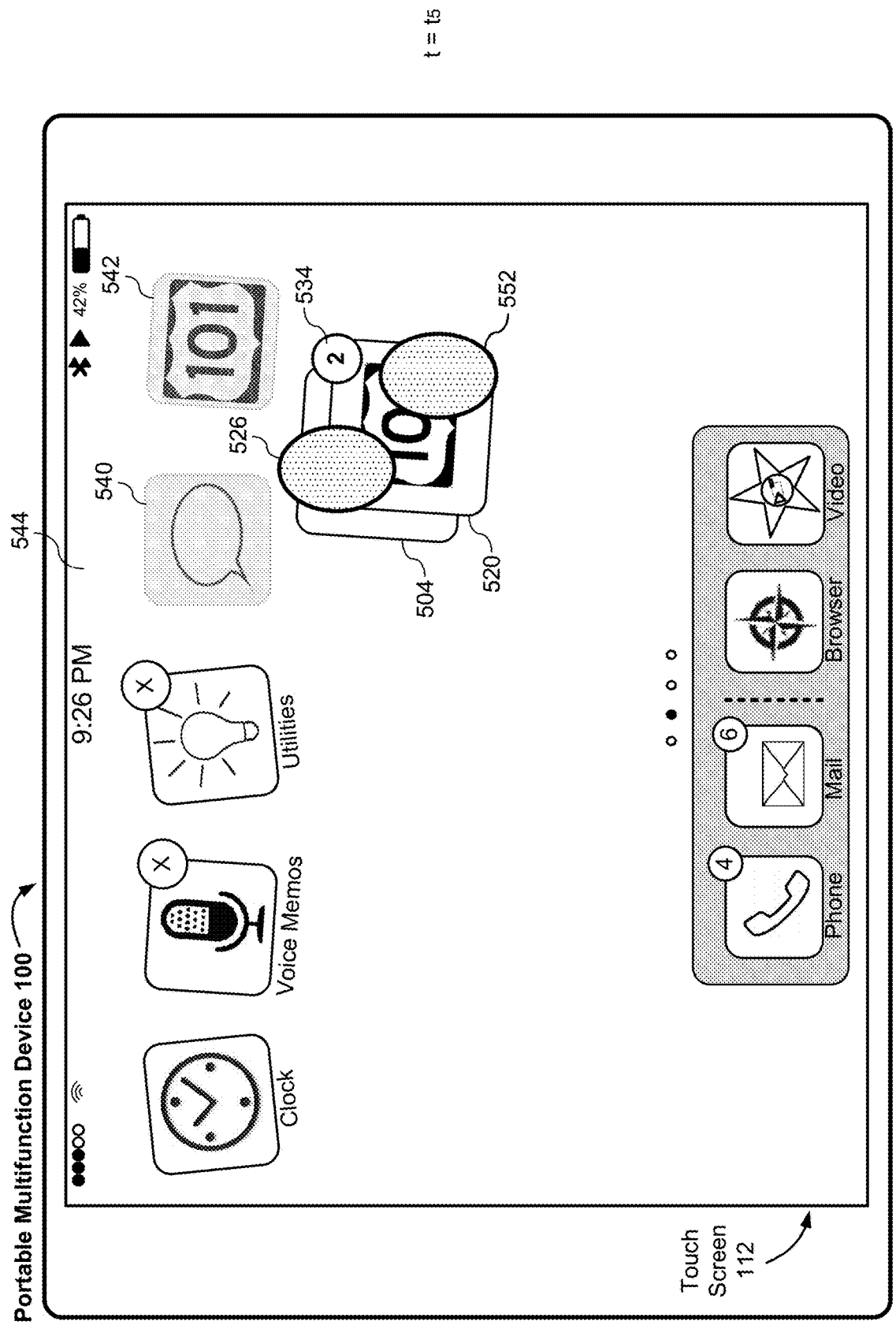
Figure 5Q:
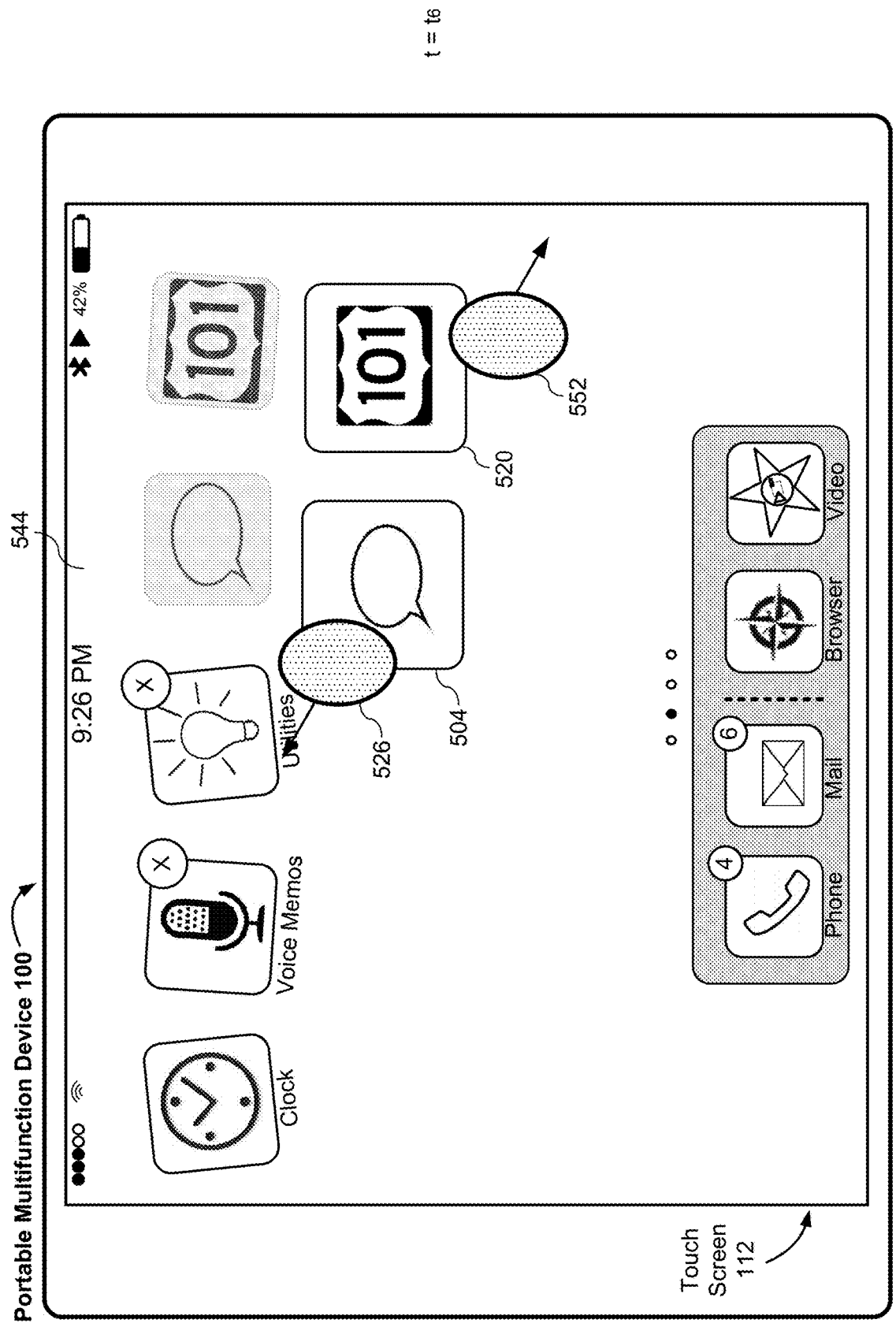
Figure 5S:
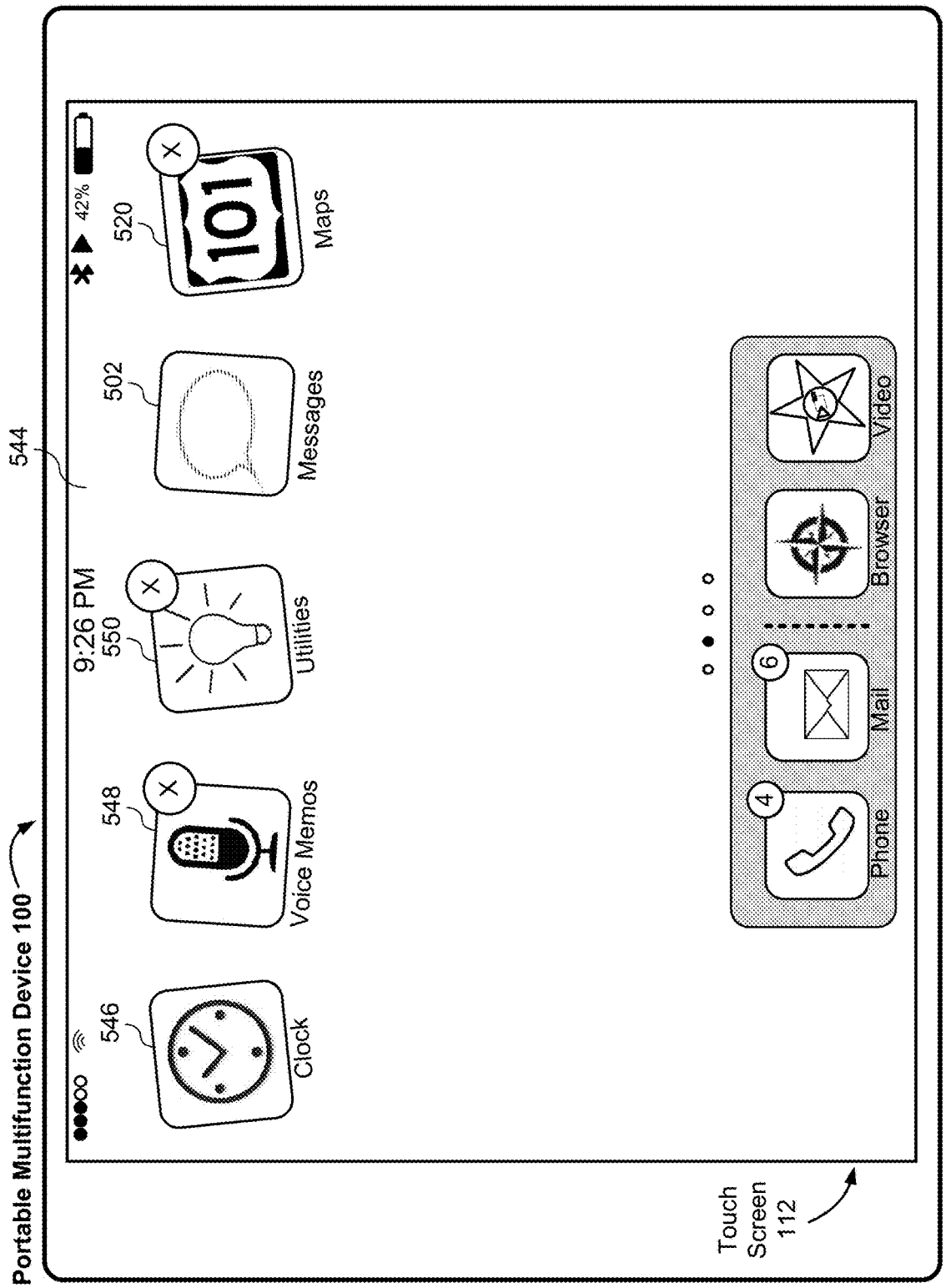

FIGS. 5A-5S illustrate example user interfaces for interacting with user interface objects (e.g., selecting, dragging and dropping objects, and displaying menus corresponding to the selected objects) in response to touch inputs, in accordance with some embodiments. The user interfaces in these figures are used to illustrate the processes described below, including the processes in FIGS. 7A-7J and 8A-8F. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

For convenience of explanation, some of the embodiments will be discussed with reference to operations performed on a device without a home button, and a gesture meeting predefined criteria is used to cause dismissal of a currently displayed user interface and display of the home screen user interface. Although not shown in FIGS. 5A-5S, in some embodiments, a home button (e.g., a mechanical button, a solid state button, or a virtual button) is included on the device and is used to cause dismissal of a currently displayed user interface and display of the home screen user interface.

FIG. 5A illustrates a user interface (e.g., home screen user interface 502) that includes a plurality of user interface objects (e.g., application launch icons corresponding to different applications installed on the device, including icons 504, 506, 508, 510, 514, 516, 518, 520, 522, and 524, etc.).

FIGS. 5B-5D illustrate that a contact (e.g., contact 526) is detected on touch-screen 112 at a location that corresponds to icon 504 at a time $t=t_0$ (as shown in FIG. 5B). Before contact 526 is maintained at that initial touch-location on icon 504 for a threshold amount of time (e.g., a long-press time threshold T), icon 504 remains unselected (e.g., as shown in FIG. 5C). At time $t=t_0+T$, when contact 526 has been kept substantially stationary over icon 504 for the threshold amount of time, icon 504 is selected (e.g., icon 504 is enlarged and lifted up from its original z-layer, casting a shadow on user interface 502 below), as shown in FIG. 5D.

FIGS. 5D-5E illustrate that, in some embodiments, if contact 526 has been kept substantially stationary over icon 504 for at least the threshold amount of time T and then lifts off without additional movement, the device displays information corresponding to icon 504 (e.g., mini-application object 528 and quick action menu 530 for the Messages application). Icon 504 is optionally returned to its original z-layer on home screen user interface 526 after lift-off of contact 526.

FIG. 5F illustrates that, in some embodiments, after contact 526 has been kept substantially stationary over icon 504 for at least the threshold amount of time T, the device displays information corresponding to icon 504 (e.g., mini-application object 528 and quick action menu 530 for the Messages application) before lift-off of contact 526 is detected.

FIG. 5G illustrates that, following FIG. 5D or FIG. 5F (e.g., where contact 526 has been kept substantially stationary over icon 504 for at least the threshold amount of time T), movement of contact 526 is detected. In response to detecting the movement of contact 526, the device moves icon 504 in accordance with the movement of contact 526 (e.g., icon 504 is dragged by contact 526 across home screen user interface 502 in a z-layer above the z-layer of the home screen user interface). In addition, the device, in response to detecting the movement of contact 526, activates a home screen reconfiguration mode (e.g., other icons on the home screen are animated (e.g., "jiggling") to indicate that the home screen reconfiguration mode has been activated) in which the icons on the home screen can be deleted and rearranged. In FIG. 5G, icon 504 has been dragged away from its original location and before icon 504 is dragged near a permissible drop-off location, icon 504 appears to be semi-transparent, such that the user interface and icons underneath are partially visible through the semitransparent icon 504.

In FIG. 5H, while icon 504 remains selected by contact 526 during the move operation by contact 526, the device detects another contact 532 over icon 520. In FIG. 5I, after contact 532 is maintained over icon 520 for at least the threshold amount of time T, icon 520 is also selected (e.g., icon 520 is enlarged and lifted up from its original z-layer, casting a shadow on the home screen user interface below). In some embodiments, the device forgoes displaying information corresponding to icon 520 upon lift-off of contact 532, in accordance with a determination that another icon (e.g., icon 504) is already selected and a move operation has been initiated and in progress.

FIGS. 5I-5J illustrate that, after icon 520 is selected, icon 520 remains substantially stationary above its original location on the home screen user interface, until movement of contact 526 is resumed. In FIG. 5J, in response to the movement of contact 526, icon 520 moves toward icon 504 and joins icon 504 to form a collection below contact 526. Indicator 534 (e.g., a badge with the count "2") is displayed overlaid on the collection of two icons 504 and 520. Other icons (e.g., icons, 506, 522, and 524) are automatically rearranged on home screen user interface 502 due to the movement of icons 504 and 520. In some embodiments, both icons 504 and 520 in the collection are semitransparent to indicate that the collection is currently located at a forbidden drop off location. If lift-off of contact 526 were to be detected at the time represented in FIG. 5J, the move operation would be canceled, and icons 504 and 520 would each fly back to their original locations on the display.

FIGS. 5J-5K illustrate that, as contact 526 continues to move across home screen user interface 502, icons 504 and 520 are dragged by contact 526 across the display as a collection.

FIGS. 5K-5L illustrate that, as icons 504 and 520 are dragged by contact 526, home screen user interface 502 remains responsive to other inputs that are detected on the touch-screen 112. For example, icon 522 is deleted in response to a tap input by contact 536 (e.g., contact 536 remained on the touch-screen for less than the threshold amount of time). Other icons (e.g., icon 524) are automatically rearranged on home screen user interface 502 due to the deletion of icon 522.

FIG. 5M illustrates that, when contact 526 drags the collection of two icons 504 and 520 to another location on the touch-screen (e.g., after contact 526 hovers over the location for a threshold amount of time), a preview of drop-off of the collection is displayed (e.g., preview object 540 and 542 are displayed at two permissible drop-off locations on home screen user interface 502, and transparency levels of icons 504 and 520 are increased).

In FIG. 5M-5O, while contact 526 is maintained and the move operation is still ongoing, a swipe gesture by a newly detected contact (e.g., movement of contact 538 is started before the long-press time threshold T is met) causes home screen user interface 502 to be scrolled rightward and another home screen user interface 544 is displayed (e.g., as shown in FIG. 5O). In FIG. 5O, while contact 526 is maintained over home screen user interface 544 (e.g., after contact 526 hovers over the location for a threshold amount of time), a preview of drop-off of the collection is displayed (e.g., preview object 540 and 542 are displayed at two permissible drop-off locations on home screen user interface 544, and transparency of icons 504 and 520 remains increased).

In FIGS. 5P-5Q, while contact 526 is maintained on the touch-screen 112 and the collection of icons 504 and 520 remain under contact 526, the device detects another contact 552 at a location on the touch-screen that corresponds to the collection of icons 504 and 520 (e.g., as shown in FIG. 5P). After detecting contact 552, the device detects relative movement of contacts 526 and 552 (e.g., a depinch gesture where contacts move apart from each other), and in response to detecting the relative movement of the contacts (e.g., in FIG. 5Q), the device spreads out the icons in the collection, such that the individual icons 504 and 520 are displayed side-by-side and non-overlapping. In some embodiments, the spreading out of the icons in the collection is optionally beyond the distance between contacts 526 and 552 and depends on the number of icons included in the collection.

FIG. 5R illustrates that, when one of the two contacts (e.g., contacts 526 and 552) is detected after the depinch gesture, icons 504 and 520 fly back to the remaining contact (e.g., contact 526 or 552) and rejoin the collection.

In FIG. 5S, lift-off of the remaining contact is detected, and icons 504 and 520 are dropped to the permissible drop-off locations closest to the final position of the contact (e.g., the positions at which the preview objects 540 and 542 were displayed). In some embodiments, the home screen reconfiguration mode remains activated when lift-off of the contact is detected, so that the home screen user interface can be rearranged in accordance with additional inputs. In some embodiments, the device exits the icon reconfiguration mode in response to detecting the lift-off of the contact.

Figure 5T:
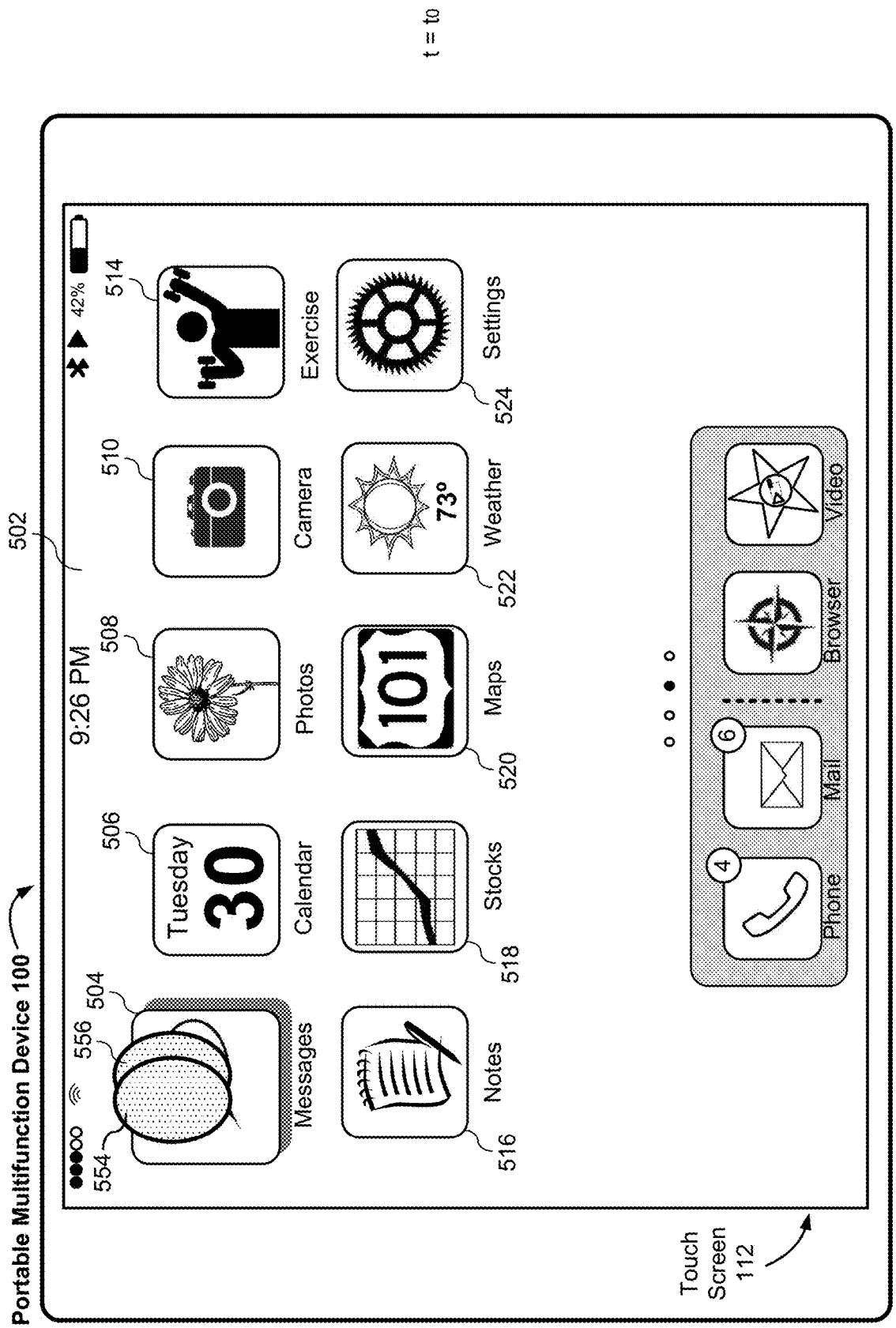

FIGS. 5T-5AC illustrate exemplary user interfaces for interacting with user interface objects (e.g., selecting, dragging and dropping objects) in response to touch-inputs, in accordance with some embodiments. The user interfaces in these figures are used to illustrate the processes described below, including the processes in FIGS. 7A-7J and 8A-8F. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector. While the inputs that cause drag operations to be performed in FIGS. 5T-5BD are shown as multiple contact inputs (e.g., two contact inputs), it should be understood that, in some embodiments, a single contact input is used (e.g., a single contact input that meets object-move criteria such as remaining substantially stationary over a respective user interface object for at least the threshold amount of time T) to initiate a drag operation, as described in greater detail above with reference to FIGS. 5A-5S.

In FIG. 5T, two contacts 554 and 556 are detected at substantially the same time (e.g., less than 200 ms apart) and at close proximity to each other (e.g., less than 0.5 centimeter apart) over icon 504 on the touch-screen 112. In response to detecting the two concurrent contacts 554 and 556 (e.g., at $t=t_0$), before any movement is made by the contacts, icon 504 is selected (e.g., icon 504 is enlarged and lifted up from the original z-layer of icon 504, casting a shadow on home screen user interface 502 below).

Figure 5U:
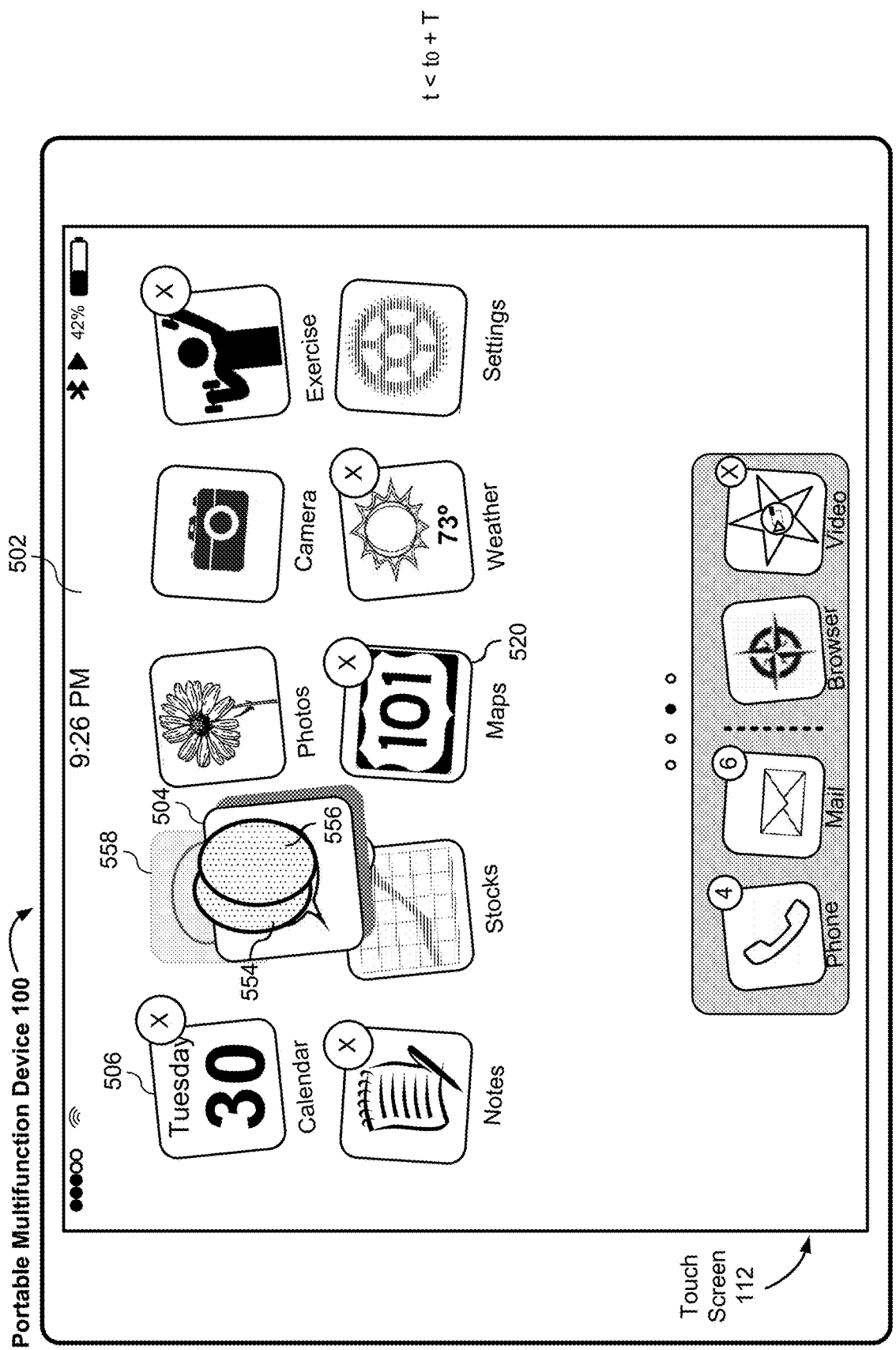

In FIG. 5U, after icon 504 is selected, concurrent movement of contacts 554 and 556 in the same direction drags the selected icon 504 across the display. In response to detecting the movement of the pair of contacts 554 and 556, the device activates the home screen reconfiguration mode in which icons on the home screen user interface can be rearranged and/or deleted in response to additional inputs. In FIG. 5U, as the pair of contacts hovers over a permissible drop-off location (previously occupied by icon 506), preview object 558 is displayed at the permissible drop-off location to indicate where icon 504 will be displayed if lift-off of contacts 554 and 556 were to be detected at the time represented by FIG. 5U.

Figure 5V:
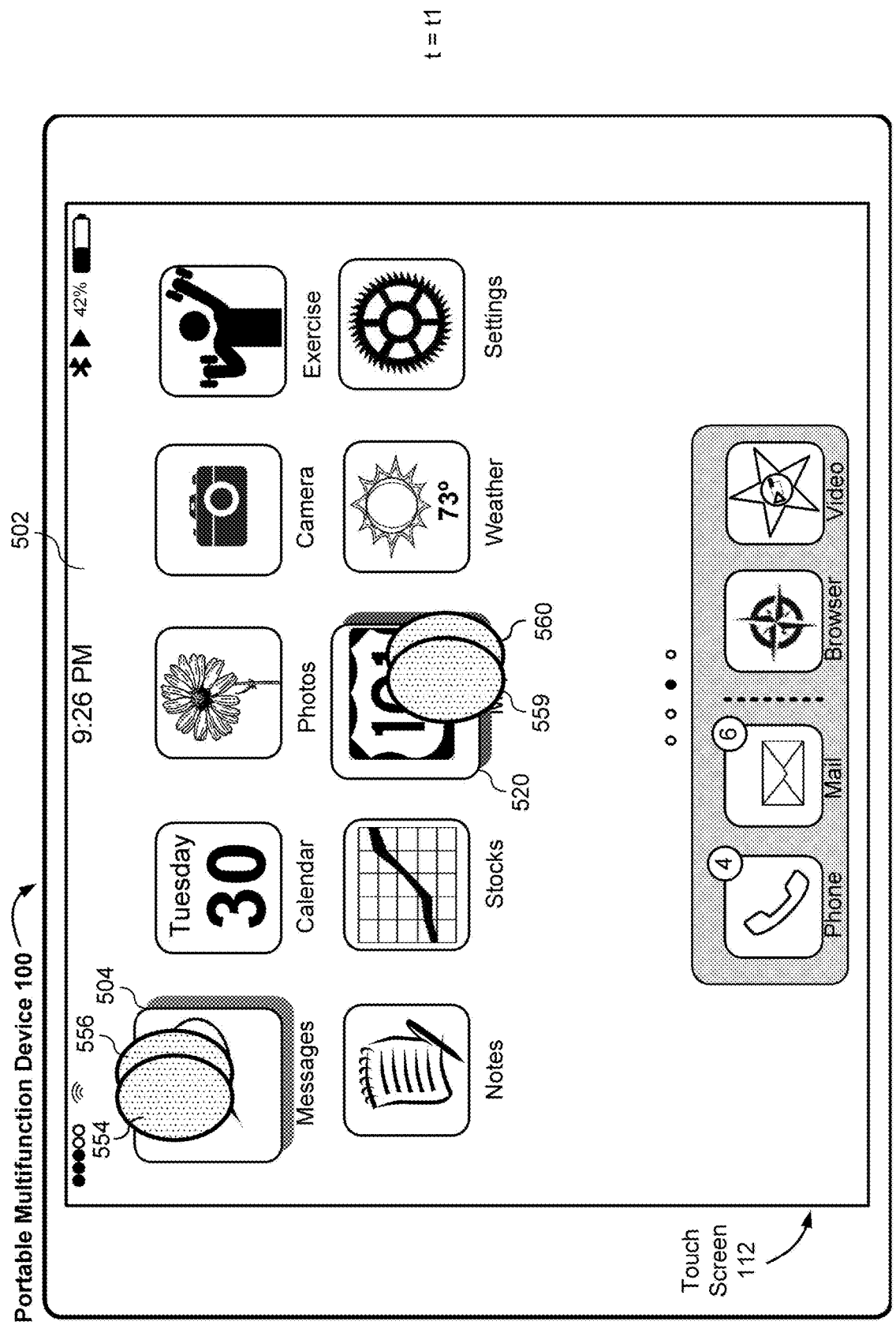
Figure 5W:
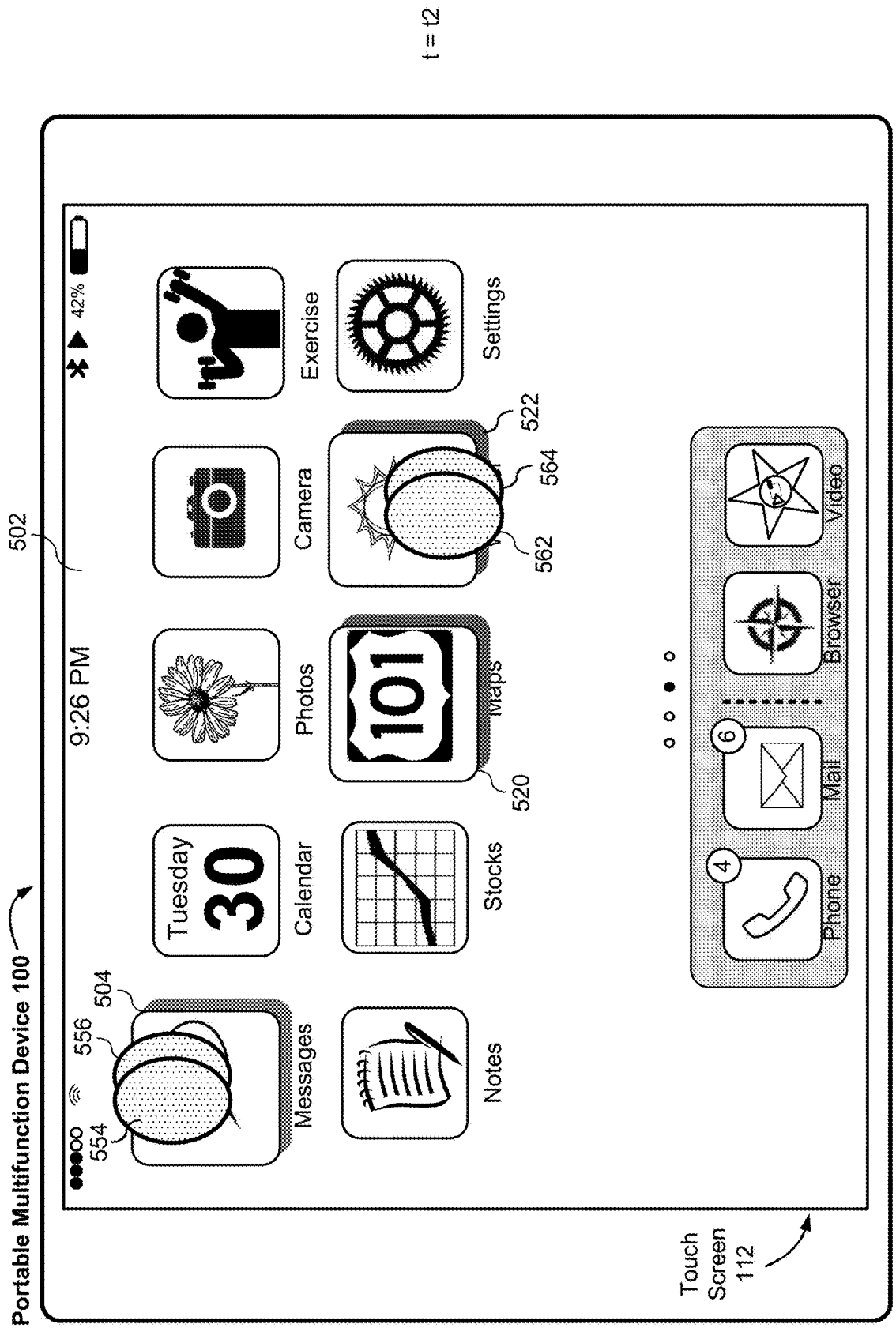
Figure 5X:
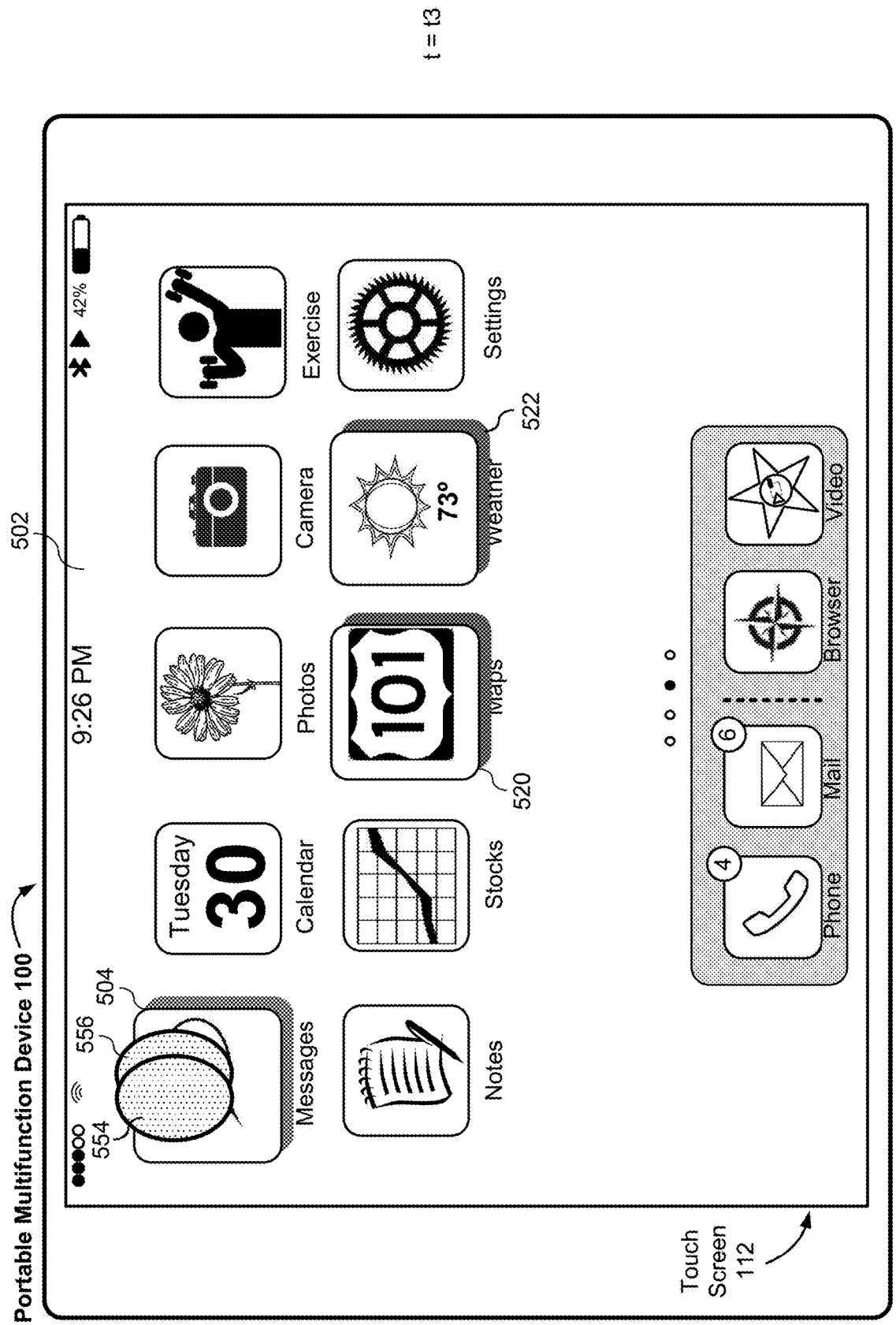

FIGS. 5V-5X illustrate that, while icon 504 remains selected in response to detection of the pair of contacts 554 and 556, if two double-finger tap inputs (e.g., a tap input by a pair of contacts 559 and 560 in FIG. 5V, and another tap input by a pair of contacts 562 and 564 in FIG. 5W) are detected over icons 520 and 522, respectively, icons 520 and 522 are selected respectively (icons 520 and 522 are enlarged and lifted up from their original z-layer, casting shadows on the home screen user interface below). When contacts 554 and 556 remain substantially stationary (e.g., at their initial touch locations), icons 520 and 522 remain near their respective original locations after they are selected, e.g., as shown in FIG. 5X.

Figure 5Y:
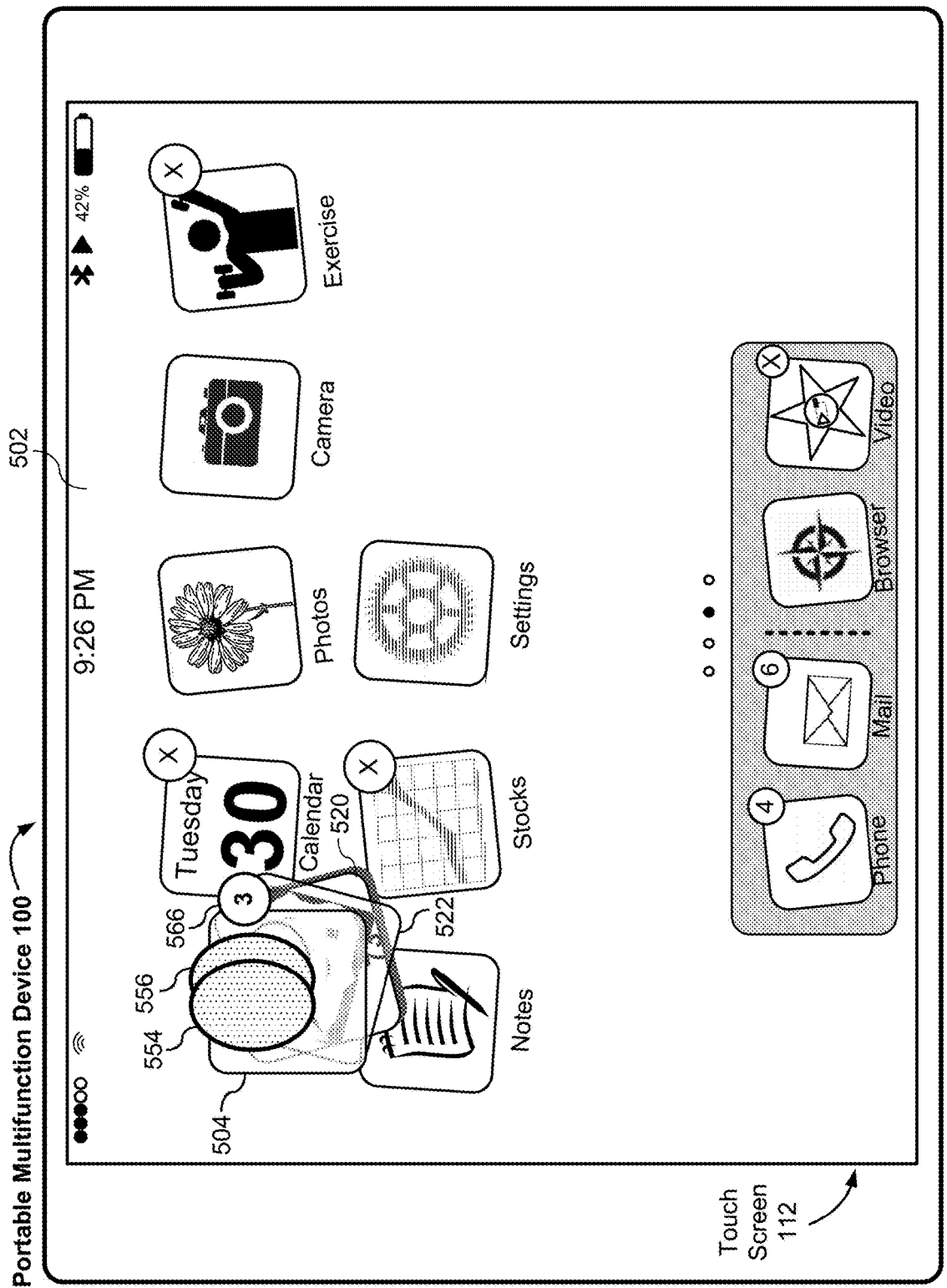

FIG. 5Y illustrates that, after icons 520 and 522 are selected, movement of the pair of contacts 554 and 556 is detected. In response to the movement of the pair of contacts 554 and 556, icons 520 and 522 fly toward the pair of contacts 554 and 556 and join icon 504 to form a collection of icons that is dragged by the pair of contacts 554 and 556. Indicator 566 (e.g., a count "3") is displayed on the collection of icons to indicate the total number of icons currently included in the collection of icons. In FIG. 5Y, in response to detecting movement of the pair of contacts 554 and 556, the device activates the user interface reconfiguration mode, and the icons on the home screen user interface 502 are animated to indicate that the user interface reconfiguration mode has been activated.

Figure 5Z:
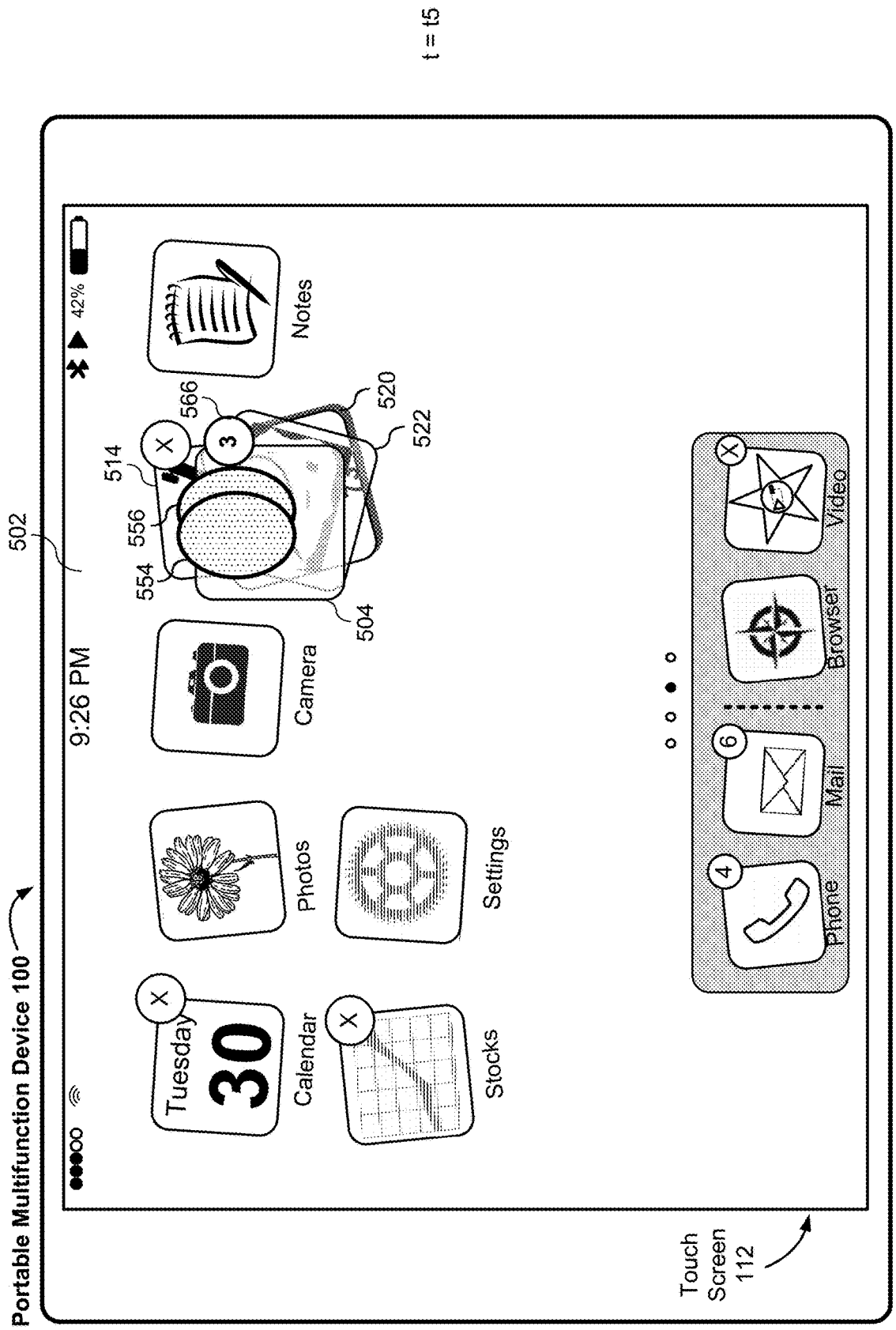
Figure 5A:
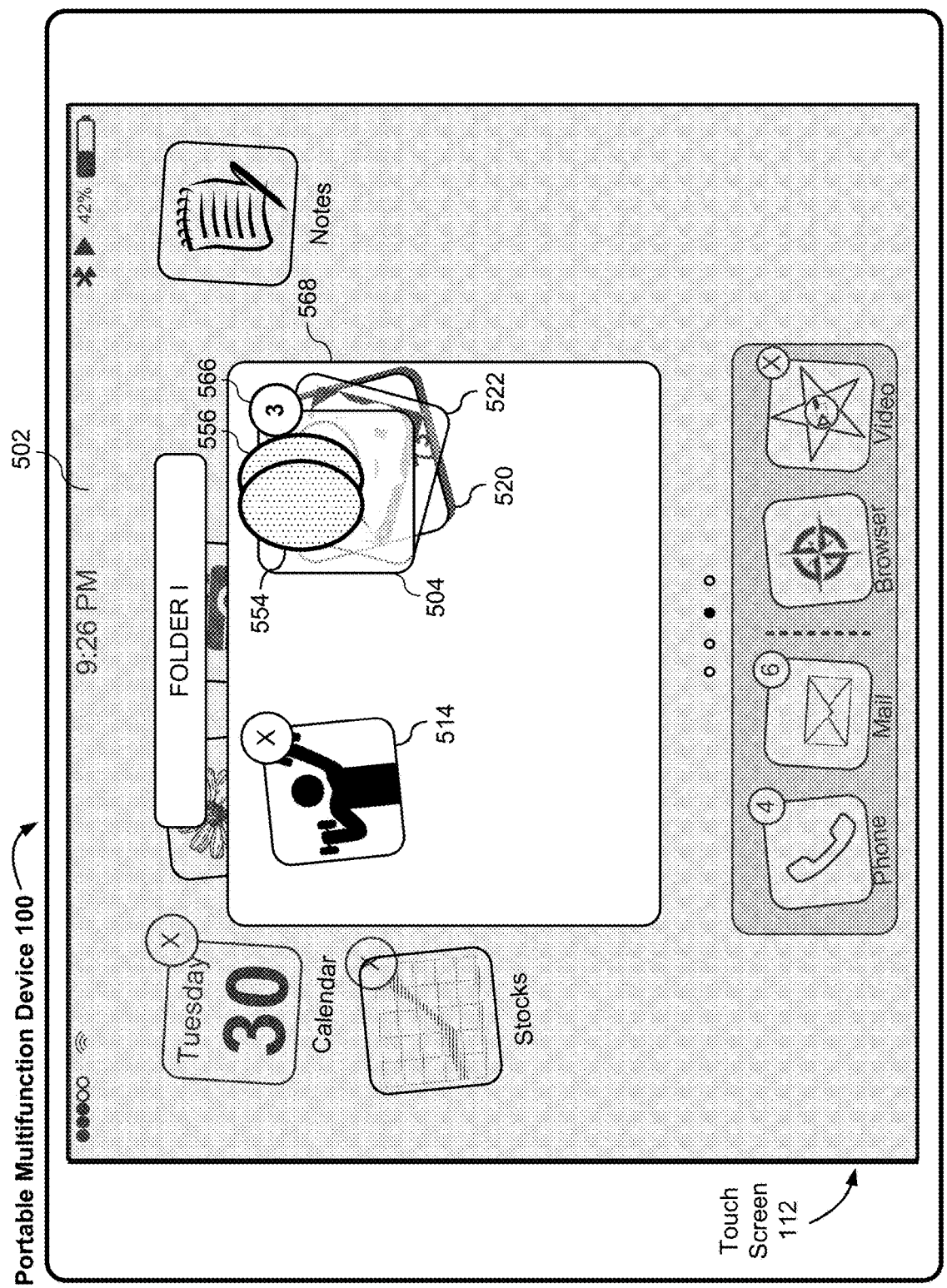
Figure 5A:
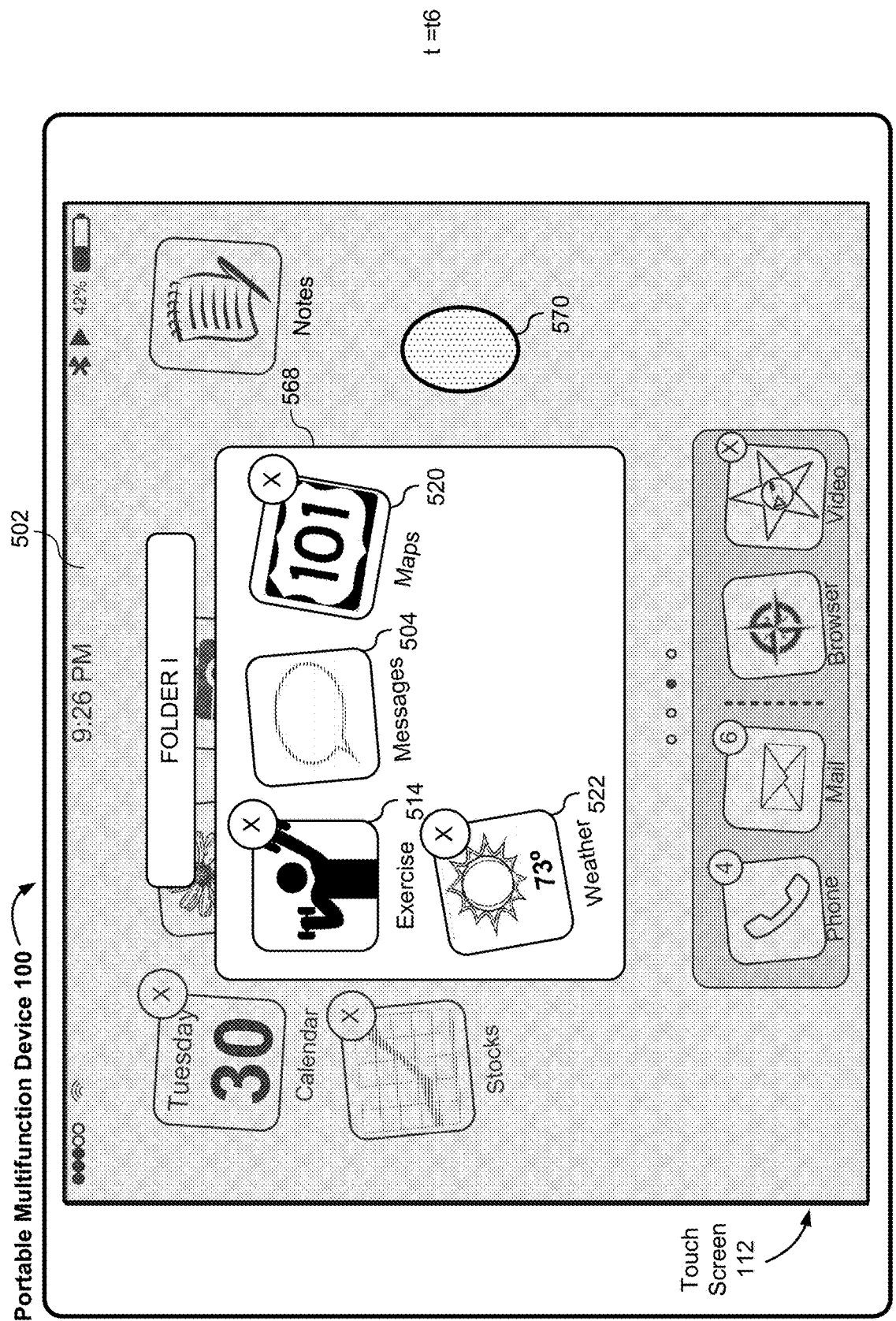
Figure 5A:
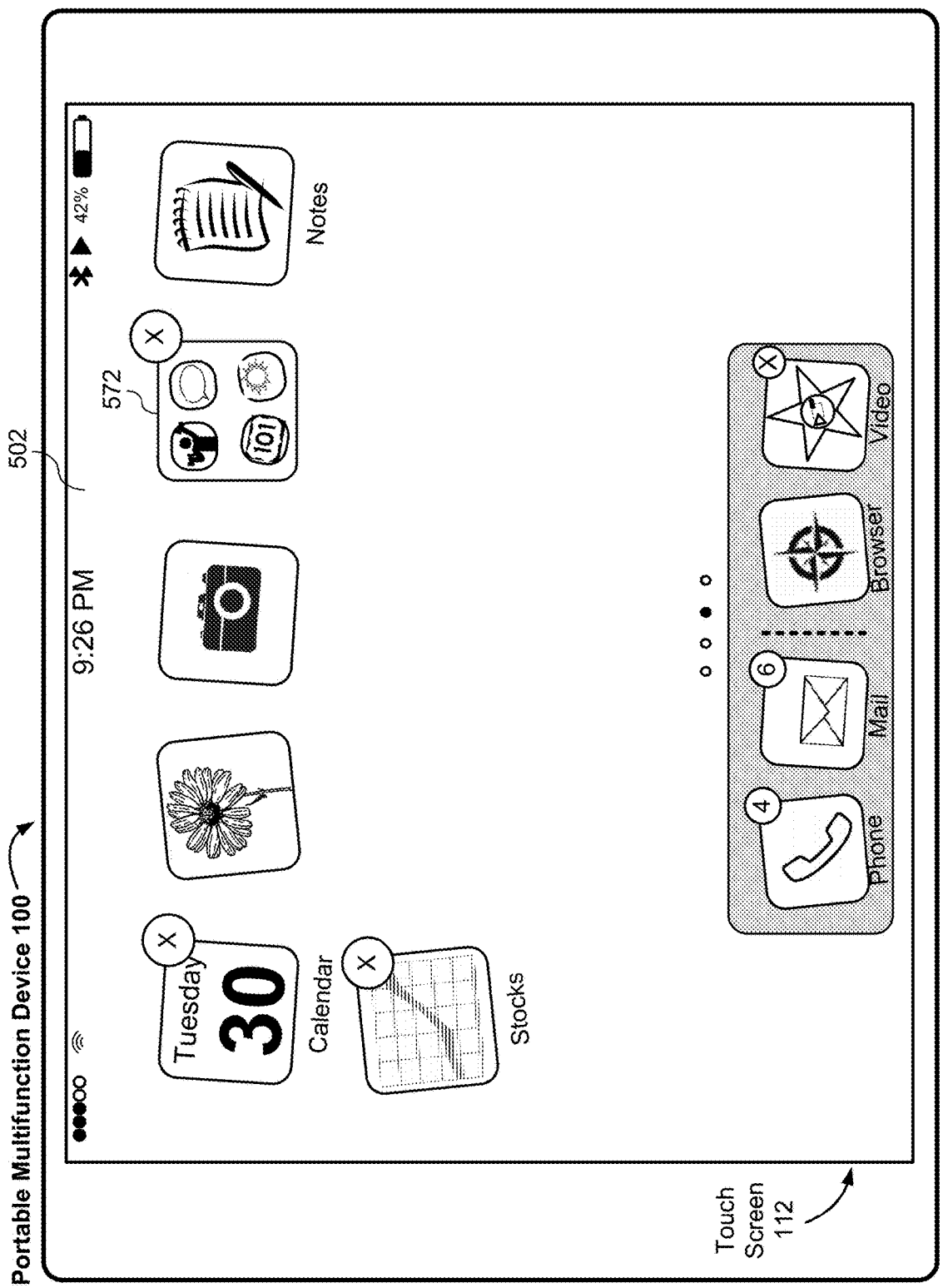
Figure 5A:
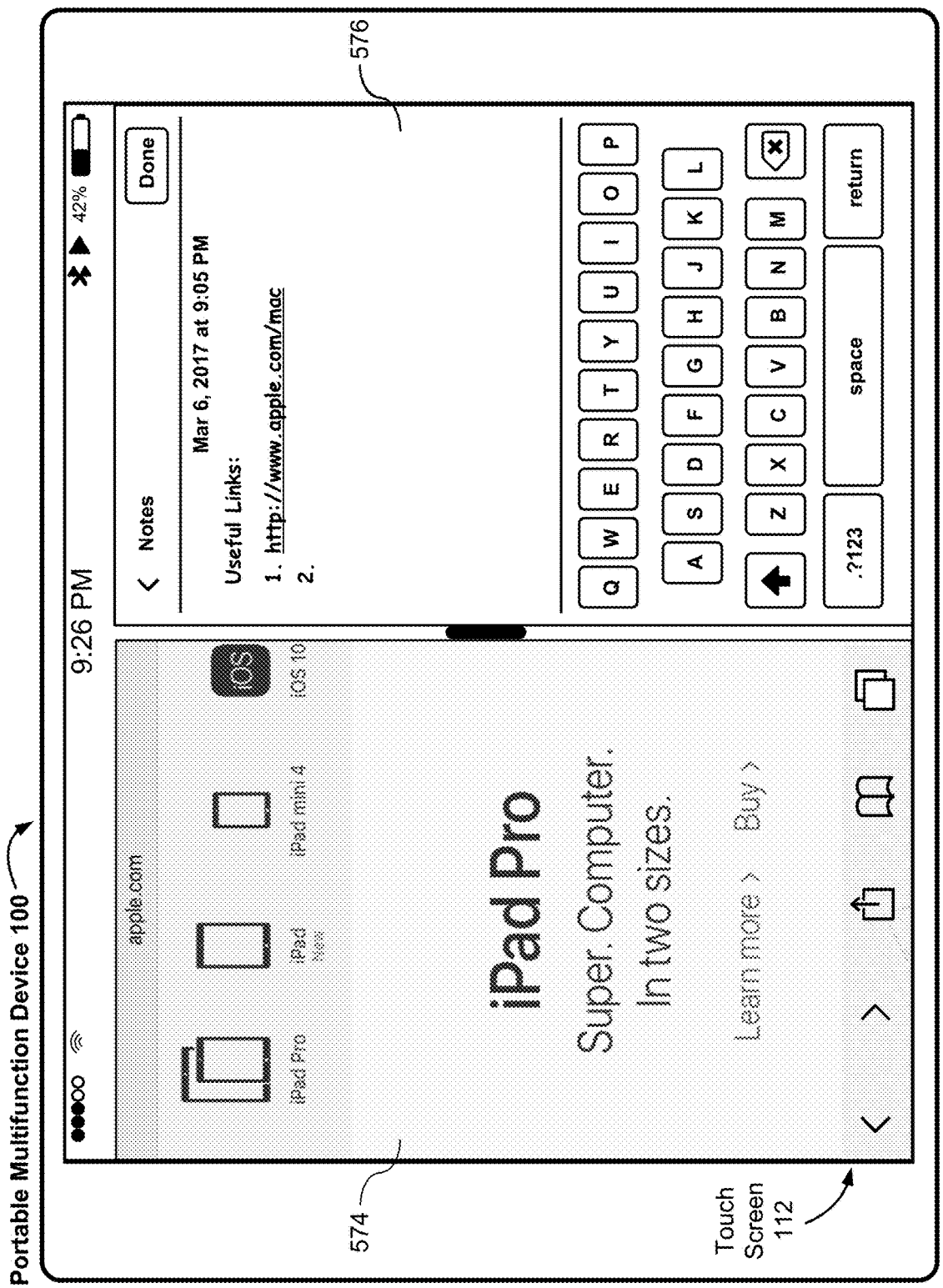
Figure 5A:
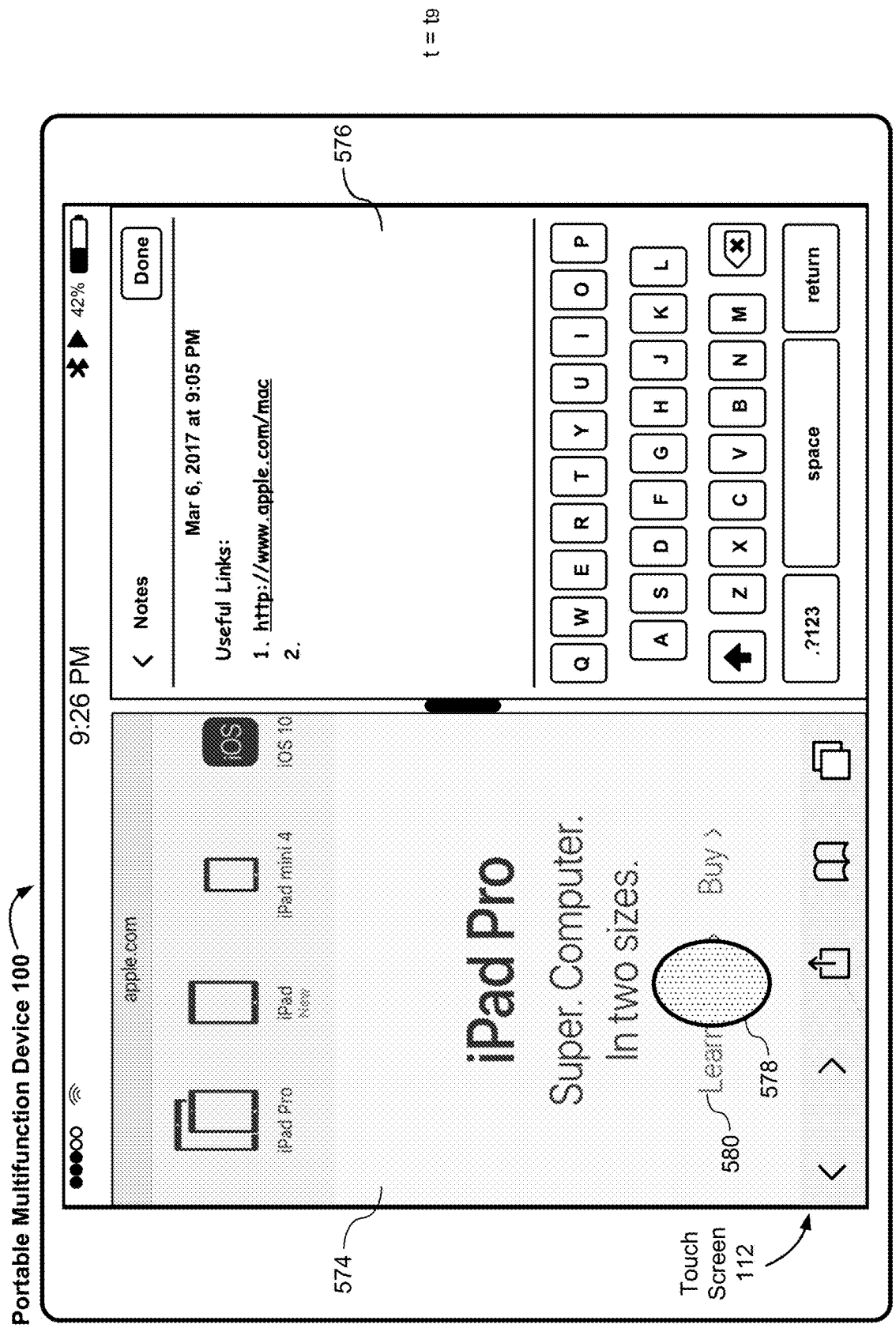
Figure 5A:
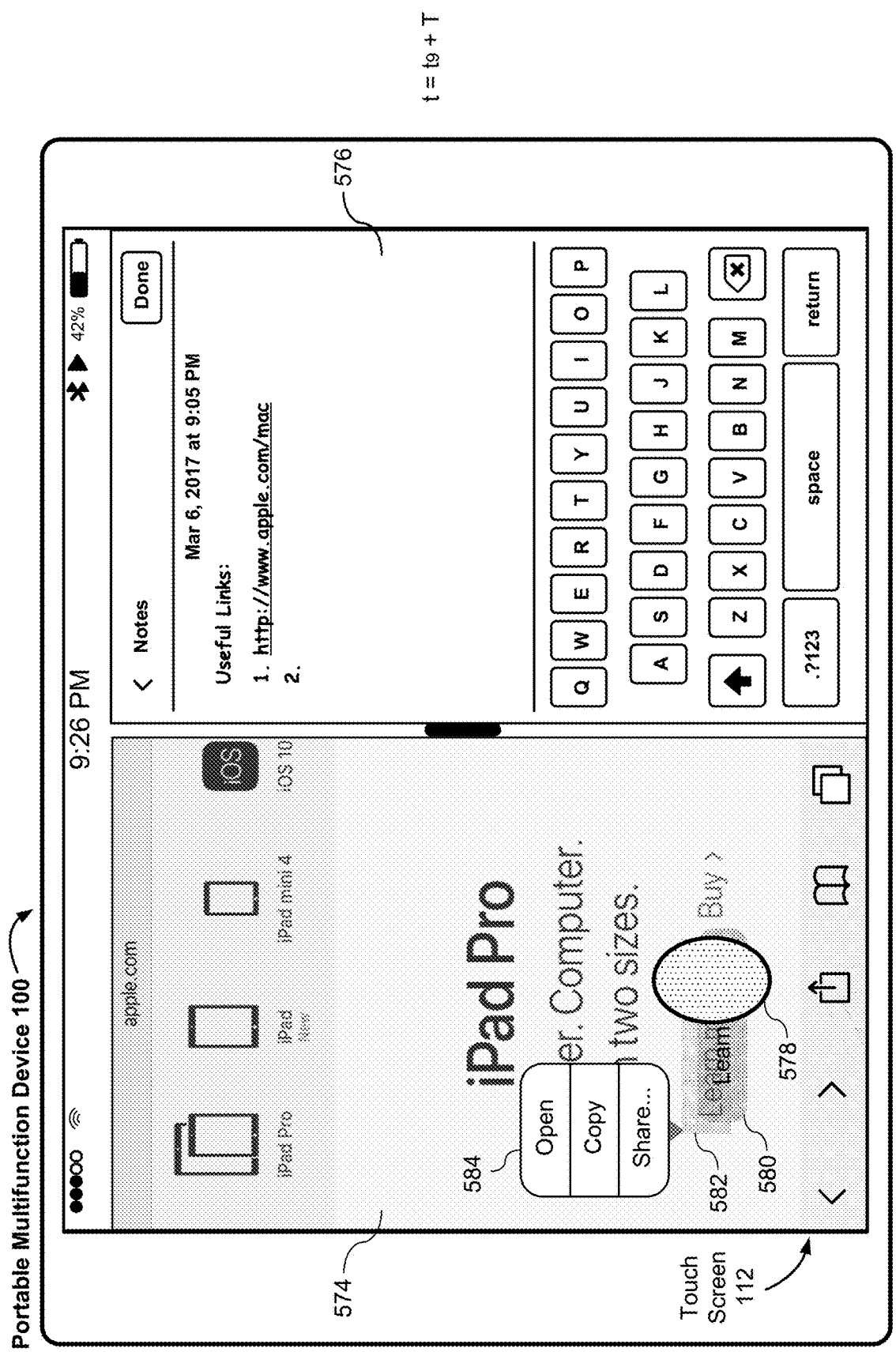
Figure 5A:
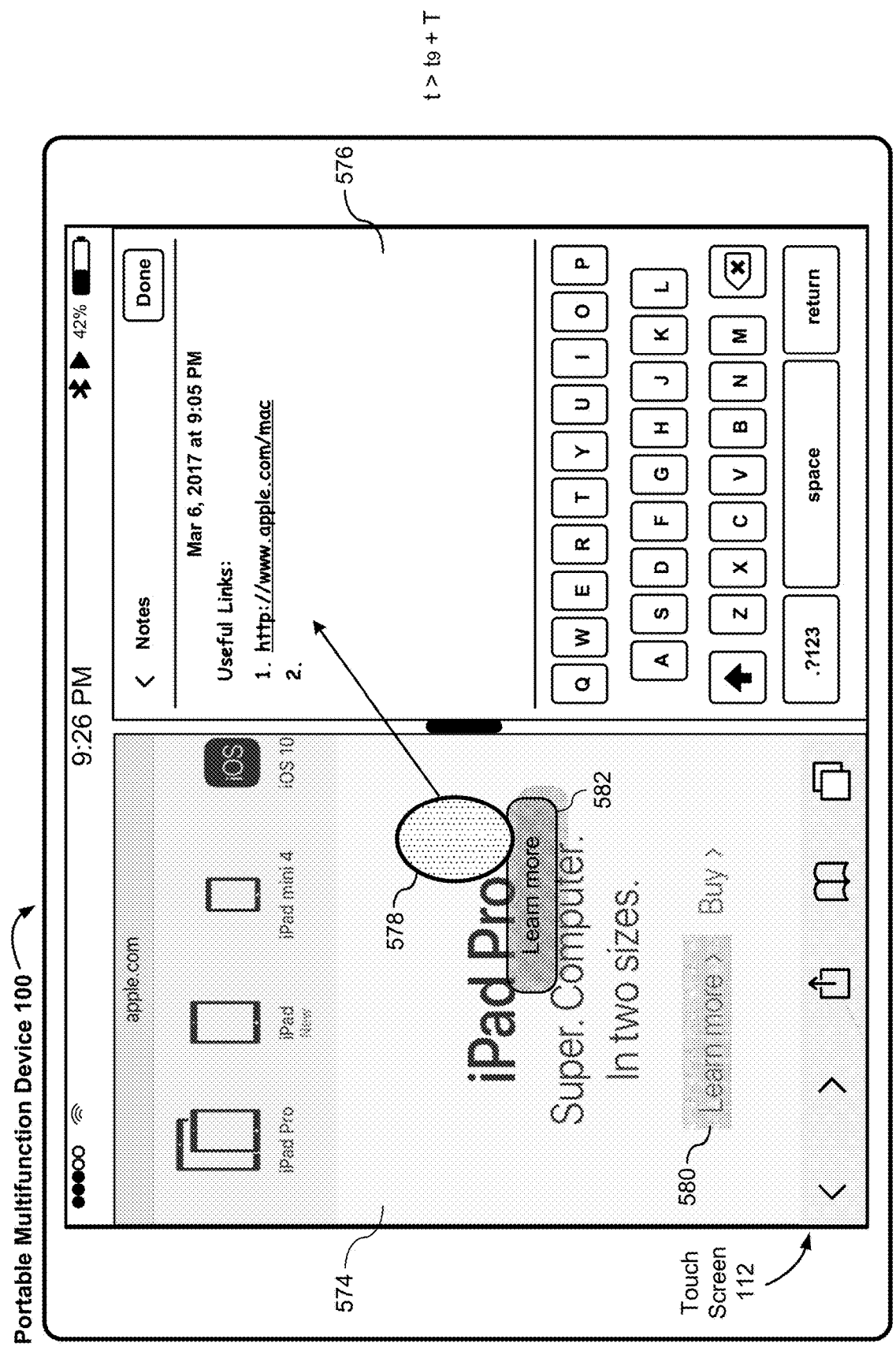
Figure 5A:
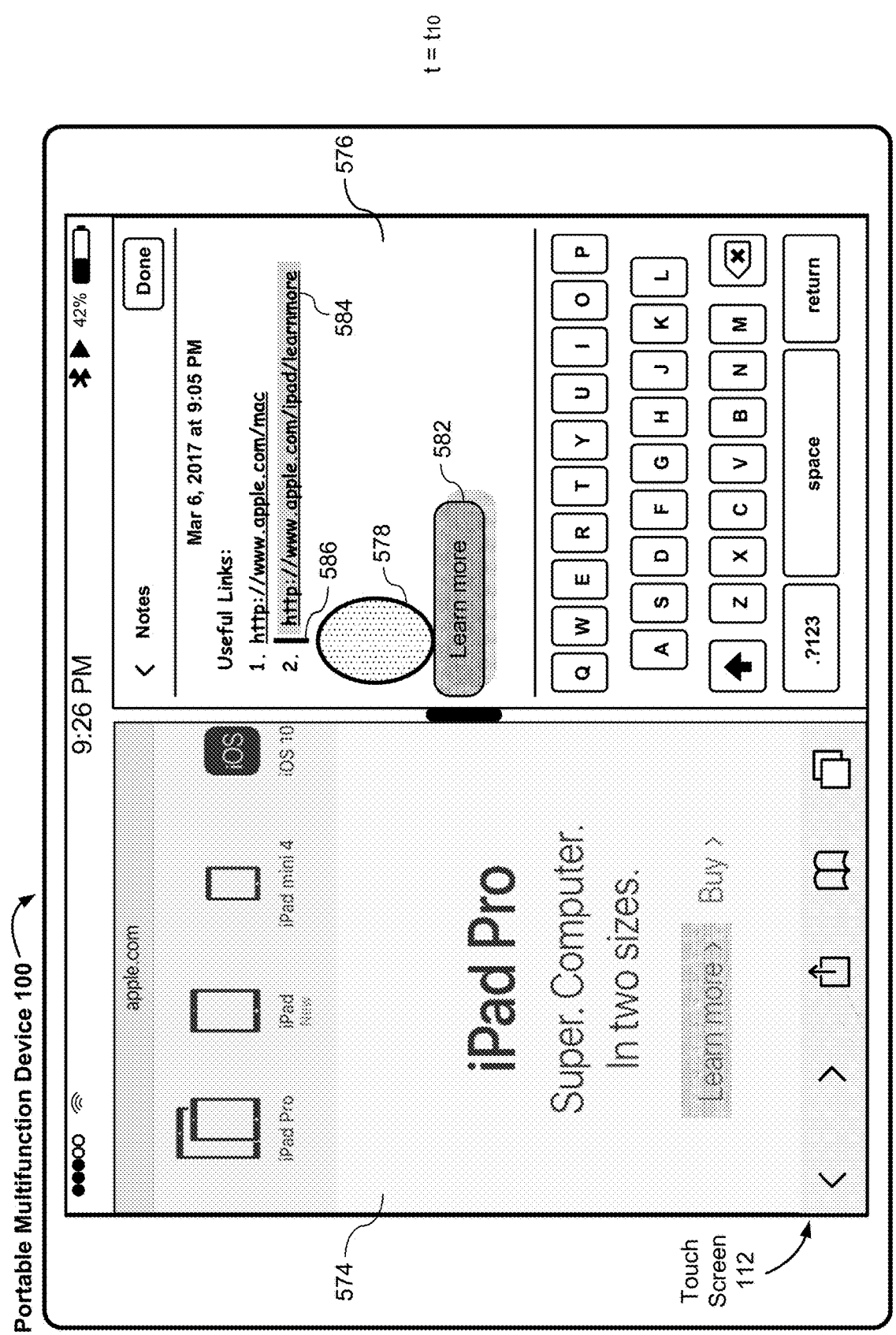
Figure 5A:
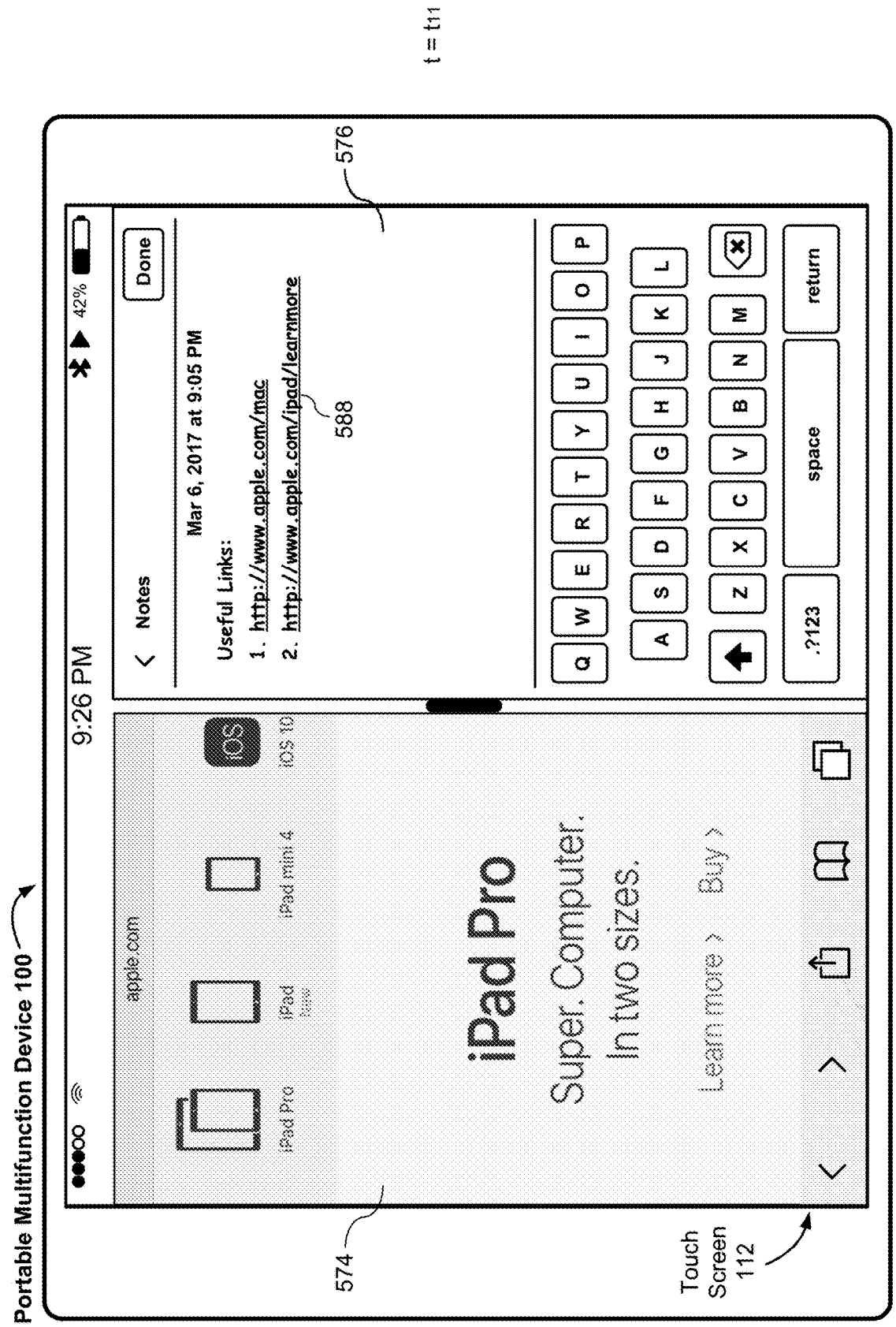
Figure 5A:
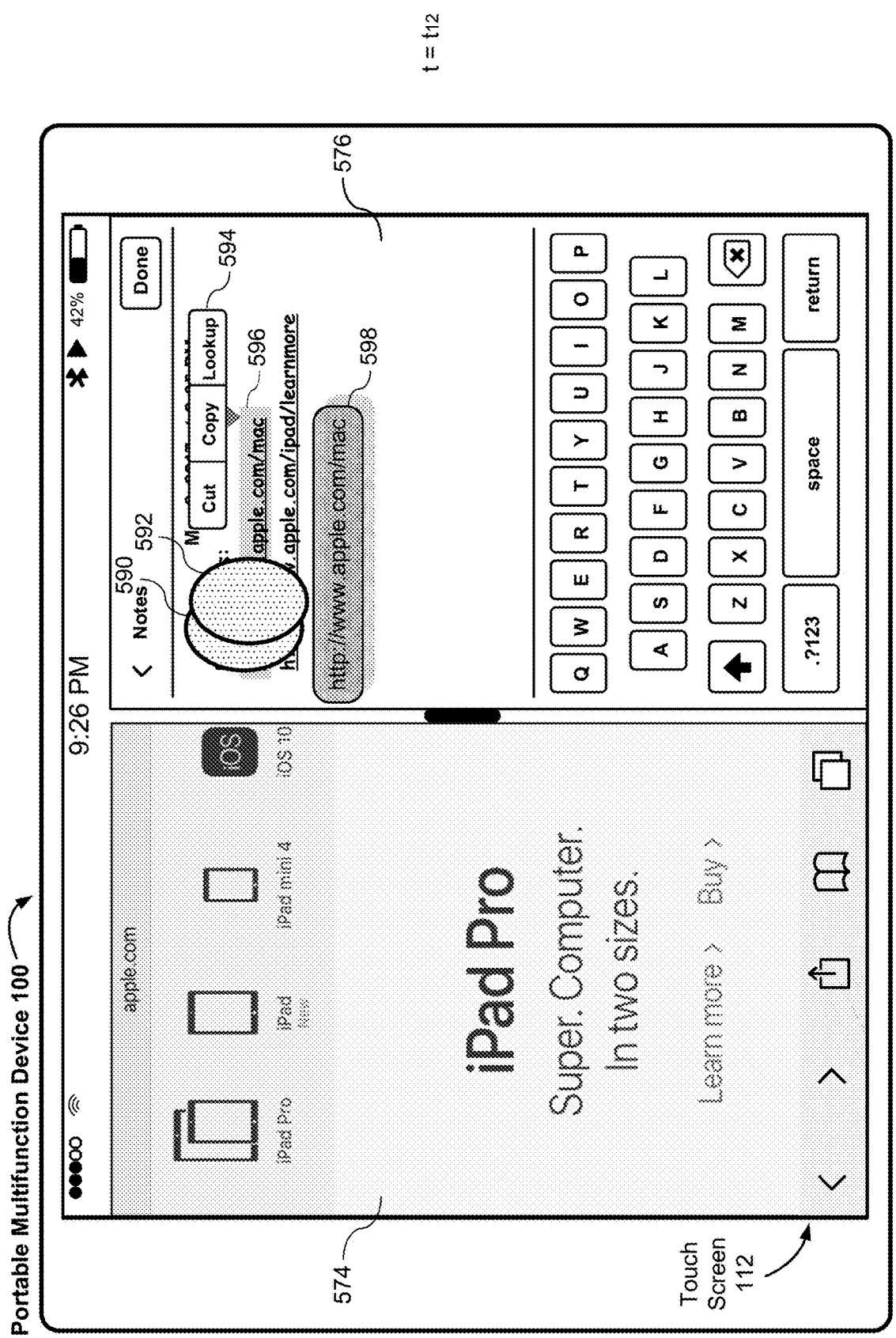
Figure 5A:
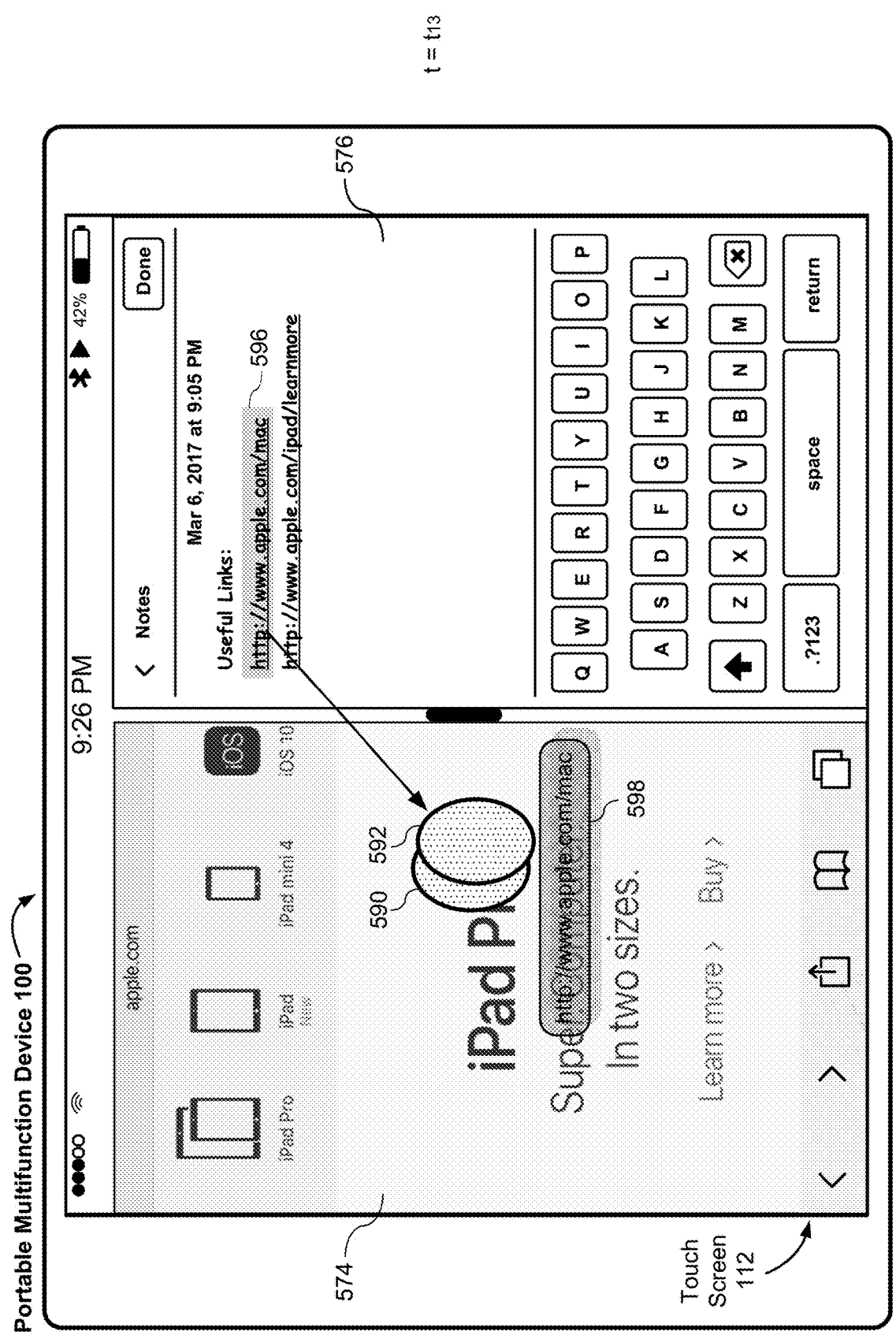
Figure 5A:
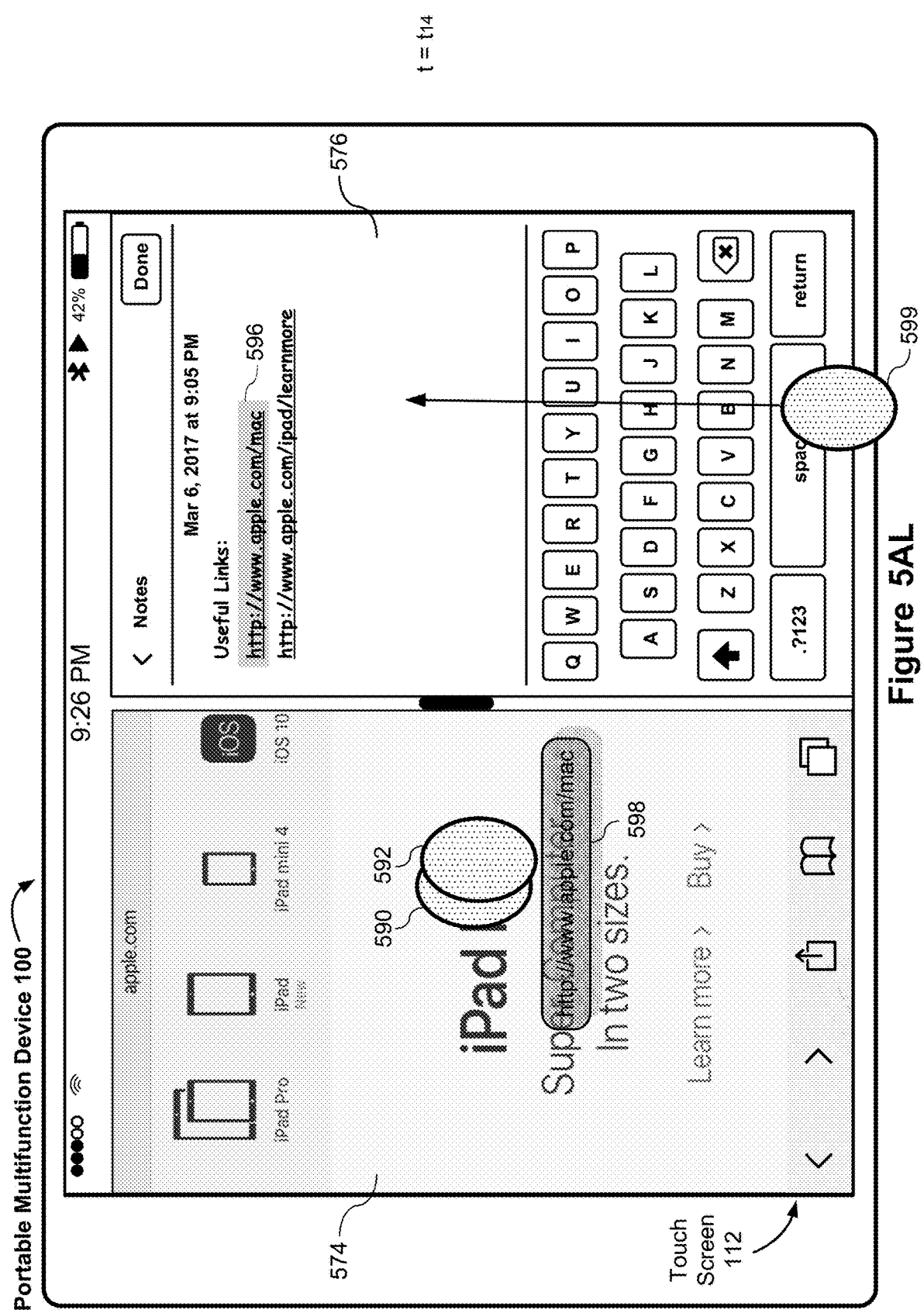
Figure 5A:
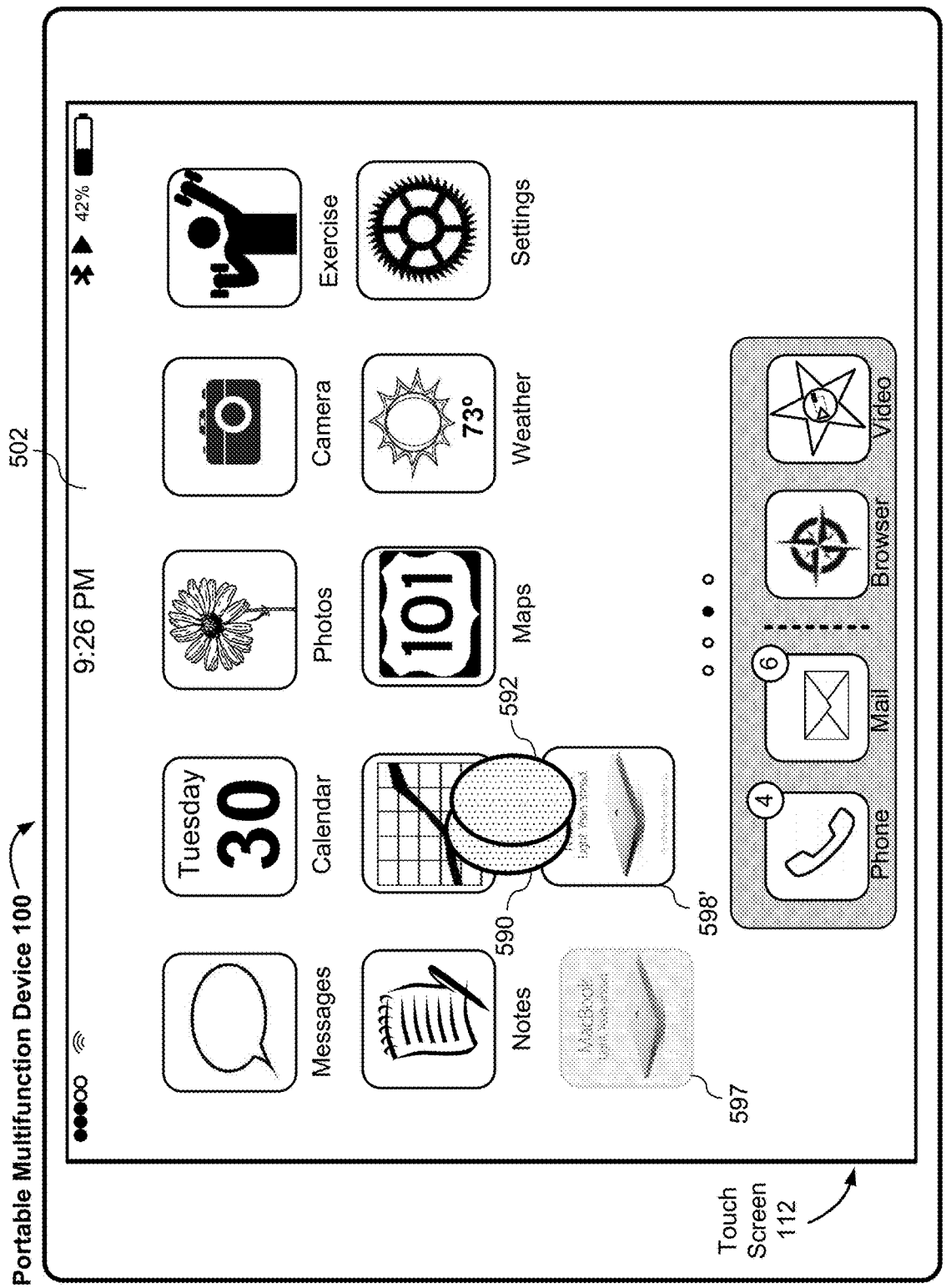
Figure 5A:
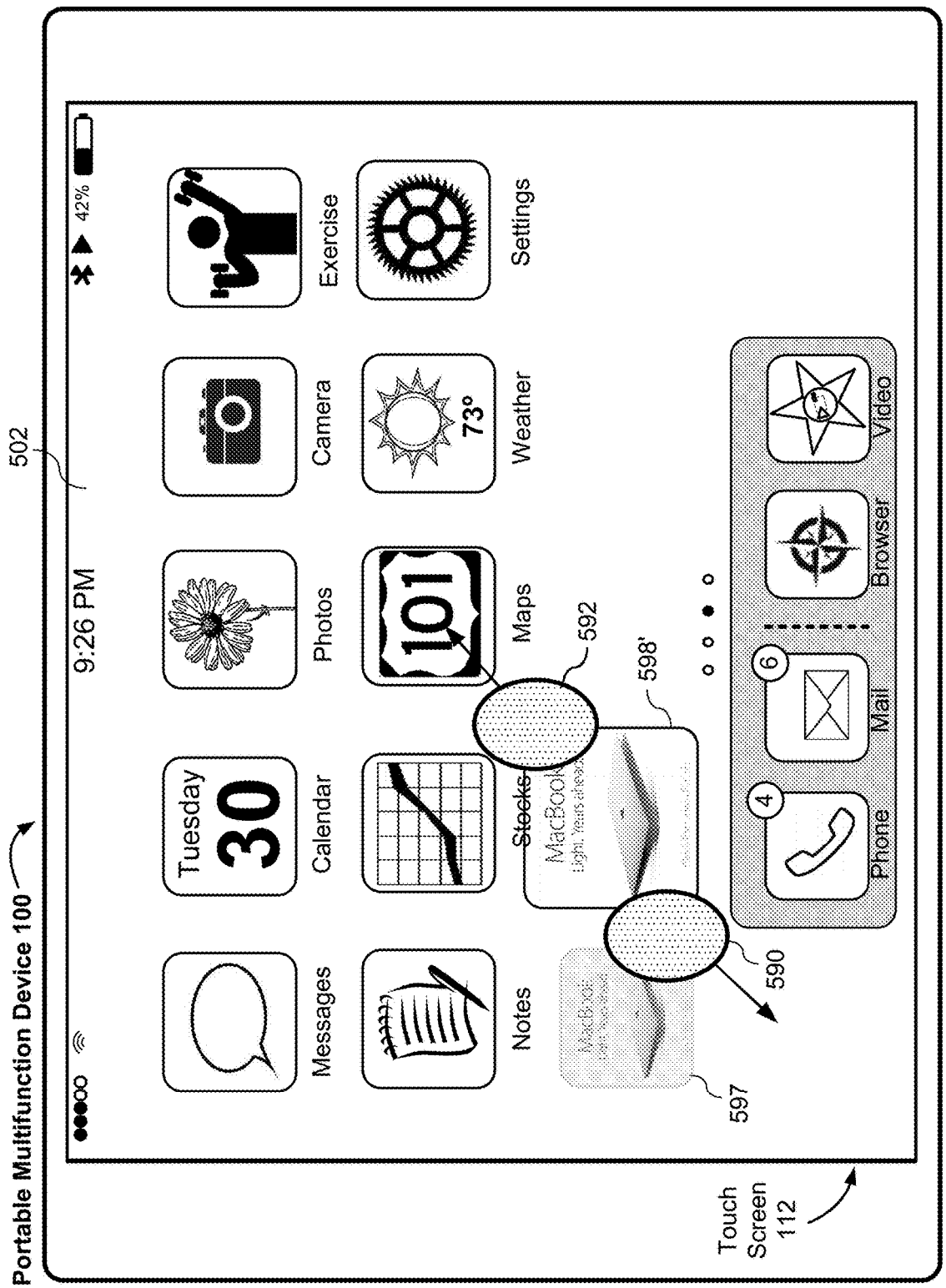
Figure 5A:
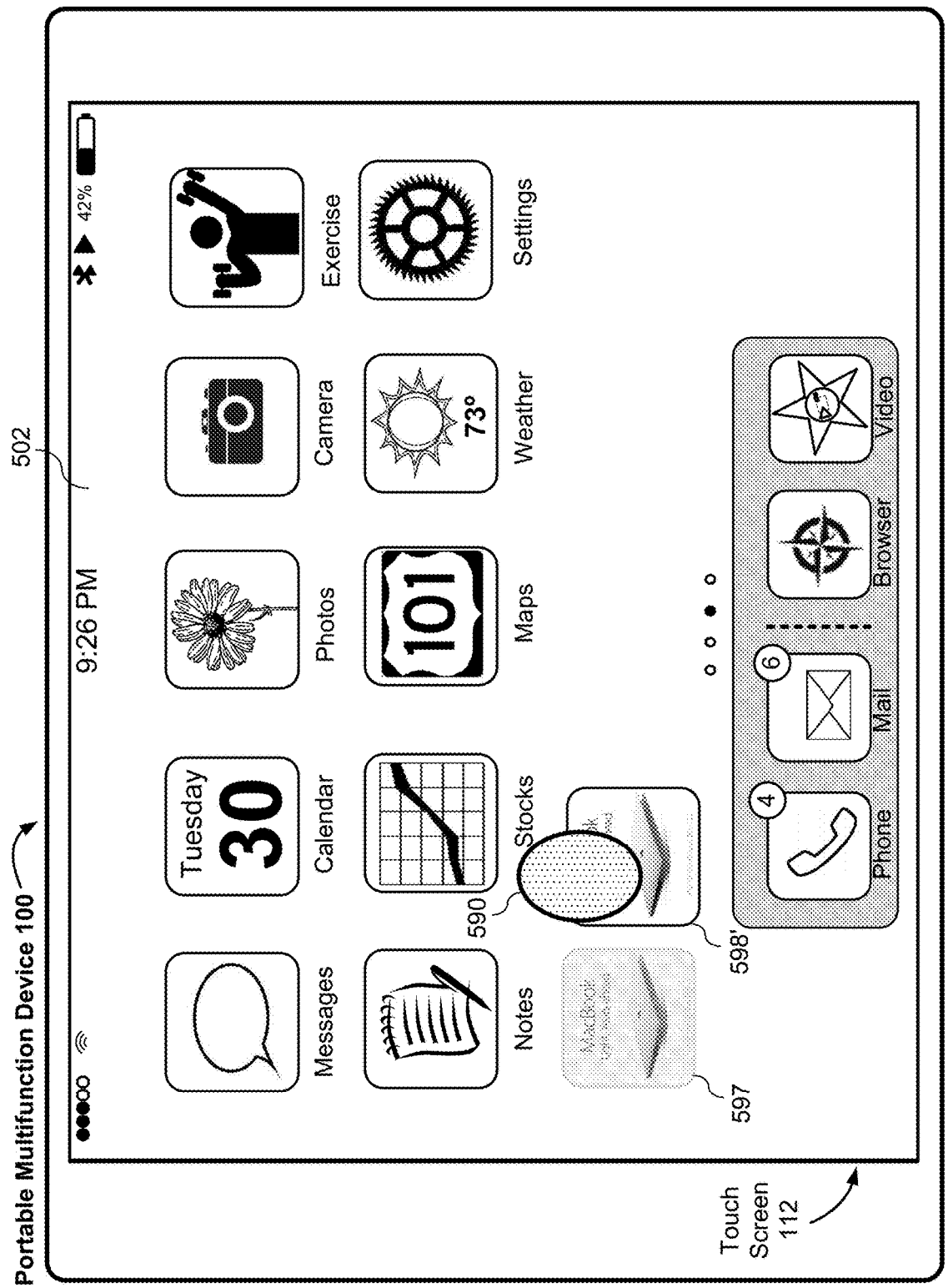
Figure 5A:
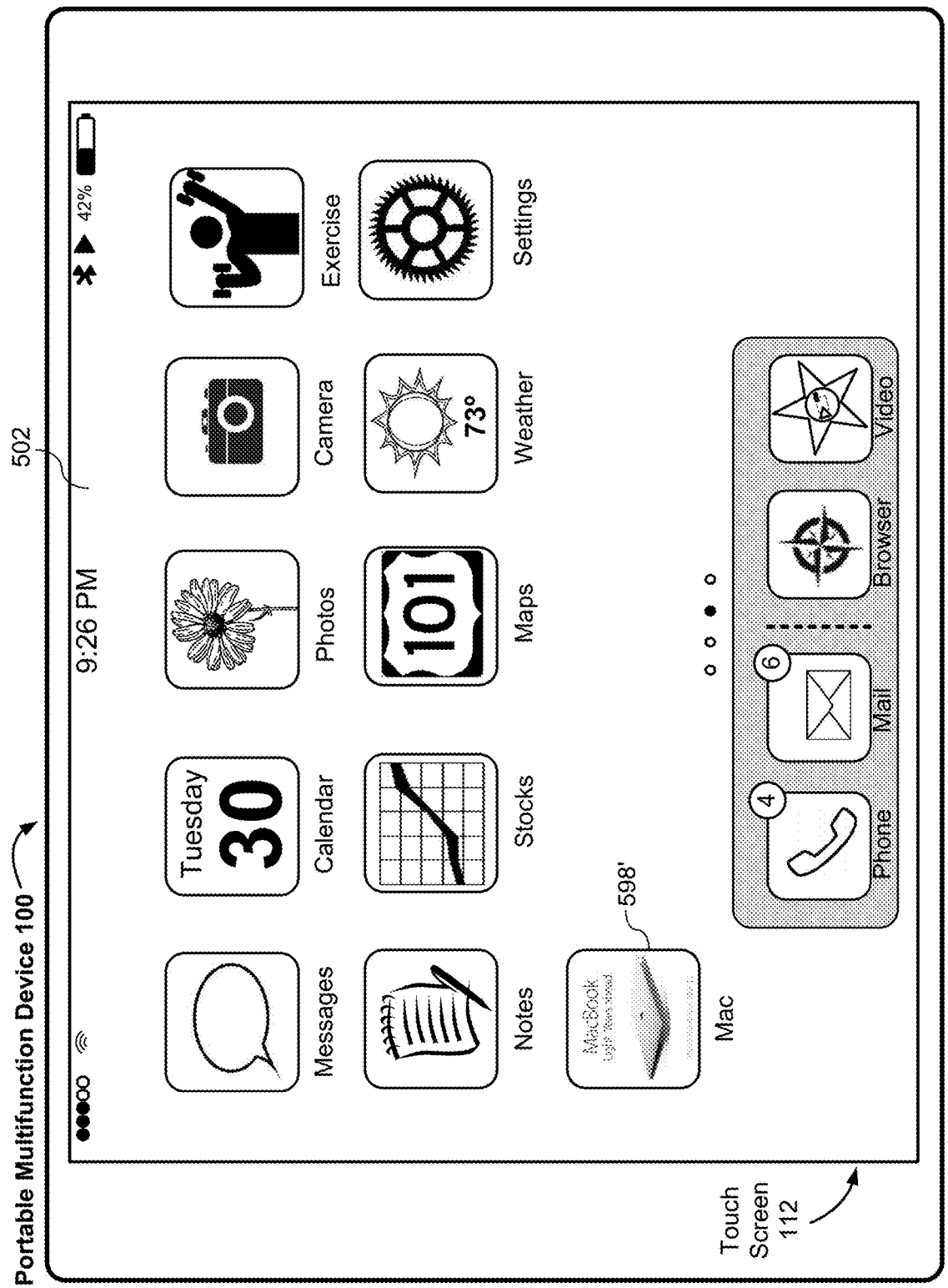
Figure 5A:
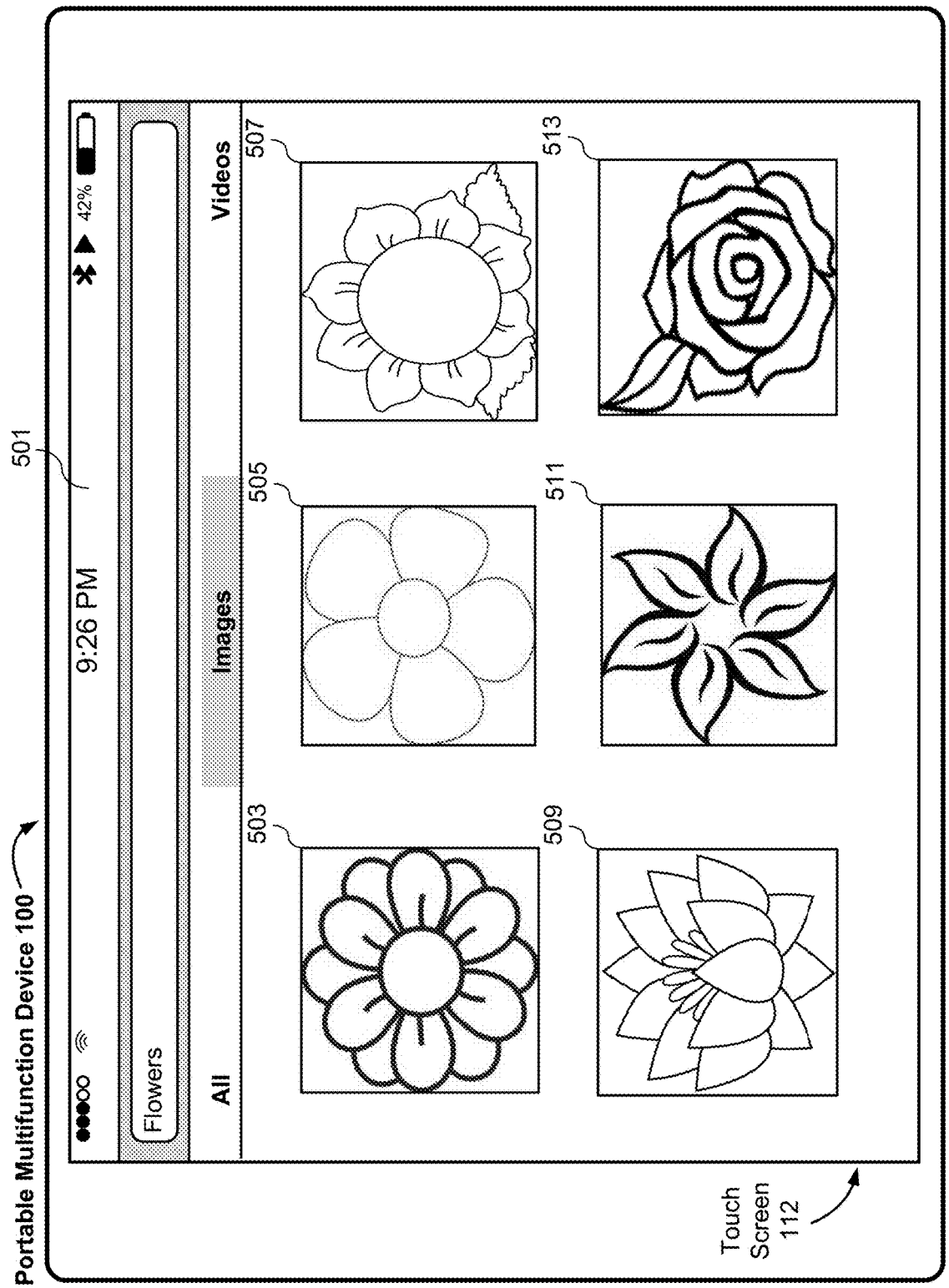
Figure 5A:
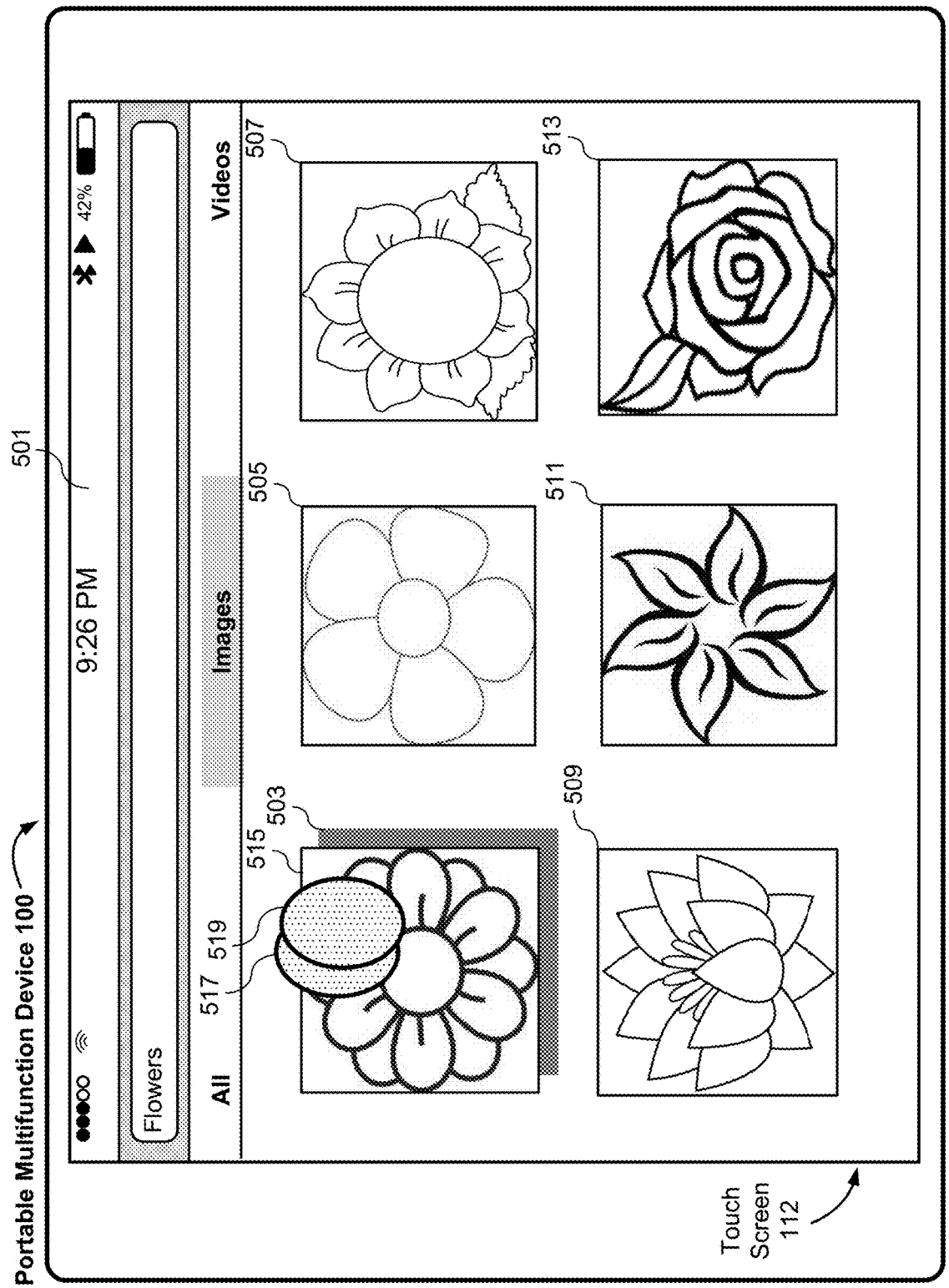
Figure 5A:
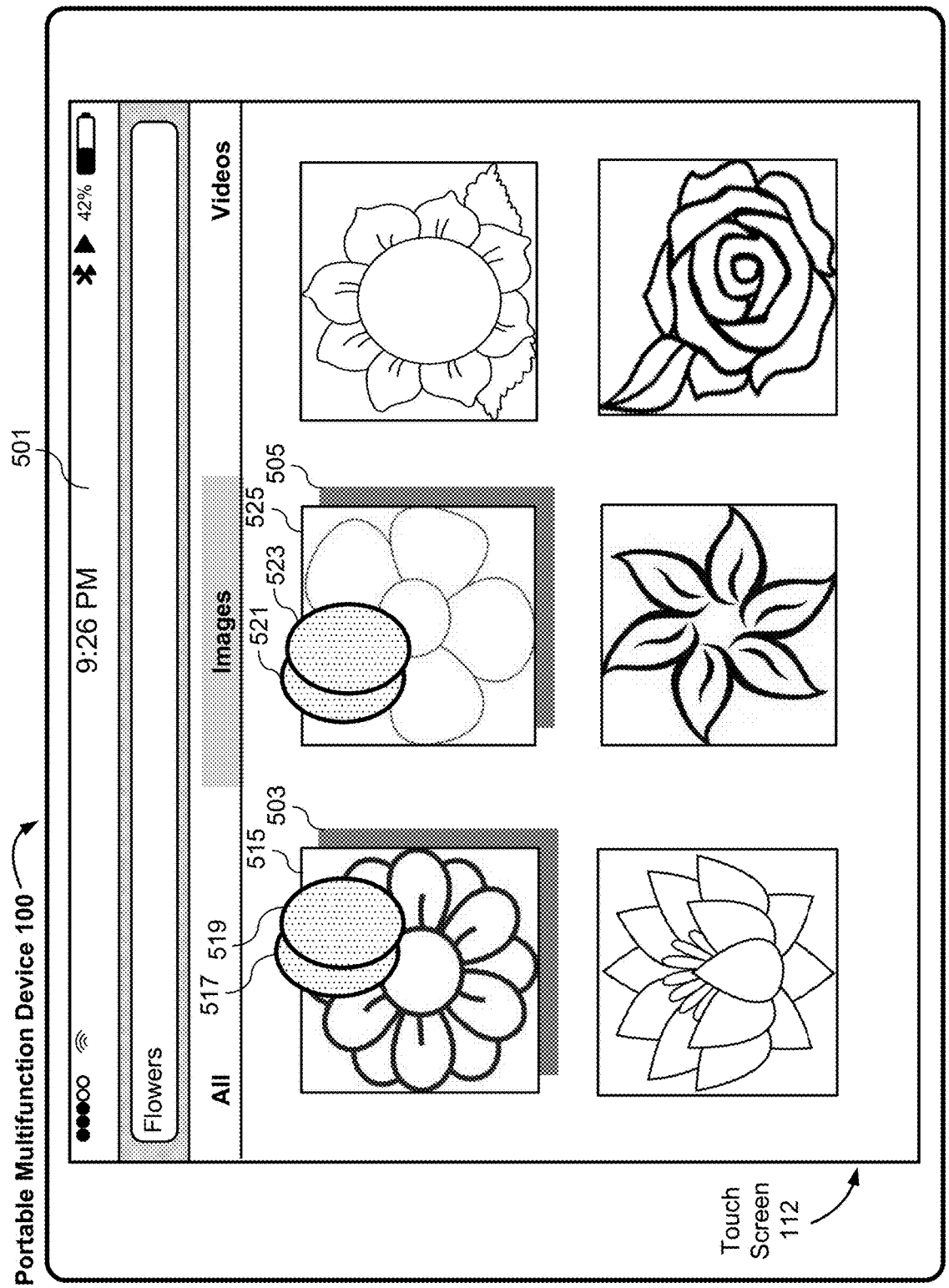
Figure 5A:
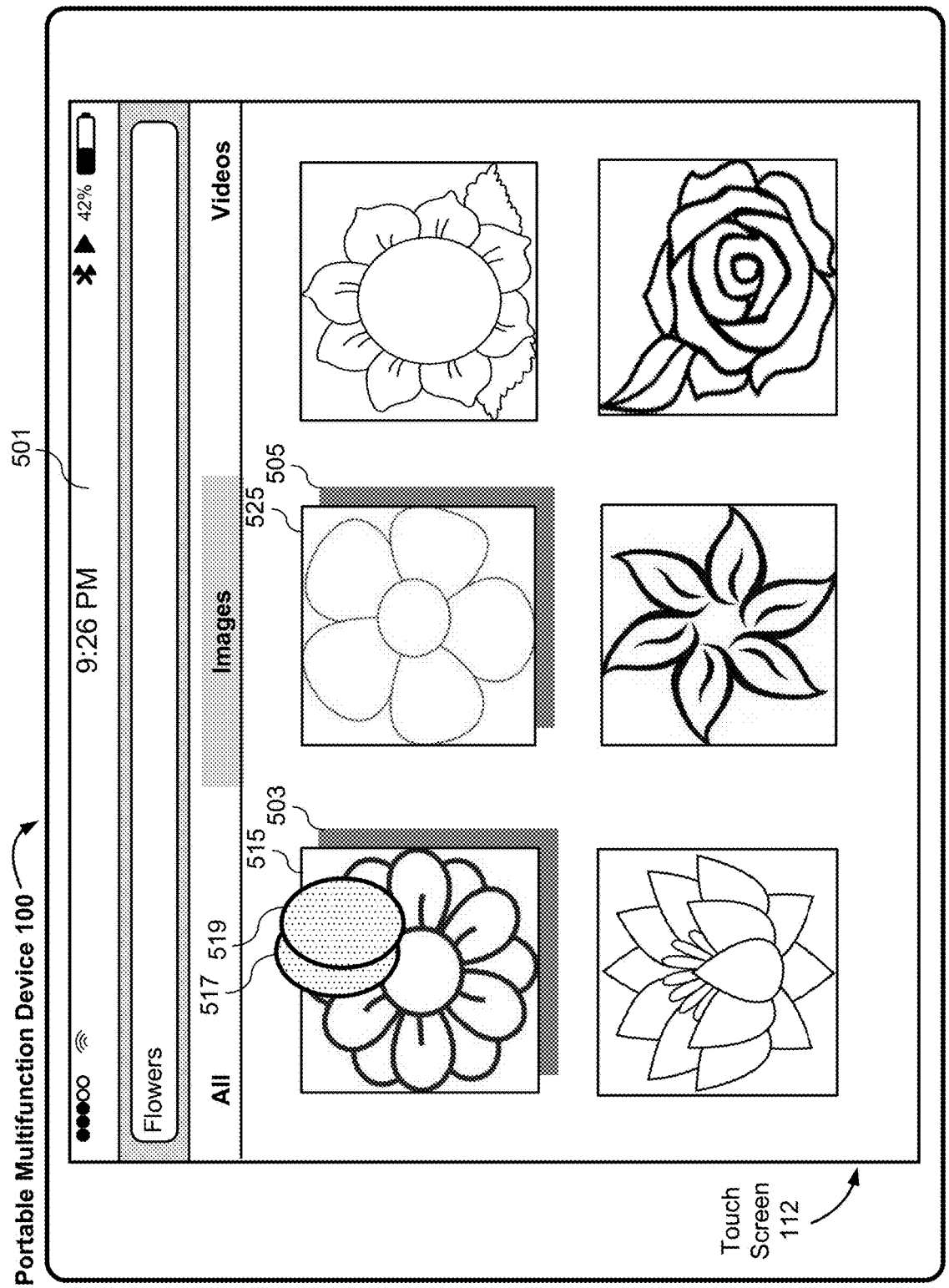
Figure 5A:
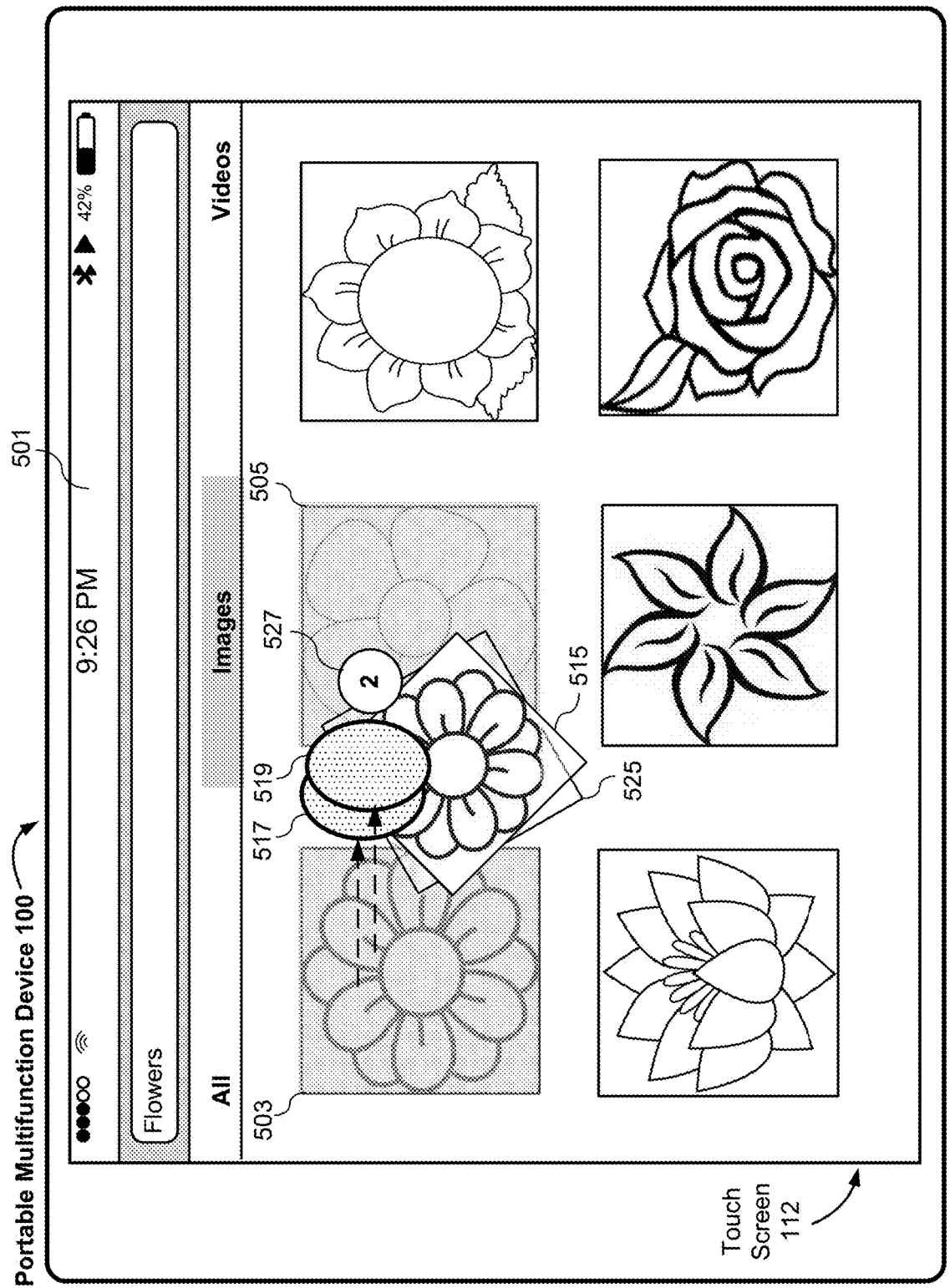
Figure 5A:
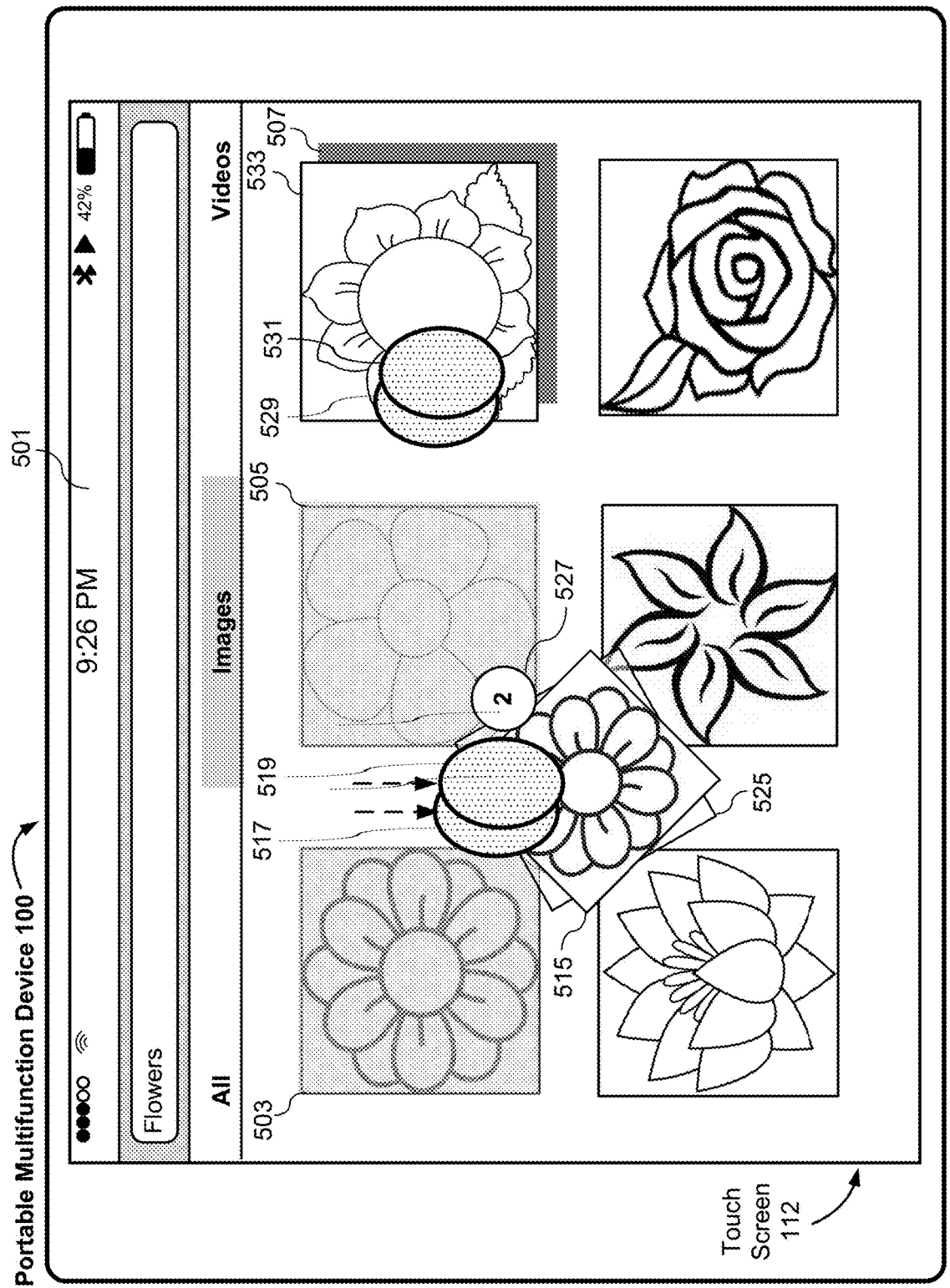
Figure 5A:
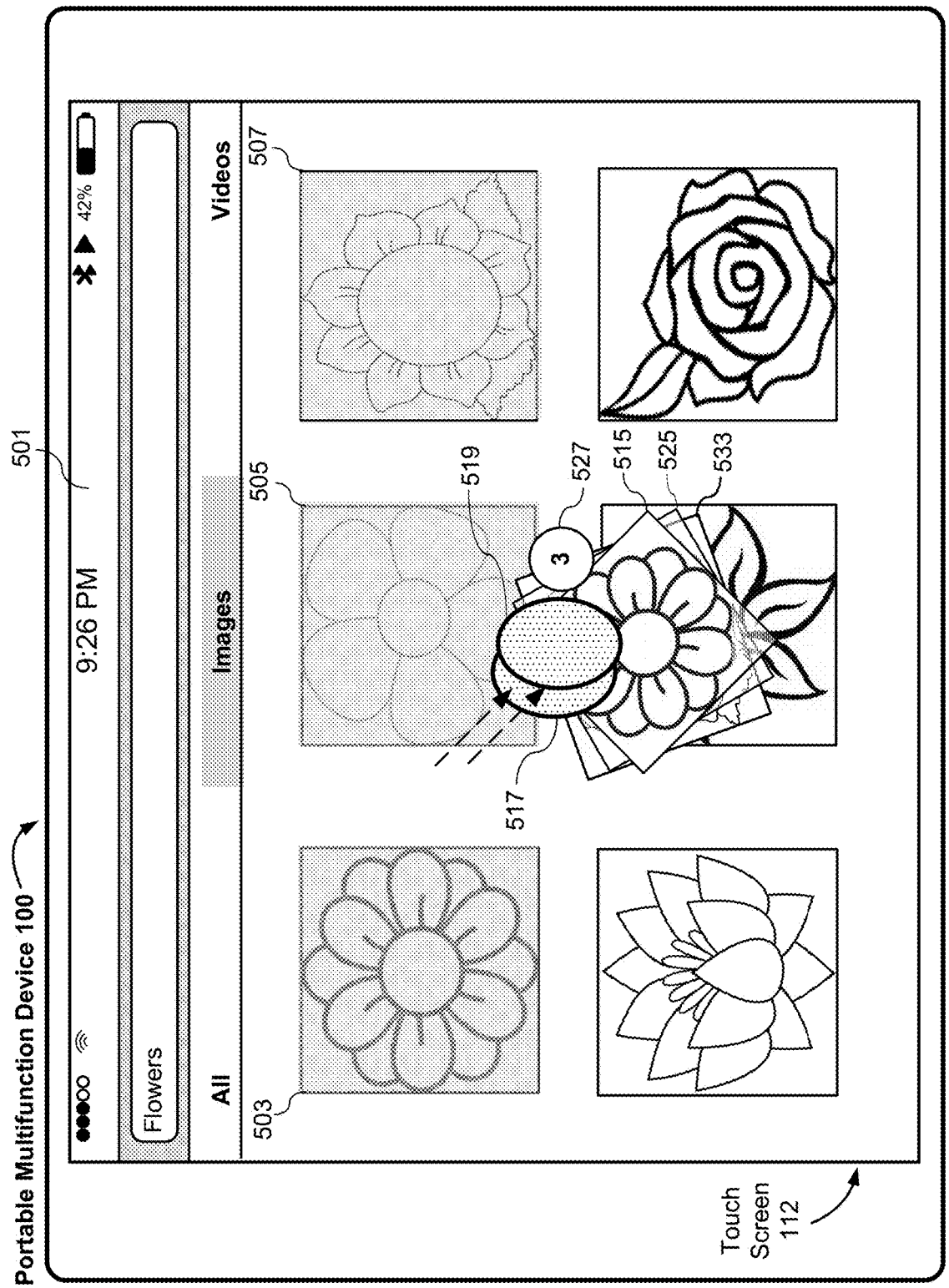
Figure 5A:
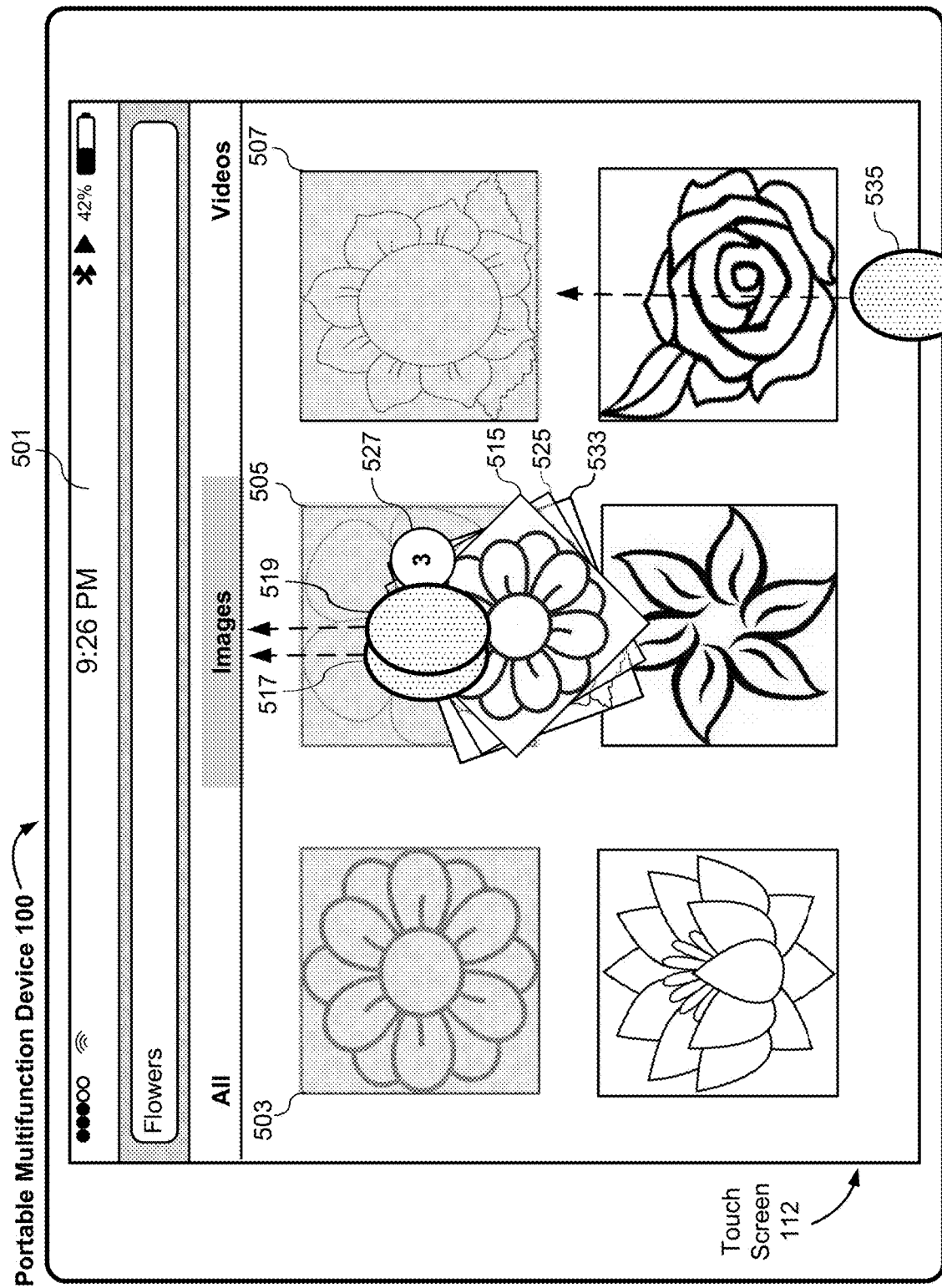
Figure 5A:
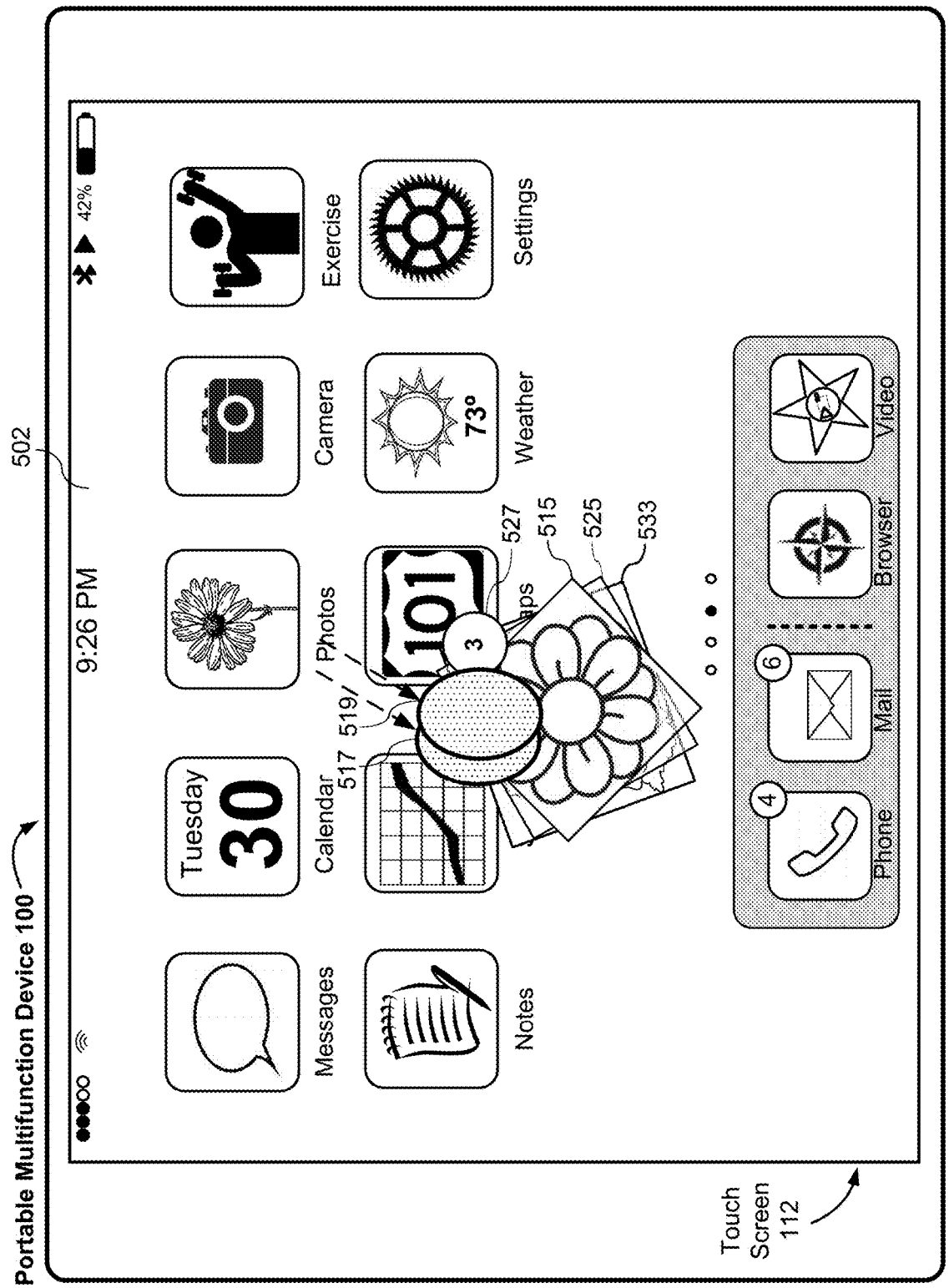
Figure 5A:
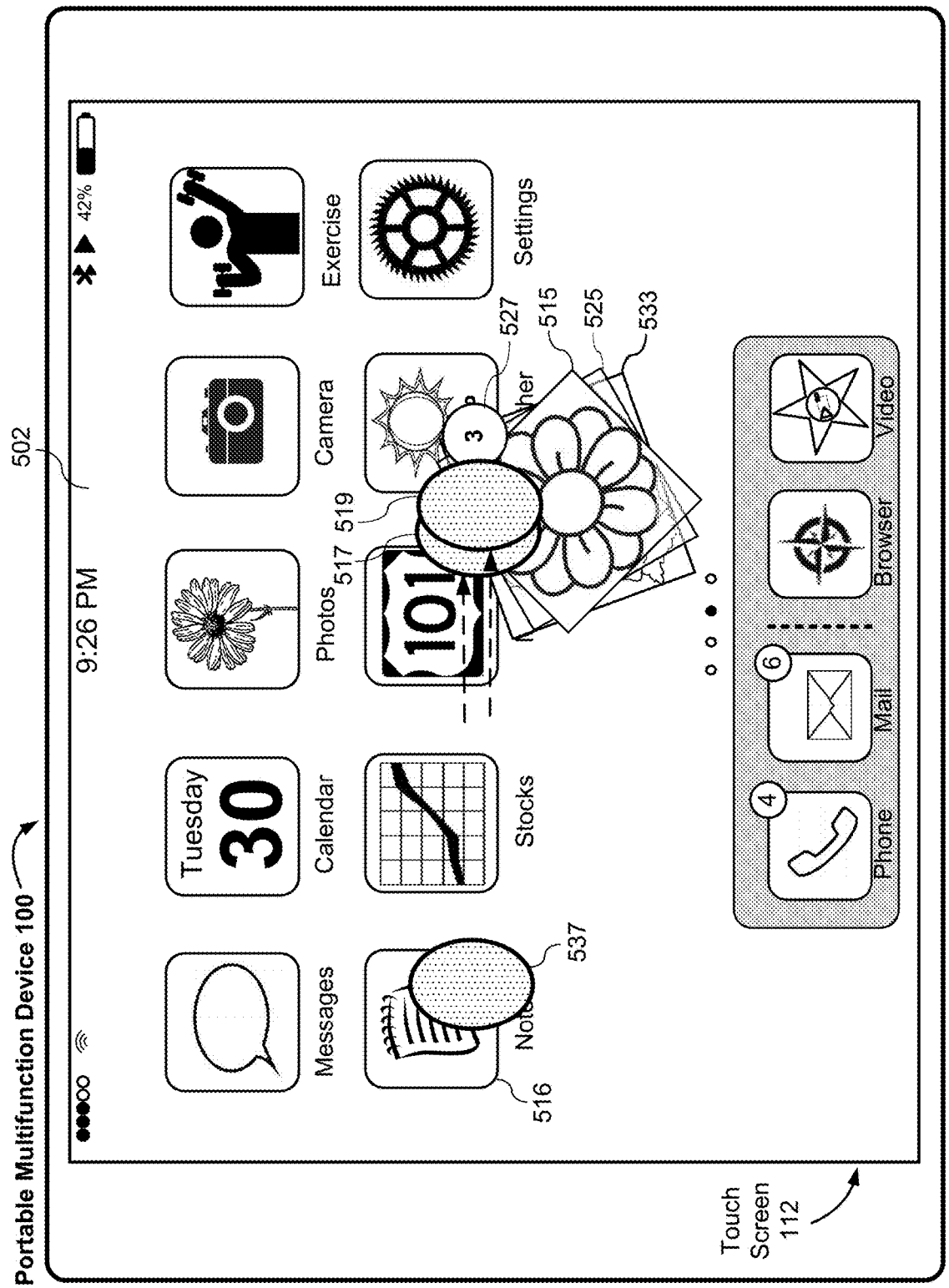
Figure 5B:
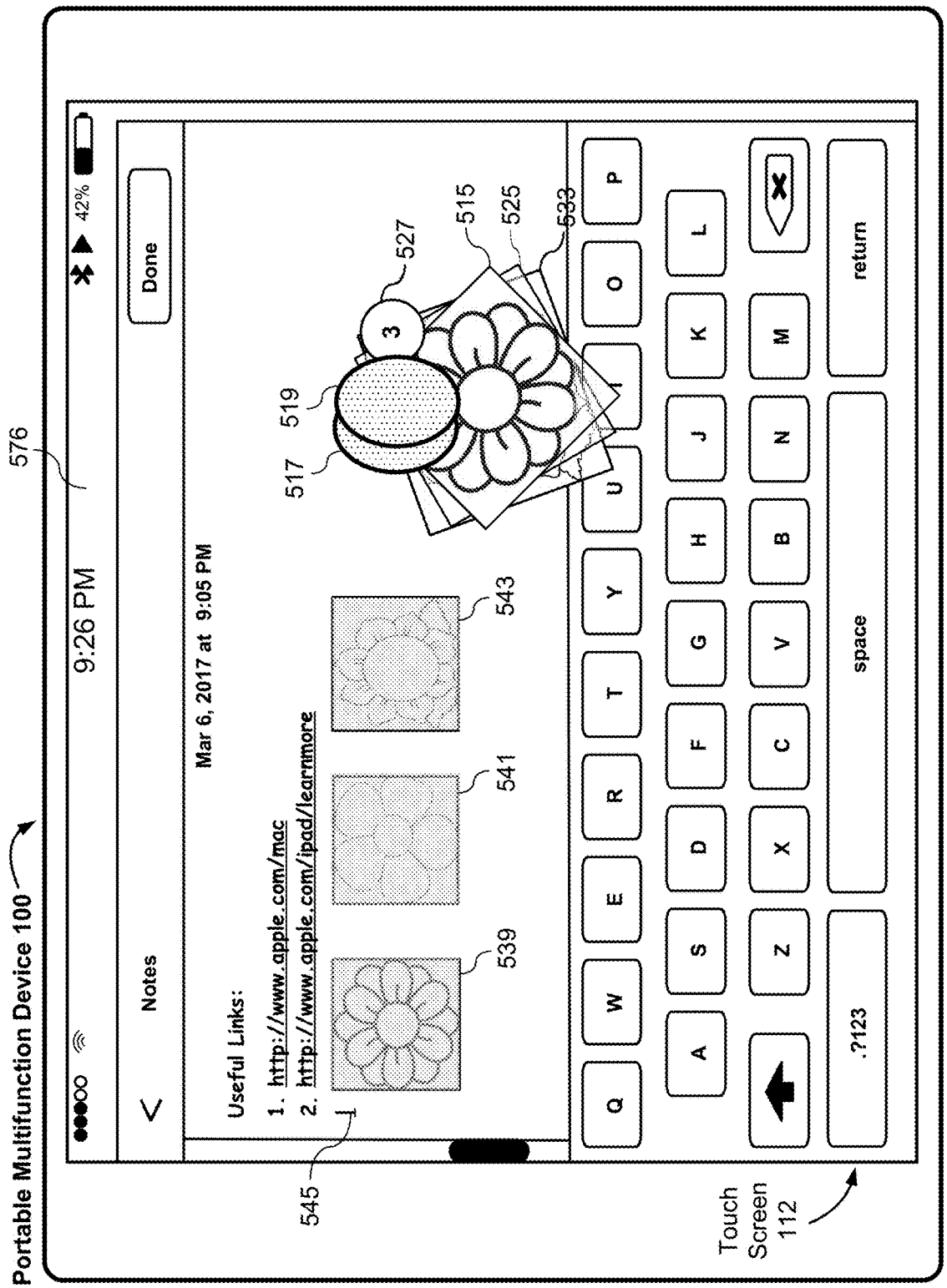
Figure 5B:
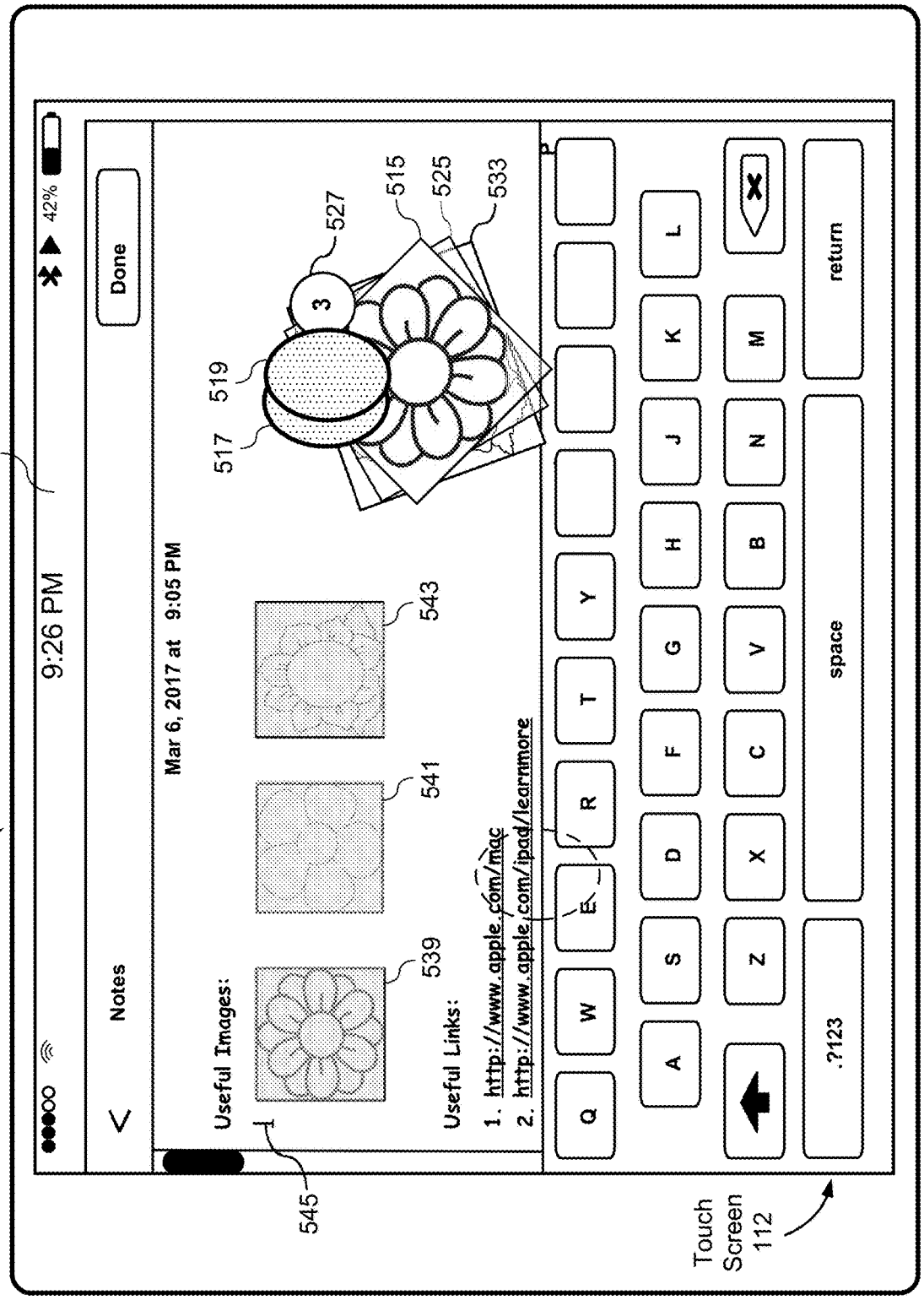
Figure 5B:
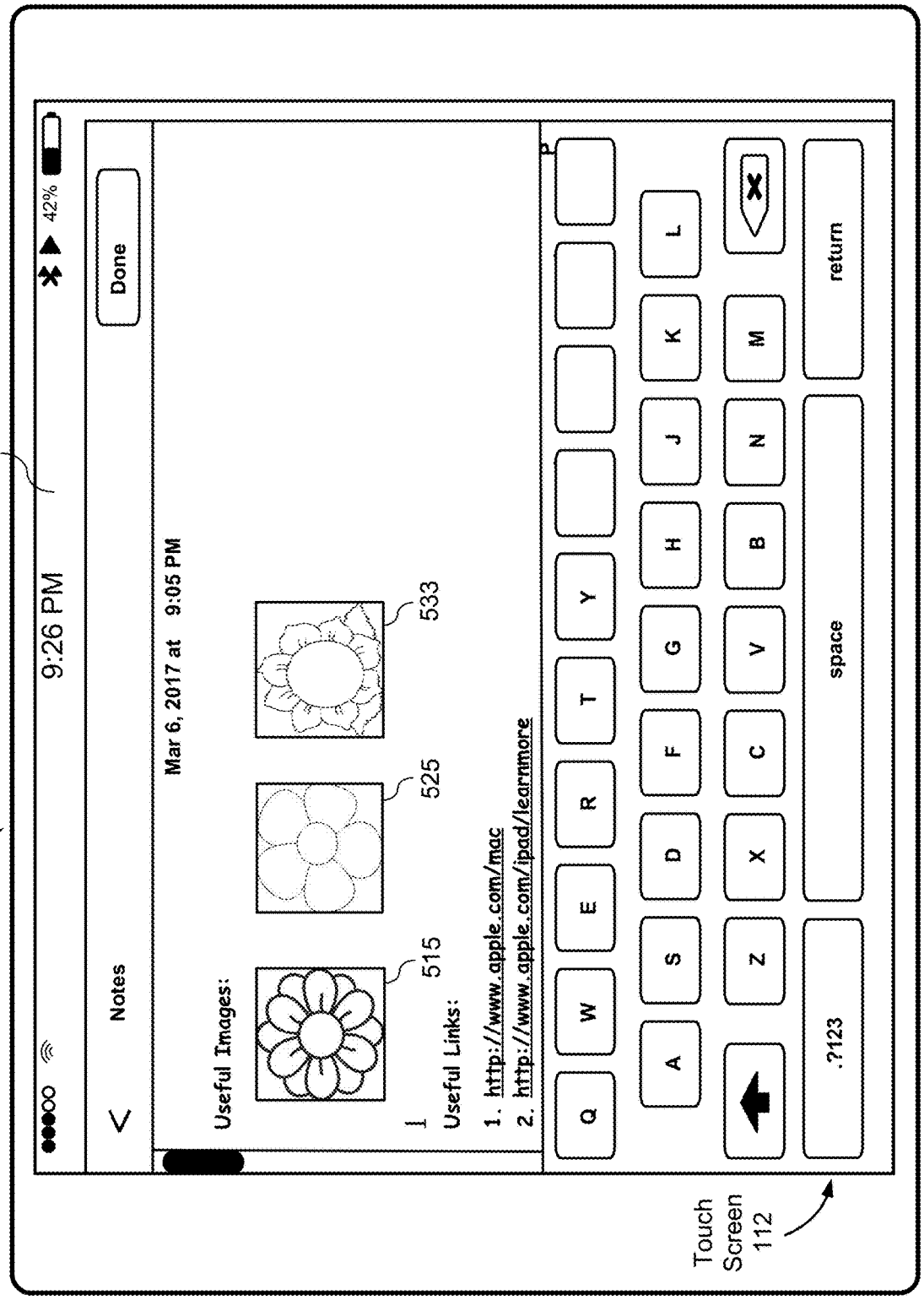

FIGS. 5Z-5AA illustrate that, when the pair of contacts 554 and 556 move to a location over icon 514, the collection of icons 504, 520 and 522 are dragged to icon 514. When the collection of icons 504, 520, and 522 remains over icon 514 for a threshold amount of time, a folder (e.g., folder 566) is created (as shown in FIG. 5AA), and icon 514 is included in folder 566. In some embodiments (not shown), a folder is not created when the pair of contacts hover over icon 514; instead, icon 514 (and other nearby icons) will shift to make room for the collection of icons, and preview objects corresponding to icons 504, 520 and 522 would be displayed in the space that has been vacated.

FIGS. 5AA-5AC illustrate that lift-off of the pair of contacts 554 and 556 is detected, and in response to lift-off of the contacts, icons 504, 520, and 522 are dropped into folder 566 (as shown in FIGS. 5AA-5AB). A tap input by a newly detected contact 570 outside of folder 566 dismisses folder 566, and folder icon 572 representing folder 566 is displayed in home screen user interface 502 (as shown in FIG. 5AC).

FIGS. 5AD-5AP illustrate example user interfaces for interacting with user interface objects (e.g., selecting, dragging and dropping objects) in response to touch inputs, in accordance with some embodiments. The user interfaces in these figures are used to illustrate the processes described below, including the processes in FIGS. 7A-7J and 8A-8F. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIG. 5AD illustrates two user interfaces for two different applications (e.g., user interface 574 for an Internet browser application and user interface 576 for a text editor application (e.g., the "Notes" application)) displayed side by side on the display. User interface 574 displays a webpage that includes selectable content (e.g., hyperlinks, text, and images, etc.), and user interface 576 includes editable content (e.g., text showing a URL for a webpage, and some other text).

FIGS. 5AE-5AF illustrate that a contact (e.g., contact 578) is detected (e.g., in FIG. 5AE) at a location on the touch-screen that corresponds to a hyperlink (e.g., hyperlink 580) corresponding to another webpage (e.g., the webpage with the name "Learn More"). When contact 578 is maintained on hyperlink 580 for at least a threshold amount of time T (e.g., in FIG. 5AF), hyperlink 580 is selected (e.g., the anchor text of hyperlink 580 is grayed out, container object 582 is displayed below contact 578 and above the z-layer of user interface 574, and the container object 582 includes a copy of the anchor text of selected hyperlink 580). FIG. 5AF further illustrates that, in some embodiments, a menu of selectable options corresponding to the selected content (e.g., open/copy/share menu 584) is displayed next to the selected hyperlink 580.

FIGS. 5AG-5AH illustrate that, in accordance with movement of contact 578 across the touch-screen 112, container object 582 is dragged across user interface 574. User interface 574 is not editable, and therefore, no permissible drop-off location is identified for container object 582 in user interface 574 (as shown in FIG. 5AG). Once contact 578 moves into user interface 576, a possible drop-off location is identified for selected hyperlink 580. For example, insertion cursor 586 is displayed at a permissible insertion location within the editable content of user interface 576, in accordance with the location of contact 578. Preview object 584 (e.g., URL that corresponds to the selected hyperlink 580) is displayed at the permissible insertion location identified by insertion cursor 586. In some embodiments, the appearance of container object is changed (e.g., made more opaque) to indicate that a preview of a drop operation is being displayed.

FIG. 5AI illustrates that, while preview object 584 is displayed at the permissible insertion location, lift-off of contact 578 is detected; and, in response to detecting lift-off of contact 578, URL 588 corresponding to the selected hyperlink 580 is inserted into the editable content in user interface 576. In response to detecting lift-off of contact 578, hyperlink 580 is no longer selected and is restored to its original appearance in user interface 574.

FIG. 5AJ illustrates a pair of contacts 590 and 592 that are detected at substantially the same time (e.g., less than 200 ms apart) and at close proximity to each other (e.g., less than 0.5 centimeter apart) over URL 596 in user interface 576. In response to detecting the pair of contacts 590 and 592 over URL 596 (and without imposing a touch-hold requirement), URL 596 is selected (e.g., the text of URL 596 is grayed out). In addition, container object 598 including a copy of the selected URL is displayed below the pair of contacts 590 and 592 (e.g., in a z-layer that is above the z-layer of user interface 576). In some embodiments, menu 594 (e.g., a cut/copy/lookup menu) corresponding to the selected content (e.g., text of URL 596) is displayed near the selected content (e.g., URL 596).

In FIG. 5AK, the pair of contacts 590 and 592 have crossed the boundary between user interface 574 and user interface 576, and are located over user interface 574. Since user interface 574 does not provide any permissible drop-off location for selected content 596, container object 598 appears more transparent than before (e.g., in FIG. 5AJ) to indicate that a permissible drop-off location has not been identified in the current user interface.

Figure AL-AM illustrate that, while the pair of contacts 590 and 592 are maintained over user interface 574 (e.g., while container object 598 is suspended over user interface 574), an input for dismissing the current user interface and displaying the home screen user interface (e.g., a home gesture by contact 599 (an upward swipe gesture from the bottom edge of the device) or a press input on a home button) is detected. In response to the input, user interfaces 574 and 596 are dismissed, and home screen user interface 502 is displayed on touch-screen 112, as shown in FIG. 5AM.

In FIG. 5AM, an alternative representation of selected URL (e.g., web-clipping icon 598') is displayed in lieu of container object 598 below the pair of contacts 590 and 592. Web clipping icon 598' is overlaid on home screen user interface 502. In some embodiments, when the pair of contacts 590 and 592 hover over the same location for a threshold amount of time, preview of a drop-off operation is displayed, e.g., preview object 597 for web clipping icon 598' is displayed at a permissible drop-off location on home screen user interface 502, in accordance with the current locations of the pair of contacts 590 and 592.

FIG. 5AN illustrates that, in some embodiments, when a depinch gesture is detected while the pair of contacts 590 and 592 are dragging web clipping icon 598' (e.g., a single object, as opposed to a collection of multiple objects), the object is enlarged in accordance with the relative movement of contacts 590 and 592 away from each other. In some embodiments, the web clipping icon 598' includes a thumbnail image of the webpage corresponding to the selected URL 596, such that the content of the webpage may be visible to the user when the web clipping icon 598' is expanded in accordance with the depinch gesture by contacts 590 and 592.

FIG. 5AO illustrates that lift-off of one of the pair of contacts (e.g., contact 592) is detected, and web clipping 598' remains below contact 590. In some embodiments, once an object is selected by a pair of contacts (e.g., contacts 590 and 592), the device does not require both contacts to be maintained during subsequent movement of the object in accordance with the movement of the remaining contact(s). FIG. 5AP illustrates that once lift-off of contact 590 is detected, web clipping icon 598' is dropped to the permissible drop-off location on the home screen user interface that was previously occupied by preview object 597. In some embodiments, if lift-off contact 592 did not occur before contact 590, web clipping icon 598' would be dropped to the permissible drop-off location on the home screen user interface that was previously occupied by preview object 597 when lift-off of both contacts is detected at the same time.

FIGS. 5AQ-5BD illustrate example user interfaces for interacting with user interface objects (e.g., selecting, dragging and dropping objects) in response to touch inputs, in accordance with some embodiments. The user interfaces in these figures are used to illustrate the processes described below, including the processes in FIGS. 7A-7J and 8A-8F. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIG. 5AQ shows a user interface of an Internet search application (e.g., user interface 501). A search (e.g., an image search for "flowers") has been performed, and multiple search results (e.g., images 503, 505, 507, 509, 511, and 513) have been identified and presented in user interface 501.

In FIG. 5AR, a pair of contacts 517 and 519 are detected at substantially the same time (e.g., less than 200 ms apart) and at close proximity to each other (e.g., less than 0.5 centimeter apart) over image 503 in user interface 501. In response to detecting the pair of contacts 517 and 519, image 503 is selected (e.g., a copy of image 503 (e.g., replica 515) is displayed at a z-layer slightly above the z-layer of image 503, and image 503 is grayed out at its original location to indicate the selected state of image 503).

FIGS. 5AS-5AT illustrate that, while the pair of contacts 517 and 519 is maintained over image 503 (and holding replica 515), a tap input by a second pair of contacts 521 and 523 is detected over image 505 (e.g., the second pair of contacts 521 and 523 are detected at substantially the same time (e.g., less than 200 ms apart) and at close proximity to each other (e.g., less than 0.5 centimeter apart) over image 505 in user interface 501, and lift-off of the second pair of contacts 521 and 523 is detected before the contacts are maintained for more than a threshold amount of time T). In response to detecting the pair of contacts 521 and 523 (in FIG. 5AS), image 505 is selected (e.g., a copy of image 505 (e.g., replica 525) is displayed at a z-layer slightly above the z-layer of image 505, and image 505 is grayed out at its original location, to indicate the selected state of image 505), as shown in FIG. 5AT.

FIGS. 5AT-5AU illustrate that, before movement of the pair of contacts 517 and 519 are started, replicas 515 and 525 are displayed near their corresponding base images 503 and 505, respectively. When movement of the pair of contacts 517 and 519 is detected, replicas 515 and 525 move to a placement location below the pair of contacts 517 and 519 and form a collection that is dragged by the pair of contacts 517 and 519. An indicator (e.g., badge 527 with an object count "2") is displayed on the collection of replicas that is being dragged in accordance with the movement of the pair of contacts 517 and 519.

FIGS. 5AV-5AW illustrate that, while the collection of replicas 515 and 525 is dragged by the pair of contacts 517 and 519, a tap input by a third pair of contacts selects a third image and the selected third image immediately moves to join the collection. In FIG. 5AV, while the collection of replicas 515 and 525 are being dragged in accordance with the movement of the pair of contacts 517 and 519, a tap input by a third pair of contacts 529 and 531 is detected over image 507 (e.g., the third pair of contacts 529 and 531 are detected at substantially the same time (e.g., less than 200 ms apart) and at close proximity to each other (e.g., less than 0.5 centimeter apart) over image 507 in user interface 501, and lift-off of the third pair of contacts 521 and 523 is detected before the contacts are maintained for more than a threshold amount of time T). In response to detecting the pair of contacts 529 and 531 (in FIG. 5AV), image 507 is selected (e.g., a copy of image 507 (e.g., replica 533) is displayed at a z-layer slightly above the z-layer of image 507, and image 507 is grayed out at its original location, to indicate the selected state of image 507), as shown in FIG. 5AV. Immediately after replica 533 is displayed, replica 533 flies toward the pair of contacts 517 and 519 (which are in motion) and joins the collection of replicas 515 and 525, as shown in FIG. 5AW.

FIGS. 5AX-5AY illustrate that, while the collection of replicas 515, 525, and 533 is dragged across the display in accordance with the movement of the pair of contacts 517 and 519, an input for dismissing the current user interface and displaying the home screen user interface (e.g., a home gesture by contact 535 (an upward swipe gesture from the bottom edge of the device) or a press input on a mechanical home button, a solid state home button, or a virtual home button) is detected. In response to the input (e.g., as shown in FIG. 5AX) and while the pair of contacts 517 and 519 continues to drag the collection of replicas 515, 525, and 533 across the display, user interface 501 is dismissed, and home screen user interface 502 is displayed on touch-screen 112 (e.g., as shown in FIG. 5AY).

FIGS. 5AZ-5BA illustrate that, while the collection of replicas 515, 525, and 533 is dragged across the display in accordance with the movement of the pair of contacts 517 and 519, a tap input by contact 537 is detected on application launch icon 516 for a text editor application (e.g., the "Notes" application). In response to detecting the tap input, user interface 576 for the text editor application is displayed (e.g., as shown in FIG. 5BA). In FIG. 5BA, while the pair of contacts 517 and 519 continues to move and drag the collection of replicas 515, 525, and 533, insertion cursor 545 is displayed at a permissible insertion location within the content shown in user interface 576 in accordance with the current location of the pair of contacts 517 and 519. In some embodiments, preview objects 539, 541, and 543 corresponding to replicas 515, 525, and 533 are displayed at the permissible insertion location that has been identified for the replicas. In some embodiments, preview objects 539, 541, and 543 are not displayed, and insertion cursor 545 is used to indicate an insertion location of the items that are being dragged will be inserted upon liftoff of the one or more contacts (e.g., 517 and 519) involved in the drag operation.

FIGS. 5BB-5BC illustrate that, while the collection of replicas 515, 525, and 533 is dragged across the display in accordance with the movement of the pair of contacts 517 and 519, a downward swipe input by contact 547 is detected on touch-screen 112 over user interface 576. In response to detecting the downward swipe input by contact 547, the device scrolls the content displayed within user interface 547 such that a different portion of the content becomes visible on the touch-screen (e.g., as shown in FIG. 5BC). In FIG. 5BC, insertion cursor 545 has been moved to a different permissible insertion location in accordance with the position of the pair of contacts 517 and 519 (e.g., and based on the portion of the content that is currently visible on the display), and preview objects 539, 541, and 543 have been displayed at the newly identified permissible insertion location in the content.

FIGS. 5BC-5BD illustrate that, while preview objects 539, 541, and 543 are displayed at the insertion location identified by insertion cursor 545 (in Figure BC), lift-off of the pair of contacts 517 and 519 is detected, and replicas 515, 525, and 533 are displayed at the insertion location and become part of the content shown in user interface 576 (as shown in FIG. 5BD). The images 503, 505, and 507 cease to be selected in user interface 501 (not shown), if user interface 501 is redisplayed in response to one or more subsequent inputs (e.g., a home gesture, followed by a tap input on the application launch icon corresponding to the Internet browser application).

Figure 6A:
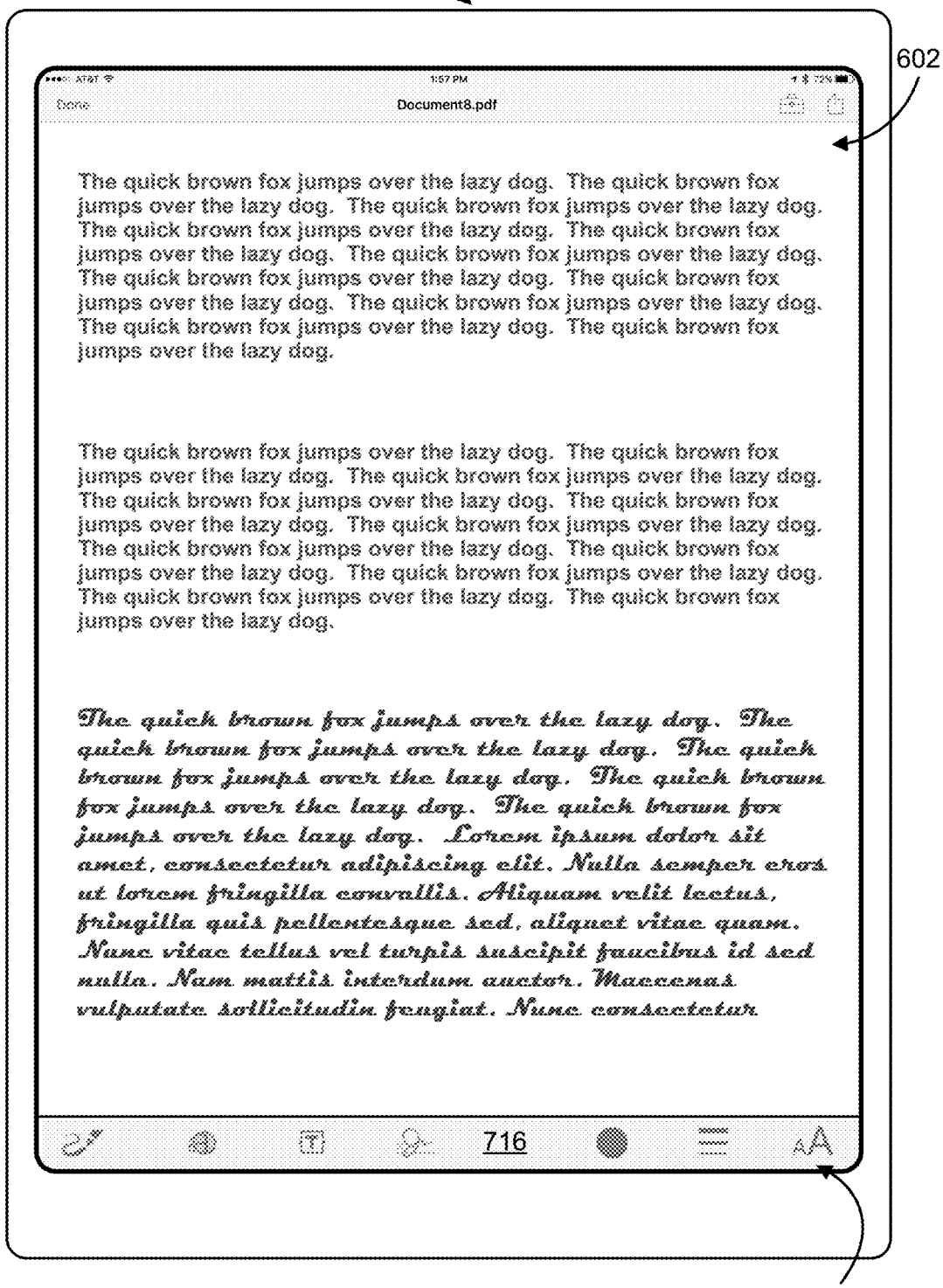
FIGS. 6A-6W illustrate example user interfaces for interacting with user interface objects (e.g., dragging and dropping selected text) in response to touch inputs, in accordance with some embodiments.
Figure 6C:
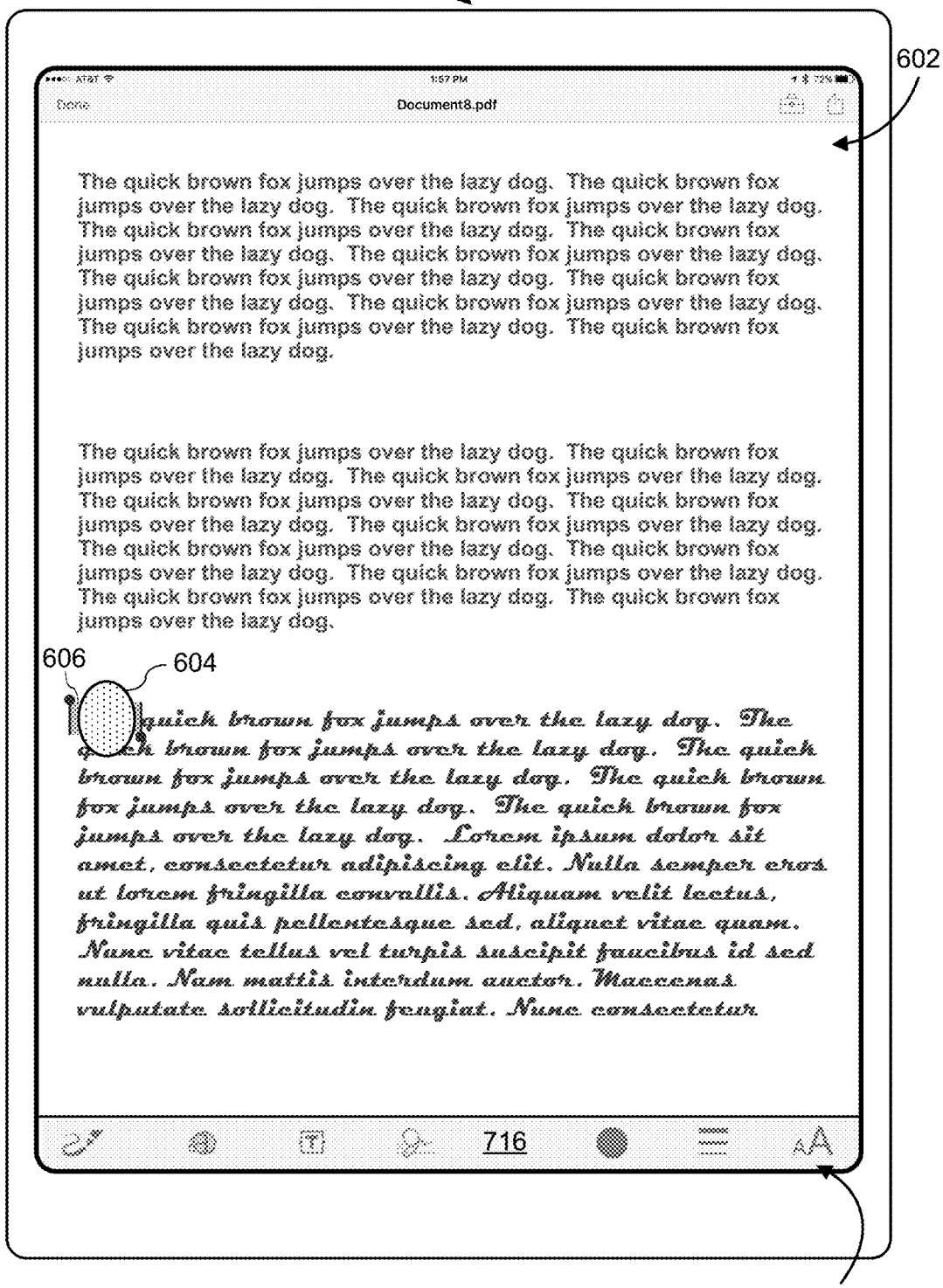
Figure 6D:
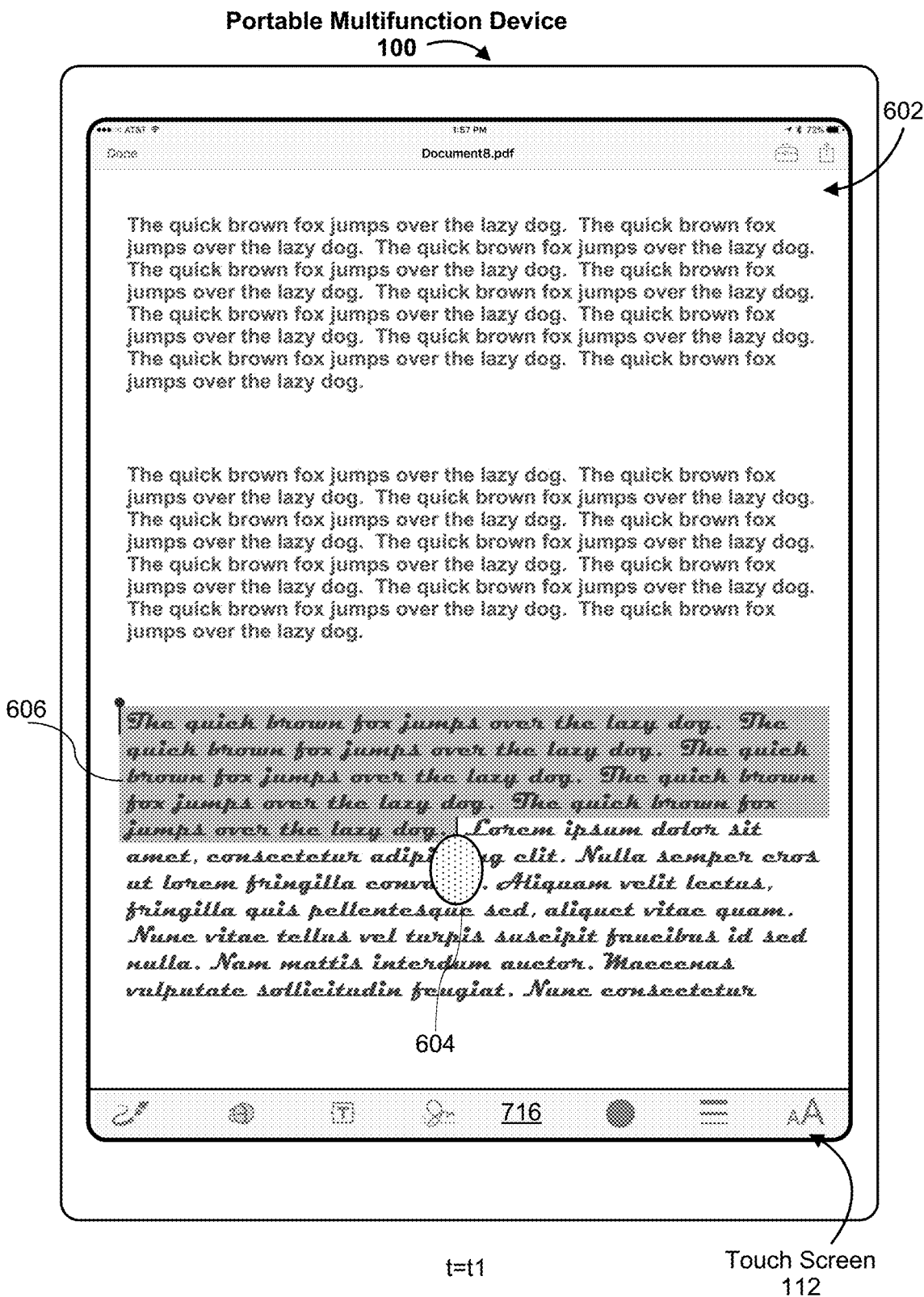
Figure 6E:
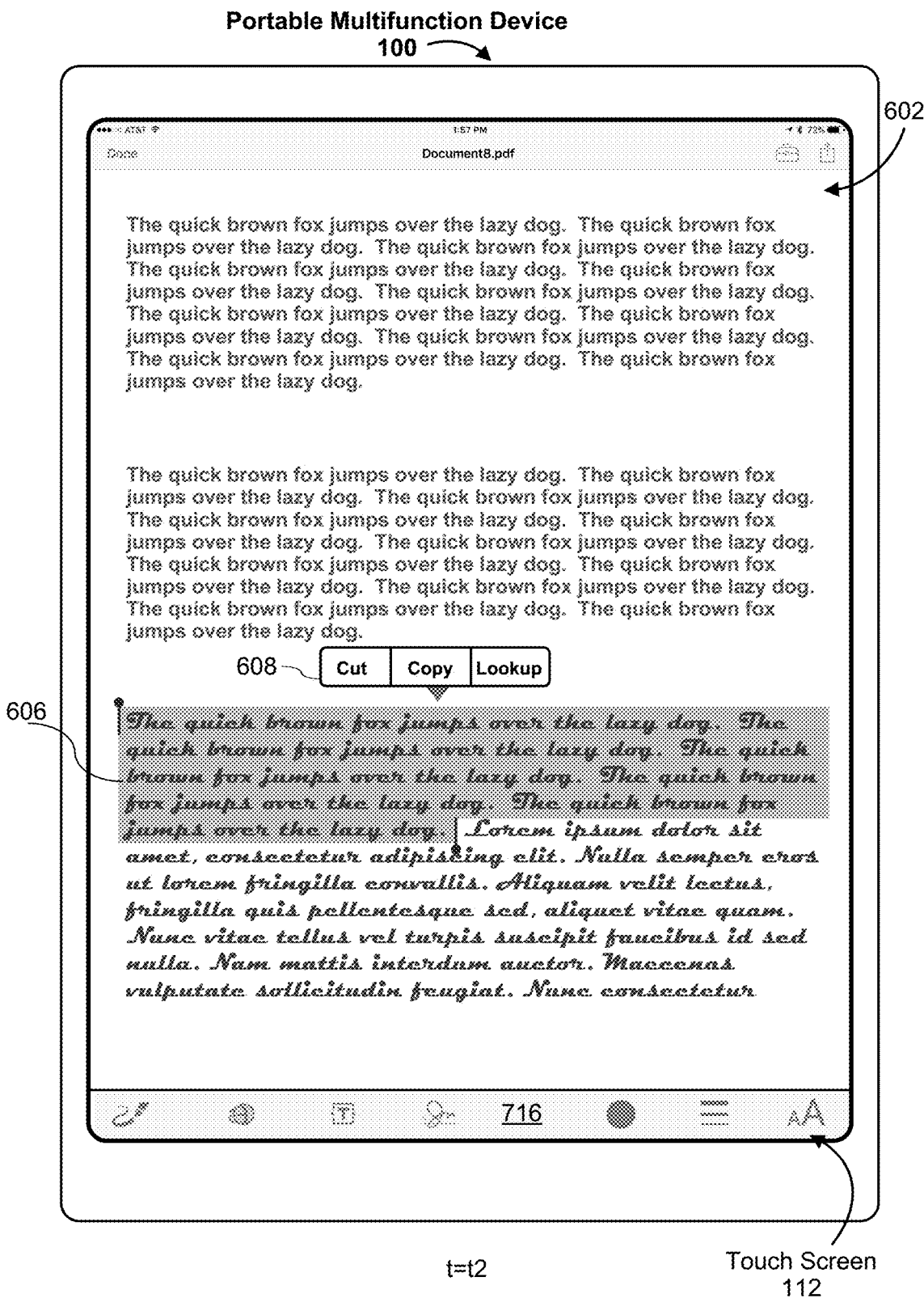
Figure 6F:
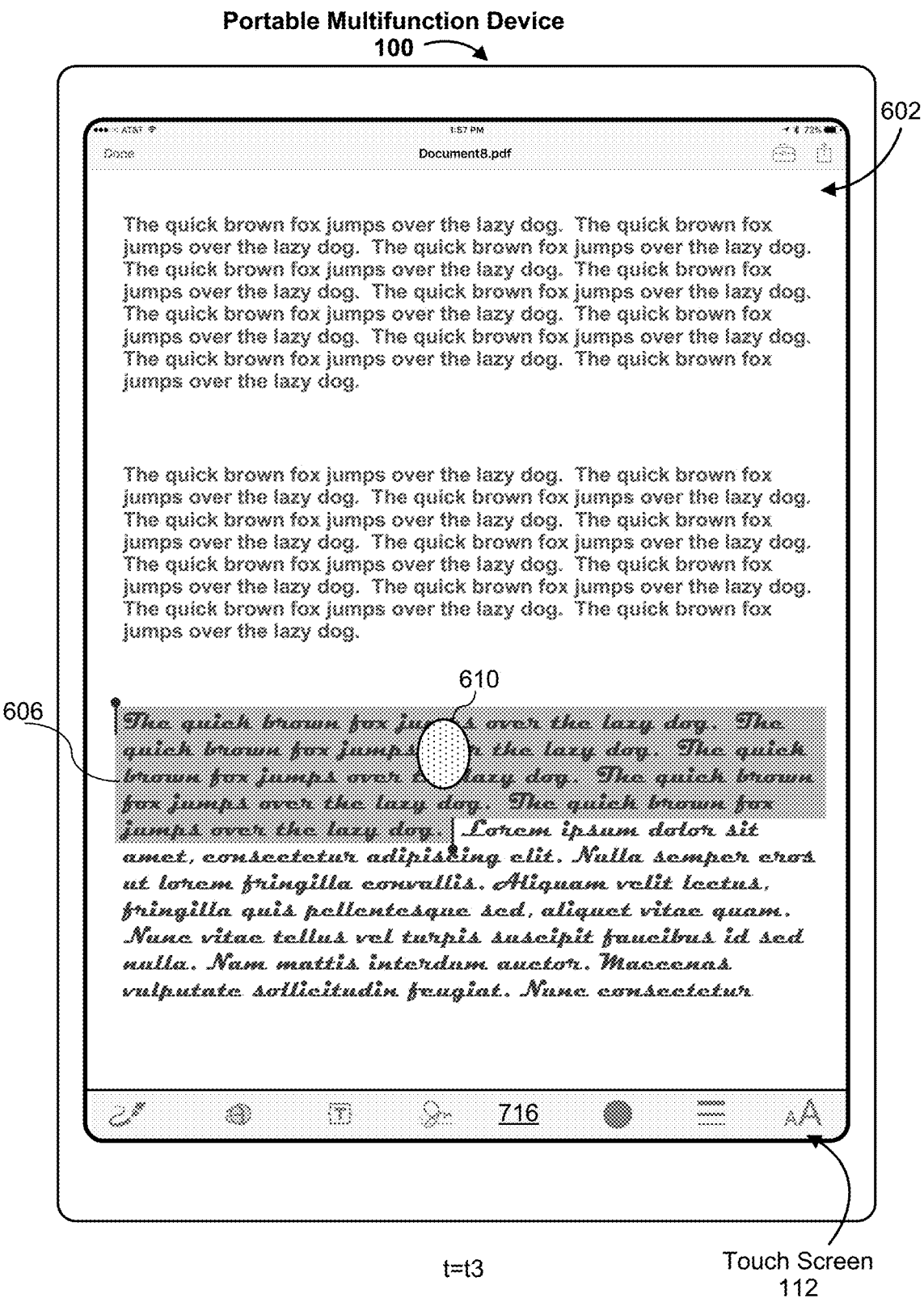
Figure 6G:
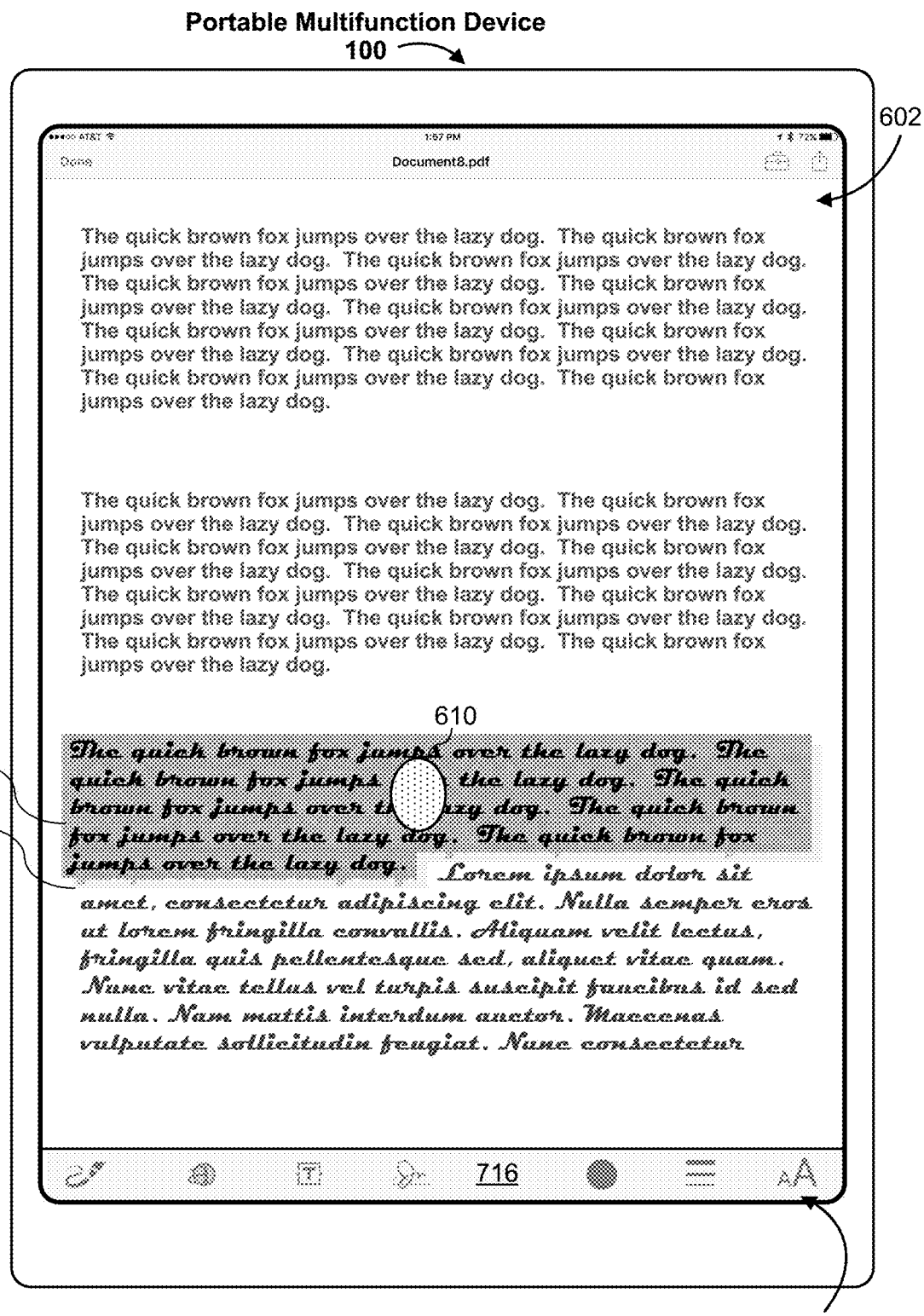
Figure 6H:
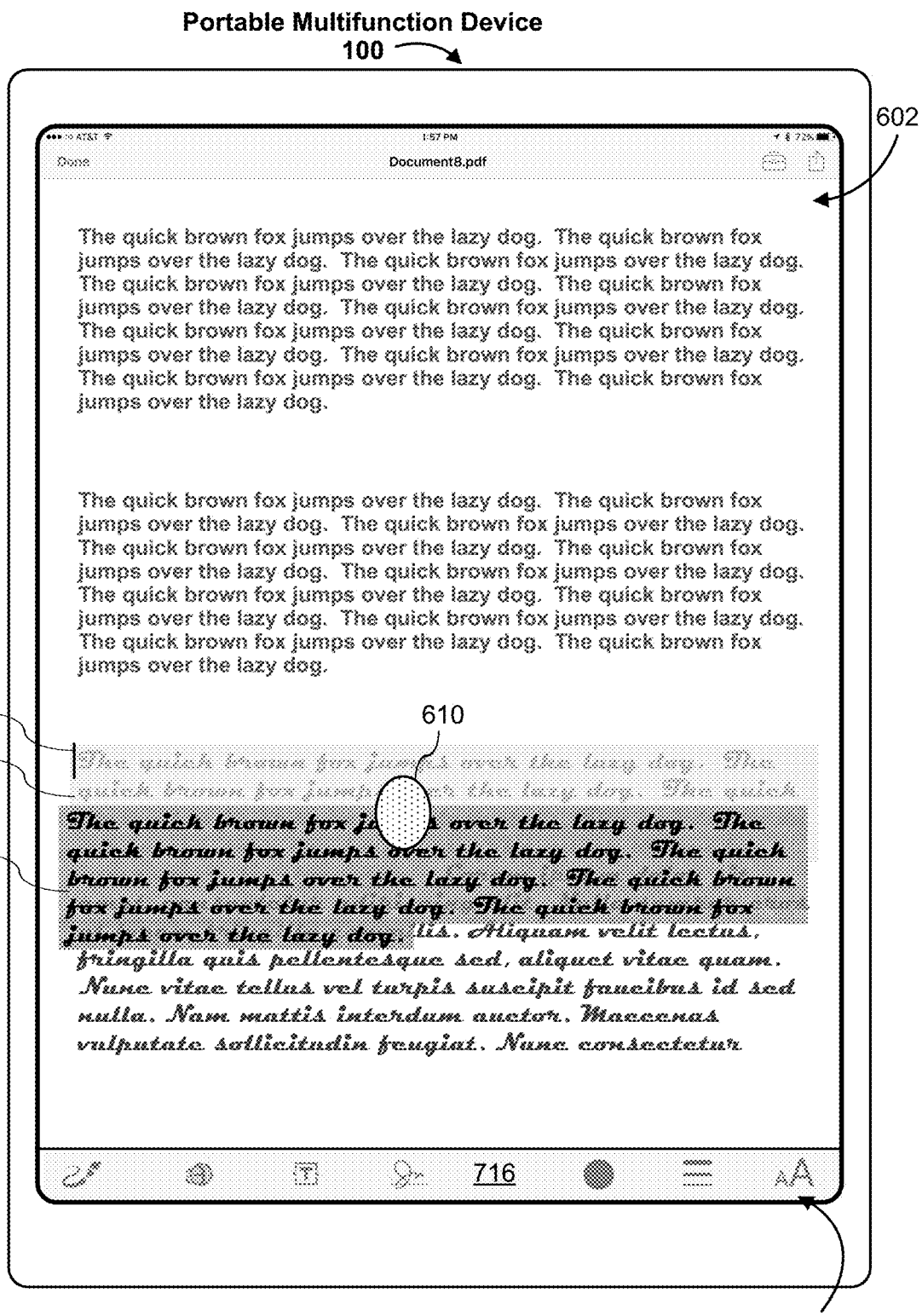
Figure 6I:
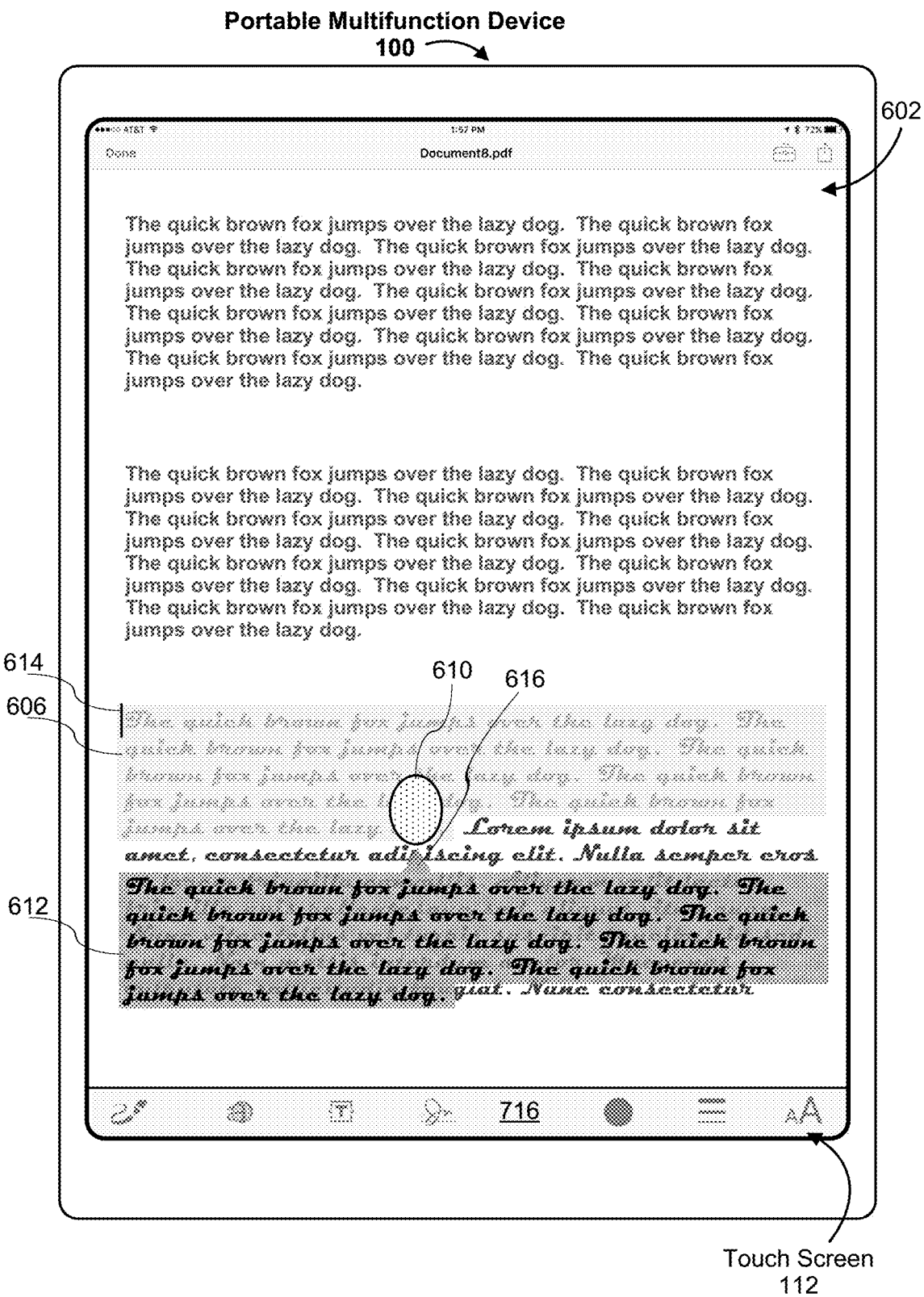
Figure 6J:
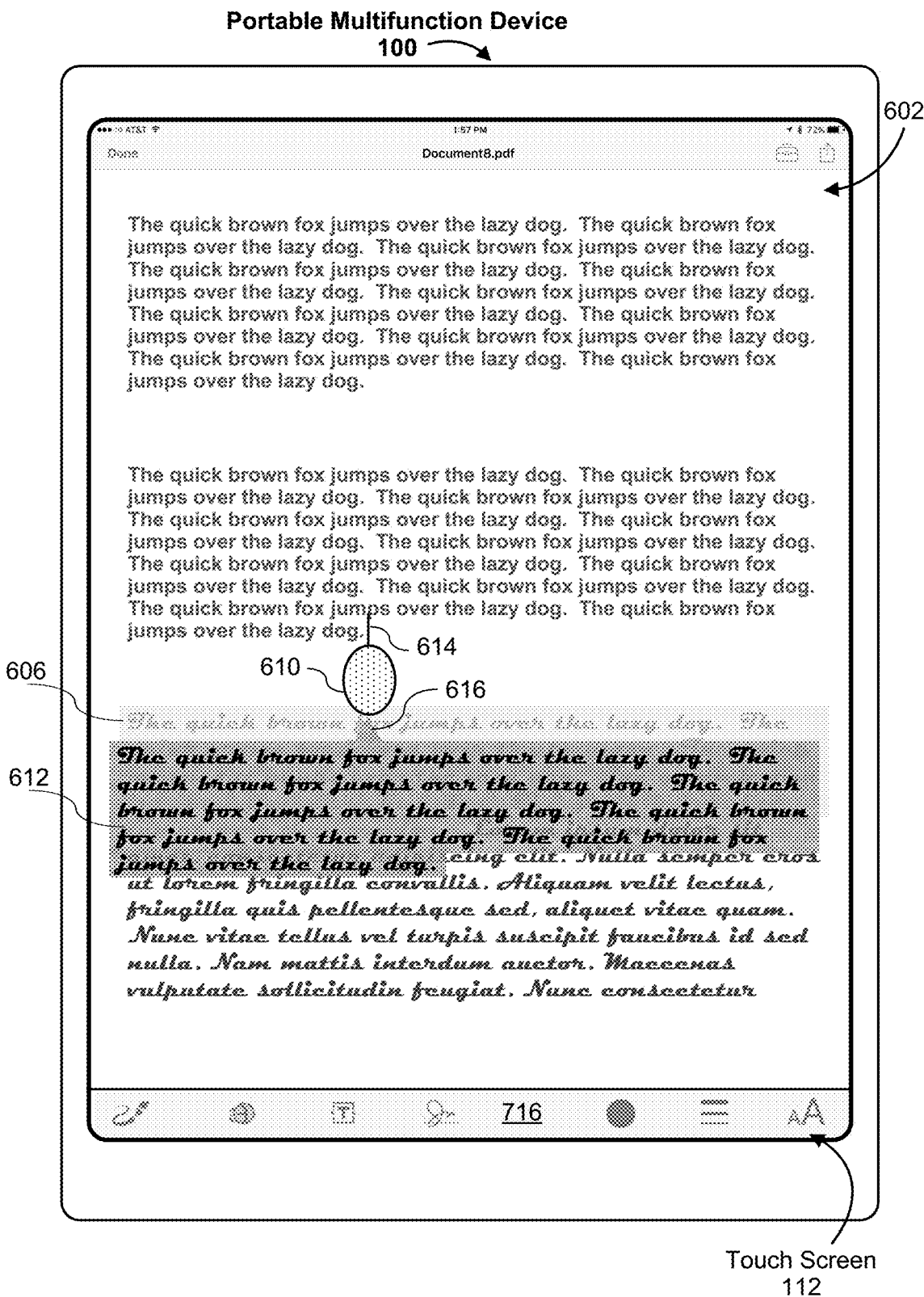
Figure 6K:
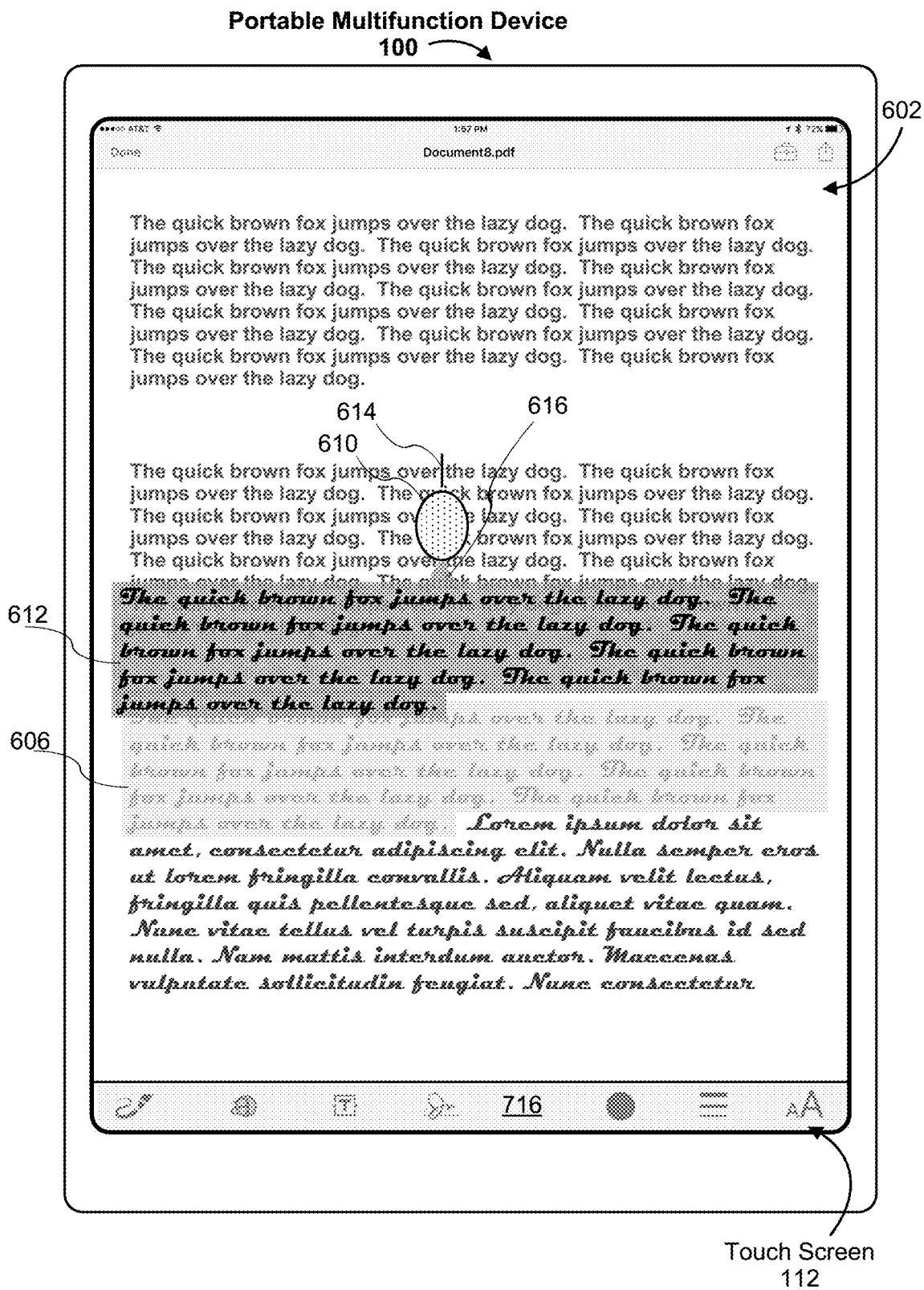
Figure 6L:
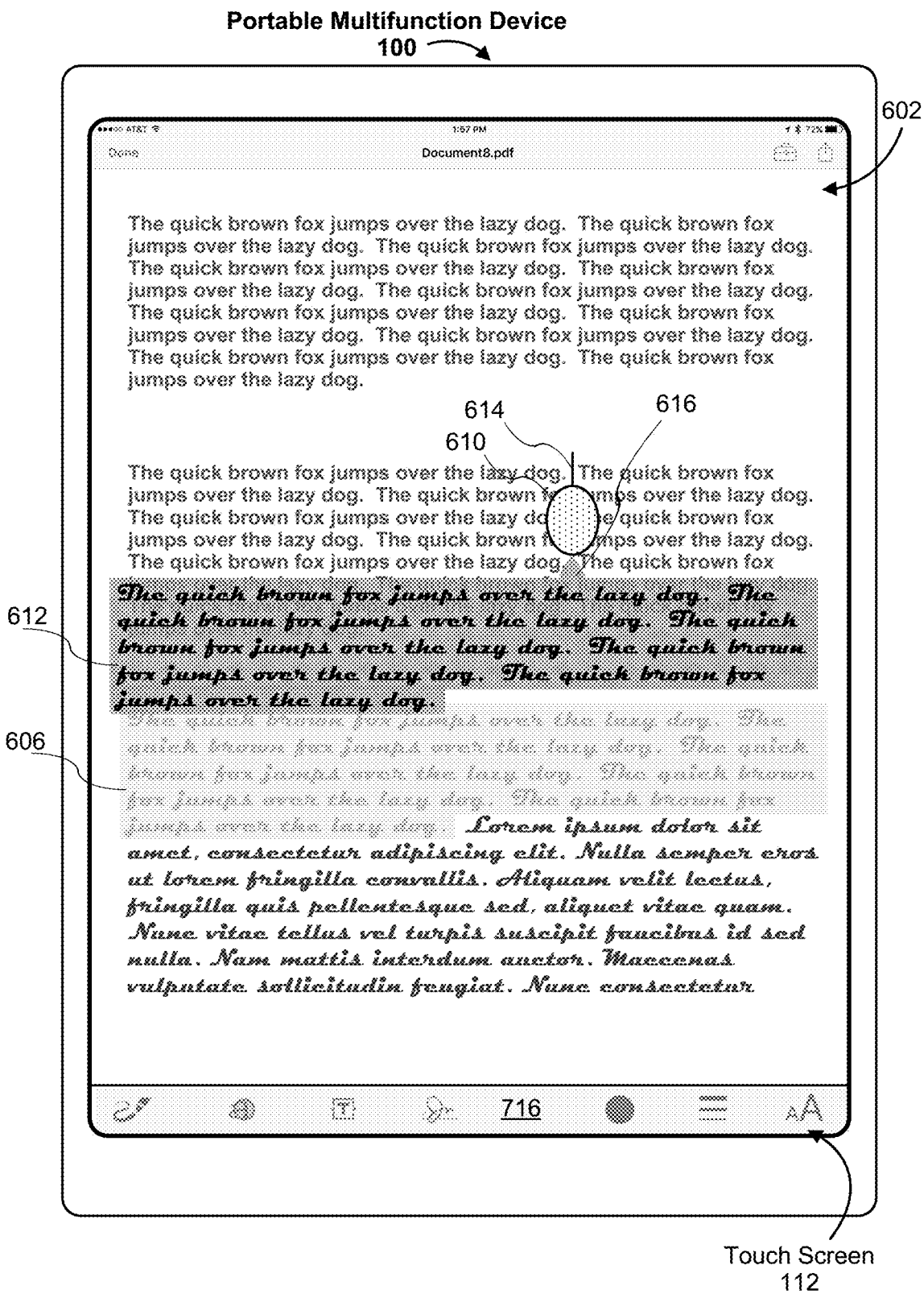
Figure 6M:
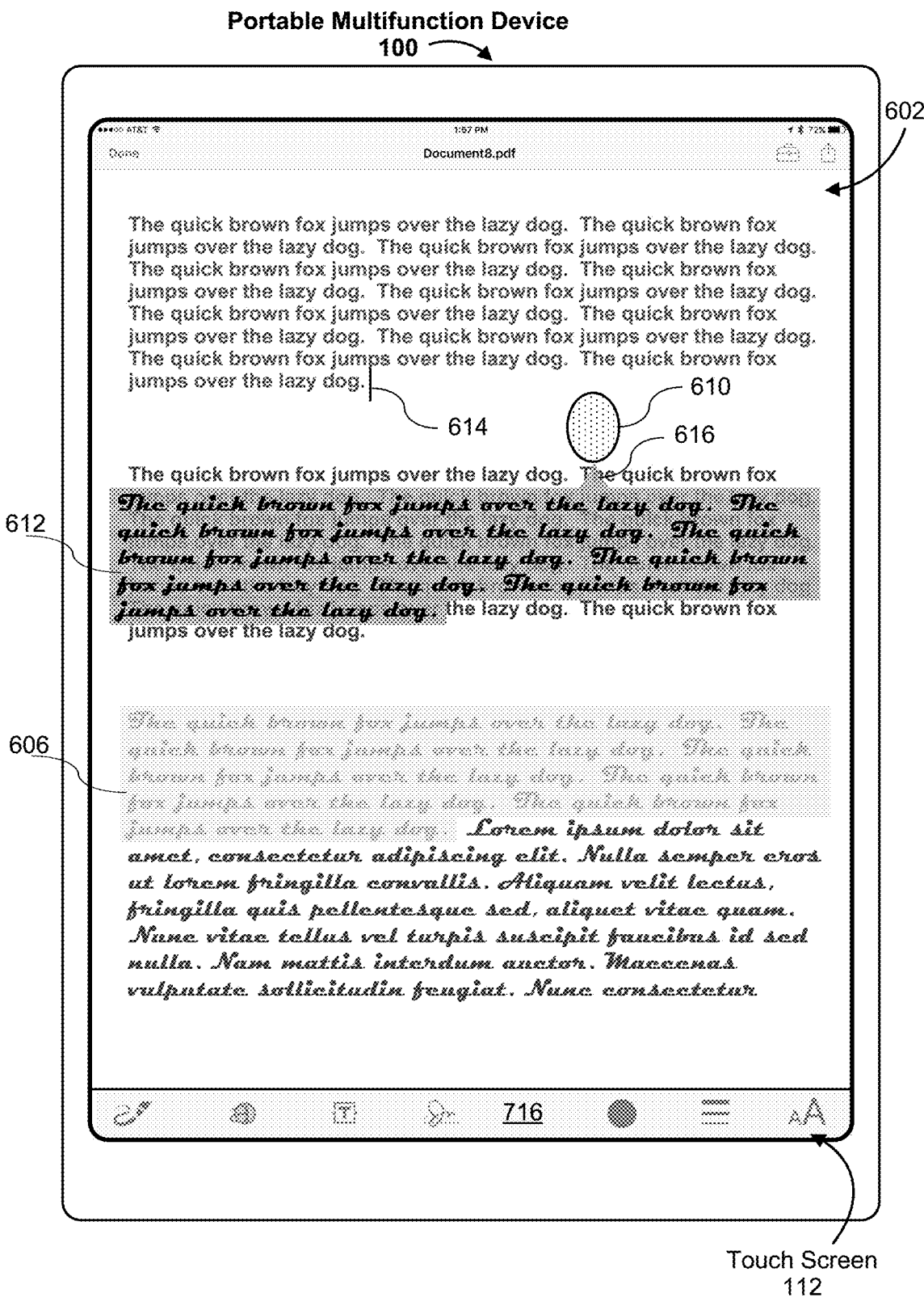
Figure 6N:
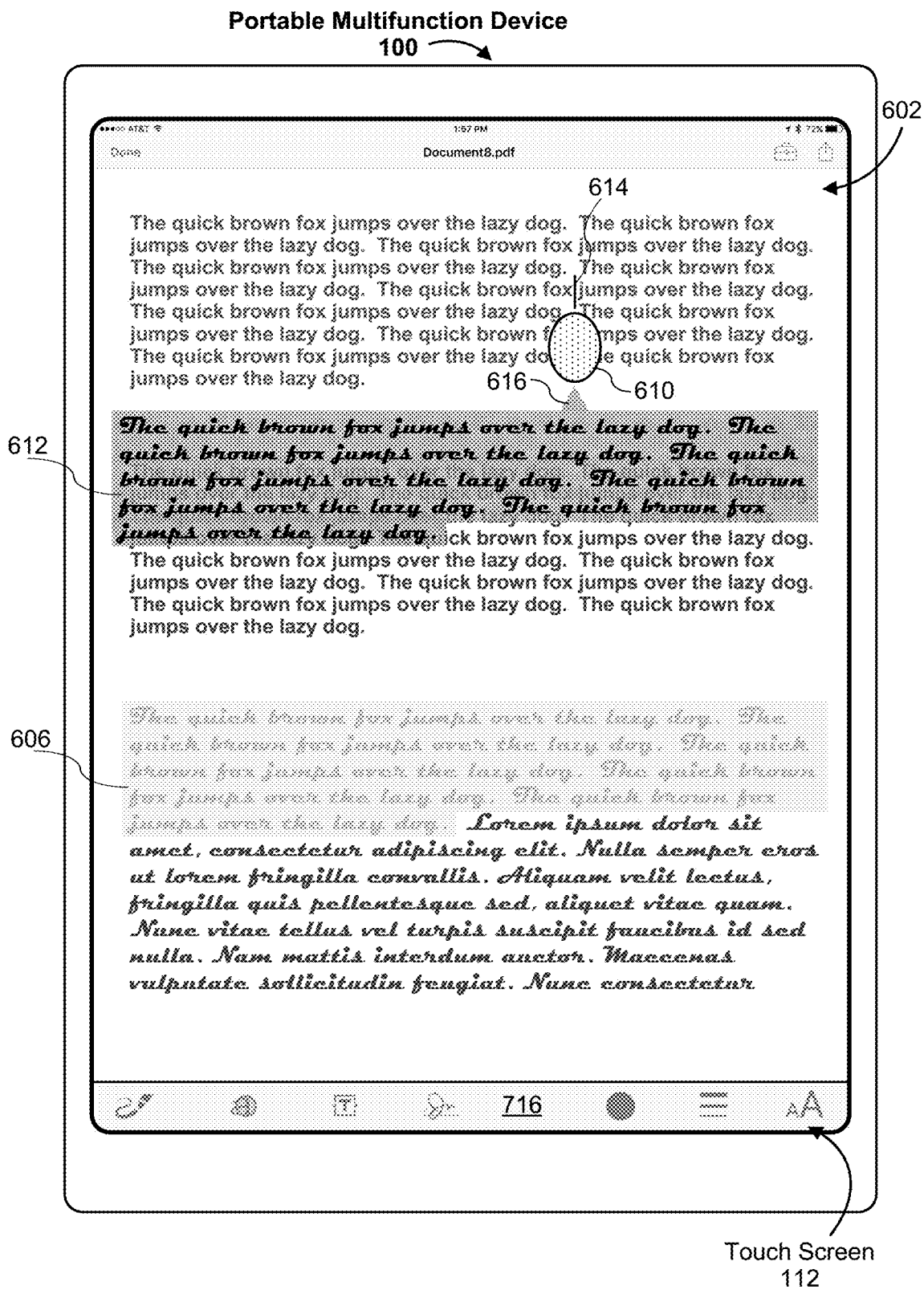
Figure 6O:
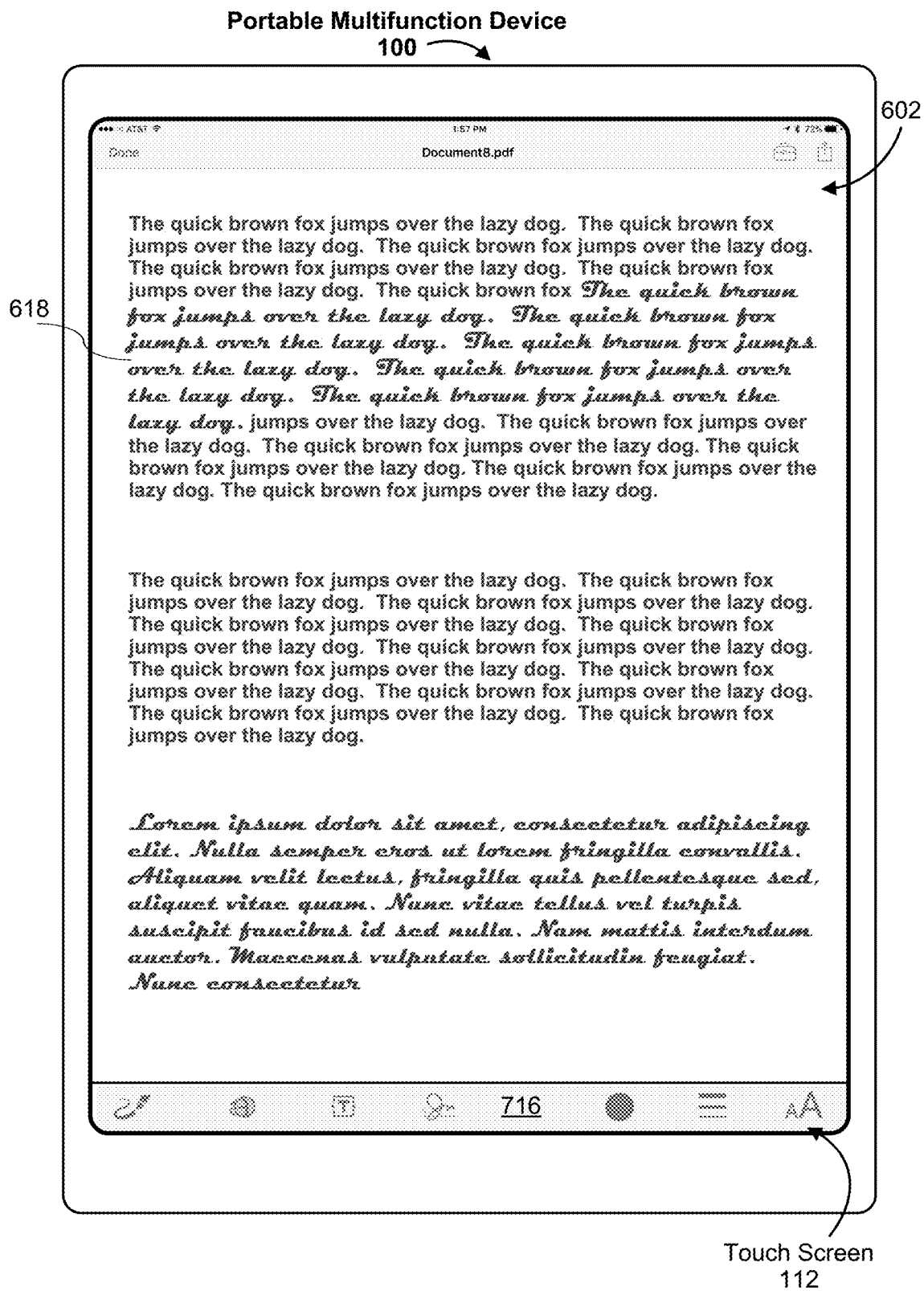
Figure 6P:
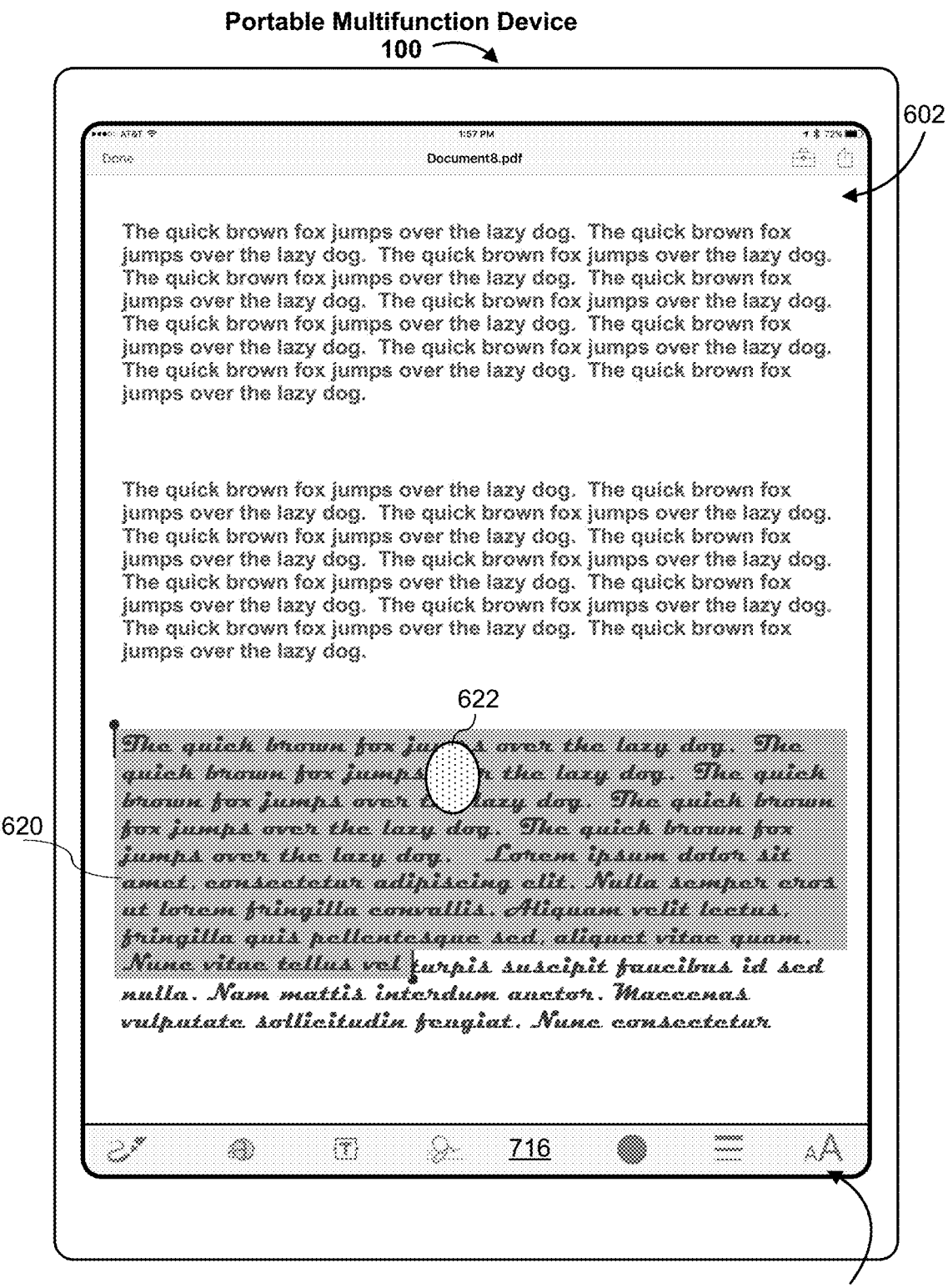
Figure 6Q:
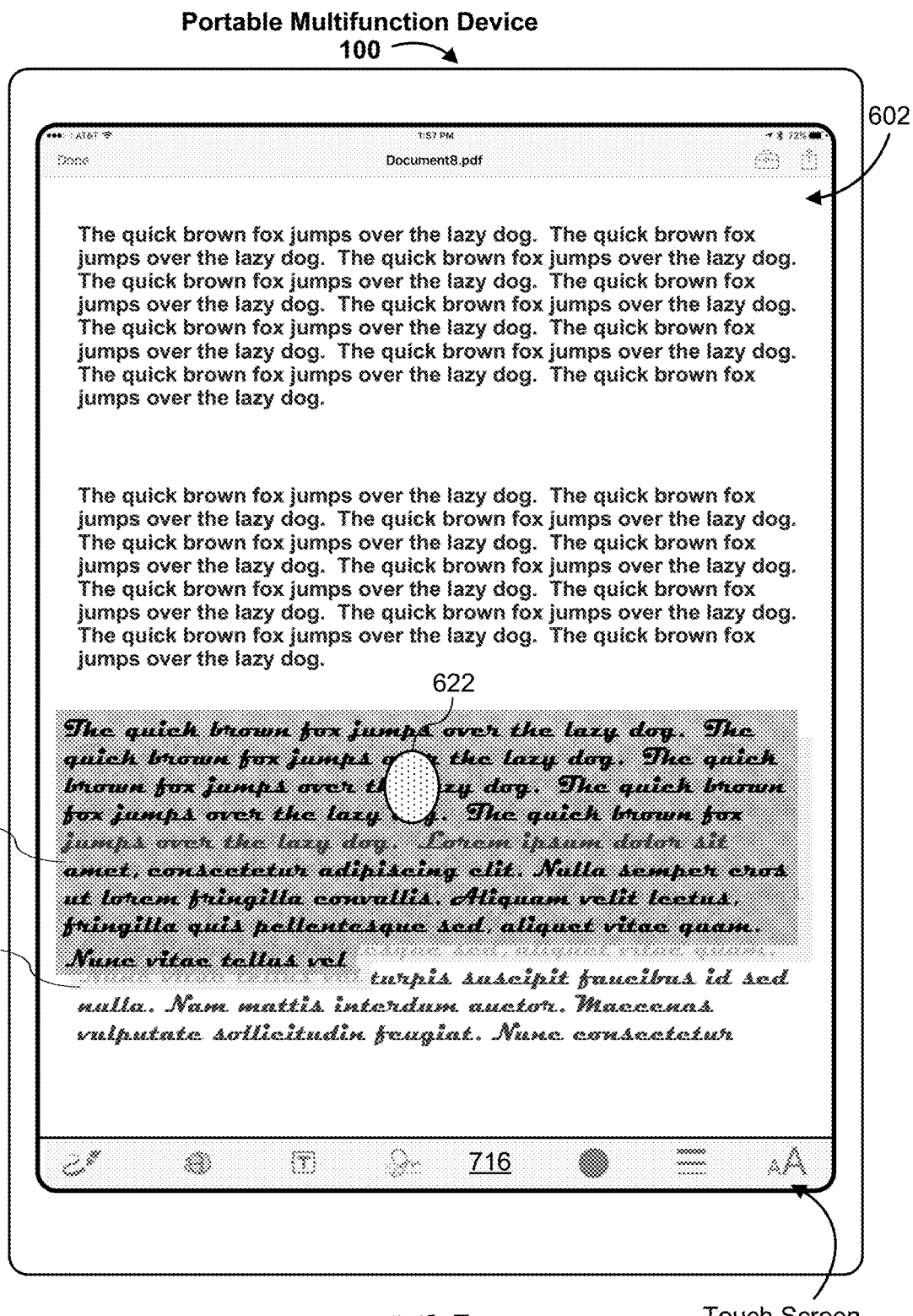
Figure 6R:
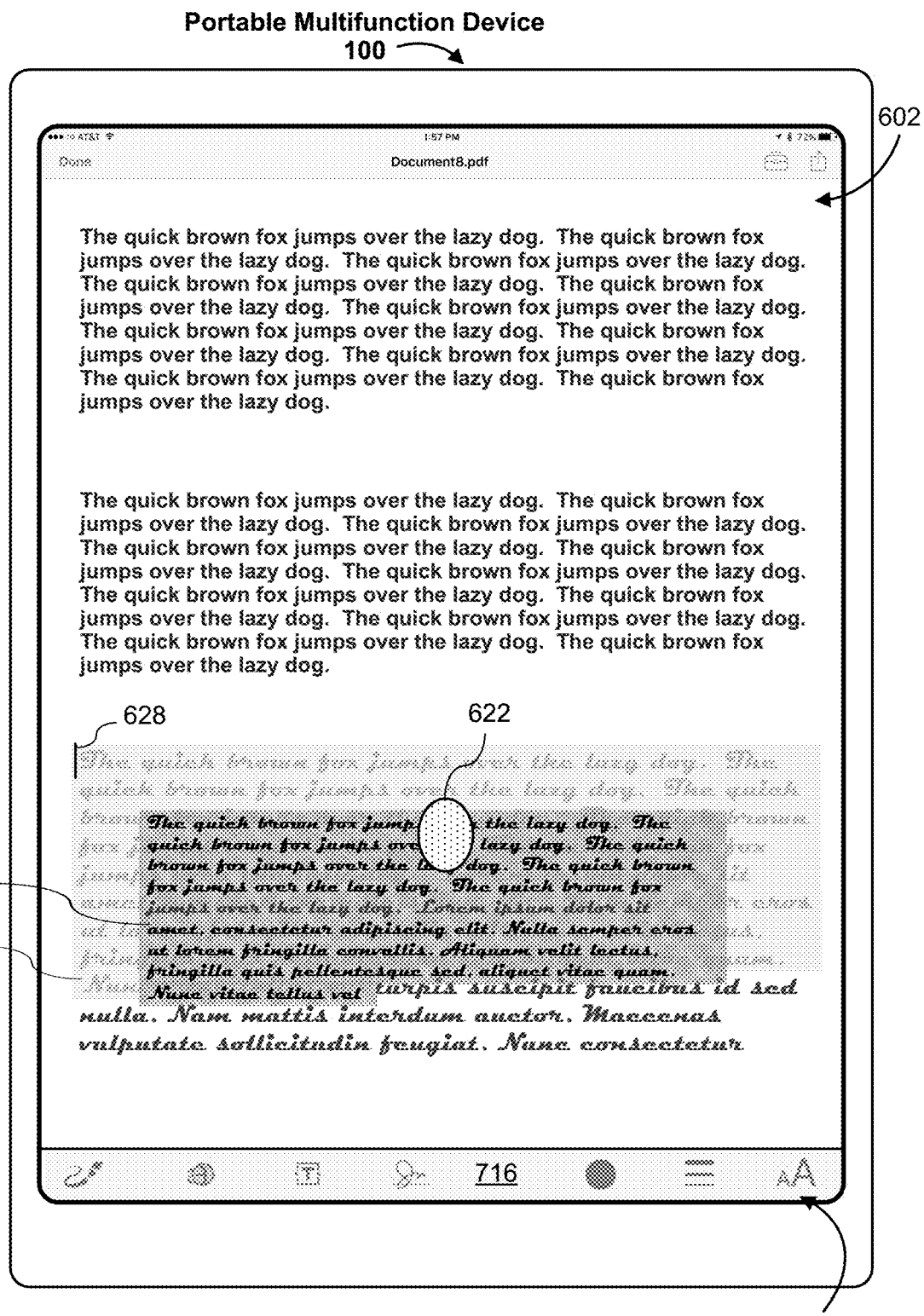
Figure 6S:
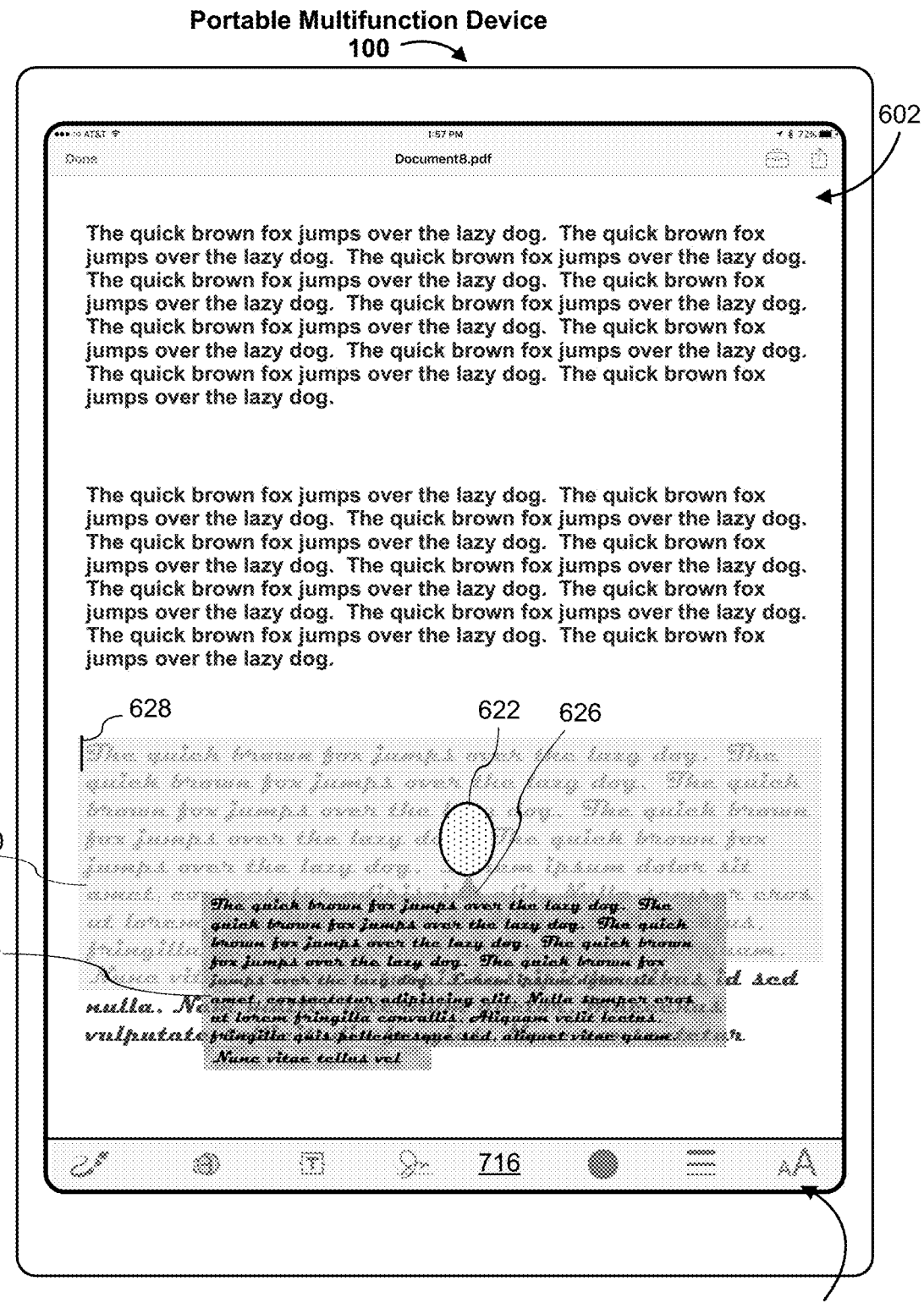
Figure 6T:
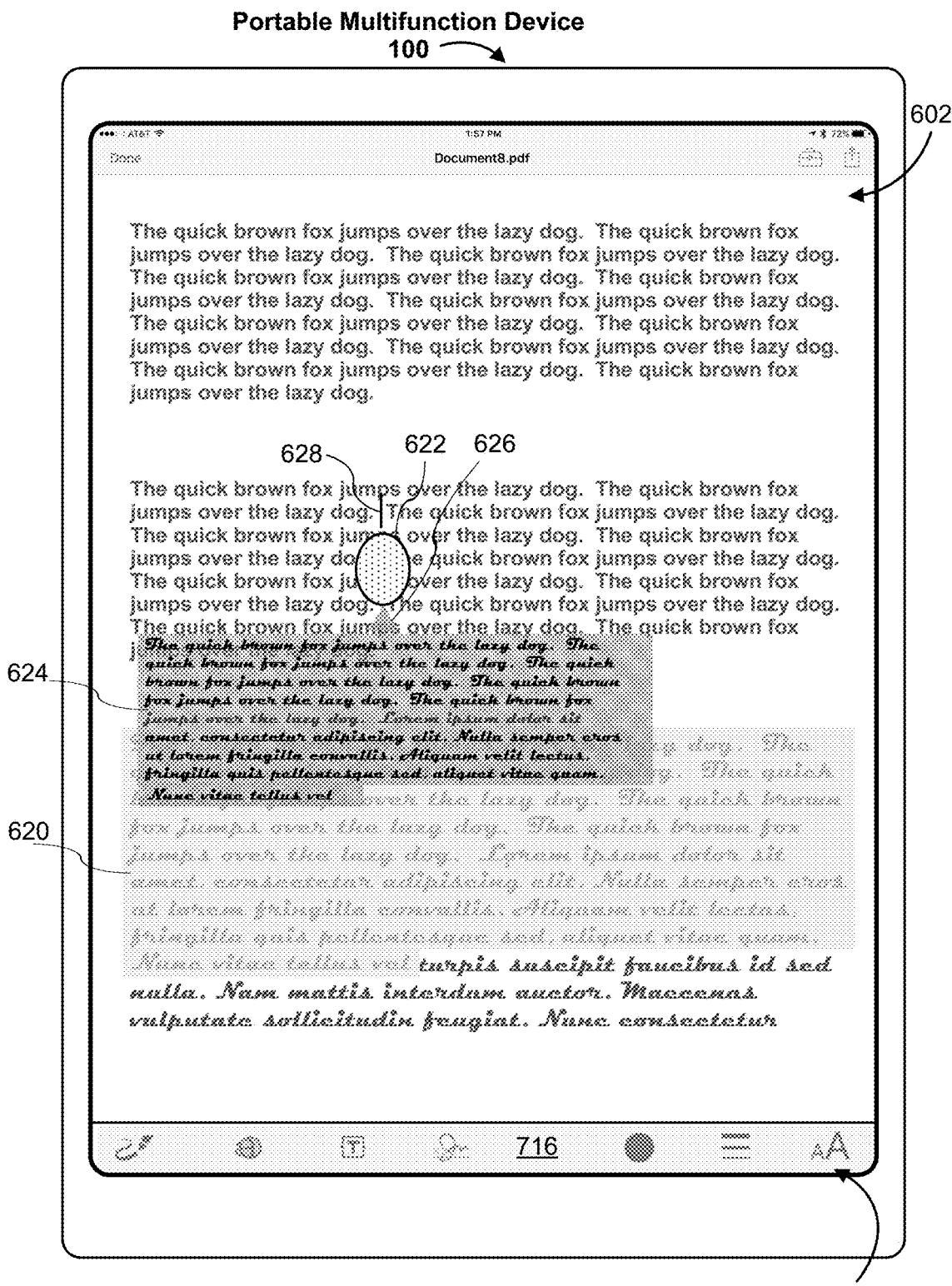
Figure 6U:
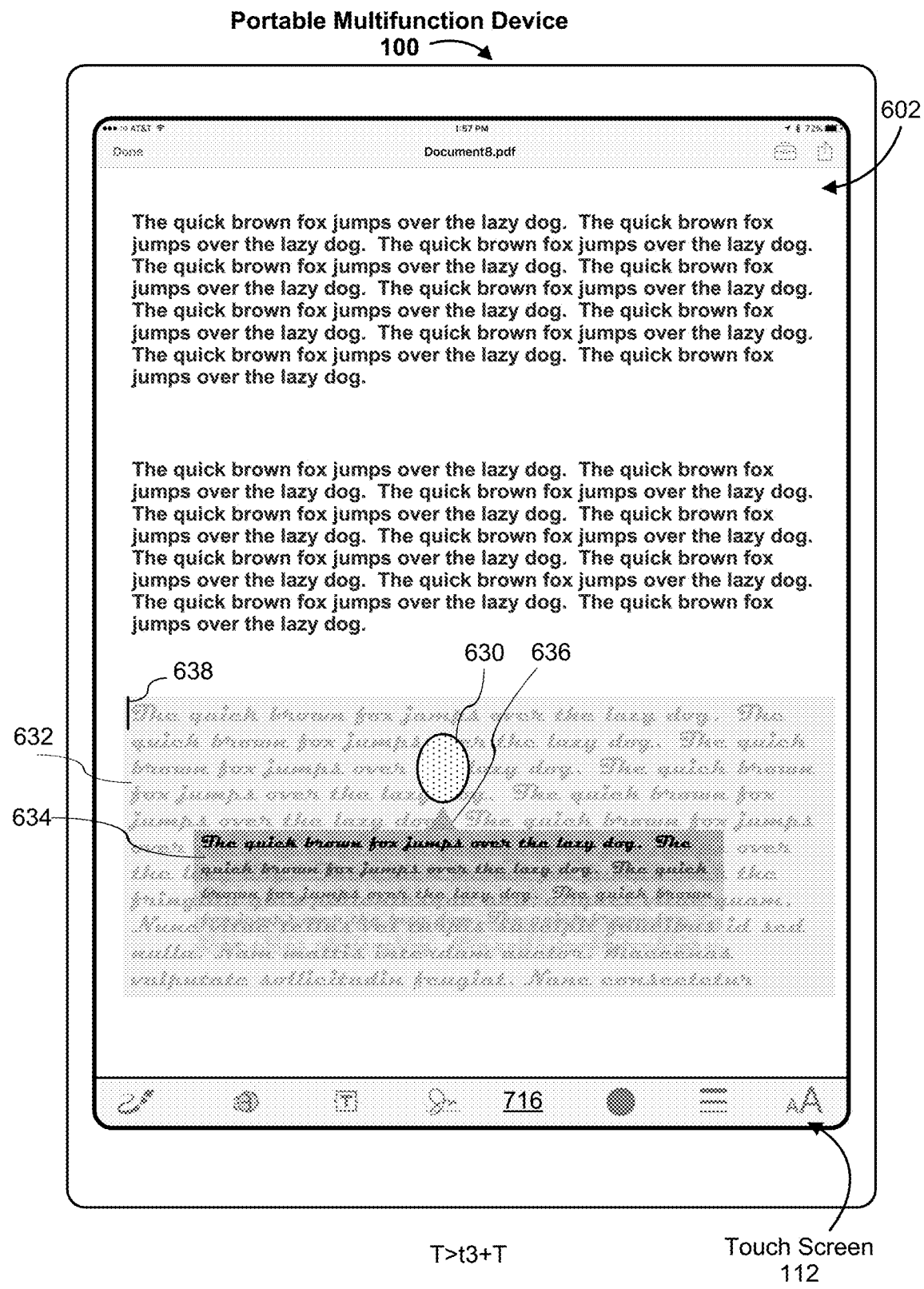
Figure 6V:
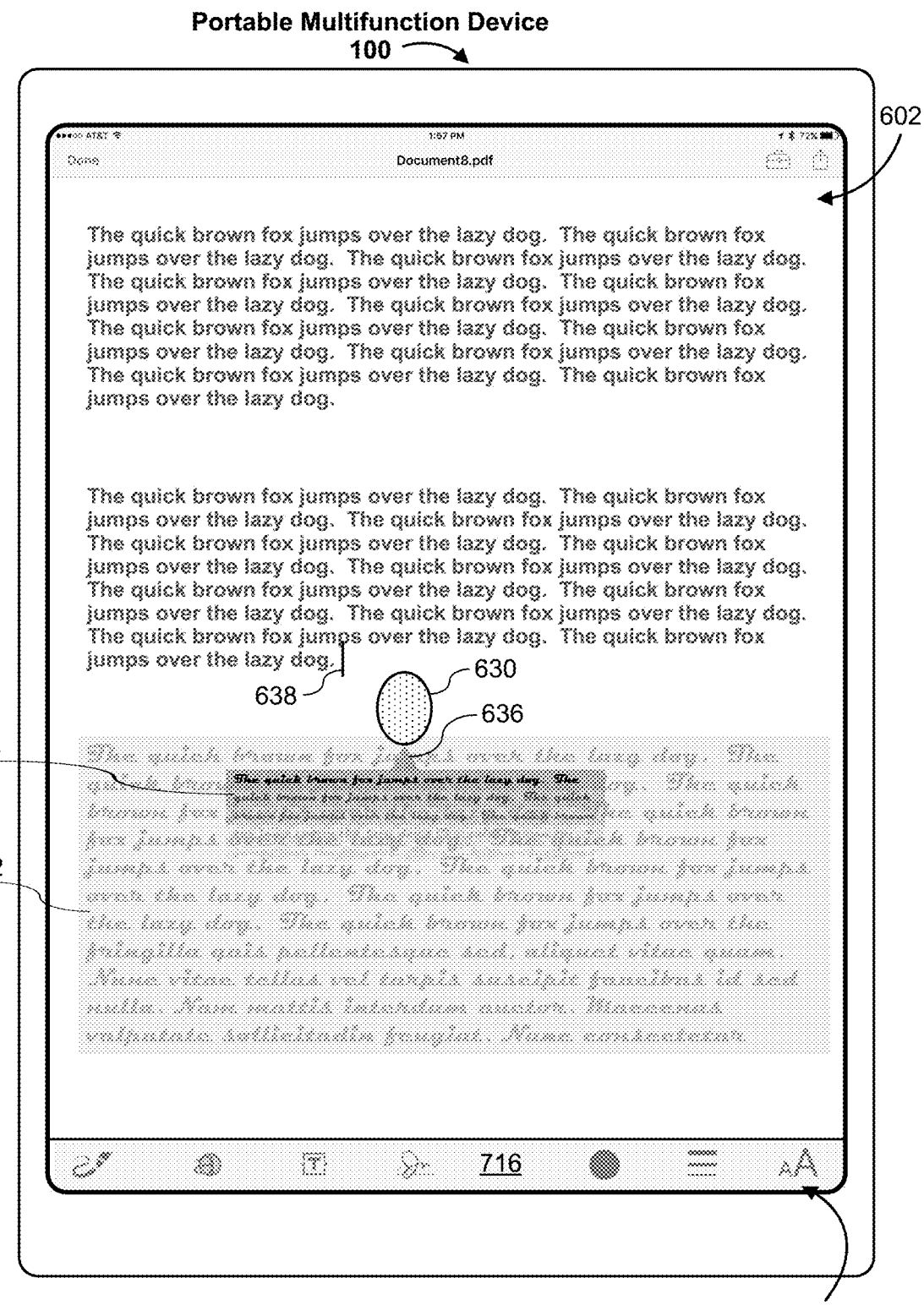
Figure 6W:
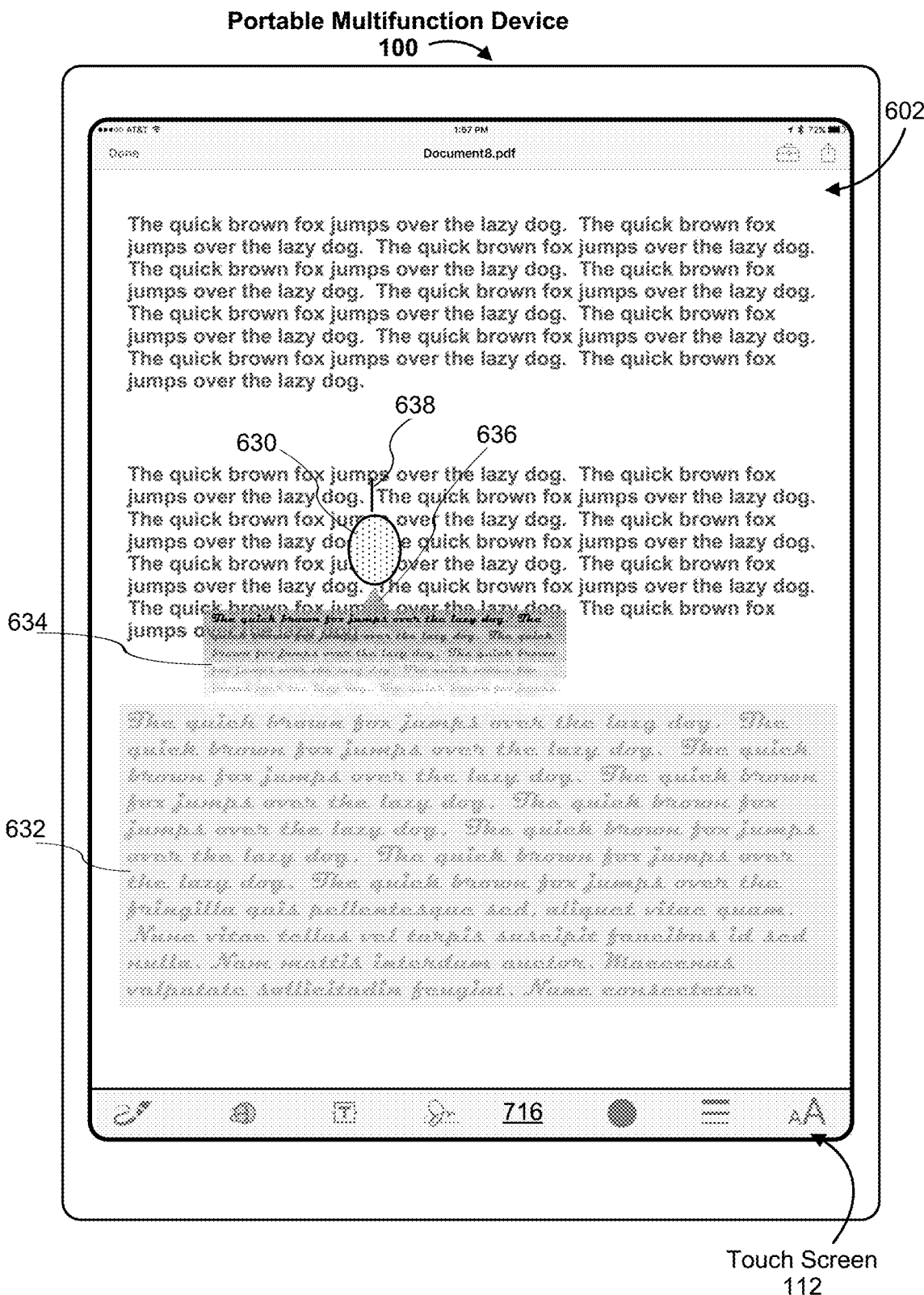

FIGS. 6A-6W illustrate example user interfaces for interacting with user interface objects (e.g., selecting, dragging and dropping objects) in response to touch inputs, in accordance with some embodiments. The user interfaces in these figures are used to illustrate the processes described below, including the processes in FIGS. 9A-9E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIG. 6A shows selectable, editable content 602 (e.g., selectable, editable text in different paragraphs and in different fonts) in a user interface of a text editor application.

FIGS. 6B-6E illustrate a process for selecting a block of text in the selectable content 602 in response to some user interactions with the selectable content. In FIGS. 6B-6C, contact 604 is detected at a first location in the selectable content 602, and after contact 604 is maintained at the first location for a threshold amount of time T, selection object 606 is displayed below contact 604, and a portion of text (e.g., a word) below contact 604 is selected within selection object 606. When contact 604 moves, one edge of selection object 606 is dragged by contact 604, and the amount of text selected in selection object 606 is increased, as shown in FIG. 6D. In FIG. 6E, lift-off of contact 606 is detected, and menu 608 (e.g., a cut/copy/lookup menu) corresponding to the selected text is displayed.

FIGS. 6F-6I illustrate a process for initiating a move operation (e.g., a drag and drop operation) for the selected text.

In FIG. 6F, contact 610 is detected (e.g., at t=$t_3$) at a location over selected text 606. In FIG. 6G, when contact 610 is kept substantially stationary for a threshold amount of time T, selected text 606 is grayed out, container object 612 including a copy of the selected text is displayed (e.g., in a z-layer that is above the z-layer of the selected text 606). Before movement of contact 610 is detected, container object 612 is at a first placement location relative to contact 610. For example, the first placement location has the same x-y position as the selected text 606, but is lifted to a different z-layer, casting a shadow over the user interface below. As shown in FIG. 6G, container object 612 has a semitransparent or translucent background below the copy of the selected text.

In FIGS. 6G-6I, as soon as contact 610 starts to move from its initial touch location, container object 612 is animated and moves from the first placement location near the original location of the selected text (e.g., as shown in FIG. 6G) to a second placement location below contact 610 (e.g., as shown in FIG. 6I). FIG. 6H shows an intermediate state where container object 612 is moving toward the second placement location (e.g., with a speed faster than the movement speed of contact 610). Once container object is moved away from the first placement location, insertion cursor 614 is displayed to indicate the current permissible insertion location for inserting the selected text if lift-off of contact 610 is detected at the present moment. In FIG. 6I, container object 612 is at the second placement location relative to contact 610, an indicator (e.g., triangular tip 616) is displayed at the top edge of container object 612, directly below contact 610. During subsequent movement of contact 610, triangular tip 616 follows the movement of contact 610 and remains directly below contact 610.

FIGS. 6J-6N illustrate that, as contact 610 continues to move across the touch-screen 112, container object 612 is dragged by contact 610 and always remains at the second placement location relative to (e.g., directly below contact 610). In addition, as contact 610 moves across the display, triangular tip 616 moves along the top edge of container object 612 such that triangular tip 616 always remains directly below contact 610. FIGS. 6J-6N further illustrate that, although movement of container object 612 and movement of triangular indicator 616 are smooth and continuous and matches the smooth and continuous movement of contact 610 across the display, insertion cursor 614 hops from one permissible insertion location to the next permissible insertion location, in accordance with the current location of contact 610, and skips the white space between paragraphs that does not include a permissible insertion location for the selected text.

FIGS. 6N-6O illustrates that, lift-off of contact 610 is detected, and in response to detecting lift-off of contact 610, selected text 606 is inserted (e.g., as text 618) into selectable content 602 at the location indicated by insertion cursor 614 (in FIG. 6N), and removed from the original location of the selected text. In this example, selected text 606 is moved (as opposed to be copied) because the original location and the drop-off location of the selected text 618 are in the same user interface. In some embodiments, if the original location and the drop-off location of the selected text are in different user interfaces, the selected text would be copied to the new location instead of being moved to the new location.

In FIGS. 6G-6N, container object 612 has a shape and size that is substantially the same as selected text 606 (e.g., the width of the container object is about one full line width of the underlying content, and the height of the container object is about five times the line height of the underlying content). The copy of selected text included in container object 612 has the same font size and layout as the selected text at its original location. This configuration of container object is used when the amount of selected content is relatively small, and full-scale replica of the selected text would not unduly interfere with the user's view of the underlying content during movement of the selected content. In some embodiments, when the selected text is less than a full line of text (e.g., after reflowing the selected text), the container object is resized to fit the reflowed selected text and is narrower than the full width of the underlying content.

FIGS. 6P-6T illustrate a process for moving a block of selected content (e.g., selected text 620) that is larger than that shown in FIGS. 6G-6N. In some embodiments, when the amount of selected text is more than a threshold amount, a different configuration is used for the container object that includes the selected text.

As shown in FIG. 6P, contact 622 is detected over selected text 620 at t=t3. In FIG. 6Q, when contact 622 is kept stationary for at least a threshold amount of time T, the move operation is initiated, and container object 624 is displayed at a first placement location near the original location of the selected text 620 on a z-layer above the original z-layer of selected text 620. Initially, container object 624 has a shape and size that is substantially the same as selected text 620 and has a semitransparent background underlying the copy of selected text contained therein. As soon as contact 622 starts to move across the touch-screen 112, an animated transition is displayed showing container object 624 moving from the first placement location relative to contact 622 toward the second placement location relative to contact 622 (e.g., directly below contact 622), as shown in FIGS. 6Q-6S. In addition to the movement from the first placement location to the second placement location, the animated transition also shows container object 624 gradually shrinking in width and height, as does the size of the copy of the selected content contained therein (e.g., the font size is reduced and text reflowed within the container object 624, or container object 624 and selected text contained therein as a whole are scaled down to a percentage of their original sizes). In some embodiments, when container object 624 arrives at the second placement location below contact 622, container object 624 is scaled to 50% its initial size. In some embodiments, by the time that container object 624 arrives at the second placement location below contact, container object 624 will have been scaled to a predefined threshold size (e.g., a predefined height and/or width). In some embodiments, container object 624 is maintained in size while it is moved around the application view in which the text was selected, and container object 624 is reduced in size in response to a user input that causes the device to navigate away from the application view in which the text was selected (e.g., by navigating to a home screen or another application in response to one or more user inputs such as a home gesture or activation of a home button, or by navigating to a different view of the application (e.g., navigating to a user interface for creating a new content item such as a newly created note or a newly created message, navigating to a user interface that corresponds to a different content item such as an existing note other than a note from which the text was selected, or a draft message other than a message from which the text was selected).

In FIG. 6R, as soon as movement of contact 622 is detected, and container object 624 is moved away from the first placement location, insertion cursor 628 is displayed at a permissible insertion location corresponding to the current location of contact 622 (e.g., the original location of the selected text).

In FIG. 6S, when container object 624 has arrived at the second placement location below contact 622, an indicator (e.g., triangular tip 626 is displayed at the top edge of container object 624, directly below contact 622). When contact 622 continues to move across touch-screen 112, container object 624 is dragged in accordance with the movement of contact 622, while remaining at the second placement location relative to contact 622. Insertion cursor 628 hops from one permissible insertion location to the next permissible insertion location within the editable content 602 in accordance with the current location of contact 622. In some embodiments, when lift-off of contact 622 is detected, selected text 620 would be inserted at the location indicated by insertion cursor 628, and selected text 620 would be removed from its original location in the editable content 602.

FIGS. 6U-6W illustrate a process for moving a block of selected content (e.g., selected text 632) that is even larger than those shown in FIGS. 6G-6N and FIGS. 6P-6T. In some embodiments, when the amount of selected text is more than a second threshold amount, a third configuration is used for the container object that includes the selected text.

As shown in FIG. 6U, contact 630 has been detected over selected text 634 and has been kept stationary for at least a threshold amount of time T before movement of contact 630 is started; and in response to the movement, container object 634 that is initially displayed at a first placement location near the original location of the selected text 634 on a z-layer above the original z-layer of selected text 620 is moved to a second placement location below contact 630. Initially, while container object 634 is displayed at the first placement location relative to contact 630, container object 634 has a shape and size that is substantially the same as selected text 632 and has a semitransparent background underlying the copy of selected text contained therein. As soon as contact 630 starts to move across the touch-screen 112, an animated transition is displayed showing container object 634 moving from the first placement location relative to contact 630 toward the second placement location relative to contact 630 (e.g., directly below contact 630). In addition to the movement from the first placement location to the second placement location, the animated transition also shows container object 624 gradually shrinking in width and height, as does the size of the copy of the selected content contained therein (e.g., the font size is reduced and text reflowed within the container object 624, or container object 624 and selected text contained therein as a whole are scaled down to a percentage of their original sizes). In some embodiments, when container object 624 arrives at the second placement location below contact 622, container object 624 is scaled to 50% its initial width, with a predefined height. As shown in FIG. 6U, the text included in container object is gradually faded out from top to bottom. In some embodiments, lower portions of the copy of the selected text are omitted and not visible in container object 634.

In FIG. 6U, after movement of contact 630 is detected, and container object 634 is moved away from the first placement location, insertion cursor 638 is displayed at a permissible insertion location corresponding to the current location of contact 630 (e.g., the original location of the selected text). When container object 634 has arrived at the second placement location below contact 630, an indicator (e.g., triangular tip 636 is displayed at the top edge of container object 634, directly below contact 630).

FIGS. 6V-6W illustrate that, when contact 630 continues to move across touch-screen 112, container object 634 is dragged in accordance with the movement of contact 630, while remaining at the second placement location relative to contact 630. Insertion cursor 638 hops from one permissible insertion location to the next permissible insertion location within the editable content 602 in accordance with the current location of contact 630. Although not shown, when lift-off of contact 630 is detected, selected text 632 would be inserted at the location indicated by insertion cursor 638, and selected text 632 would be removed from its original location in the editable content 602.

FIGS. 7A-7J are flow diagrams illustrating a method 700 of interacting with user interface objects (e.g., selecting and moving objects, and displaying menus corresponding to the selected objects) in response to touch inputs, in accordance with some embodiments. The method 700 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

Method 700 relates to a heuristic for determining whether to display a menu for a user interface object and/or to move the user interface object in response to movement of a contact across a touch-sensitive surface. Specifically, after the device detects a contact at a location on the touch-sensitive surface that corresponds to a user interface object, the device determines whether the contact has been kept substantially stationary (e.g., with less than a threshold amount of movement) for at least a threshold amount of time. If the contact has been maintained on the touch-sensitive surface with less than the threshold amount of movement for at least the threshold amount of time (e.g., a touch-hold requirement is met), the device displays a menu corresponding to the object; and if the contact has been kept substantially stationary for at least the threshold amount of time (e.g., after the touch-hold requirement is met) and then moves, the device moves the object according to the contact's movement. As a result, the device is able to provide additional control options associated with a user interface object (e.g., an option to display a menu for the object and an option to move the object) without cluttering the user interface with additional displayed controls. The menu-display and object-move operations can be selected with the same contact (e.g., according to whether movement is detected after the touch-hold requirement is met) without requiring any additional user interface controls to be selected by the user. Providing additional control options without cluttering the UI with additional displayed controls in accordance with the method described herein enhances the operability of the device (e.g., by allowing the user to decide between two control options with the same contact, which reduces user mistakes when operating the device) and makes the user-device interface more efficient (e.g., by helping the user to achieve an intended outcome with required inputs and reducing user mistakes when operating/interacting with the device). Further, providing additional control options in response to a touch-hold input followed by a movement input by the same contact improves the longevity of the device (e.g., by eliminating unnecessary pressure and friction on the touch-sensitive surface that would result from use of an intensity-based input or input based on multiple contacts, thereby reducing structural fatigue of the touch-sensitive surface).

Method 700 is performed at a device having a display and a touch-sensitive surface (e.g., a touch-screen display that serves both as the display and the touch-sensitive surface). The device displays (702) a first user interface (e.g., a home screen, a widget screen, a desktop, a user interface of an application, two (or more) concurrently displayed applications, a browser user interface, an email user interface, a calendar user interface, a table, a spreadsheet, a drawing canvas, a text document, an online-shopping cart, a map, etc.) on the display, wherein the first user interface includes a first user interface object (e.g., an image, an icon, selected text, an application launch icon, a file, a hyperlink, a folder, a control, a shortcut icon, a calendar event, an email message, a communication item, a content item, a widget, a sticker, a banner, a notification, a data item, a graph, an equation, a point-of-interest on a map, etc.) at a first location in the first user interface. While displaying the first user interface that includes the first user interface object at the first location in the first user interface, the device detects (704) a first portion of a first input, including detecting a first contact at a location on the touch-sensitive surface that corresponds to the first user interface object in the first user interface (on the display). In response to detecting the first portion of the first input: in accordance with a determination that the first portion of the first input meets menu-display criteria, wherein the menu-display criteria require that the first contact is maintained on the touch-sensitive surface for more than a first threshold amount of time (e.g., a long-press time threshold) with less than a threshold amount of movement (e.g., 0.2, 0.5, 1, 2, 2.5, or 3 mm) in order for the menu-display criteria to be met (e.g., the menu-display criteria are met when the first contact is kept substantially stationary until the long-press time threshold is reached), the device displays (706) a plurality of selectable options (e.g., a quick action menu or a cut/copy/paste/formatting menu) that corresponds to the first user interface object on the display. This is illustrated in FIG. 5A-5E, or 5F, where quick action menu 530 is displayed when a touch-hold requirement is met by contact 526. This is also illustrated in FIGS. 5AD-5AF, where menu 584 is displayed when a touch-hold requirement is met by contact 578. In some embodiments, the menu-display criteria require that the first contact is maintained on the touch-sensitive surface for more than a first threshold amount of time (e.g., a long-press time threshold) with less than a threshold amount of movement (e.g., 0.2, 0.5, 1, 2, 2.5, or 3 mm) before termination of the first input (e.g., lift-off of the first contact) is detected in order for the menu-display criteria to be met. In some embodiments, the menu-display criteria require that lift-off of the first contact is detected in order for the menu-display criteria to be met, and the menu is displayed upon detecting lift-off of the first contact. In some embodiments, the menu-display criteria do not require that the lift-off of the first contact is detected in order for the menu-display criteria to be met, and the menu is displayed upon detecting that the first threshold amount of time has elapsed and the first contact has made less than the threshold amount of movement prior to the lapsing of the first threshold amount of time (e.g., the time since the detection of the first contact). In accordance with a determination that the first portion of the first input meets object-move criteria, wherein the object-move criteria require that the first contact is maintained on the touch-sensitive surface for more than the first threshold amount of time with less than the threshold amount of movement, and that after the contact has been maintained on the touch-sensitive surface for more than the first threshold amount of time with less than the threshold amount of movement, the first portion of the first input includes first movement of the first contact across the touch-sensitive surface that is greater than the threshold amount of movement, in order for the object-move criteria to be met (e.g., the object-move criteria are met when the first contact moves by more than 2 mm after the long-press time threshold is reached), the device moves the first user interface object or a representation thereof (e.g., a reduced scale image of the first user interface object) from the first location to a second location on the display in accordance with the first movement of the first contact (e.g., without scrolling the first user interface). This is illustrated in FIGS. 5F-5G, where icon 504 is moved in accordance with movement of contact 526 after the touch-hold requirement is met by contact 526. In some embodiments, the menu-display criteria are met before the object-move criteria are met, and the menu-display criteria cease to be met when the object-move criteria are met. In some embodiments, when the menu-display criteria cease to be met, the device ceases to display the menu if the menu was displayed when the menu-display criteria were initially met. In some embodiments, a two-finger movement can start a drag operation immediately without meeting the touch-hold requirement first. This is illustrated in FIGS. 5T-5U, for example, where icon 504 is dragged by a pair of contacts 554 and 556 without the touch-hold requirement being met by the pair of contacts. When two concurrent contacts are detected on the touch-sensitive surface at a location that corresponds to the first user interface object on the display, the object-move criteria require that the two concurrent contacts make a second amount of movement that is greater than the threshold amount of movement, and do not require that the two concurrent contacts be maintained on the touch-sensitive surface with less than the threshold amount of movement for more than the first threshold amount of time before they make the second amount of movement, in order for the object-move criteria to be met (e.g., the object-move criteria are met when intentional movement of two concurrent contacts (e.g., as determined by the amount of movement exceeding the threshold amount of movement) is detected, without regard to whether the two contacts have been kept still for a first threshold amount of time on the touch-sensitive surface first). Examples of using a predefined number of contacts (e.g., two contacts) to initiate a drag operation are described below with reference to method 800.

In some embodiments, in response to detecting the first portion of the first input, in accordance with a determination that the first portion of the first input meets interface-scroll criteria, wherein the interface-scroll criteria require that the first portion of the first input includes second movement of the first contact across the touch-sensitive surface that is greater than the threshold amount of movement and that the second movement is detected before the first contact is maintained on the touch-sensitive surface for more than the first threshold amount of time in order for the interface-scroll criteria to be met (e.g., the interface-scroll criteria are met when the first contact moves by more than 2 mm before the long-press time threshold is met), the device scrolls (708) the first user interface (as a whole) in accordance with the second movement of the first contact. This is illustrated in FIGS. 5M-5N, where movement of contact 538 without first meeting the touch-hold requirement causes user interface 502 to be scrolled (e.g., replaced by user interface 544). Providing an additional control option (e.g., scrolling the interface) based on whether certain conditions are met (e.g., whether a touch-hold input has been detected before movement of the contact) enhances the operability of the device and makes the user-device interface more efficient (e.g., by allowing the user to decide between three control options using the same contact, which reduces user mistakes when operating the device), which, additionally improves the battery life of the device by enabling the user to use the device more quickly and efficiently.

In some embodiments, in response to detecting the first portion of the first input, in accordance with a determination that the first portion of the first input meets object-activation criteria, wherein the object-activation criteria require that the first contact is maintained on the touch-sensitive surface for less than the first threshold amount of time (e.g., the long-press time threshold) with less than the threshold amount of movement (e.g., 2 mm) before termination of the first input (e.g., lift-off of the first contact) is detected in order for the object-activation criteria to be met (e.g., the object-activation criteria are met by a tap input), the device performs (710) an operation that corresponds to the first user interface object, including ceasing to display the first user interface and displaying a second user interface that corresponds to the first user interface object (e.g., the first user interface object is an application launch icon for a first application and the operation is launching the first application; the first user interface object represents a content item and the operation is opening and displaying the content item; or the first user interface object is a hyperlink and the operation is loading a webpage or other resources that correspond to the hyperlink etc.). For example, a tap input on icon 504 in FIG. 5A would cause home screen user interface 502 to be replaced by a user interface of the messages application. Providing an additional control option (e.g., activating the user interface object) based on whether certain conditions are met (e.g., whether a tap input is detected) enhances the operability of the device and makes the user-device interface more efficient (e.g., by allowing the user to decide between a plurality of control options with the same contact, which reduces user mistakes when operating the device), which, additionally improves the battery life of the device by enabling the user to use the device more quickly and efficiently.

In some embodiments, in response to detecting the first portion of the first input: in accordance with a determination that the contact has been maintained on the touch-sensitive surface for more than the first threshold amount of time with less than the threshold amount of movement, the device changes (712) an appearance of the first user interface object (e.g., lifting the first user interface object off of the original z-layer of the first user interface object; enlarging the first user interface object, or otherwise indicating selection of the first user interface object or activation of a mode for displaying a menu or moving the object in accordance with a predefined heuristic) to indicate that the first contact has been maintained for more than the first threshold amount of time with less than the threshold amount of movement. This is illustrated in FIGS. 5D and 5F, where icon 504 is lifted up once the touch-hold requirement is met by contact 526. This is also illustrated in FIG. 5AF, where a copy of hyperlink 580 is lifted up, leaving a ghost image of hyperlink 580 on user interface 574. When a replica, copy, or representation of an object is referred to in this specification, the replica, copy, or representation may be also considered to be the object itself with an altered appearance; and in such cases, the object remaining at its original location may be considered to be the replica, copy, or representation of the object. In some embodiments, the device changes the appearance of the first user interface (e.g., blurring or darken regions outside of the first user interface object) to indicate that the first contact has been maintained for more than the first threshold amount of time with less than the threshold amount of movement and that the mode for displaying a menu or moving the object in accordance with a predefined heuristic has been activated. In some embodiments, the lifting animation is generated by an application-independent module that is used by multiple different applications to generate dropping animations. Indicating that criteria for activating a control option have been met for a user interface object (e.g., by changing an appearance of the user interface object) provides the user with improved visual feedback regarding the internal state of the device. Providing improved feedback enhances the operability of the device and makes the user-device interface more efficient (e.g., by helping the user to achieve an intended outcome with required inputs and reducing user mistakes when operating/interacting with the device), which, additionally, reduces power usage and improves battery life of the device by enabling the user to use the device more quickly and efficiently.

In some embodiments, changing the appearance of the first user interface object to indicate that the first contact has been maintained for more than the first threshold amount of time with less than the threshold amount of movement includes (714) one or more of: reducing an opacity of the first user interface object, increasing a size of the first user interface object, changing a simulated z-height of the first user interface object relative to a user interface in which the first user interface object was displayed, or displaying a shadow behind the first user interface object to indicate a separation of the first user interface object from the user interface in which the first user interface object was displayed. This is illustrated in FIGS. 5D, 5F, 5AF, and 6G, for example. Providing improved visual feedback by changing the appearance of the user interface object enhances the operability of the device and makes the user-device interface more efficient (e.g., by informing the user of the changes in the internal state of the device, helping the user to achieve an intended outcome with the required inputs, and reducing user mistakes when operating/interacting with the device), which, additionally, reduces power usage and improves battery life of the device by enabling the user to use the device more quickly and efficiently.

In some embodiments, the menu-display criteria are (716) met and the plurality of selectable options are displayed before lift-off of the first contact is detected. This is illustrated in FIGS. 5F and 5AF, for example. Performing an operation (e.g., displaying a menu) when a set of conditions have been met without requiring further user input enhances the operability of the device and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, in response to detecting the first portion of the first input: in accordance with the determination that after the contact has been maintained on the touch-sensitive surface for more than the first threshold amount of time with less than the threshold amount of movement, and that the first portion of the first input includes first movement of the first contact across the touch-sensitive surface that is greater than the threshold amount of movement, the device ceases (718) to display the plurality of selectable options that correspond to the first user interface object. This is illustrated in FIGS. 5F-5G and FIGS. 5AF-5AG, for example. In some embodiments, if termination of the first input (e.g., lift-off of the first contact) is detected before the object-move criteria are met, the device maintains display of the menu after termination of the first input is detected. Ceasing display of the results/progress of one control option (e.g., menu-display operation) in order to display results/progress of a subsequent control option (e.g., object-move operation) upon activation of the subsequent control option enhances the operability of the device and makes the user-device interface more efficient (e.g., by reducing user confusion, and reducing user mistakes when operating/interacting with the device) which, additionally, reduces power usage and improves battery life of the device by enabling the user to use the device more quickly and efficiently.

In some embodiments, the menu-display criteria are met (720) and the plurality of selectable options are displayed after lift-off of the first contact is detected. This is illustrated in FIG. 5E, for example. Displaying the menu after completely ascertaining the user's intent to display the menu (e.g., after detecting the lift-off of the contact without detecting the movement after the touch-hold input) enhances the operability of the device and makes the user-device interface more efficient (e.g., by reducing user confusion, and reducing user mistakes due to the confusion), which, additionally, reduces power usage and improves battery life of the device by enabling the user to use the device more quickly and efficiently.

In some embodiments, the object-move criteria are met (722) and the first user interface object is moved from the first location to the second location in accordance with the first movement of the first contact before termination of the first input is detected. This is illustrated in FIGS. 5F-5G, for example. This is further illustrated in FIGS. 5AF-5AG, for example. Performing an operation when a set of conditions has been met (e.g., moving an object when object-move criteria are met) enhances the operability of the device and makes the user-device interface more efficient (e.g., by helping the user to achieve an intended outcome with the required inputs, reducing the number of inputs needed to perform an operation, and reducing user mistakes when operating/interacting with the device) which, additionally, improves the battery life of the device (e.g., by enabling the user to use the device more quickly and efficiently).

In some embodiments, the device detects (724) termination of the first input, including detecting lift-off of the first contact. In response to detecting the termination of the first input: in accordance with a determination that the object-move criteria have been met by the first input and that a current location of the first user interface object on the display (e.g., the second location on the display or a third location on the display) corresponds to a permissible drop-off location in a currently displayed user interface on the display (e.g., a new location in the first user interface that is different from the initial location of the first user interface object in the first user interface, or a new location in a second user interface that is different from the first user interface), the device displays the first user interface object or a copy thereof at the permissible drop-off location in the currently displayed user interface on the display after the termination of the first input. This is illustrated in FIGS. 5R-5S, and 5AH-5AI, for example. Performing a move operation according to whether a destination for the move is permissible enhances the operability of the device and makes the user-device interface more efficient (e.g., by helping the user to achieve an intended outcome with the required inputs and reducing user mistakes when operating/interacting with the device) which, additionally, improves the battery life of the device (e.g., by enabling the user to use the device more quickly and efficiently).

In some embodiments, in response to detecting the termination of the first input: in accordance with a determination that the object-move criteria have been met by the first input and that the current location of the first user interface object on the display does not correspond to a permissible drop-off location in the currently displayed user interface on the display, the device provides (726) visual feedback to indicate a cancelation of an object-move operation that corresponds to the first user interface object. In some embodiments, the first user interface object is restored at the first location after the termination of the first input (e.g., an animation showing the restoration of the first user interface object at its original location in the first user interface is displayed). In some embodiments, if the first user interface is not currently displayed at the time when the termination of the first input is detected, visual/audio/haptic feedback to indicate the cancelation of the object-move operation is provided, optionally, without being accompanied with the animation showing the restoration of the first user interface object at its original location in the first user interface. In some embodiments, the dropping animation is generated by an application-independent module that is used by multiple different applications to generate dropping animations. Canceling a move operation according to whether a destination for the move is permissible enhances the operability of the device and makes the user-device interface more efficient (e.g., by helping the user to achieve an intended outcome with the required inputs and reducing user mistakes when operating/interacting with the device) which, additionally, improves the battery life of the device (e.g., by enabling the user to use the device more quickly and efficiently).

In some embodiments, while moving the first user interface object or the representation thereof from the first location to the second location: in accordance with a determination that the object-move criteria have been met by the first input and that a current location of the first user interface object on the display (e.g., the second location on the display or a third location on the display) corresponds to a permissible drop-off location in a currently displayed user interface on the display, the device displays (728) the first user interface object or the representation thereof with a first appearance (e.g., with a first translucency level); and in accordance with a determination that the object-move criteria have been met by the first input and that the current location of the first user interface object on the display does not correspond to a permissible drop-off location in the currently displayed user interface on the display, displaying the first user interface or the representation thereof with a second appearance that is different from the first appearance (e.g., with a second translucency level that is greater than the first translucency level). This is illustrated in FIG. 5J (e.g., icons 504 and 520 are transparent to indicate that permissible drop-off positions are not available) and FIG. 5M (e.g., icons 504 and 520 are opaque to indicate that permissible drop-off positions have been identified), for example. This is also illustrated in FIG. 5AG (e.g., hyperlink 582 is transparent to indicate the drop-off is not permissible in user interface 574) and FIG. 5AH (hyperlink 582 is opaque to indicate the drop-off is permissible in user interface 576), for example. In some embodiments, if the current location of the first user interface object does not correspond to a permissible drop-off location in the currently displayed user interface, the first user interface object is displayed with a third translucency level that is less than the first translucency level. Providing improved visual feedback (e.g., changing the appearance of a user interface object according to whether the object is located near a permissible drop-off location) enhances the operability of the device and makes the user-device interface more efficient (e.g., by alerting the user of permissible drop-off locations, thereby helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the second location on the display corresponds (730) to a permissible drop-off location for the first user interface object within the first user interface. For example, the first user interface object is moved to another location in the same user interface (e.g., a user interface of a currently displayed application) with or without scrolling the user interface as a whole. This is illustrated in FIG. 6F-6O, where selected text is dragged and dropped within the same user interface 602, for example. Providing visual feedback regarding whether the object is located near a permissible drop-off location in the same user interface enhances the operability of the device and makes the user-device interface more efficient (e.g., by alerting the user of permissible drop-off locations, thereby helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the second location on the display corresponds (732) to a permissible drop-off location in a third user interface that is concurrently displayed with the first user interface on the display when the first portion of the first input is detected. For example, the first user interface object is moved to another location in a user interface that is displayed side by side with the first user interface on the display. In some embodiments, the two concurrently displayed user interfaces are interfaces of two different applications. This is illustrated in FIGS. 5AD-5AG, for example. In some embodiments, the two concurrently displayed user interfaces are interfaces of the same application. In some embodiments, the two user interfaces are concurrently displayed before the movement of the first user interface object is started. In some embodiments, the third user interface is displayed after the movement of the first user interface object is already started, for example, in response to another user input by a different contact that launches a new application or opening a new user interface of the same application. Providing visual feedback regarding whether the object is located near a permissible drop-off location in a concurrently displayed user interface enhances the operability of the device and makes the user-device interface more efficient (e.g., by alerting the user of permissible drop-off locations, thereby helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the second location on the display corresponds (734) to a permissible drop-off location in a fourth user interface that was not concurrently displayed with the first user interface on the display when the first portion of the first input was detected. For example, the fourth user interface is displayed after the movement of the first user interface object is already started, for example, in response to another user input by a different contact that launches a new application or opening a new user interface of the same application. This is illustrated in FIGS. 5M-5O, where the second location is on user interface 544 which was not displayed when contact 526 was first detected on icon 504. This is also illustrated in FIGS. 5AJ-5AP, where the second location is on user interface 502 which was not displayed when contacts 590 was first detected. Providing visual feedback regarding whether the object is located near a permissible drop-off location in a user interface that is newly displayed enhances the operability of the device and makes the user-device interface more efficient (e.g., by alerting the user of permissible drop-off locations, thereby helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the first user interface is (736) a user interface of a first application, and the second location on the display corresponds to a permissible drop-off location in a user interface of a second application that is distinct from the first application. For example, the first user interface of the first application and the user interface of the second application are concurrently displayed applications. This is illustrated in FIGS. 5AD-5AI for example. In another example, the second application is displayed after the first application is closed. In another example, the second application is displayed before the first application is closed and remains displayed after the first application is closed. This is illustrated in FIGS. 5AJ-5AP, for example. Providing visual feedback regarding whether the object is located near a permissible drop-off location in a user interface of a different application enhances the operability of the device and makes the user-device interface more efficient (e.g., by alerting the user of permissible drop-off locations, thereby helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the second location corresponds (738) to a permissible drop-off location in a fifth user interface, and the first user interface and the fifth user interface are distinct user interfaces of a first application. For example, the first user interface and the fifth user interface are concurrently displayed user interfaces of the same application when the input is detected. This is illustrated in FIGS. 6G-6O, for example. In another example, the fifth user interface is displayed after the first user interface is closed. This is illustrated in FIGS. 5M-5O, for example. In another example, the fifth user interface is displayed before the first user interface is closed and remains displayed after the first user interface is closed. Providing visual feedback regarding whether the object is located near a permissible drop-off location in a distinct user interface of the same application enhances the operability of the device and makes the user-device interface more efficient (e.g., by alerting the user of permissible drop-off locations, thereby helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the device detects (740) termination of the input (e.g., detecting lift-off of the first contact after the first movement of the first contact) while a current location of the user interface object (e.g., the second location) on the display corresponds to a permissible drop-location in a currently displayed user interface (e.g., the same user interface, a concurrently displayed user interface in the same application or a different application, a newly displayed user interface in the same or a different application, etc.) on the display. In response to detecting the termination of the first input: in accordance with a determination that the currently displayed user interface and the first user interface are interfaces of two distinct applications: the device displays a copy of the first user interface object at the permissible drop-off location in the currently displayed user interface on the display after the termination of the first input; and the device maintains the first user interface object at the first location in the first user interface after the termination of the first input (e.g., if the first user interface is still displayed on the display). In some embodiments, if the first user interface is no longer displayed when the termination of the input is detected, the first user interface object will be displayed at the first location in the first user interface when the first user interface is subsequently redisplayed in response to another user input. In accordance with a determination that the currently displayed user interface and the first user interface are interfaces of a common application, the device displays the first user interface object at the permissible drop-off location in the currently displayed user interface on the display after the termination of the first input without maintaining the first user interface object at the first location in the first user interface after the termination of the first input (e.g., if the first user interface is still displayed on the display). For example, if the first user interface object is dragged between two applications, the object is copied to the new location in the second application; and if the first user interface object is dragged within the same application, the object is moved from the original location to the new location in the same application. In some embodiments, if the first user interface is no longer displayed when the termination of the input is detected, the first user interface object will not be displayed at the first location in the first user interface when the first user interface is subsequently redisplayed in response to another user input. In FIGS. 5A-5S, icons are moved from one location to another within the home screen user interface (e.g., two pages of the home screen user interface). In FIGS. 5AD-5AI, hyperlink 580 is copied from user interface 574 of a browser application to user interface 576 of a text editor application. In FIGS. 5AJ-5AP, URL 596 is copied from the user interface 576 of the text editor application to home screen user interface 502. In FIGS. 5AQ-5BD, images 503, 505, and 507 are copied from user interface 501 of a search engine application to user interface 576 of the text editor application. Deciding whether to move or copy an object based on preset conditions and without prompting the user (e.g. according to whether the object's destination is in the same application or a different application) enhances the operability of the device and makes the user-device interface more efficient (e.g., by reducing the number of inputs needed to perform a copy or move operation and reducing user mistakes when interacting with/operating the device), which, additionally, reduces power usage and improves battery life of the device by enabling the user to use the device more quickly and efficiently.

In some embodiments, while maintaining the first contact (e.g., before termination of the first input), the device detects (742) a second input (e.g., a swipe gesture, a tap gesture, a press input, etc.), including detecting a second contact on the touch-sensitive surface that is distinct from the first contact on the touch-sensitive surface. In response to detecting the second input, the device performs an operation that corresponds to the second input while maintaining display of the first user interface object or the representation thereof independent of any effect of the operation on the first user interface. In some embodiments, performing the operation includes at least one of: (1) scrolling the first user interface, (2) displaying a respective user interface that was not displayed when the first input was detected, and (3) replacing the first user interface with the respective user interface. For example, in some embodiments, when the first user interface object is in the process of being moved by the first contact, the device continue to detect additional inputs by other contact(s), such as a tap input to open a new application, a swipe input to scroll the user interface, a home button press or home gesture to dismiss the first user interface and display a home screen, a pinch or depinch gesture to zoom the first user interface, a multitasking gesture to display an application-switcher user interface followed by a selection input to activate a different application from the application-switcher user interface, etc. This is illustrated in FIGS. 5M-5O, where a swipe input is detected to switch to home screen user interface 502 to home screen user interface 544. In FIGS. 5AK-5AM, a home gesture by contact 599 is detected to dismiss user interface 576 and 574, and display home screen user interface 502. In FIGS. 5AX-5AY, a home gesture by contact 535 is detected to dismiss user interface 501 and display home screen user interface 502. In FIGS. 5AY-5BA, a tap input by contact 537 is detected to launch the text editor application and display user interface 576. Allowing the user interface to accept additional inputs and perform additional corresponding operations that are independent of the move-operation by the first contact enhances the operability of the device and makes the user-device interface more efficient (e.g., by reducing the number of inputs needed to perform additional tasks). Additionally, enabling the additional operations makes additional objects available to join the selected object and be moved as a group, and makes additional user interfaces available as possible drop-off locations, thereby further enhancing the operability of the device (e.g., by helping the user to achieve additional intended outcomes with the required inputs without having to wait for the first intended outcome to be completed, or without having to always performing a set of required operations in a fixed order), which, additionally, reduces power usage and improves battery life of the device by enabling the user to use the device more quickly and efficiently.

In some embodiments, after the object-move criteria are met and before termination of the first input is detected, the device detects (744) a third input, including detecting a third contact on the touch-sensitive surface at a location on the touch-sensitive surface that corresponds to a second user interface object (e.g., the second user interface object is of the same object type as the first user interface object, or the second user interface object is of a different object type from the first user interface object) in a currently displayed user interface (e.g., the first user interface or another user interface in the same application or a different application) and subsequently detecting lift-off of the third contact from the touch-sensitive surface. In response to detecting the third input: in accordance with a determination that the third input meets object-selection criteria, wherein the object-selection criteria require that the third contact is maintained on the touch-sensitive surface for less than the first threshold amount of time (e.g., the long-press time threshold) with less than the threshold amount of movement (e.g., 2 mm) before the lift-off of the third contact is detected in order for the object-selection criteria to be met (e.g., the object-selection criteria are met by a tap input on the second user interface object), the device moves the second user interface object or a representation thereof to a respective location on the display that corresponds to a current location of the first contact on the touch-sensitive surface (e.g., the second user interface object or a representation thereof moves toward the current location of the first user interface object or the representation thereof and joins it as a collection of objects that is being moved by the first contact). This is illustrated in FIGS. 5G-5J, where icon 520 is moved toward contact 526 in response to a tap input by contact 532. This is also illustrated in FIGS. 5V-5Y, where icons 520 and 522 move toward contacts 554 and 556 in response to two two-finger tap inputs, respectively. This is further illustrated in FIGS. 5AQ-5AW, where images 505 and 507 (or replicas thereof) move toward contacts 517 and 519 in response to two two-finger tap inputs, respectively. In some embodiments, the decision as to whether to add the second user interface object to the collection or drop the second user interface object when lift-off of the third contact is detected depends on whether the second user interface object is close enough to the first user interface object (e.g., adding the second user interface object to the collection if the second user interface object is touching or overlapping the first user interface object or the second user interface object is within a pre-defined distance of the first user interface object and not adding it if the conditions are not met) or whether the third contact is close enough to the first contact (e.g., adding the second user interface object to the collection if the third contact is within a predefined distance of the first contact and not adding it if the conditions are not met). Providing an option for the user to add an additional object into a collection with the initially selected object while initial object is still selected makes the user-device interface more efficient (e.g., by reducing the number of inputs needed to select multiple objects and perform similar tasks on each object, thereby helping the user to perform multiple operations with the required inputs without having to wait for the first operation to be completed, or without requiring the operations always be performed in a fixed order (e.g., selecting all objects and then move)) which, additionally, reduces power usage and improves battery life of the device by enabling the user to use the device more quickly and efficiently.

In some embodiments, after moving the second user interface object or the representation thereof to the respective location on the display that corresponds to the current location of the first contact on the touch-sensitive surface, the device detects (746) a second portion of the first input, including detecting third movement of the first contact from a third location to a fourth location on the touch-sensitive surface. I response to detecting the second portion of the first input, the device moves the second user interface object and the first user interface object on the display in accordance with the third movement of the first contact. This is illustrated in FIGS. 5G-5K, where icon 520 and icon 504 move with contact 526 as a collection. This is also illustrated in FIGS. 5V-5Z, where icons 504, 520 and 522 move with contacts 554 and 556 as a collection. This is further illustrated in FIGS. 5AQ-5AX, where images 503, 505 and 507 (or replicas thereof) move with contacts 517 and 519 as a collection. Providing an option for the user to add an additional object into a collection with the initially selected object while initial object is still selected, and further allowing the user to simultaneously move the objects as a collection make the user-device interface more efficient (e.g., by reducing the number of inputs needed to select multiple objects and perform similar tasks on each object), which, additionally, reduce power usage and improve battery life of the device by enabling the user to use the device more quickly and efficiently.

In some embodiments, after moving the second user interface object or the representation thereof to the respective location on the display that corresponds to the current location of the first contact on the touch-sensitive surface: the device merges (748) display of the first user interface object or the representation thereof and display of the second user interface object or the representation thereof into a representation of an object collection (e.g., a stack of objects that moves with the first contact as a group). While displaying the object collection on the display, the device detects a fourth input, including detecting a depinch gesture (e.g., two concurrent contacts that move apart from each other) at a location on the touch-sensitive surface that corresponds to the object collection on the display. In some embodiments, detecting the depinch gesture includes detecting a second contact while maintaining the first contact, and detecting relative movement between the first and second contacts. In response to detecting the fourth input, the device expands the representation of the object collection to separately display the first user interface object or the representation thereof and the second user interface object or the representation thereof (e.g., the stack of objects spreads out into individual objects in response to the depinch gesture detected on the stack of objects). This is illustrated in FIGS. 5P-5Q, for example. In some embodiments, if two concurrent contacts are used to activate the move operation (e.g., without requiring the two concurrent contacts to be maintained at the location of the first user interface object with less than the threshold amount of movement for at least the threshold amount of time), tapping on other objects (e.g., with a single contact or with two other concurrent contacts) while maintaining the two concurrent contacts on the touch-sensitive surface cause causes the other objects to join the first user interface object as a collection. During subsequent movement of the two concurrent contacts, the device moves the collection of objects as a whole in accordance with a determination that the movement of the two contacts is substantially co-linear (e.g., parallel and synchronous movement in the same direction); the device spreads out the collection to reveal its constituent objects in accordance with a determination that the movement of the two contacts are relative to each other (e.g., as in a depinch gesture). Providing an option for the user to view objects in a collection during a move operation (e.g. by expanding the collection to separately display each object) improves the operability of the device and makes the user-device interface more efficient (e.g., by helping the user to provide proper inputs, and by allowing the user to reviewing the state of the current operation without completing or cancelling the operation), which, additionally, reduces power usage and improves battery life of the device by enabling the user to use the device more quickly and efficiently.

In some embodiments, the first user interface object is (750) a first application launch icon that corresponds to a first application, and wherein the first user interface is a home screen user interface that includes a plurality of application launch icons that correspond to a plurality of different applications including the first application. This is illustrated in FIG. 5A-5C, for example. Providing an additional control option (e.g., activating an application launch icon) without cluttering the UI with additional displayed controls enhances the operability of the device (e.g., by allowing the user to decide between a plurality of control options with the same contact, which reduces user mistakes when operating the device) and improves the longevity of the device (e.g., by eliminating unnecessary pressure and friction on the touch-sensitive surface that would result from multiple inputs, thereby reducing structural fatigue of the touch-sensitive surface).

In some embodiments, in response to detecting the first portion of the first input: in accordance with a determination that the first portion of the first input meets the object-move criteria, the device activates (752) an interface reconfiguration mode, wherein in the interface reconfiguration mode, a respective application launch icon of the plurality of application icons is repositionable by a drag input directed to the respective application launch icon without requiring the drag input to meet the object-move criteria (e.g., in the interface reconfiguration mode, a respective application launch icon that is touched by a contact can be moved by the contact without requiring the contact to have stayed stationary for the long-press time threshold before the movement). This is illustrated in FIGS. 5A-5G, for example. This is also illustrated in FIGS. 5T-5Y, for example. Providing an additional control option (e.g., activating a reconfiguration mode) when the object-move-criteria are met enhances the operability of the device and makes the user-device interface more efficient (e.g., by activating multiple related operations with the same input, which reduces the number of inputs required to perform interface reconfiguration operations), which, additionally, reduces power usage and improves battery life of the device by enabling the user to use the device more quickly and efficiently.

In some embodiments, in response to detecting the first portion of the first input: in accordance with a determination that the first portion of the first input meets interface-reconfiguration criteria, wherein the interface-reconfiguration criteria require that the first contact is maintained on the touch-sensitive surface for more than a second threshold amount of time that is greater than the first threshold amount of time (e.g., the second threshold amount of time is an augmented long-press time threshold) with less than the threshold amount of movement (e.g., 2 mm) before termination of the first input (e.g., lift-off of the first contact) is detected in order for the interface-reconfiguration criteria to be met (e.g., the interface reconfiguration criteria are met when the first contact is substantially kept stationary before the augmented long-press time threshold is reached), the device activates (754) an interface reconfiguration mode, wherein in the interface reconfiguration mode, a respective application launch icon of the plurality of application icons is repositionable by a drag input without requiring the drag input to meet the object-move criteria (e.g., in the interface reconfiguration mode, a respective application launch icon that is touched by a contact can be moved by the contact without requiring the contact to have stayed stationary for the long-press time threshold before the movement). In some embodiments, there are at least two-ways to activate the interface reconfiguration mode (e.g., the jiggle-delete mode for the home screen user interface), including (1) touch and hold on the first user interface object for a first threshold amount of time T1 and then drag the first user interface object away from its original location, and (2) touch and hold on the first user interface object for a second threshold amount of time T2 that is greater than T1. Providing an additional control option (e.g., activating the reconfiguration mode) based on whether the contact is kept substantially stationary for a second threshold amount of time enhances the operability of the device and makes the user-device interface more efficient (e.g., by allowing the user to decide between a plurality of control options with the same contact, which reduces user mistakes when operating the device), which further improves the longevity of the device (e.g., by eliminating unnecessary pressure on the touch-sensitive surface that would result from an intensity-based requirement for activating the reconfiguration mode, thereby reducing structural fatigue of the touch-sensitive surface).

In some embodiments, the first user interface includes (756) first content, and the first user interface object is selected content that is a selected portion of the first content in the first user interface. This is illustrated in FIGS. 6A-6W, where the first user interface object is selected text, for example. Selecting a portion of content, displaying a menu related to the selection, and/or moving the selected content based on the input meeting different conditions enhance the operability of the device and make the user-device interface more efficient (e.g., by allowing the user to decide between a plurality of control options with the same contact, which reduces user mistakes when operating the device), which, additionally, reduces power usage and improves battery life of the device by enabling the user to use the device more quickly and efficiently.

In some embodiments, the display and the touch-sensitive surface are integrated (758) in a touch-screen display, and moving the first user interface object or the representation thereof from the first location to the second location on the display in accordance with the first movement of the first contact includes: displaying a copy of at least a portion of the selected content in a container object on the touch-screen display (e.g., the selected text is lifted off of the first user interface and displayed in a semi-transparent or translucent platter, leaving a ghost image of the selected text remaining in the first user interface); and moving the container object containing the copy of at least a portion of the selected content on the display in accordance with the first movement of the first contact, including maintaining a predefined placement location of the container object relative to a characteristic location of the first contact (e.g., a centroid or apex of the first contact, or other dynamically determined characteristic locations of the first contact) during the first movement of the first contact (e.g., such that a predefined region of the container object (e.g., a top edge of the container object) is moved to and remains slightly below or at the first contact on the touch-sensitive surface (e.g., the center of the top edge of the container object is aligned with the apex or centroid of the first contact on the touch screen) during the first movement of the first contact. This is illustrated in FIGS. 6A-6W, where selected text (or a copy thereof) (e.g., selected text 606 or container object 612; selected text 620 or container object 624; selected text 632 or container object 634) shifts downward to below the contact (e.g., contacts 610, 622, 630, respectively). In some embodiments, the predefined region of the container object is indicated by a visual indicator (e.g., a pointy tip at the top center of the container object, when the container object is first moved to the predefined placement location). Keeping the selected content from obscuring possible insertion locations (e.g., locations near the contact) while the selected content is being dragged by the contact (e.g., by moving a copy of a portion of the selected content while maintaining a predefined placement location of the content relative to the contact) enhances the operability of the device and makes the user-device interface more efficient (e.g., by allowing the user to have a better view of the user interface during the move operation, thereby helping the user to achieve an intended outcome with the required inputs and reducing user mistakes when operating/interacting with the device), which, additionally, reduce power usage and improves battery life of the device by enabling the user to use the device more quickly and efficiently.

In some embodiments, displaying a copy of at least a portion of the selected content in a container object includes (760) resizing the container object and the copy of at least a portion of the selected content in accordance with a predefined scaling constraint (e.g., scaling the selected text to fit within the container object of a predefined size, displaying only a portion of the selected text that would fit within the container object of a predefined size, or scaling the selected text by a predefined ratio and displaying only a portion of the scaled text that would fit within the container object of a predefined size). This is illustrated in FIGS. 6Q-6S, for example. In some embodiments, when only a portion of the selected text can fit within the container object of the predefined size, the bottom portion of the container object and the text displayed within the bottom portion of the container object are shown as faded and/or more translucent that the top portion of the container object and the text displayed within the top portion of the container object. This is illustrated in FIG. 6U, for example. Keeping a selected object from obscured possible insertion locations while it is being dragged by the contact (e.g., by moving a copy of a portion of the selected content and scaling it according to a scaling constant) enhances the operability of the device and makes the user-device interface more efficient (e.g., by allowing the user to have a better view of the user interface during the input, thereby helping the user to achieve an intended outcome with the required inputs and reducing user mistakes when operating/interacting with the device), which, additionally, reduces power usage and improves the battery life of the device by enabling the user to use the device more quickly and efficiently.

In some embodiments, the first user interface object is (762) a hyperlink (e.g., a URL, a bookmark, etc.) to first content (e.g., a webpage, a media file, a document, an electronic book, etc.), the second location on the display corresponds to a location on a home screen user interface (e.g., where the home screen user interface has been displayed concurrently with the first user interface since before the first user interface object is picked up, or the home screen user interface is displayed after the first user interface object is picked up and after the first user interface is dismissed by an additional input). The device detects termination of the first input, including detecting lift-off of the first contact. In response to detecting the termination of the first input, the device displays a representation of the first content (e.g., an icon for the hyperlink) on the home screen user interface, wherein activation of the representation of the first content (e.g., a tap on the icon for the hyperlink) causes display of the first content (e.g., a webpage, a media file, a document, an electronic book, etc.) on the display. This is illustrated in FIGS. 5AI-5AP, where URL 596 is dropped onto home screen user interface 502 as web clipping 598', for example. Selecting a hyperlink and copying it onto a home screen where it can more easily be activated enhance the operability of the device and make the user-device interface more efficient (e.g., by reducing the number of inputs needed to open linked content, thereby helping the user to achieve an intended outcome with the required inputs and reducing user mistakes when operating/interacting with the device) which, additionally, reduces power usage and improves battery life of the device by enabling the user to use the device more quickly and efficiently.

It should be understood that the particular order in which the operations in FIGS. 7A-7J have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 900) are also applicable in an analogous manner to method 700 described above with respect to FIGS. 7A-7J. For example, the contacts, gestures, user interface objects, time thresholds, focus selectors, and/or animations described above with reference to method 700 optionally have one or more of the characteristics of the contacts, gestures, user interface objects, time thresholds, focus selectors, and/or animations described herein with reference to other methods described herein (e.g., methods 800 and 900). For brevity, these details are not repeated here.

The operations in the information processing methods described above are, optionally, implemented by running one or more functional modules in information processing apparatus such as general purpose processors (e.g., as described above with respect to FIGS. 1A and 3) or application specific chips.

The operations described above with reference to FIGS. 7A-7J are, optionally, implemented by components depicted in FIGS. 1A-1B. For example, detection operation 704 and move operation 706 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 8A-8F are flow diagrams illustrating a method 800 of interacting with user interface objects (e.g., selecting and moving objects, and displaying menus corresponding to the selected objects) in response to touch inputs, in accordance with some embodiments. The method 800 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

Method 800 relates to providing two alternative gestures for triggering a move operation for a user interface object based on the number of contacts used in the gestures. Specifically, when a first number of contacts (e.g., two contacts) are detected, the move operation is triggered by movement of the second number of contacts without requiring that the second number of contacts be kept substantially stationary for a first threshold amount of time (e.g., no tap-hold requirement before movement of the contacts). When a second number of contacts (e.g., a single contact) are detected, the device requires that the first number of contacts be kept substantially stationary for at least the first threshold amount of time (e.g., tap-hold is required) before the subsequent movement of the first number of contacts triggers the move operation. In addition, movement of the first number of contacts without the initial stationary period (e.g., without the touch-hold) is optionally reserved for triggering other operations. Providing the aforementioned control options based on both the number of contacts in an input and whether an initial touch-hold requirement is met enhances the operability of the device and makes the user-device interface more efficient (e.g., by reducing the number of control affordances required in a user interface to accomplish different control options, and permitting multiple alternative ways to trigger the same operation), which, additionally, reduces power usage and improves battery life of the device by enabling the user to use the device more quickly and efficiently.

Method 800 is performed at a device having a display and a touch-sensitive surface (e.g., a touch-screen display that serves both as the display and the touch-sensitive surface). The device displays (802) a first user interface (e.g., a home screen, a widget screen, a desktop, a user interface of an application, two (or more) concurrently displayed applications, a browser user interface, an email user interface, a calendar user interface, a table, a spreadsheet, a drawing canvas, a text document, an online-shopping cart, a map, etc.) on the display, wherein the first user interface includes a first user interface object (e.g., an image, an icon, selected text, an application launch icon, a file, a hyperlink, a folder, a control, a shortcut icon, a calendar event, an email message, a communication item, a content item, a widget, a sticker, a banner, a notification, a data item, a graph, an equation, a point-of-interest on a map, etc.) at a first location in the first user interface. While displaying the first user interface that includes the first user interface object, the device detects (804) a first input that includes a first portion of the first input and a second portion of the first input, wherein detecting the first portion of the input includes detecting one or more first contacts at a location on the touch-sensitive surface that corresponds to the first user interface object in the first user interface (on the display) and detecting the second portion of the first input that includes detecting first movement of the one or more first contacts across the touch-sensitive surface, wherein the first user interface object is displayed at the first location in the first user interface while the first portion of the first input is detected. In response to detecting the first input: in accordance with a determination that the second portion of the first input (e.g., the first movement of the contact(s)) was detected before the one or more first contacts had been detected at the location on the touch-sensitive surface for a first threshold amount of time (e.g., a long press time threshold) without more than a threshold amount of movement (e.g., 2 mm) (e.g., in accordance with a determination that the one or more first contacts had been kept substantially stationary over the first user interface object on the touch-screen for the first threshold amount of time before the first movement of the one or more first contacts are detected): in accordance with a determination that the first input has a first predefined number of contacts (e.g., two contacts) (and, optionally, that the first predefined number of contacts are detected within a threshold distance of one another (e.g., the two contacts are no more than 1 cm apart)), the device drags (806) the first user interface object or a representation thereof relative to the first user interface (e.g., dragging the first user interface object across the first user interface, without scrolling the first user interface) in accordance with the second portion of the first input (e.g., synchronous and parallel movement of the two contacts in the same direction); and in accordance with a determination that the first input has a second predefined number of contacts (e.g., a single contact), the device forgoes dragging the first user interface object or the representation thereof (e.g., a reduced scale image of the first user interface object) relative to the first user interface (e.g., instead, scrolling the first user interface as a whole) in accordance with the second portion of the first input; and in accordance with a determination that the second portion of the first input (e.g., the first movement of the contact(s)) was detected after the one or more first contacts had been detected at the location on the touch-sensitive surface for at least the first threshold amount of time without more than the threshold amount of movement (e.g., in accordance with a determination that the one or more first contacts moved after having been kept substantially stationary over the first user interface object on the touch-screen for the first threshold amount of time), the device drags the first user interface object or the representation thereof (e.g., a reduced scale image of the first user interface object) relative to the first user interface (e.g., dragging the first user interface object across the first user interface, without scrolling the first user interface) in accordance with the second portion of the first input (e.g., without regard to whether the first input has a the first predefined number of contacts or the second predefined number of contacts). This is illustrated in FIGS. 5A-5G, where a touch-hold requirement needs to be met by a single contact 526 on icon 504 in order to drag icon 504 or a copy thereof across the display; and in FIGS. 5T-5U, where a pair of contacts 554 and 556 drags icon 504 or a copy thereof across the display without first meeting the touch-hold requirement; and in FIGS. 5M-5O, where a single contact 538 did not meet the touch-hold requirement and movement of the single contact 538 causes home screen user interface 502 to be scrolled and replaced by another home screen user interface 544. This is also illustrated in FIGS. 5AQ-5AU, where touch-hold is not required of the pair of contacts 517 and 519 when icon 503 or its replica 515 is dragged across the display in accordance with movement of the pair of contacts 517 and 519.

In some embodiments, after the first user interface object or the representation thereof has been dragged to a second location on the display (e.g., the second location on the display may be within the first user interface or in a different user interface that is concurrently displayed with the first user interface or a different user interface that replaced display of the first user interface after the first user interface object is dragged in accordance with the second portion of the first input) in accordance with the second portion of the first input (e.g., either by a single contact or by two concurrent contacts of the first input) and before termination of the first input is detected, the device detects (808) a second input, including detecting one or more second contacts at a location on the touch-sensitive surface that corresponds to a second user interface object (e.g., an object in the first user interface or in another user interface), distinct from the first user interface object, on the display. In response to detecting the second input: in accordance with a determination that the second input meets object-selection criteria, wherein the object-selection criteria require that the second input has the first predefined number of contacts (e.g., two contacts), the one or more second contacts are maintained on the touch-sensitive surface for less than the first threshold amount of time (e.g., the long-press time threshold) with less than the threshold amount of movement (e.g., 2 mm) before the lift-off of the one or more second contacts is detected in order for the object-selection criteria to be met (e.g., the object-selection criteria are met by a two-finger tap input on the second user interface object), the device selects the second user interface object (e.g., selecting the second user interface object includes lifting the second user interface object off the user interface on which it is displayed, and/or moving the second user interface object or a representation thereof to a respective location on the display that corresponds to a current location of the one or more first contacts on the touch-sensitive surface). In some embodiments, when the first user interface object remains lifted by the one or more first contacts of the first input, if one or more additional objects shown on the display are selected by two-finger taps on these additional objects, the additional objects are lifted from the user interface(s) on which the additional objects are displayed, and fly to the first user interface object to form a collection of objects that is moved together in accordance with subsequent movement of the one or more first contacts. This is illustrated in FIGS. 5T-5Z, where after movement of 504 has been started in accordance with movement of the pair of contacts 554 and 556, two-finger tap inputs by two pairs of contacts 559 and 560, and 562 and 564 cause icons 520 and 522 to be selected and upon additional movement of contacts 554 and 556, icons 520 and 522 move to join icon 504 to form a collection that is dragged in accordance with subsequent movement of contacts 554 and 556. This is further illustrated in FIGS. 5AU-5AW, where image 507 becomes selected in response to a two-finger tap input by contacts 529 and 531, while other images are dragged by contacts 517 and 519, and the newly selected image 507 or replica thereof joins the already selected images to move with contacts 517 and 519. In some embodiments, the additional objects are of different object types (e.g., they are objects that correspond to different applications) from one another and from the first user interface object. In some embodiments, only objects of the same object type (e.g., object types include application launch icons, media content, documents, address book contacts, URLs, etc.). In some embodiments, if the one or more second contacts meet the requirements for a drag input, instead of being added to the first drag, the second user interface object is dragged separately from the first user interface object as part of a second drag session. Providing a gesture for adding additional objects to the selected object to form a collection, optionally, after the move operation is already started enhances the operability of the device and makes the user-device interface more efficient (e.g., by reducing the number of inputs required to move multiple objects, and allowing the user to change the number of objects that are moved after the move operation is already started), which, additionally, reduces power usage and improves battery life of the device by enabling the user to use the device more quickly and efficiently.

In some embodiments, selecting the second user interface object includes (810) changing an appearance of the second user interface object to indicate that the second user interface object is in a selected state (e.g., lift the first user interface object off of the original z-layer of the first user interface object; enlarging the first user interface object, or otherwise indicating selection of the first user interface object or activation of a mode for displaying a menu or moving the object in accordance with a predefined heuristic). This is illustrated in FIGS. 5V-5X (e.g., icons 520 and 522), and 5AV (e.g., image 507), for example. Providing improved visual feedback (e.g., changing the appearance of the newly selected object) enhances the operability of the device and makes the user-device interface more efficient (e.g., by informing the user of the changes in the internal state of the device, helping the user to achieve an intended outcome with required inputs, and reducing user mistakes when operating/interacting with the device), which, additionally, reduces power usage and improves battery life of the device by enabling the user to use the device more quickly and efficiently.

In some embodiments, while the second user interface object is selected, the device detects (812) a third portion of the first input, including detecting second movement of the one or more first contacts; and in response to detecting the third portion of the first input: the device moves the second user interface object or a representation thereof to a respective location on the display that corresponds to a current location of the one or more first contacts on the touch-sensitive surface; and the device moves the first user interface object and the second user interface object as a collection in accordance with the third portion of the first input (e.g., the second user interface object or a representation thereof moves toward the current location of the first user interface object or the representation thereof and joins it as a collection of objects that is being moved by the one or more first contacts). This is illustrated in FIGS. 5H-5J, 5V-5Z, 5AR-5AU, and 5AV-5AW, where movement of the second object is initiated when the first object is moved after the selection of the second object. Providing separate visual feedback to indicate that formation of a collection and subsequent movement of the collection enhances the operability of the device and makes the user-device interface more efficient (e.g., by informing the user of the changes in the internal state of the device, and reducing user mistakes when operating/interacting with the device), which, additionally, reduces power usage and improves battery life of the device by enabling the user to use the device more quickly and efficiently.

In some embodiments, the first input has (814) the first predefined number of contacts (e.g., two contacts), detecting the first input further includes detecting a fourth portion of the first input (e.g., after the second user interface object has joined the first user interface object in a collection), including detecting first relative movement between at least two of the first predefined number of contacts of the first input (e.g., detecting a depinch gesture by the two contacts (e.g., after movement of the two contacts that drags the collection as a whole)). In response to detecting the fourth portion of the first input, the device spreads out the first user interface object from the second user interface object in accordance with the fourth portion of the first input (e.g., spreading out objects in the collection in accordance with the depinch gesture by the two contacts of the first input, such that the constituent objects within the collection are individually displayed and not obscuring one another or are spread apart so that the overlap between the constituent objects is decreased as the distance between the contacts increases). This is illustrated in FIGS. 5P-5R, for example. Providing a gesture for viewing multiple objects that have been moved as part of a collection provides improved visual feedback which makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, selecting the second user interface object includes (816) moving the second user interface object or a representation thereof to a respective location on the display that corresponds to a current location of the one or more first contacts on the touch-sensitive surface (e.g., the second user interface object or a representation thereof moves toward the current location of the first user interface object or the representation thereof and joins it as a collection of objects that is being moved by the one or more first contacts of the first input). Providing a gesture for adding a second object to a collection including the first object (e.g., by moving the second object to a location of the first object) enhances the operability of the device and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, in response to detecting the second input: in accordance with a determination that the second input meets object-activation criteria, wherein the object-activation criteria require that the second input has the second predefined number of contacts (e.g., a single contact), the one or more second contacts are maintained on the touch-sensitive surface for less than the first threshold amount of time (e.g., the long-press time threshold) with less than the threshold amount of movement (e.g., 2 mm) before the lift-off of the one or more second contacts is detected in order for the object-activation criteria to be met (e.g., the object-activation criteria are met by a single-finger tap input on the second user interface object), the device displays (818) user interface or content corresponding to the second user interface object (e.g., launching an application corresponding to the second user interface object (e.g., when the second user interface object is an application launch icon), and/or displaying content (e.g., a webpage, a video, a document, etc.) corresponding to the second user interface (e.g., when the second user interface object is a web clipping, a shortcut, a link, a bookmark, a file icon, etc.)). This is illustrated in FIG. 5AY-5BA, where while image replicas 515, 525, and 533 are dragged by contacts 517 and 519, a tap input by contact 537 on icon 516 causes a text editor user interface 576 that corresponds to the Notes application to be displayed. Providing an additional control option for a second object while the first object remains selected (e.g., activating the second object to display a user interface or content corresponding to the second object) enhances the operability of the device and makes the user-device interface more efficient (e.g., by providing additional functionality and control functions without requiring cancelation of the initial move operation), which, additionally, reduces power usage and improves battery life of the device by enabling the user to use the device more quickly and efficiently.

In some embodiments, in response to detecting the first input: in accordance with a determination that the second portion of the first input (e.g., the first movement of the contact(s)) was detected after the one or more first contacts had been detected at the location on the touch-sensitive surface for at least the first threshold amount of time without more than the threshold amount of movement (e.g., in accordance with a determination that the one or more first contacts moved after having been kept substantially stationary over the first user interface object on the touch-screen for at least the first threshold amount of time): in accordance with a determination that the first input includes the second predefined number of contacts (e.g., a single contact), the device displays (820) a plurality of selectable options that correspond to the first user interface object (e.g., displaying a quick action menu or a cut/copy/paste/formatting menu) after the one or more first contacts had been detected at the location on the touch-sensitive surface for at least the first threshold amount of time without more than the threshold amount of movement (e.g., when the single-finger long press is detected before movement of the single contact). This is illustrated in FIGS. 5A-5E and 5F, and 5AD-5AF. In some embodiments, the plurality of selectable options cease to be displayed when movement of the first contact is detected. In accordance with a determination that the first input includes the first predefined number of contacts (e.g., two contacts), the device forgoes displaying the plurality of selectable options that correspond to the first user interface object. Examples of displaying a menu including a plurality of selectable options after the one or more first contacts had been detected at the location on the touch-sensitive surface for at least the first threshold amount of time without more than the threshold amount of movement are described above with reference to method 700. Providing an additional control option for an object (e.g., displaying a menu before starting the move operation) enhances the operability of the device and makes the user-device interface more efficient (e.g., by providing additional functionality and control functions before completion of the input is detected and before the user intent is completely ascertained), which, additionally, reduces power usage and improves battery life of the device by enabling the user to use the device more quickly and efficiently.

In some embodiments, in response to detecting the first input: in accordance with a determination that the first input includes the second predefined number of contacts (e.g., a single contact), the device changes (822) an appearance of the first user interface object (e.g., lift the first user interface object off of the original z-layer of the first user interface object; enlarging the first user interface object, or otherwise indicating selection of the first user interface object or activation of a mode for displaying a menu or moving the object in accordance with a predefined heuristic) after the one or more first contacts had been detected at the location on the touch-sensitive surface for at least the first threshold amount of time without more than the threshold amount of movement (e.g., when the single-finger long press is detected before movement of the single contact). This is illustrated in FIGS. 5B-5D, 5H-5I, 5AE-5AF, for example. In some embodiments, a plurality of selectable options are displayed upon lift-off the single first contact, when movement of the first contact is not detected. In response to detecting the first input: in accordance with a determination that the first input includes the first predefined number of contacts (e.g., two contacts), the device changes the appearance of the first user interface object (e.g., lift the first user interface object off of the original z-layer of the first user interface object; enlarging the first user interface object, or otherwise indicating selection of the first user interface object or activation of a mode for moving the object in accordance with a predefined heuristic) without waiting until the one or more first contacts are maintained for at least the first threshold amount of time (e.g., the first user interface object is lifted off the user interface immediately upon touch-down of the two fingers on the first user interface object on the touch-screen). This is illustrated in FIGS. 5T,5V-5X, 5AI-5AJ, 5AR-5AT, and 5AV, for example. In some embodiments, the menu (e.g., a quick action menu, or a cut/copy/paste/formatting menu) ceases to be displayed upon lift-off of the two first contacts. Changing an appearance of an object once it has been selected (e.g., selected in either of two possible ways) provides improved feedback which enhances the operability of the device (e.g., by providing visual confirmation that the object is selected) and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, in response to detecting the first input: in accordance with a determination that the second portion of the first input (e.g., the first movement of the contact(s)) is detected before the one or more first contact had been detected at the location on the touch-sensitive surface for the first threshold amount of time (e.g., the long press time threshold) without more than the threshold amount of movement (e.g., 2 mm) (e.g., the first contact(s) moved by more than 2 mm before the long-press time threshold is met), the device scrolls (824) the first user interface (e.g., as a whole) in accordance with the second portion of the first input. This is illustrated in FIGS. 5M-5O (e.g., swipe input by contact 538 scrolls the user interface 502), and FIGS. 5BB-5BC (e.g., swipe input by contact 547 scrolls the user interface 576), for example. Scrolling the user interface when the movement occurs without the second number of contacts meeting the touch-hold requirement enhances the operability of the device and makes the user-device interface more efficient (e.g., by providing additional control options without cluttering the UI with additional displayed controls, reducing the number of inputs needed to scroll the user interface, and reducing user mistakes when operating/interacting with the device), which, additionally, reduces power usage and improves battery life of the device by enabling the user to use the device more quickly and efficiently.

In some embodiments, dragging the first user interface object or the representation thereof in accordance with the second portion of the first input includes (826) dragging the first user interface object or the representation thereof in accordance with the first movement of the first predefined number of contacts in the first input, wherein the first movement includes less than a threshold amount of relative movement between respective ones of the second predefined number of contacts (e.g., the two contacts of the two-finger drag move in substantial unison in the same direction, and make less than a threshold amount of movement relative to each other while making the first movement). Requiring each contact in a multi-contact drag gesture to move in unison (e.g., by including less than a threshold amount of relative movement between each contact) enhances the operability of the device and makes the user-device interface more efficient (e.g., by avoiding accidental initiation of a move operation, and thereby helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the first input has (828) the first predefined number of contacts (e.g., two contacts). Detecting the first input further includes detecting a fifth portion of the first input (e.g., either after or before detecting the second portion of the first input (e.g., the two-finger drag input), selecting the first user interface object, and/or dragging the first user interface object in accordance with the second portion of the input), including detecting first relative movement between at least two of the second predefined number of contacts of the first input (e.g., detecting a depinch gesture by the two contacts of the first input). In response to detecting the fifth portion of the first input, the device changes a size of the first user interface object in accordance with the fifth portion of the first input (e.g., expand the first user interface object in accordance with the depinch gesture by the two contacts of the first input). This is illustrated in FIGS. 5AM-5AN, for example. In some embodiments, if there are already more than one object that is being dragged as a collection by the two-finger drag input, the depinch gesture spread out individual objects in the collection of objects in accordance with the relative movement of the contacts in the third portion of the first input. Providing a control for enlarging an object (e.g., by depinching two contacts) during a move operation enhances the operability of the device and makes the user-device interface more efficient (e.g., by allowing the user to review the object that is being dragged, and thereby reducing user mistakes when operating/interacting with the device), which, additionally, reduces power usage and improves battery life of the device by enabling the user to use the device more quickly and efficiently.

In some embodiments, in response to detecting the first input: in accordance with a determination that deletion-mode-activation criteria are met, the device displays (830) the first user interface in an object-deletion mode, wherein: while the first user interface is displayed in the object-deletion mode, deletion of a respective object displayed in the first user interface is performed when a predefined deletion input is detected at a location on the touch-sensitive surface that corresponds to the respective object (e.g., when in the object-deletion mode, a tap input on a user interface object in the first user interface causes the user interface object to be deleted from the first user interface, as opposed to causing the object to be activated (e.g., activation refers to launching a corresponding application or displaying content associated with the activated object)). The deletion-mode-activation criteria are met in accordance with any one of: (1) the first input has the first predefined number of contacts (e.g., two contacts), and the second portion of the first input (e.g., the first movement of the contact(s)) includes more than the threshold amount of movement (e.g., a two-finger drag input is detected) (e.g., as illustrated in FIGS. 5T-5U); (2) the first input has the second predefined number of contacts (e.g., a single contact), and the one or more first contacts had been detected at the location on the touch-sensitive surface for at least the first threshold amount of time without more than the threshold amount of movement before the second portion of the first input was detected (e.g., a single-finger drag input is detected after the single-finger long press input is detected) (e.g., as illustrated in FIGS. 5A-5G); and (3) the first input has the second predefined number of contacts (e.g., a single contact), and the one or more first contacts had been detected at the location on the touch-sensitive surface for at least a second threshold amount of time, greater than the first threshold amount of time without more than the threshold amount of movement (e.g., a single-finger super-long-press input is detected) before the second portion of the first input (e.g., the first movement of the contact(s)) was detected. In some embodiments, no movement is required to trigger the object-deletion-mode, when a single-finger super-long-press input is detected. Providing a deletion mode via multiple alternative gestures enhances the operability of the device and makes the user-device interface more efficient (e.g., by providing additional functionality and control functions without cluttering the UI with additional displayed controls, reducing the number of inputs needed to perform a deletion, and thereby reducing user mistakes when operating/interacting with the device), which, additionally, reduces power usage and improves battery life of the device by enabling the user to use the device more quickly and efficiently.

In some embodiments, two object-move gestures (e.g., a touch-hold-followed-by-move gesture by a single contact or a drag gesture by two contacts) can be used on two different objects in parallel, and subsequently releasing one of the two objects (e.g., by lifting-off of the contact(s) that are controlling the object) causes the released object to join the other object in a collection which can then be moved by the contact(s) that is moving the unreleased object. In some embodiments, a first object-move gesture (e.g., a touch-hold-followed-by-move gesture by a single contact or a drag gesture by two contacts) can be used first on one object, and before termination of the first object-move gesture, another object-move gesture (e.g., a touch-hold-followed-by-move gesture by a single contact or a drag gesture by two contacts) is used on another object, and the two object-move-gestures can be performed simultaneously afterwards.

It should be understood that the particular order in which the operations in FIGS. 8A-8F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 900) are also applicable in an analogous manner to method 800 described above with respect to FIGS. 8A-8F. For example, the contacts, gestures, user interface objects, time thresholds, focus selectors—and/or animations described above with reference to method 800 optionally have one or more of the characteristics of the contacts, gestures, user interface objects, tactile outputs, intensity thresholds, focus selectors, and/or animations described herein with reference to other methods described herein (e.g., methods 700 and 900). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8F are, optionally, implemented by components depicted in FIGS. 1A-1B. For example, detection operation 804 and drag operation 806 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 9A-9E are flow diagrams illustrating a method 900 of interacting with user interface objects (e.g., dragging and dropping selected text) in response to touch inputs, in accordance with some embodiments. The method 900 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

Method 900 relates to keeping selected content at a placement location that is offset from the focus selector (e.g., finger contact) during a drag operation that moves the selected content across the display in accordance with the movement of the focus selector. Specifically, when a device detects a move operation (e.g., by detecting one or more contacts at a location corresponding to the selected content), the device displays at least a portion of the selected content in a container object. The device then moves the container object to a position below the one or more contacts (e.g., by moving the container object from its original location relative to the contact to a placement location directly below the contacts). The container object remains relatively fixed at the second placement location relative to the finger contact as the user moves the contact across the touch-sensitive surface. As a result, the container object does not obscure the possible insertion locations for the selected content during the movement of the contacts. The offset of the selected object from the contacts provide improved visual feedback since it allows the user to have a better view of the underlying content, which enhances the operability of the device and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

Method 900 is performed at a device having a touch-screen display. The device displays (902) content in a first user interface on the touch-screen display (e.g., the content includes text and/or images in a document, drawings and shapes on a drawing canvas, or other selectable content in a content-display user interface). While displaying the content in the first user interface on the touch-screen display, the device detects (904) a first user interaction that selects first content within the content (e.g., detecting a touch-hold gesture by a single contact at a first location within selectable text to display a selection object (e.g., a text selection box), and dragging the selection handle by the same single contact in a first direction across the display to expand the selection object and select text enclosed within the selection object). While displaying the first content in a selected state within the content (e.g., the first content is highlighted (e.g., enclosed in a selection object or highlighted by a different color) related to other portions of the content that is not currently selected), the device detects (906) a first portion of a first input that activates a move operation for the selected first content (e.g., the first input is a single-finger long press followed by movement, or a two-finger movement), including detecting one or more contacts on the touch-screen display at a location that corresponds to the selected first content. In some embodiments, detecting the first portion of the first input includes detecting a single contact at the location of the selected content for at least a threshold amount of time (e.g., the long press time threshold) without detecting movement or lift-off of the contact. In some embodiments, detecting the first portion of the first input includes detecting two contacts that are less than a threshold amount of distance apart from each other, at a location that corresponds to the selected content, without detecting lift-off of the contacts or relative movement of the contacts apart from each other. In some embodiments, upon detection of the single-contact touch-hold gesture, the device displays a cut/copy/paste/formatting menu next to the selected content. In some embodiments, the cut/copy/paste/formatting menu is displayed upon lift-off of the single contact, if the single contact has remained substantially stationary (e.g., made less than a threshold amount of movement) for at least the threshold amount of time (e.g., the long-press time threshold) over the selected content on the touch-screen. In some embodiments, upon detection of two concurrent contacts that are less than a threshold distance apart from each other over the selected content, the device displays a cut/copy/paste/formatting menu next to the selected content. In some embodiments, the device displays the cut/copy/paste/formatting menu upon lift-off of the two contacts, if less than the threshold amount of movement of the contacts is detected before the lift-off of the contacts. In response to detecting the first portion of the first input that activates the move operation for the selected first content, the device displays (908) a copy of at least of a portion of the first content in a container object. For example, the selected text is lifted off of its original z-layer and displayed within a semi-transparent or translucent platter that floats above the original z-layer of the selected text, leaving a ghost image of the selected text remaining in the original z-layer of the selected text. In some embodiments, the container object is reduced in size (e.g., the container with the copy of the at least the portion of the selected first content is reduced in size to 90%, 85%, 75%, 50% or 25% of the original width and/or height of the selected first content) before the container object is moved away from its original location to the second placement location slightly below the contact(s). In some embodiments, the container object is translucent, and the first content and other portions of the user interface can be seen through the translucent container background. In some embodiments, the container object is the selected content or a replica of the selected content (optionally, with an altered appearance). The device moves (910) the container object that displays the copy of at least a portion of the first content from a first placement location relative to a characteristic location of the one or more contacts on the touch-screen to a second placement location relative to the characteristic location of the one or more contacts on the touch screen (e.g., the container moves from its initial display location relative to the one or more contacts to a location slightly below the one or more contacts so that the container object does not obscure an insertion cursor that is displayed above the one or more contacts). In some embodiments, moving the container object relative to a characteristic location of the one or more contacts on the touch-screen is in response to detecting that first criteria have been met (e.g., the first criteria are met when a single-contact long press input or a two-contact touch input is detected (e.g., before the movement of the contact(s) is detected)). In some embodiments, moving the container object relative to a characteristic location of the one or more contacts on the touch-screen is in response to detecting movement of the one or more contacts. In some embodiments, while moving the container object from the first placement location to the second placement location, the size of the container object shrinks from its original size to a smaller size (e.g., a predefined size that is 50% or 25% of the original size) during the movement of the container object. After moving the container object that displays the copy of at least a portion of the first content from the first placement location to the second placement location relative to the characteristic location of the one or more contacts, the device moves (912) the container object that displays the copy of at least the portion of the first content in accordance with movement of the one or more contacts while maintaining the container object at the second placement location relative to the characteristic location of the one or more contacts as the one or more contacts move across the touch-sensitive surface (e.g., the container object continues to stay slightly below the one or more contacts during subsequent movement of the one or more contacts (e.g., the container object tracks the movement of the contact(s) closely)). In some embodiments, the container object is moved to the second placement location relative to the characteristic location of the one or more contacts without regard to an initial placement location of the container object relative to the characteristic location of the one or more contacts (e.g., whether the one or more contacts start a center, an upper right corner, a lower right corner, a lower left corner, an upper right corner or any other portion of the first content in the selected state, the container object is moved to the second placement location relative to the characteristic location of the one or more contacts). Moving the container object to the second placement location relative to the characteristic location of the one or more contacts without regard to an initial placement location of the container object relative to the characteristic location of the one or more contacts ensures that the container object will (after movement of the contact has been detected) be displayed at a predictable location relative to the characteristic location of the one or more contacts which provides improved visual feedback which enhances the operability of the device and makes the user-device interface more efficient (e.g., by allowing the user to have a better view of content that has been selected, which helps the user to achieve an intended outcome with the required inputs and reduces user mistakes when operating/interacting with the device), which, additionally, reduces power usage and improves battery life of the device by enabling the user to use the device more quickly and efficiently. Method 900 is illustrated in FIGS. 6A-6K, for example, where a copy of selected content is placed within a container object 612 that shifts from a first placement location (e.g., in FIG. 6G) to a second placement location (e.g., in FIG. 6I) relative to contact 610, and then during subsequent movement of contact 610, container object 612 remains at the second placement location relative to contact 610, for example.

In some embodiments, displaying the copy of at least the portion of the first content in the container object includes (914): displaying the container object including at least the portion of the first content at the first placement location relative to the characteristic location of the one or more contacts on the touch-screen, wherein the first placement location corresponds to an original display location of the first content, and is on a different z-layer from the original display location of the first content (e.g., in response to detecting the first portion of the first input that activates the move operation for the selected first content, the device lifts the portion of the background that underlies the selected first content along with the selected first content to a different z-layer slightly above the z-layer of the background on which the selected content was originally displayed, leaving behind a ghost image of the selected first content and the original background). This is illustrated in FIGS. 6F-6G, for example. Displaying a portion of the selected content in a container object on a different z-layer near the original location of the selected content provides improved visual feedback which enhances the operability of the device and makes the user-device interface more efficient (e.g., by allowing the user to have a better view of content that has been selected, which helps the user to achieve an intended outcome with the required inputs and reduces user mistakes when operating/interacting with the device), which, additionally, reduces power usage and improves battery life of the device by enabling the user to use the device more quickly and efficiently.

In some embodiments, the first portion of the first input has (916) a first predefined number of contacts (e.g., a single contact). The device detects a second portion of the first input, including detecting at least a threshold amount of movement (e.g., 0.2, 0.5, 1, 2, 2.5, 3 mm) of the one or more contacts (e.g., the single contact) after detecting that the one or more contacts of the first input have been maintained at the location that corresponds to the selected first content with less than the threshold amount of movement for at least a threshold amount of time (e.g., the long press time threshold), wherein: moving the container object from the first placement location to the second placement location is performed in response to detecting the second portion of the first input. This is illustrated in FIGS. 6G-6I, where container object 612 moves from the first placement location to the second placement location upon movement of contact 610 after the touch-hold requirement is met by contact 610. Moving a portion of the selected content in a container object to the second placement location below the contact when movement is detected after the touch-hold requirement is met provides improved visual feedback which enhances the operability of the device and makes the user-device interface more efficient (e.g., by informing the user of the changes in the internal state of the device and placing the user interface in a ready state for subsequent placement of the insertion cursor, which helps the user to achieve an intended outcome with the required inputs and reduces user mistakes when operating/interacting with the device), which, additionally, reduces power usage and improves battery life of the device by enabling the user to use the device more quickly and efficiently.

In some embodiments, the first portion of the first input has (918) a first predefined number of contacts (e.g., a single contact). Moving the container object from the first placement location to the second placement location is performed in response to detecting that the one or more contacts of the first input (e.g., the single contact) have been maintained at the location that corresponds to the selected first content with less than a threshold amount of movement (e.g., 0.2, 0.5, 1, 2, 2.5, 3 mm) for at least a threshold amount of time (e.g., the long press time threshold such as 0.5, 0.1, 0.2, or 0.3 seconds). Making more of the underlying content and possible insertion locations visible (e.g., by moving the selected content in a container object to below the contacts) when the touch-hold requirement is met provides improved visual feedback which enhances the operability of the device and makes the user-device interface more efficient (e.g., by allowing the user to have a better view of underlying content and insertion locations, which helps the user to achieve an intended outcome with the required inputs and reduces user mistakes when operating/interacting with the device), which, additionally, reduces power usage and improves battery life of the device by enabling the user to use the device more quickly and efficiently.

In some embodiments, the first portion of the first input includes (920) an initial movement of the one more contacts that is at least the threshold amount of movement. In response to detecting the initial movement of the one or more contacts, the device moves the copy of at least the portion of the first content from an original location of the portion of the first content in the user interface to the first placement location (e.g., as soon as the device detects that the contact(s) have moved by the threshold amount of movement, the device moves the first content into a floating container object, or moves the container object with the copy of the first content to a predefined intermediate location between the initial location of the first content and the location near the input object). After displaying the copy of at least the portion of the first content in the container object in response to detecting the first portion of the first input, the device detects a second portion of the first input, including detecting additional movement of the one or more contacts after the initial movement of the one or more contacts, wherein: moving the container object from the first placement location to the second placement location is performed in response to detecting the additional movement of the one or more contacts (e.g., after the first content or a copy thereof has moved a little in response to detecting the initial movement of the one or more contacts, the first content or the copy thereof moves quickly to the second placement location to catch up with the subsequent movement of the contacts), and the second placement location is offset from the one or more contacts in a predefined manner (e.g., the center of the top edge of the container object is moved to directly below the one or more contacts). This is illustrated in FIGS. 6G-6I, 6P-6S, where container objects 612 and 624 move from their respective first placement locations to their respective second placement locations upon movement of contacts 610 and 622 after the touch-hold requirement is met by contacts 610 and 622, respectively. Separately displaying movement of the selected content both upon selection (e.g., upon touch-down of the double contacts, or when the touch-hold requirement is met by a single contact) and upon activation of the move operation (e.g., upon movement of the contact(s)) enhances the operability of the device and makes the user-device interface more efficient (e.g., by informing the user of the changes in the internal state of the device, and helping the user to achieve an intended outcome with the required inputs, and reduces user mistakes when operating/interacting with the device) which, additionally, reduces power usage and improves battery life of the device by enabling the user to use the device more quickly and efficiently.

In some embodiments, the container object includes (922) a translucent background (e.g., that at least partially obscures the underlying content), and portions of the content are visible through the background of the container object during movement of the container object. This is illustrated in FIGS. 6M, 6S, and 6U, for example, where container objects 612, 624, and 634 have translucent background that allow underlying content to show through. Providing for a translucent background for the container object during movement of the container object enhances the operability of the device and makes the user-device interface more efficient (e.g., by allowing the user to have a better view of non-selected content as the selected content moves over it, which helps the user to achieve an intended outcome with the required inputs and reduces user mistakes when operating/interacting with the device), which, additionally, reduces power usage and improves battery life of the device by enabling the user to use the device more quickly and efficiently.

In some embodiments, the container object includes (924) a background (e.g., the translucent background mentioned above) that separates the copy of at least the portion of the first content from the content (e.g., the background is layer that obscures and/or blurs the underlying content). This is illustrated in FIGS. 6M, 6S, and 6U, for example, where container objects 612, 624, and 634 have translucent background that obscures and blurs the underlying content. Separating the selected content and the underlying content by the background of a container object enhances the operability of the device and makes the user-device interface more efficient (e.g., by allowing the user to better differentiate the selected content from the underlying content as the selected content is dragged over the underlying content, which helps the user to achieve an intended outcome with the required inputs and reduces user mistakes when operating/interacting with the device), which, additionally, reduces power usage and improves battery life of the device by enabling the user to use the device more quickly and efficiently.

In some embodiments, the container object includes (926) an indicator (e.g., a pointy element, such as a caret-shaped object on the top edge of the container object) that indicates an insertion location for the selected content (e.g., the indication has a corresponding insertion cursor that is displayed above the contact(s) and that hops from one permissible insertion location or another permissible insertion location as the container object is dragged by the one or more contacts, and the caret-shaped indicator on the top edge of the container object optionally moves along the top edge of the container object to follow the movement of the insertion cursor, and helps to focus the user's attention on the location of the insertion cursor). In some embodiments, the position of the indication remains directly below the contact(s) during the movement of the contact(s) while the insertion cursor hops from one permissible insertion location to the next permissible insertion location based on the current position of the contact(s). This is illustrated in FIGS. 6I-6N (e.g., indicator 616 and insertion cursor 614), FIGS. 6S-6T (e.g., indicator 626 and insertion cursor 628), and FIGS. 6U-6W (e.g., indicator 636 and insertion cursor 638), for example. Indicating potential insertion locations of selected content using an indicator directly coupled to the container object as the selected content is being moved in the container object across the user interface enhances the operability of the device and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, displaying the copy of at least the portion of the first content in a container object includes (928): displaying a first portion of the first content with a first opacity; and displaying a second portion of the first content (e.g., the second portion is below the first portion in the first content) with a second opacity that is different from the first opacity (e.g., the second portion of the first content is displayed with a higher level of transparency (or is more faded out than the top portion of the first content in the container object)). In some embodiments, the bottom portion of the first content is completed obscured, omitted, and/or invisible when included in the container object. This is illustrated in FIGS. 6U-6W, where container 635 includes a first portion of the first content with a first opacity and a second portion of the first content with a second opacity, for example. Displaying portions of the content with different opacities (e.g., gradually fading out the lower portions of the selected content in the container object) provides improved visual feedback which enhances the operability of the device and makes the user-device interface more efficient (e.g., by allowing the user to view some of the selected content while keeping the size of the container object below a limit, which reduces user mistakes when operating/interacting with the device), which, additionally, reduces power usage and improves battery life of the device by enabling the user to use the device more quickly and efficiently.

In some embodiments, displaying the copy of at least the portion of the first content in the container object includes (930): displaying the copy of at least the portion of the first content in the container object in a first configuration that corresponds to an original configuration of the portion of the first content; and reflowing at least the portion of the first content to display the copy of at least the portion of the first content in the container object in a second configuration that is different from the first configuration. For example, when the selected text is displayed in a container object that is half the width of the displayed content, the selected text is reduced in scale and at the same time reflowed within the container object in accordance with the reduced text size and the width of the container object. In some embodiments, when the selected text includes a first portion in a first line, and a second portion in a next line, but the background underlying the two portions are not connected when lifted from the original display layer of the content, the two portions of the selected text is reflowed such that they are merged into a single line in a unitary container object. Reflowing the content in the container enhances the operability of the device and makes the user-device interface more efficient (e.g., by allowing the user to have a better view of content that has been selected, which helps the user to achieve an intended outcome with the required inputs and reduces user mistakes when operating/interacting with the device) which, additionally, reduces power usage and improves battery life of the device by enabling the user to use the device more quickly and efficiently.

In some embodiments, while the container object is displayed at the second placement location relative to the characteristic location of the one or more contacts, the device displays (932) an insertion cursor at a first location in the content that corresponds to an original location of the first content in the content. This is illustrated in FIGS. 6I-6N (e.g., insertion cursor 614), FIGS. 6R-6T (e.g., insertion cursor 628), and FIGS. 6U-6W (e.g., insertion cursor 638), for example. In some embodiments, when the container object is moved from its initial location to a location below the one or more contacts after the initial movement of the one or more contacts, the insertion cursor is displayed at the original location of the end of the first content (or the start of the first content) in the content, to indicate that if lift-off of the one or more contacts are detected at this moment, the selected content will be dropped back to its original location. Indicating potential insertion locations of selected content, beginning with the initial selection location, provides improved visual feedback which enhances the operability of the device and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, while moving the container object in accordance with movement of the one or more contacts while maintaining the container object at the second placement location relative to the characteristic location of the one or more contacts as the one or more contacts move across the touch-sensitive surface, the device moves (934) the insertion cursor through one or more permissible insertion locations within the content in accordance with the movement of the one or more contacts. This is illustrated in FIGS. 6I-6N (e.g., insertion cursor 614), FIGS. 6R-6T (e.g., insertion cursor 628), and FIGS. 6U-6W (e.g., insertion cursor 638), for example. In some embodiments, when the container object is dragged along by the one or more contacts, the relative position of the contacts and the container object remain substantially unchanged (e.g., movement of the container object tracks the movement of the one or more contacts closely), while the insertion cursor hops from one permissible insertion location to the next permissible insertion location, depending on the current location of the one or more contacts (e.g., the insertion cursor is placed at the permissible insertion location that is nearest the characteristic location of the one or more contacts). In some embodiments, the insertion cursor is offset from the container object and the one or more contacts. Indicating permissible insertion locations of selected content (e.g., discrete positions) with a "hopping" insertion cursor as the container object is being moved across underlying content (e.g., smooth movement) enhances the operability of the device and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, while moving the container object in accordance with the movement of the one or more contacts while maintaining the container object at the second placement location relative to the characteristic location of the one or more contacts, the device moves (936) the insertion cursor from a first permissible insertion location to a second permissible insertion location, wherein the first permissible insertion location is in a first user interface, and the second permissible insertion location is in a second user interface that is distinct from the first user interface (e.g., the first user interface and the second user interface are user interfaces of two different applications, or distinct user interfaces of the same application). Indicating permissible insertion locations of selected content (e.g., discrete positions) in different user interfaces enhances the operability of the device and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the device alters (938) an appearance of the first content (e.g., graying out the selected first content, displaying the first content with a faded appearance) at an original location of the first content in the first user interface (e.g., when a copy of at least the portion of the first content is displayed in the container object and the container object is lifted from the original z-layer of the content, the original first content is displayed with a grayed out appearance (e.g., as a ghost image of the first content)). The device maintains display of the first content with the altered appearance while moving the container object that displays the copy of at least the portion of the first content in accordance with the movement of the one or more contacts (e.g., the ghost image of the first content remains displayed while the container object including the copy of at least the portion of the first content is moved with the contacts(s)). This is illustrated in FIGS. 6I-6N (e.g., selected content 606), FIGS. 6R-6T (e.g., selected content 620), and FIGS. 6U-6 W (e.g., selected content 632), for example. Altering an appearance of selected content in its original location as the selected content is moved across a display provides improved feedback (e.g., by allowing the user to keep track of the origin of the selected content as it is being moved), and enhances the operability of the device and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the device detects (940) termination of the first input while the one or more contacts are over the first user interface, including detecting lift-off of the one or more contacts. In response to detecting the termination of the first input: the device displays the first content (or a representation thereof) at a first insertion location within the first user interface. In some embodiments, the device displays an animation showing the container object that contains the copy of the first content merging into the content at the first insertion location. In addition, in response to detecting the termination of the first input: the device ceases to display the first content at the original location of the first content (e.g., ceasing to display the ghost image of the first content at the original location of the first content) in the first user interface. For example, when dragging the selected content within the same user interface, the content is moved from its original location to a new location at the end of the move operation. In some embodiments, the remaining content in the first user interface is reflowed in response to the move of the first content. This is illustrated in FIGS. 6N-6O, for example. Moving a selection of content to a new location upon termination of the contact that initially moved the selected content to the insertion location enhances the operability of the device and makes the user-device interface more efficient (e.g., by informing the user the changes in the internal state of the device, and reducing user mistakes when interacting with/operating the device), which, additionally, reduces power usage and improves battery life of the device by enabling the user to use the device more quickly and efficiently.

In some embodiments, the device detects (942) termination of the first input while the one or more contacts are over a second user interface, including detecting lift-off of the one or more contacts. In response to detecting the termination of the first input: the device displays the first content (or an exact copy thereof, or a representation thereof) at a second insertion location within the second user interface (e.g., in some embodiments, the second user interface is distinct from the first user interface. In some embodiments, the second user interface is the first user interface). In some embodiments, the device displays an animation showing the container object that contains the copy of the first content merging into the content at the second insertion location. In addition, in response to detecting the termination of the first input, the device restores the appearance of the first content at the original location of the first content in the first user interface. For example, when dragging the selected content across two different user interfaces (e.g., of the same applications, or of two different applications or documents), the content is copied from its original location to a new location at the end of the move operation, and the content that is copied is restored (e.g., the ghost image of the selected text is restored to its original appearance) at the original location of the content. Copying a selection of content to a new location upon termination of the contact that initially moved the selected content to the insertion location enhances the operability of the device and makes the user-device interface more efficient (e.g., informing the user of the changes in the internal state of the device, and reducing user mistakes when interacting with/operating the device) which, additionally, reduces power usage and improves battery life of the device by enabling the user to use the device more quickly and efficiently.

In some embodiments, in response to detecting the termination of the first input: in accordance with a determination that a permissible insertion location is currently identified for the first content (e.g., the insertion cursor is currently displayed at the permissible insertion location), the device displays (944) the first content (or an exact copy thereof, or a representation thereof) at the permissible insertion location that is currently identified for the first content. In some embodiments, the device displays an animation showing the container object that contains the copy of the first content merging into the content at the first insertion location. In addition, in response to detecting the termination of the first input: in accordance with a determination that no permissible insertion location is currently identified for the first content (e.g., no insertion cursor is currently displayed, or the insertion cursor is displayed with an altered appearance to indicate that a permissible insertion location is not currently identified for the first content), the device restores the appearance of the first content at the original location of the first content in the first user interface without copying or moving the first content to another location that is different from the original location (e.g., the first content is dropped back to the original location at the end of the move operation (e.g., the ghost image of the selected text is restored to its original appearance)). In some embodiments, maintaining the location of the one or more contacts for a predefine threshold amount of time (e.g., with less than a threshold amount of movement for at least the first threshold amount of time) while the insertion cursor is displayed at a respective insertion location for the first content, the device displays a preview showing the insertion of the first content at the respective insertion location (e.g., displaying the first content at the respective insertion location and reflow the rest of the text). In some embodiments, if termination of the first input is detected while the preview is being displayed, the insertion is conformed and completed; and if termination of the first input is detected while no preview is displayed, the move operation is canceled, and the first content is restored to its original location. Restoring selected content to its original location upon an attempt to move it to an impermissible location enhances the operability of the device and makes the user-device interface more efficient (e.g., by preventing the user from reaching an unintended outcome, and thereby reducing user mistakes when operating/interacting with the device), which, additionally, reduces power usage and improves battery life of the device by enabling the user to use the device more quickly and efficiently.

It should be understood that the particular order in which the operations in FIGS. 9A-9E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 800) are also applicable in an analogous manner to method 700 described above with respect to FIGS. 9A-9E. For example, the contacts, gestures, user interface objects, time thresholds, focus selectors, and/or animations described above with reference to method 900 optionally have one or more of the characteristics of the contacts, gestures, user interface objects, tactile outputs, intensity thresholds, focus selectors, and/or animations described herein with reference to other methods described herein (e.g., methods 700 and 800). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9E are, optionally, implemented by components depicted in FIGS. 1A-1B. For example, detection operations 904 and 906, and move operations 910 and 912 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at a device having a touch-screen display:
displaying content in a first user interface on the touch-screen display;
while displaying the content in the first user interface on the touch-screen display, detecting a first user interaction that selects first content within the content;
while displaying the first content in a selected state within the content, detecting a first portion of a first input that activates a move operation for the first content, including detecting one or more contacts on the touch-screen display at a location that corresponds to the first content in the selected state;
in response to detecting the first portion of the first input that activates the move operation for the first content, displaying a copy of at least of a portion of the first content in a container object;
moving the container object that displays the copy of at least the portion of the first content from a first placement location relative to a characteristic location of the one or more contacts on the touch-screen display to a second placement location relative to the characteristic location of the one or more contacts on the touch-screen display; and
after moving the container object that displays the copy of at least the portion of the first content from the first placement location to the second placement location relative to the characteristic location of the one or more contacts, moving the container object that displays the copy of at least the portion of the first content in accordance with movement of the one or more contacts while maintaining the container object at the second placement location relative to the characteristic location of the one or more contacts as the one or more contacts move across the touch-screen display.

2. The method of claim 1, wherein displaying the copy of at least the portion of the first content in the container object includes:
displaying the container object including at least the portion of the first content at the first placement location relative to the characteristic location of the one or more contacts on the touch-screen display, wherein the first placement location corresponds to an original display location of the first content, and is on a different z-layer from the original display location of the first content.

3. The method of claim 1, wherein:
the first portion of the first input has a first predefined number of contacts; and
the method includes:
detecting a second portion of the first input, including detecting at least a threshold amount of movement of the one or more contacts after detecting that the one or more contacts of the first input have been maintained at the location that corresponds to the first content with less than the threshold amount of movement for at least a threshold amount of time, wherein:
moving the container object from the first placement location to the second placement location is performed in response to detecting the second portion of the first input.

4. The method of claim 1, wherein:
the first portion of the first input has a first predefined number of contacts; and
moving the container object from the first placement location to the second placement location is performed in response to detecting that the one or more contacts of the first input have been maintained at the location that corresponds to the first content with less than a threshold amount of movement for at least a threshold amount of time.

5. The method of claim 1, wherein the first portion of the first input includes an initial movement of the one or more contacts that is at least a threshold amount of movement, and the method includes:
in response to detecting the initial movement of the one or more contacts, moving the copy of at least the portion of the first content from an original location of the portion of the first content in the first user interface to the first placement location; and
after displaying the copy of at least the portion of the first content in the container object in response to detecting the first portion of the first input, detecting a second portion of the first input, including detecting additional movement of the one or more contacts after the initial movement of the one or more contacts, wherein:
moving the container object from the first placement location to the second placement location is performed in response to detecting the additional movement of the one or more contacts, and
the second placement location is offset from the one or more contacts in a predefined manner.

6. The method of claim 1, wherein the container object includes a translucent background, and portions of the content are visible through the translucent background of the container object during movement of the container object.

7. The method of claim 1, wherein the container object includes a background that separates the copy of at least the portion of the first content from the content.

8. The method of claim 1, wherein the container object includes an indicator that indicates an insertion location for the first content.

9. The method of claim 1, wherein displaying the copy of at least the portion of the first content in the container object includes:
displaying a first portion of the first content with a first opacity; and
displaying a second portion of the first content with a second opacity that is different from the first opacity.

10. The method of claim 1, wherein displaying the copy of at least the portion of the first content in the container object includes:
  displaying the copy of at least the portion of the first content in the container object in a first configuration that corresponds to an original configuration of the portion of the first content; and
  reflowing at least the portion of the first content to display the copy of at least the portion of the first content in the container object in a second configuration that is different from the first configuration.

11. The method of claim 1, including:
  while the container object is displayed at the second placement location relative to the characteristic location of the one or more contacts, displaying an insertion cursor at a first location in the content that corresponds to an original location of the first content in the content.

12. The method of claim 11, including:
  while moving the container object in accordance with the movement of the one or more contacts while maintaining the container object at the second placement location relative to the characteristic location of the one or more contacts as the one or more contacts move across the touch-screen display, moving the insertion cursor through one or more permissible insertion locations within the content in accordance with the movement of the one or more contacts.

13. The method of claim 11, including:
  while moving the container object in accordance with the movement of the one or more contacts while maintaining the container object at the second placement location relative to the characteristic location of the one or more contacts, moving the insertion cursor from a first permissible insertion location to a second permissible insertion location, wherein the first permissible insertion location is in the first user interface, and the second permissible insertion location is in a second user interface that is distinct from the first user interface.

14. The method of claim 1, including:
  altering an appearance of the first content at an original location of the first content in the first user interface; and
  maintaining display of the first content with the altered appearance while moving the container object that displays the copy of at least the portion of the first content in accordance with the movement of the one or more contacts.

15. The method of claim 14, including:
  detecting termination of the first input while the one or more contacts are over the first user interface, including detecting lift-off of the one or more contacts; and
  in response to detecting the termination of the first input:
    displaying the first content at a first insertion location within the first user interface; and
    ceasing to display the first content at the original location of the first content in the first user interface.

16. The method of claim 14, including:
  detecting termination of the first input while the one or more contacts are over a second user interface, including detecting lift-off of the one or more contacts; and
  in response to detecting the termination of the first input:
    displaying the first content at a second insertion location within the second user interface; and
    restoring the appearance of the first content at the original location of the first content in the first user interface.

17. The method of claim 14, including:
  in response to detecting termination of the first input:
    in accordance with a determination that a permissible insertion location is currently identified for the first content, displaying the first content at the permissible insertion location that is currently identified for the first content; and
    in accordance with a determination that no permissible insertion location is currently identified for the first content, restoring the appearance of the first content at the original location of the first content in the first user interface without copying or moving the first content to another location that is different from the original location.

18. An electronic device, comprising:
  a touch-screen display;
  one or more processors;
  memory; and
  one or more programs, wherein the one or more programs are stored in the memory and configured to be executed by the one or more processors, the one or more programs including instructions for:
    displaying content in a first user interface on the touch-screen display;
    while displaying the content in the first user interface on the touch-screen display, detecting a first user interaction that selects first content within the content;
    while displaying the first content in a selected state within the content, detecting a first portion of a first input that activates a move operation for the first content, including detecting one or more contacts on the touch-screen display at a location that corresponds to the first content in the selected state;
    in response to detecting the first portion of the first input that activates the move operation for the first content, displaying a copy of at least of a portion of the first content in a container object;
    moving the container object that displays the copy of at least the portion of the first content from a first placement location relative to a characteristic location of the one or more contacts on the touch-screen display to a second placement location relative to the characteristic location of the one or more contacts on the touch-screen display; and
    after moving the container object that displays the copy of at least the portion of the first content from the first placement location to the second placement location relative to the characteristic location of the one or more contacts, moving the container object that displays the copy of at least the portion of the first content in accordance with movement of the one or more contacts while maintaining the container object at the second placement location relative to the characteristic location of the one or more contacts as the one or more contacts move across the touch-screen display.

19. The electronic device of claim 18, wherein displaying the copy of at least the portion of the first content in the container object includes:
  displaying the container object including at least the portion of the first content at the first placement location relative to the characteristic location of the one or more contacts on the touch-screen display, wherein the first placement location corresponds to an original display location of the first content, and is on a different z-layer from the original display location of the first content.

20. The electronic device of claim 18, wherein:
the first portion of the first input has a first predefined number of contacts; and
the one or more programs include instructions for:
  detecting a second portion of the first input, including detecting at least a threshold amount of movement of the one or more contacts after detecting that the one or more contacts of the first input have been maintained at the location that corresponds to the first content with less than the threshold amount of movement for at least a threshold amount of time, wherein:
    moving the container object from the first placement location to the second placement location is performed in response to detecting the second portion of the first input.

21. The electronic device of claim 18, wherein:
the first portion of the first input has a first predefined number of contacts; and
moving the container object from the first placement location to the second placement location is performed in response to detecting that the one or more contacts of the first input have been maintained at the location that corresponds to the first content with less than a threshold amount of movement for at least a threshold amount of time.

22. The electronic device of claim 18, wherein the first portion of the first input includes an initial movement of the one or more contacts that is at least a threshold amount of movement, and the one or more programs include instructions for:
  in response to detecting the initial movement of the one or more contacts, moving the copy of at least the portion of the first content from an original location of the portion of the first content in the first user interface to the first placement location; and
  after displaying the copy of at least the portion of the first content in the container object in response to detecting the first portion of the first input, detecting a second portion of the first input, including detecting additional movement of the one or more contacts after the initial movement of the one or more contacts, wherein:
    moving the container object from the first placement location to the second placement location is performed in response to detecting the additional movement of the one or more contacts, and
    the second placement location is offset from the one or more contacts in a predefined manner.

23. The electronic device of claim 18, wherein the container object includes a translucent background, and portions of the content are visible through the translucent background of the container object during movement of the container object.

24. The electronic device of claim 18, wherein the container object includes a background that separates the copy of at least the portion of the first content from the content.

25. The electronic device of claim 18, wherein the container object includes an indicator that indicates an insertion location for the first content.

26. The electronic device of claim 18, wherein displaying the copy of at least the portion of the first content in the container object includes:
  displaying a first portion of the first content with a first opacity; and
  displaying a second portion of the first content with a second opacity that is different from the first opacity.

27. The electronic device of claim 18, wherein displaying the copy of at least the portion of the first content in the container object includes:
  displaying the copy of at least the portion of the first content in the container object in a first configuration that corresponds to an original configuration of the portion of the first content; and
  reflowing at least the portion of the first content to display the copy of at least the portion of the first content in the container object in a second configuration that is different from the first configuration.

28. The electronic device of claim 18, wherein the one or more programs include instructions for:
  while the container object is displayed at the second placement location relative to the characteristic location of the one or more contacts, displaying an insertion cursor at a first location in the content that corresponds to an original location of the first content in the content.

29. The electronic device of claim 28, wherein the one or more programs include instructions for:
  while moving the container object in accordance with the movement of the one or more contacts while maintaining the container object at the second placement location relative to the characteristic location of the one or more contacts as the one or more contacts move across the touch-screen display, moving the insertion cursor through one or more permissible insertion locations within the content in accordance with the movement of the one or more contacts.

30. The electronic device of claim 28, wherein the one or more programs include instructions for:
  while moving the container object in accordance with the movement of the one or more contacts while maintaining the container object at the second placement location relative to the characteristic location of the one or more contacts, moving the insertion cursor from a first permissible insertion location to a second permissible insertion location, wherein the first permissible insertion location is in the first user interface, and the second permissible insertion location is in a second user interface that is distinct from the first user interface.

31. The electronic device of claim 18, wherein the one or more programs include instructions for:
  altering an appearance of the first content at an original location of the first content in the first user interface; and
  maintaining display of the first content with the altered appearance while moving the container object that displays the copy of at least the portion of the first content in accordance with the movement of the one or more contacts.

32. The electronic device of claim 31, wherein the one or more programs include instructions for:
  detecting termination of the first input while the one or more contacts are over the first user interface, including detecting lift-off of the one or more contacts; and
  in response to detecting the termination of the first input:
    displaying the first content at a first insertion location within the first user interface; and
    ceasing to display the first content at the original location of the first content in the first user interface.

33. The electronic device of claim 31, wherein the one or more programs include instructions for:
  detecting termination of the first input while the one or more contacts are over a second user interface, including detecting lift-off of the one or more contacts; and
  in response to detecting the termination of the first input:
    displaying the first content at a second insertion location within the second user interface; and
    restoring the appearance of the first content at the original location of the first content in the first user interface.

34. The electronic device of claim 31, wherein the one or more programs include instruction for:
  in response to detecting termination of the first input:
    in accordance with a determination that a permissible insertion location is currently identified for the first content, displaying the first content at the permissible insertion location that is currently identified for the first content; and
    in accordance with a determination that no permissible insertion location is currently identified for the first content, restoring the appearance of the first content at the original location of the first content in the first user interface without copying or moving the first content to another location that is different from the original location.

35. A non-transitory computer readable storage medium storing one or more programs, the one or more programs comprising instructions, which when executed by an electronic device with a touch-screen display, cause the electronic device to perform operations including:
  displaying content in a first user interface on the touch-screen display;
  while displaying the content in the first user interface on the touch-screen display, detecting a first user interaction that selects first content within the content;
  while displaying the first content in a selected state within the content, detecting a first portion of a first input that activates a move operation for the first content, including detecting one or more contacts on the touch-screen display at a location that corresponds to the first content in the selected state;
  in response to detecting the first portion of the first input that activates the move operation for the first content, displaying a copy of at least of a portion of the first content in a container object;
  moving the container object that displays the copy of at least the portion of the first content from a first placement location relative to a characteristic location of the one or more contacts on the touch-screen display to a second placement location relative to the characteristic location of the one or more contacts on the touch-screen display; and
  after moving the container object that displays the copy of at least the portion of the first content from the first placement location to the second placement location relative to the characteristic location of the one or more contacts, moving the container object that displays the copy of at least the portion of the first content in accordance with movement of the one or more contacts while maintaining the container object at the second placement location relative to the characteristic location of the one or more contacts as the one or more contacts move across the touch-screen display.

36. The non-transitory computer readable storage medium of claim 35, wherein displaying the copy of at least the portion of the first content in the container object includes:
  displaying the container object including at least the portion of the first content at the first placement location relative to the characteristic location of the one or more contacts on the touch-screen display, wherein the first placement location corresponds to an original display location of the first content, and is on a different z-layer from the original display location of the first content.

37. The non-transitory computer readable storage medium of claim 35, wherein:
  the first portion of the first input has a first predefined number of contacts; and
  the one or more programs include instructions, which when executed by the electronic device, cause the electronic device to perform operations including:
    detecting a second portion of the first input, including detecting at least a threshold amount of movement of the one or more contacts after detecting that the one or more contacts of the first input have been maintained at the location that corresponds to the first content with less than the threshold amount of movement for at least a threshold amount of time, wherein:
      moving the container object from the first placement location to the second placement location is performed in response to detecting the second portion of the first input.

38. The non-transitory computer readable storage medium of claim 35, wherein:
  the first portion of the first input has a first predefined number of contacts; and
  moving the container object from the first placement location to the second placement location is performed in response to detecting that the one or more contacts of the first input have been maintained at the location that corresponds to the first content with less than a threshold amount of movement for at least a threshold amount of time.

39. The non-transitory computer readable storage medium of claim 35, wherein:
  the first portion of the first input includes an initial movement of the one or more contacts that is at least a threshold amount of movement; and
  the one or more programs include instructions, which when executed by the electronic device, cause the electronic device to perform operations including:
    in response to detecting the initial movement of the one or more contacts, moving the copy of at least the portion of the first content from an original location of the portion of the first content in the first user interface to the first placement location; and
    after displaying the copy of at least the portion of the first content in the container object in response to detecting the first portion of the first input, detecting a second portion of the first input, including detecting additional movement of the one or more contacts after the initial movement of the one or more contacts, wherein:
      moving the container object from the first placement location to the second placement location is performed in response to detecting the additional movement of the one or more contacts; and
      the second placement location is offset from the one or more contacts in a predefined manner.

40. The non-transitory computer readable storage medium of claim 35, wherein the container object includes a translucent background, and portions of the content are visible through the translucent background of the container object during movement of the container object.

41. The non-transitory computer readable storage medium of claim 35, wherein the container object includes a background that separates the copy of at least the portion of the first content from the content.

42. The non-transitory computer readable storage medium of claim 35, wherein the container object includes an indicator that indicates an insertion location for the first content.

43. The non-transitory computer readable storage medium of claim 35, wherein displaying the copy of at least the portion of the first content in the container object includes:
    displaying a first portion of the first content with a first opacity; and
    displaying a second portion of the first content with a second opacity that is different from the first opacity.

44. The non-transitory computer readable storage medium of claim 35, wherein displaying the copy of at least the portion of the first content in the container object includes:
    displaying the copy of at least the portion of the first content in the container object in a first configuration that corresponds to an original configuration of the portion of the first content; and
    reflowing at least the portion of the first content to display the copy of at least the portion of the first content in the container object in a second configuration that is different from the first configuration.

45. The non-transitory computer readable storage medium of claim 35, wherein the one or more programs include instructions, which when executed by the electronic device, cause the electronic device to perform operations including:
    while the container object is displayed at the second placement location relative to the characteristic location of the one or more contacts, displaying an insertion cursor at a first location in the content that corresponds to an original location of the first content in the content.

46. The non-transitory computer readable storage medium of claim 45, wherein the one or more programs include instructions, which when executed by the electronic device, cause the electronic device to perform operations including:
    while moving the container object in accordance with the movement of the one or more contacts while maintaining the container object at the second placement location relative to the characteristic location of the one or more contacts as the one or more contacts move across the touch-screen display, moving the insertion cursor through one or more permissible insertion locations within the content in accordance with the movement of the one or more contacts.

47. The non-transitory computer readable storage medium of claim 45, wherein the one or more programs include instructions, which when executed by the electronic device, cause the electronic device to perform operations including:
    while moving the container object in accordance with the movement of the one or more contacts while maintaining the container object at the second placement location relative to the characteristic location of the one or more contacts, moving the insertion cursor from a first permissible insertion location to a second permissible insertion location, wherein the first permissible insertion location is in the first user interface, and the second permissible insertion location is in a second user interface that is distinct from the first user interface.

48. The non-transitory computer readable storage medium of claim 35, wherein the one or more programs include instructions, which when executed by the electronic device, cause the electronic device to perform operations including:
    altering an appearance of the first content at an original location of the first content in the first user interface; and
    maintaining display of the first content with the altered appearance while moving the container object that displays the copy of at least the portion of the first content in accordance with the movement of the one or more contacts.

49. The non-transitory computer readable storage medium of claim 48, wherein the one or more programs include instructions, which when executed by the electronic device, cause the electronic device to perform operations including:
    detecting termination of the first input while the one or more contacts are over the first user interface, including detecting lift-off of the one or more contacts; and
    in response to detecting the termination of the first input:
        displaying the first content at a first insertion location within the first user interface; and
        ceasing to display the first content at the original location of the first content in the first user interface.

50. The non-transitory computer readable storage medium of claim 48, wherein the one or more programs include instructions, which when executed by the electronic device, cause the electronic device to perform operations including:
    detecting termination of the first input while the one or more contacts are over a second user interface, including detecting lift-off of the one or more contacts; and
    in response to detecting the termination of the first input:
        displaying the first content at a second insertion location within the second user interface; and
        restoring the appearance of the first content at the original location of the first content in the first user interface.

51. The non-transitory computer readable storage medium of claim 48, wherein the one or more programs include instructions, which when executed by the electronic device, cause the electronic device to perform operations including:
    in response to detecting termination of the first input:
        in accordance with a determination that a permissible insertion location is currently identified for the first content, displaying the first content at the permissible insertion location that is currently identified for the first content; and
        in accordance with a determination that no permissible insertion location is currently identified for the first content, restoring the appearance of the first content at the original location of the first content in the first user interface without copying or moving the first content to another location that is different from the original location.

* * * * *